US008086880B2

(12) United States Patent
Ichikawa et al.

(10) Patent No.: US 8,086,880 B2
(45) Date of Patent: Dec. 27, 2011

(54) INFORMATION PROCESSING APPARATUS, INFORMATION PROCESSING METHOD, AND COMPUTER PROGRAM

(75) Inventors: Norihito Ichikawa, Kanagawa (JP); Koji Takashima, Chiba (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/292,408

(22) Filed: Nov. 19, 2008

(65) Prior Publication Data

US 2009/0083557 A1 Mar. 26, 2009

Related U.S. Application Data

(62) Division of application No. 11/154,873, filed on Jun. 17, 2005, now Pat. No. 7,536,229.

(30) Foreign Application Priority Data

Jul. 5, 2004 (JP) ................................. 2004-198300

(51) Int. Cl.
*G06F 1/00* (2006.01)
*G06F 19/00* (2006.01)
*G05B 19/18* (2006.01)

(52) U.S. Cl. ............. 713/310; 700/2; 700/100; 712/226
(58) Field of Classification Search .................. 713/310; 700/2, 100; 712/226
See application file for complete search history.

(56) References Cited

U.S. PATENT DOCUMENTS

| 5,727,221 A * | 3/1998 | Walsh et al. .................. 713/310 |
| 6,587,953 B1 * | 7/2003 | Torikai .......................... 713/330 |
| 7,472,293 B2 * | 12/2008 | Kuhlmann et al. ........... 713/300 |
| 7,536,229 B2 * | 5/2009 | Ichikawa et al. .................. 700/2 |
| 7,895,455 B2 * | 2/2011 | Green et al. .................. 713/300 |
| 2004/0126097 A1 | 7/2004 | Aridome |

FOREIGN PATENT DOCUMENTS

| JP | 06-035871 A | 2/1994 |
| JP | 08-016531 A | 1/1996 |
| JP | 09-034601 | 2/1997 |
| JP | 11-296488 A | 10/1999 |
| JP | 2000-112559 | 4/2000 |

(Continued)

OTHER PUBLICATIONS

Japanese Office Action issued Aug. 20, 2009 for corresponding Japanese Application No. 2004-198300.

(Continued)

*Primary Examiner* — Mark Rinehart
*Assistant Examiner* — Jeremy S Cerullo
(74) *Attorney, Agent, or Firm* — Rader, Fishman & Grauer PLLC

(57) ABSTRACT

An information processing apparatus includes a first information processor, a plurality of second information processor, and a plurality of temperature detecting units detecting temperature in the vicinity of each of the plurality of second information processors. The first information processor includes an application program execution control unit controlling execution of an application program, a distributed processing control unit controlling distributed processing, a recording unit recording first information relating to temperature detected by the temperature detecting unit, and second information relating to the execution of the process of the second information processor, an anomaly detecting unit detecting an anomaly in the temperature detected by the temperature detecting unit, and an anomaly-time control unit controlling the distributed processing of the distributed processing control unit in response to the temperature anomaly detected by the anomaly detecting unit.

14 Claims, 57 Drawing Sheets

FOREIGN PATENT DOCUMENTS

| | | |
|---|---|---|
| JP | 2001-145174 | 5/2001 |
| JP | 2002-108839 A | 4/2002 |
| JP | 2002-304232 | 10/2002 |
| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| JP | 2004-126968 A | 4/2004 |
| WO | WO-03/083693 A1 | 10/2003 |

OTHER PUBLICATIONS

Supplementary European Search Report, Application No./Patent No. 05753494.3/2202/1659790 PCT/JP2005011335; Dated: Oct. 22, 2008.

* cited by examiner

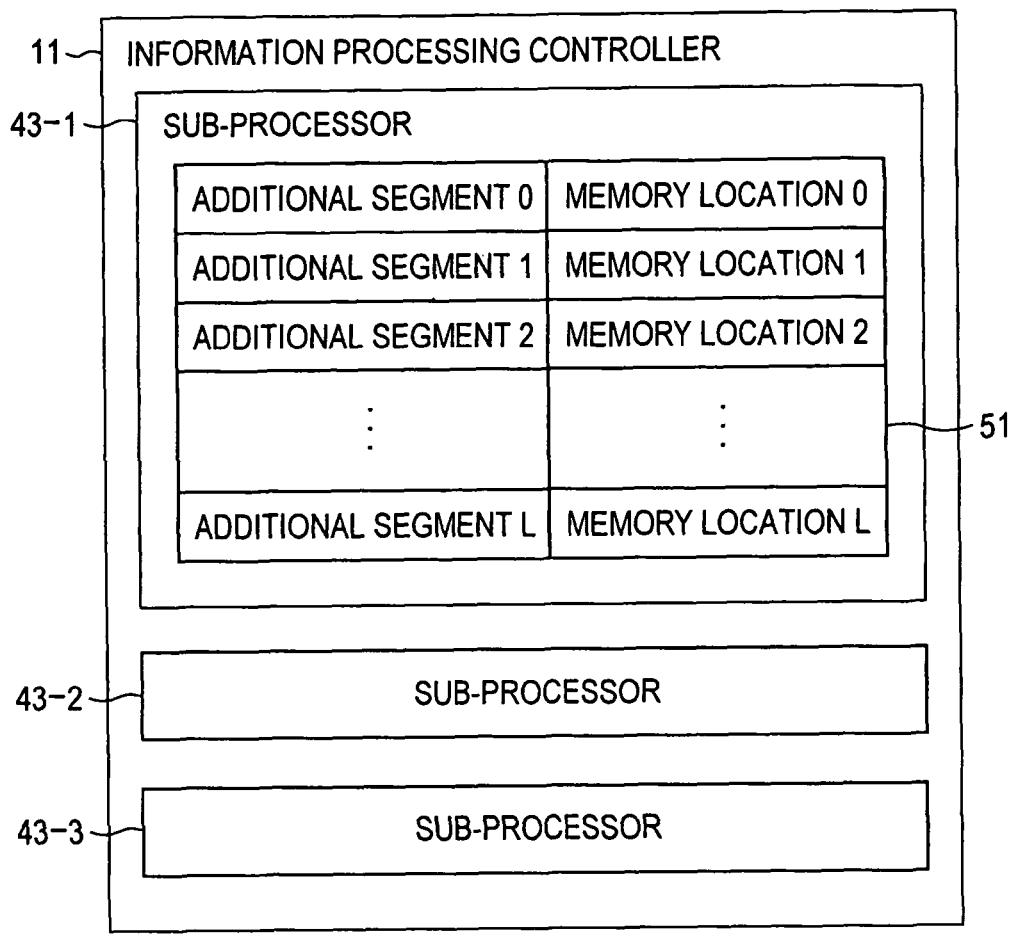

FIG. 13

CONTROLLER ID
HEAT SINK TEMPERATURE

MAIN PROCESSOR TEMPERATURE
MAIN PROCESSOR TEMPERATURE UPPER LIMIT

SUB-PROCESSOR 1 TEMPERATURE
SUB-PROCESSOR 1 TEMPERATURE UPPER LIMIT
SUB-PROCESSOR 1 OPERATING STATE

⋮

SUB-PROCESSOR 8 TEMPERATURE
SUB-PROCESSOR 8 TEMPERATURE UPPER LIMIT
SUB-PROCESSOR 8 OPERATING STATE

SUB-PROCESSOR LAYOUT INFORMATION

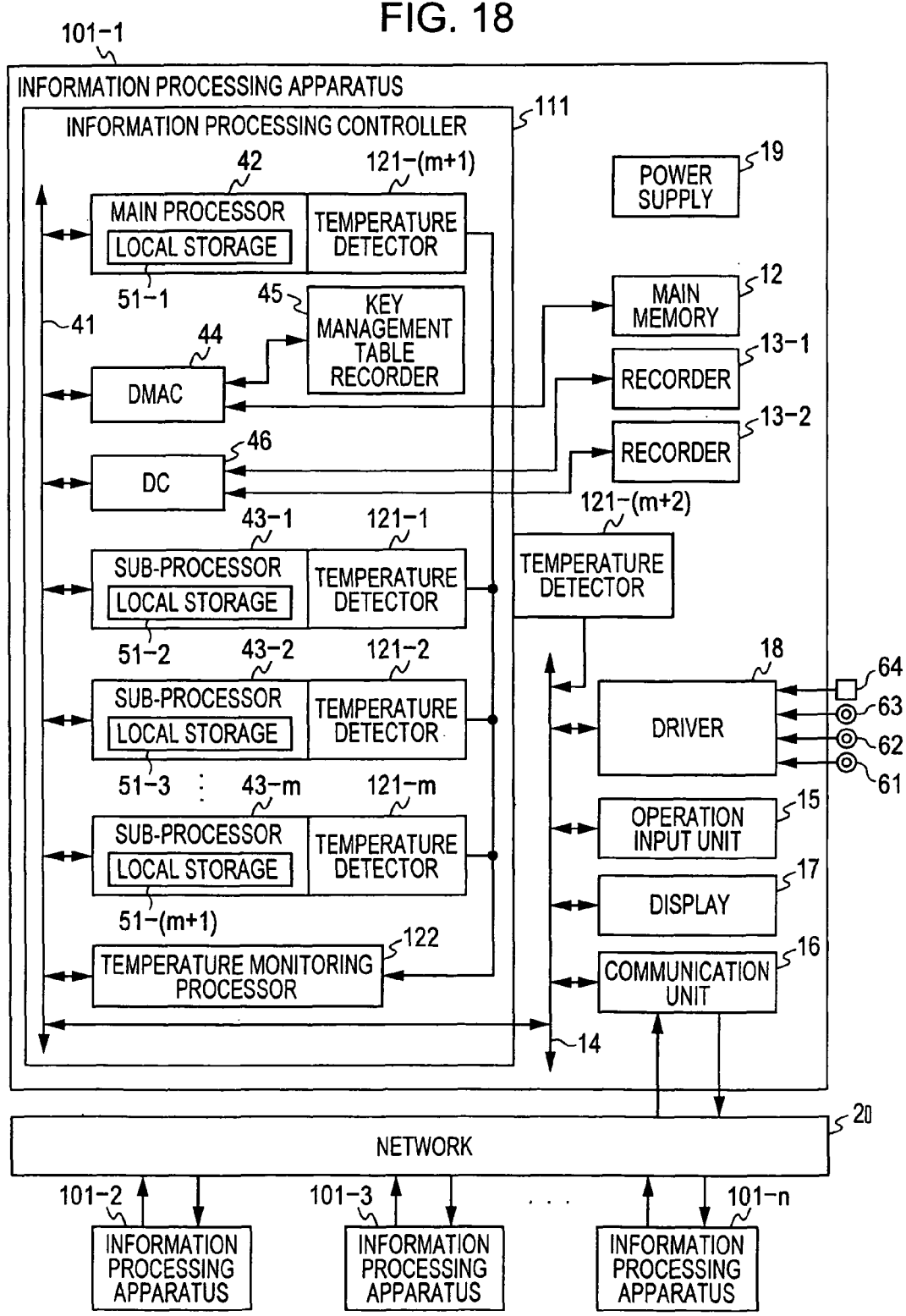

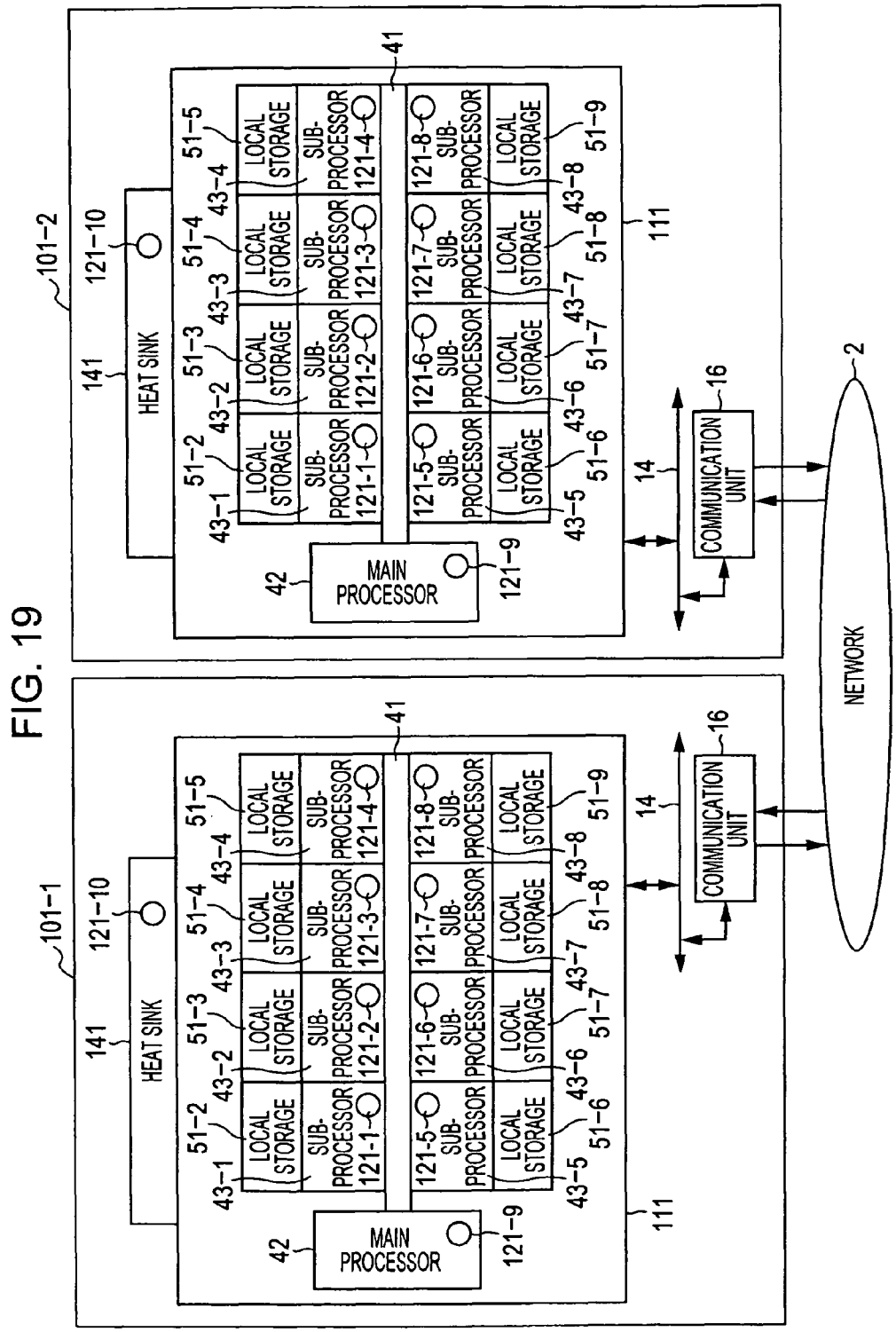

INFORMATION PROCESSING APPARATUS, INFORMATION PROCESSING METHOD, AND COMPUTER PROGRAM

CROSS REFERENCES TO RELATED APPLICATIONS

The present application is a Divisional Application of the patent application Ser. No. 11/154,873, filed Jun. 17, 2005, which is based on the priority application JP-2004-198300 filed on Jul. 5, 2004, the entire contents of which are incorporated herein by reference.

BACKGROUND OF THE INVENTION

1. Field of the Invention

The present invention relates to an information processing apparatus, an information processing method, and a computer program and, in particular, to an information processing apparatus, an information processing method, and a computer program appropriate for distributed processing performed by a plurality of processors.

2. Description of the Related Art

Distributed processing for distributing a process among a plurality of processors or computers for execution currently draws attention. In a first method, distributed processing is performed by a plurality of computers connected via a communication network. In a second method, distributed processing is performed among a plurality of processors arranged in a single computer. In a third method, the first method and the second method are combined.

An apparatus or a processor requesting the execution of distributed processing transmits data and a program, required to perform distributed process, to another apparatus or another processor which is going to perform distributed processing. Upon receiving the data and the program, the apparatus or the processor performs the requested process, and sends back processed data to the requesting computer or the requesting processor.

Upon receiving the data from the computer or the processor, the requesting computer or the requesting processor performs a predetermined process or records the received data.

Japanese Unexamined Patent Application Publications Nos. 2002-342165, 2002-351850, 2002-358289, 2002-366533, and 2002-366534 disclose high-speed computer architecture techniques that perform distributed processing using a uniform modular structure, a common computing module, and a uniform software cell.

With an ever-increasing clock speed and higher degree of integration implemented in information processing apparatuses, the use of a plurality of processors permits distributed processing to be performed without the need for a large-scale computer.

In the techniques stated in the above disclosure, a basic processing module is a processor element (PE). The PE includes a processor unit (PU), a direct-memory access controller (DMAC), and a plurality of additional processor units (APU), namely, a plurality of sub-processors for the main processor.

Known processor systems perform a variety of power control methods. Japanese Unexamined Patent Application Publication No. 9-34601 discloses a power control method in which each processor stops and resumes operation with a network and a system controller continuously kept running. Japanese Unexamined Patent Application Publication No. 2002-304232 discloses another power control method in which an operating frequency and a power supply voltage are controlled in response to loads. Japanese Unexamined Patent Application Publication No. 2001-526809 discloses yet another power control method in which a fault tolerance system blocks power to a central processing unit (CPU). Japanese Unexamined Patent Application Publication No. 2000-112559 discloses a power control system in which a multiprocessor system automatically detects no load state to control a clock frequency. Japanese Unexamined Patent Application Publication No. 2001-145174 discloses a power control method in which device cooperation is controlled in response to a change in environment and status.

SUMMARY OF THE INVENTION

With an ever-increasing clock speed and higher degree of integration implemented in information processing apparatuses, a plurality of extremely-high speed processors are mounted on a single chip. A plurality of processors mounted on a single chip perform respective independent programs, thereby performing a process to determine a solution as a single logical function (logical thread). The amount of heat at the location of a processor within the chip is substantially increased in comparison with the conventional art. In other words, heat density becomes substantially higher.

Processors are subject to runaway or malfunction due to heat unless any remedial step is applied to a temperature rise at the location of processors on the chip. The conventional distributed processing system is unable to guarantee that each processor and the surrounding area thereof on the chip stay within a normal operating temperature range. Each processor fails to perform highly reliable information processing in a device-degradation free manner.

Temperature rise on the chip is not considered in the known distributed processing system. No technique is available to transfer or interchange a process (thread) between a plurality of processors in response to the temperature rise at the location of each processor. In other words, no consideration is given to the operational status of the processors, temperature on the chip, and the layout of the processors on the chip in terms of the budget of the logical thread, and the selection of the processor as a transfer target or an interchange target of the process (thread).

With an ever-increasing clock speed and higher degree of integration implemented in information processing apparatuses, power consumed for processing is dramatically increased. In the power control method in the known processor system, every effort is made to reduce power consumed by processes other than the original process of the apparatus. In the known information processing apparatus performing the distributed processing, no consideration is given to the case in which power supplied to the processor (or the processor group) becomes insufficient or to the case in which continuous operation is desired with the power consumption of the processor (or the processor group) kept to a certain level It is thus desirable to provide an information processing apparatus that performs highly reliable information processing with a function operating as a logical thread in a device degradation free manner even when any processor suffers from temperature rise or an abnormal power supply state in the middle of distributed processing.

An information processing apparatus of an embodiment of the present invention includes a first information processor, a plurality of second information processor, and a plurality of temperature detecting units, each temperature detecting unit for detecting temperature in the vicinity of each of the plurality of second information processor. The first information processor includes an application program execution control unit for controlling execution of an application program, a distributed processing control unit for controlling distributed processing that performs process assignment on the plurality of second information processors in order to provide a function corresponding to a process unit, the application program execution control unit, when executing an application program, forming a plurality of processes to be respectively assigned to the plurality of second information processors, into the process unit for providing the function, a recording unit for recording first information relating to temperature detected by the temperature detecting unit, and second information relating to the execution of the process of the second information processor, an anomaly detecting unit for detecting an anomaly in the temperature detected by the temperature detecting unit, and an anomaly-time control unit for controlling the distributed processing of the distributed processing control unit in response to the temperature anomaly detected by the anomaly detecting unit. The anomaly-time control unit controls the distributed processing control unit to update, based on the first information and the second information recorded by the recording unit, the assignment of the process being executed by the second information processor that is detected to be in temperature anomaly.

The anomaly-time control unit may control the distributed processing control unit to update the assignment of the process so that one of the second information processor detected not to be in temperature anomaly is selected and so that the process being executed by the second information processor detected to be in temperature anomaly is reassigned to the selected second information processor for execution.

The anomaly-time preferably control unit may select, as a process assignment target with high priority based on the first information recorded by the recording unit, one of the second information processor having a vicinity temperature which, as detected by the temperature detecting unit, is lower than the vicinity temperatures of the other second information processor.

The anomaly-time control unit may select, as a process assignment target with high priority based on the second information recorded by the recording unit, one of the second information processor having not started executing the process.

The anomaly-time control unit may control the distributed processing control unit to update the process assignment so that one of the second information processor detected not to be in temperature anomaly is selected, and so that the process being executed by the second information processor detected to be in temperature anomaly is interchanged with the process being executed the selected second information processor in execution of the processes.

The anomaly-time control unit may select, as a process interchange target with high priority based on the first information recorded by the recording unit, one of the second information processor having a vicinity temperature which, as detected by the temperature detecting unit, is lower than the vicinity temperatures of the other second information processor.

The anomaly-time control unit may select, as a process interchange target with high priority based on the second information recorded by the recording unit, one of the second information processor having not started executing the process.

The information processing apparatus may further include a communication unit for communicating with another information processing apparatus.

The information processing apparatus may form a network system together with at least another information processing apparatus via the communication unit and, if own information processing apparatus functions as a master apparatus, the communication unit receives the first information and the second information of the other information processing apparatus from the other information processing apparatus. The recording unit further records the first information and the second information of the other information processing apparatus, received by the communication unit. The anomaly detecting unit further detects a temperature anomaly generated in the other information processing apparatus communicable via the communication unit, based on the first information of the other information processing apparatus recorded by the recording unit. The anomaly-time control unit controls the distributed processing control unit to update the assignment of the process being executed by the second information processor detected to be in temperature anomaly, based on the first information and the second information of own information processing apparatus and the other information processing apparatus, recorded by the recording unit, if the anomaly detecting unit detects the temperature anomaly. If own information processing apparatus functions as a slave apparatus in the network system, the communication unit transmits the first information and the second information, recorded by the recording unit, to the other information processing apparatus as a master apparatus in the network system.

The anomaly-time control unit may generate a first signal requesting the other information processing apparatus communicable via the communication unit to transmit the first information and the second information of the other information processing apparatus if the anomaly detecting unit detects temperature anomaly. The communication unit transmits the first signal to the other information processing apparatus while receiving, from the other information processing apparatus, a second signal corresponding to the first information and the second information. The anomaly-time control unit controls the distributed processing control unit to update the assignment of the process being executed by the second information processor, detected to be in temperature anomaly, in response to the second signal received by the communication unit.

The anomaly-time control unit may generate a first signal requesting the other information processing apparatus communicable via the communication unit to execute the process being executed by the second information processor detected to be in temperature anomaly if the anomaly detecting unit detects the temperature anomaly, and the communication unit may transmit the first signal to the other information processing apparatus while receiving, from the other information processing apparatus, a second signal in reply to the first signal. The anomaly-time control unit may control the distributed processing control unit to update the assignment of the process being executed by the second information processor detected to be in temperature anomaly, in response to the second signal received by the communication unit.

The information processing apparatus may include a plurality of information processing modules, each module including the first information processor and the second information processor.

The information processing apparatus may further include a power measurement unit for measuring power consumed by the information processing module including the first information processor and the second information processor. The recording unit may further record information relating to the power consumption measured by the power measurement unit. The anomaly detecting unit may further detect an anomaly in the power consumption measured by the power measurement unit. The anomaly-time control unit may control the distributed processing performed by the distributed processing control unit if the anomaly detecting unit detects one of the temperature anomaly and the power consumption anomaly.

In accordance with one embodiment of the present invention, an information processing method of an information processing apparatus including first information processor and a plurality of second information processor, includes steps of requesting the start of distributed processing for providing a function corresponding to a process unit, the first information processor, when executing an application program, forming a plurality of processes to be respectively assigned to the plurality of second information processors, into the process unit for providing the function, acquiring temperature information of temperature generated in the vicinity of the second information processor, detecting a temperature anomaly in the temperature information acquired in the temperature information acquisition step, determining one of the second information processor, the vicinity temperature of which is detected to be in temperature anomaly in the anomaly detecting step, and controlling the distributed processing to update the assignment of the process being executed by the second information processor detected to be in temperature anomaly, based on the temperature information acquired in the temperature information acquisition step and the determination result provided in the determination step.

In accordance with another embodiment of the present invention, a computer program for causing a computer to control distributed processing with first information processor and a plurality of second information processor, includes steps of requesting the start of distributed processing for providing a function corresponding to a process unit, the first information processor, when executing an application program, forming a plurality of processes to be respectively assigned to the plurality of second information processors, into the process unit for providing the function, acquiring temperature information of temperature generated in the vicinity of the second information processor, detecting a temperature anomaly in the temperature information acquired in the temperature information acquisition step, determining one of the second information processor, the vicinity temperature of which is detected to be in temperature anomaly in the anomaly detecting step, and controlling the distributed processing to update the assignment of the process executed by the second information processor detected to be in temperature anomaly, based on the temperature information acquired in the temperature information acquisition step and the determination result provided in the determination step.

With the first information processor performing the application program, the request to start the distributed processing is issued, the temperature information concerning temperature in the vicinity of the first information processor or the second information processor is acquired, and the temperature anomaly is detected. One of the first information processor and the second information processors, the vicinity temperature of which is detected to be in anomaly is determined. Based on the temperature information and the determination results, the distributed processing is controlled so that the assignment of the process being executed by the second information processor in temperature anomaly is updated.

In accordance with yet another embodiment of the present invention, an information processing apparatus includes a first information processor, a plurality of second information processor, a power measurement unit for measuring power consumed by an information processing module including the first information processor and the second information processor, and a communication unit for communicating with the other information processing apparatus. The first information processor includes an application program execution control unit for controlling execution of an application program, a distributed processing control unit for controlling distributed processing that performs process assignment on the plurality of second information processors in order to provide a function corresponding to a process unit, the application program execution control unit, when executing the application program, forming a plurality of processes to be respectively assigned to the plurality of second information processors, into the process unit for providing the function, a recording unit for recording first information relating to power measured by the power measurement unit, and second information relating to the execution of the process of the second information processor, an anomaly detecting unit for detecting an anomaly in the power consumption measured by the power measurement unit, and an anomaly-time control unit for controlling the distributed processing of the distributed processing control unit in response to the power anomaly detected by the anomaly detecting unit. The anomaly-time control unit controls the distributed processing control unit to update, based on the first information and the second information recorded by the recording unit, the assignment of the process being executed by the plurality of second information processor contained in the information processing module detected to be in power anomaly.

The information processing apparatus may form a network system together with at least another information processing apparatus and if own information processing apparatus functions as a master apparatus, the communication unit receives the first information and the second information of the other information processing apparatus from the other information processing apparatus. The recording unit further records the first information and the second information of the other information processing apparatus, received by the communication unit. The anomaly detecting unit further detects a power anomaly generated in the other information processing apparatus communicable via the communication unit, based on the first information of the other information processing apparatus recorded by the recording unit. The anomaly-time control unit controls the distributed processing control unit to update the assignment of the process being executed by the plurality of second information processor contained in the information processing module detected to be in power anomaly, based on the first information and the second information of own information processing apparatus and the other information processing apparatus, recorded by the recording unit, if the anomaly detecting unit detects the power anomaly. If own information processing apparatus functions as a slave apparatus in the network system, the communication unit transmits the first information and the second information, recorded by the recording unit, to the other information processing apparatus as a master apparatus in the network system.

The anomaly-time control unit may generate a first signal requesting the other information processing apparatus communicable via the communication unit to transmit the first information and the second information of the other information processing apparatus if the anomaly detecting unit detects the power anomaly. The communication unit may transmit the first signal to the other information processing apparatus while receiving, from the other information processing apparatus, a second signal corresponding to the first information and the second information. The anomaly-time control unit may control the distributed processing control unit to update the assignment of the process being executed by the plurality of second information processor contained in the information processing module detected to be in power anomaly, in response to the second signal received by the communication unit.

In the information processing apparatus, the anomaly-time control unit may generate a first signal requesting the other information processing apparatus communicable via the communication unit to execute the process being executed by the second information processor detected to be in power anomaly if the anomaly detecting unit detects the power anomaly. The communication unit may transmit the first signal to the other information processing apparatus while receiving, from the other information processing apparatus, a second signal in reply to the first signal. The anomaly-time control unit may control the distributed processing control unit to update the assignment of the process being executed by the plurality of second information processor contained in the information processing module detected to be in power anomaly, in response to the second signal received by the communication unit.

In the information processing apparatus, the anomaly-time control unit may control the distributed processing control unit to update the process assignment so that one of the other image processing modules detected not to be in any power anomaly is selected, and so that the process being executed by the plurality of second information processor contained in the information processing module detected to be in power anomaly is performed by the plurality of second information processor contained in the selected information processing module.

In the information processing apparatus, the anomaly-time control unit may select, as a process assignment target with high priority, the information processing module consuming power which, as detected by the anomaly detecting unit, is lower than the power consumed by the other information processor.

In the information processing, the anomaly-time control unit may select, as a process assignment target with higher priority, the information processing module operating from an alternating current source than the information processing module operating from a battery power source.

In the information processing apparatus, the anomaly-time control unit may control the distributed processing control unit to update the process assignment so that one of the second information processing modules detected not to be in power anomaly is selected, and so that the process being executed by the plurality of second information processor in the information processing module detected to be in power anomaly is interchanged with the process of the plurality of second information processor in the selected information processing module in execution of the processes.

The anomaly-time control unit may select, a process interchange target with high priority, the information processing module consuming power which, as detected by the anomaly detecting unit, is lower than the power consumed by the other information processing module.

The anomaly-time control unit may select, as a process interchange target with higher priority, the information processing module operating from an alternating current source than the information processing module operating from a battery power source.

The information processing apparatus may further include a plurality of information processing modules.

In accordance with another embodiment of the present invention, an information processing method of an information processing apparatus including first information processor, a plurality of second information processor, and communication unit for communicating with another information processing apparatus, includes steps of requesting the start of distributed processing for providing a function corresponding to a process unit, the first information processor, when executing an application program, forming a plurality of processes to be respectively assigned to the plurality of second information processors, into the process unit for providing the function, acquiring information relating to power consumed by an information processing module including the first information processor and the second information processor, detecting an anomaly in the information relating to the power consumption acquired in the power information acquisition step, and controlling the distributed processing to update the assignment of the process being executed by the second information processor in the information processing module detected to be in power anomaly, based on the power information acquired in the power information acquisition step.

In accordance with yet another embodiment of the present invention, a computer program for causing a computer to perform distributed processing with first information processor, a plurality of second information processor, and communication unit for communicating with another information processing apparatus, includes steps of requesting the start of distributed processing for providing a function corresponding to a process unit, the first information processor, when executing an application program, forming a plurality of processes to be respectively assigned to the plurality of second information processors, into the process unit for providing the function, acquiring information relating to power consumed by an information processing module including the first information processor and the second information processor, detecting an anomaly in the information relating to the power consumption acquired in the power information acquisition step, and controlling the distributed processing to update the assignment of the process executed by the second information processor in the information processing module detected to be in power anomaly, based on the power information acquired in the power information acquisition step.

With the first information processor performing the application program, the request to start the distributed processing is issued, the power information concerning power consumed by the first information processor or the second information processor is acquired, and the power anomaly may be detected. One of the first information processor and the second information processors detected to be in power anomaly is determined. Based on the power information, the distributed processing is controlled so that the assignment of the process being executed by the second information processor in power anomaly is updated.

In accordance with embodiments of the present invention, the distributed processing is performed. If the temperature information of a processor is acquired, and a temperature anomaly is detected in the temperature information, the distributed processing is controlled to update the process assignment. The function operating as a logical thread is maintained at normal state while device degradation is controlled. Highly reliable information processing is thus performed.

If the power information of a processor is acquired, and a power anomaly is detected in the power information, the distributed processing is controlled to update the process assignment. The function operating as a logical thread is maintained at normal state while device degradation is controlled. Highly reliable information processing is thus performed.

BRIEF DESCRIPTION OF THE DRAWINGS

FIG. 4 illustrates a local storage of a sub-processor of the information processing apparatus;

FIG. 5 illustrates a key management table of the information processing apparatus;

FIG. 13 illustrating a temperature management table of the information processing apparatus;

FIG. 18 illustrates the structure of an information processing controller in accordance with one embodiment of the present invention;

FIG. 19 illustrates the structure of a chip in the information processing apparatus of FIG. 18;

DESCRIPTION OF THE PREFERRED EMBODIMENTS

Figure 1:
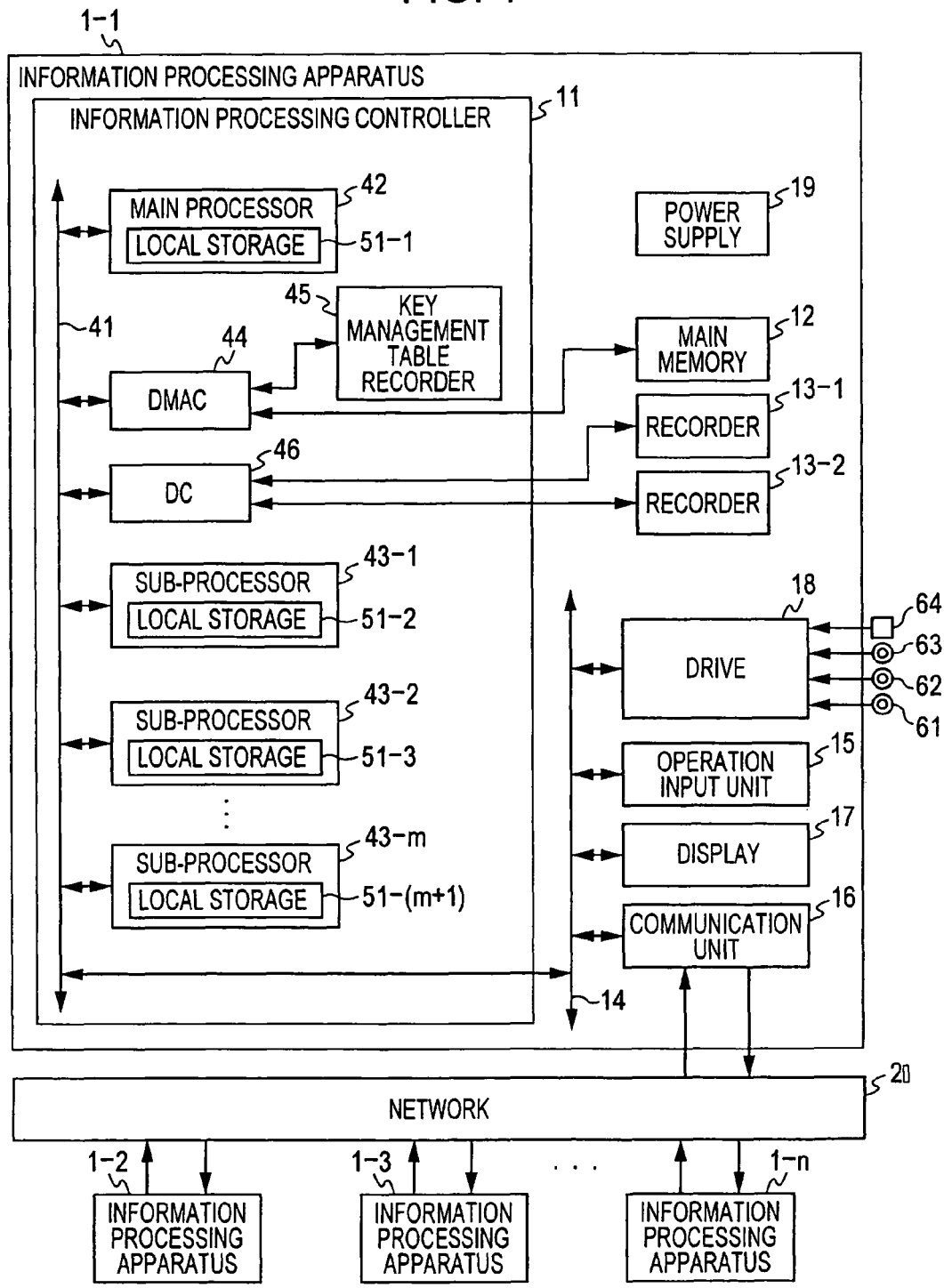
FIG. 1 illustrates a communication system in accordance with one embodiment of the present invention.

In accordance with one embodiment of the present invention, an information processing apparatus includes a first information processor (for example, a main processor 42), a plurality of second information processors (for example, sub-processors 43), and a plurality of temperature detecting units (for example, temperature detectors 121) for detecting temperature in the vicinity of each of the plurality of second information processor. The first information processor includes an application program execution control unit (for example, an arithmetic processor 161) for controlling execution of an application program, a distributed processing control unit (for example, one of a logical thread management processor 163, a logical thread management processor 217, and a logical thread management processor 457) for controlling distributed processing that performs process assignment on the plurality of second information processors in order to provide a function corresponding to a process unit, the application program execution control unit, when executing an application program, forming a plurality of processes to be respectively assigned to the plurality of second information processors, into the process unit for providing the function, a recording unit (for example, one of a temperature management table 167, a temperature management table 215, a temperature management table 233, and a temperature and power management table 452) for recording first information relating to temperature detected by the temperature detecting unit, and second information relating to the execution of the process of the second information processor, an anomaly detecting unit (for example, one of a temperature rise detector 168 and an anomaly detector 453) for detecting an anomaly in the temperature detected by the temperature detecting unit, and an anomaly-time control unit (for example, one of a temperature anomaly correction controller 169, a temperature anomaly correction controller 216, a temperature anomaly correction controller 234, a temperature anomaly correction controller 252, and an anomaly correction controller 455) for controlling the distributed processing of the distributed processing control unit if the temperature anomaly is detected by the anomaly detecting unit. The anomaly-time control unit controls the distributed processing control unit to update, based on the first information and the second information recorded by the recording unit, the assignment of the process being executed by the second information processor detected to be in temperature anomaly.

The information processing apparatus further includes a communication unit (for example, a communication unit 16) for communicating with another information processing apparatus.

The information processing apparatus further includes a plurality of information processing modules (such as the information processing controller), each module including the first information processor and the second information processor.

The information processing apparatus further includes a power measurement unit (for example, a power measurement unit 321) for measuring power consumed by the information processing module including the first information processor and the second information processor. The recording unit (for example, a temperature and power management table 452) further records the information relating to the power measured by the power measurement unit. The anomaly detecting unit (for example, an anomaly detector 453) detects a power anomaly in the power consumption measured the power measurement unit. The anomaly-time control unit (for example, the anomaly correction controller 455) controls the distributed processing of the distributed processing control unit if the anomaly detecting unit detects a temperature anomaly or a power anomaly.

Figure 15:
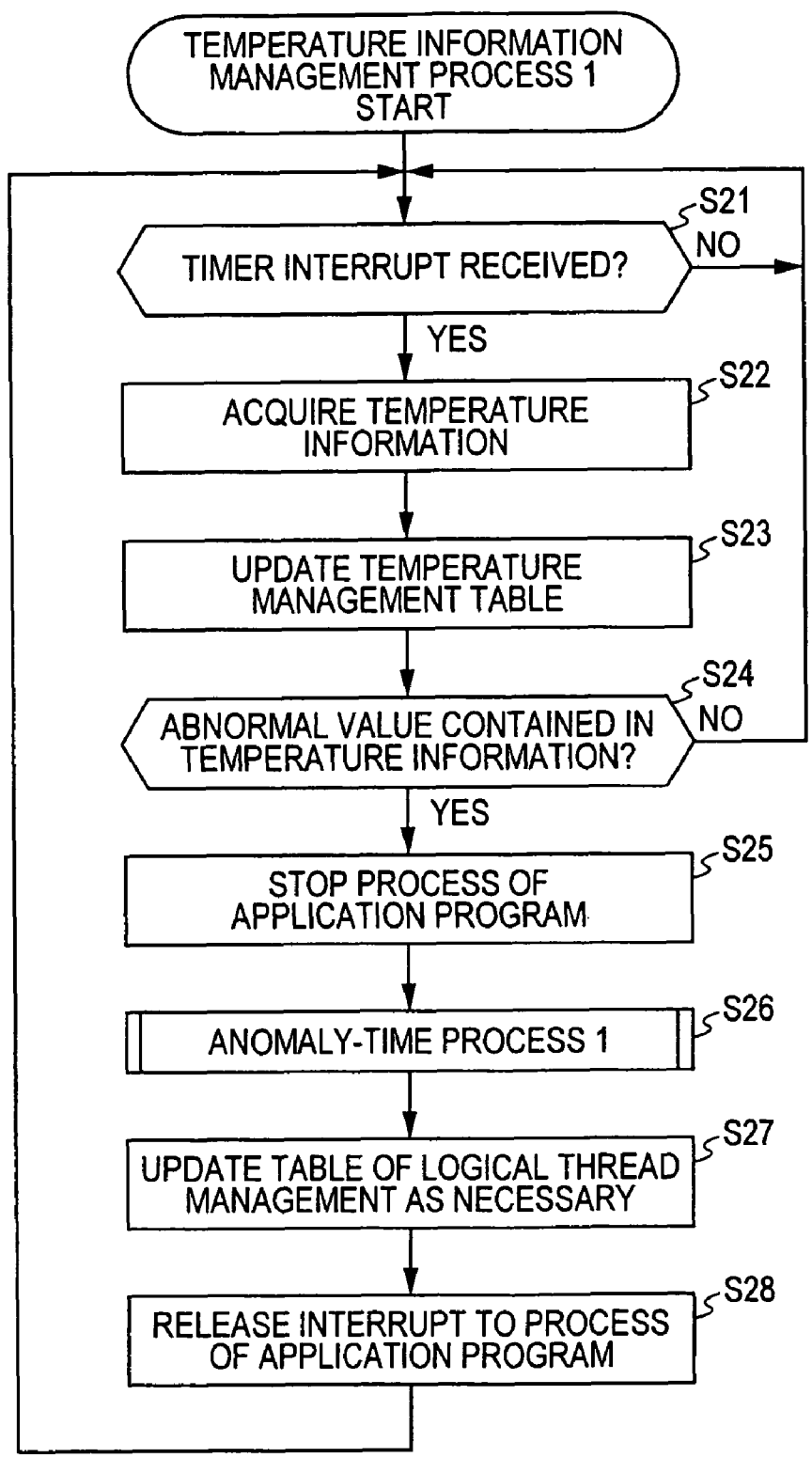
FIG. 15 is a flowchart illustrating a temperature information management process 1.
Figure 16:
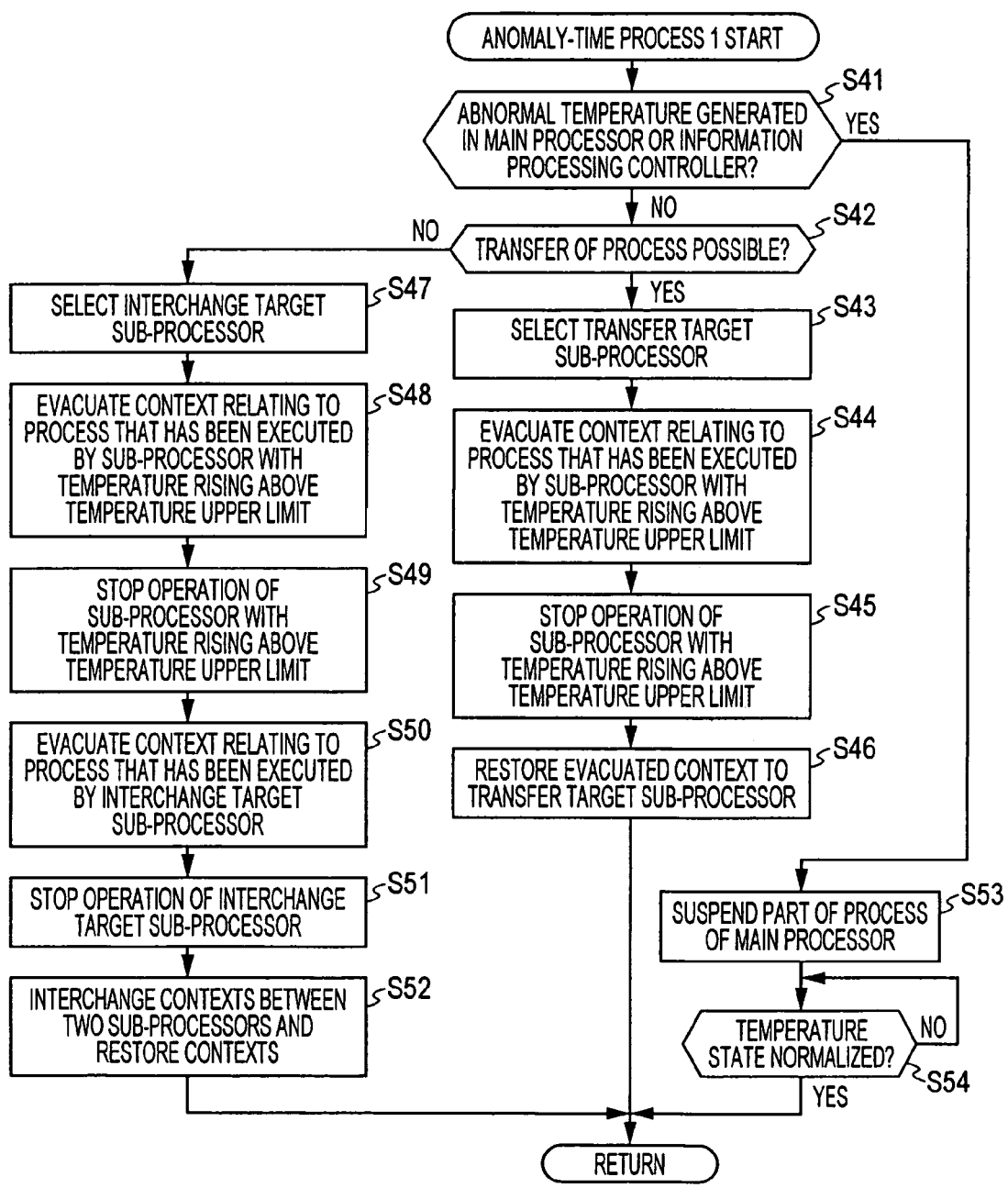
FIG. 16 is a flowchart illustrating an anomaly-time process 1 of the information processing apparatus.
Figure 22:
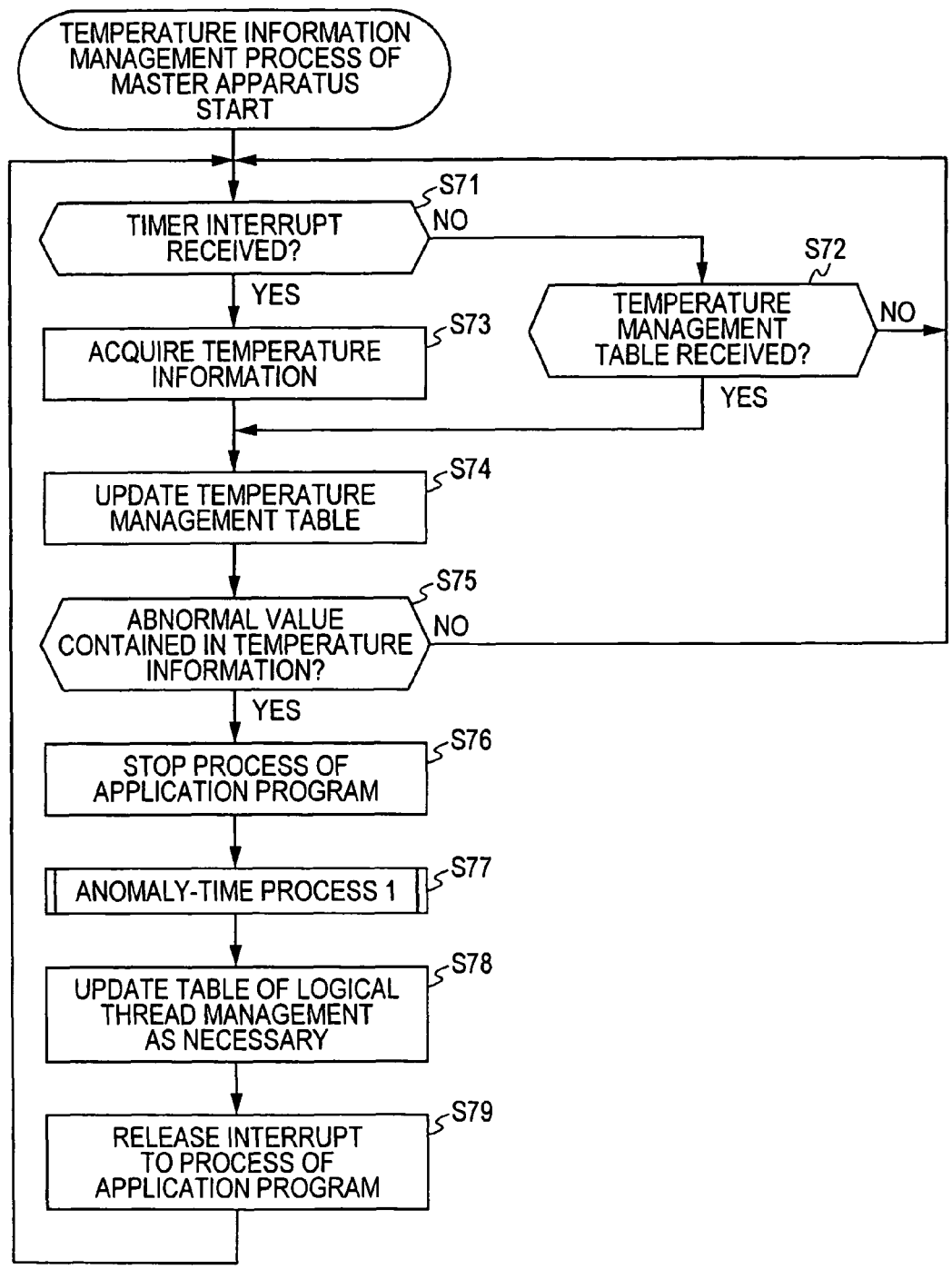
FIG. 22 is a flowchart illustrating a temperature information management process of a master apparatus.
Figure 23:
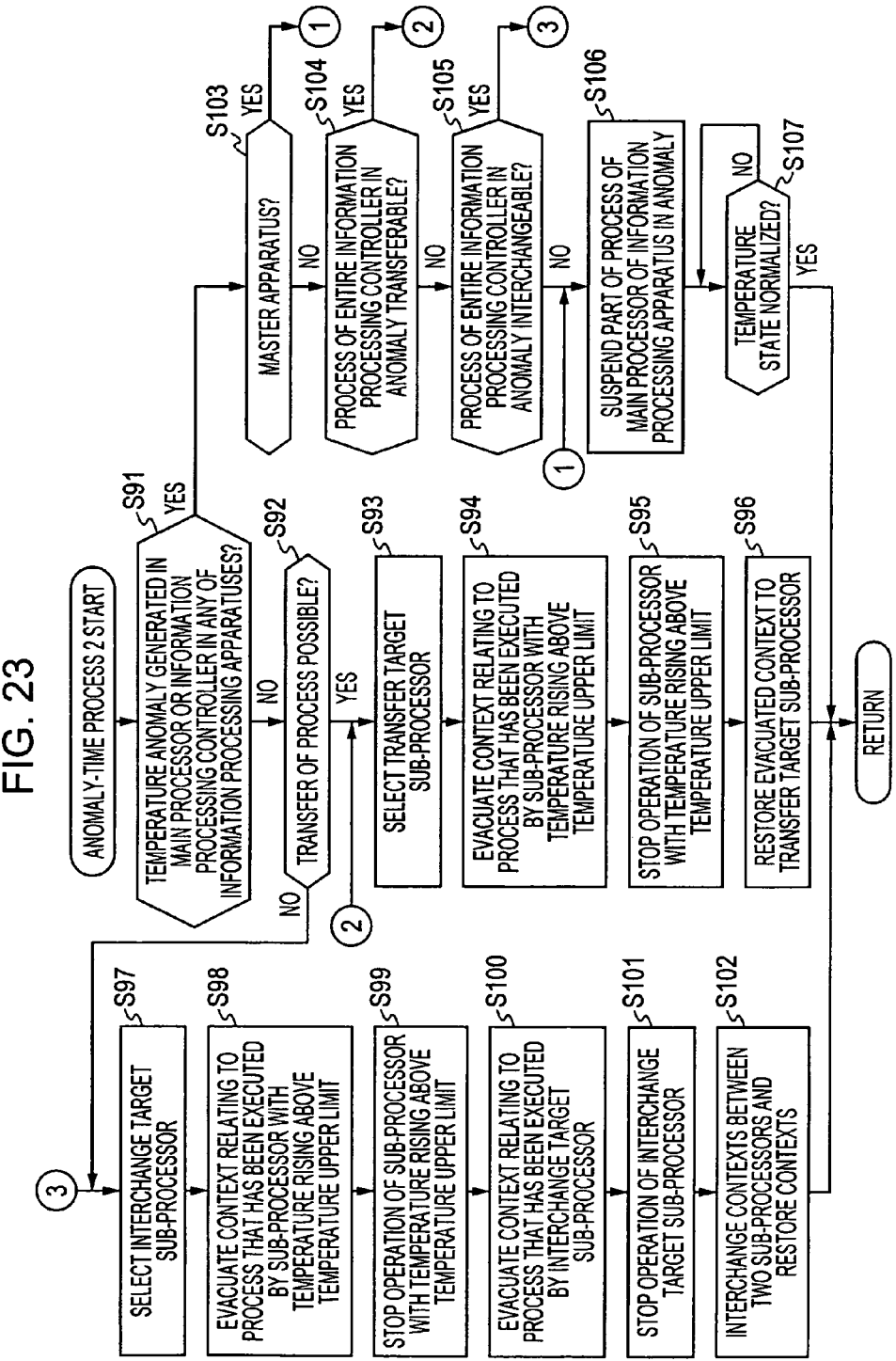
FIG. 23 is a flowchart illustrating an anomaly-time process 2.
Figure 27:
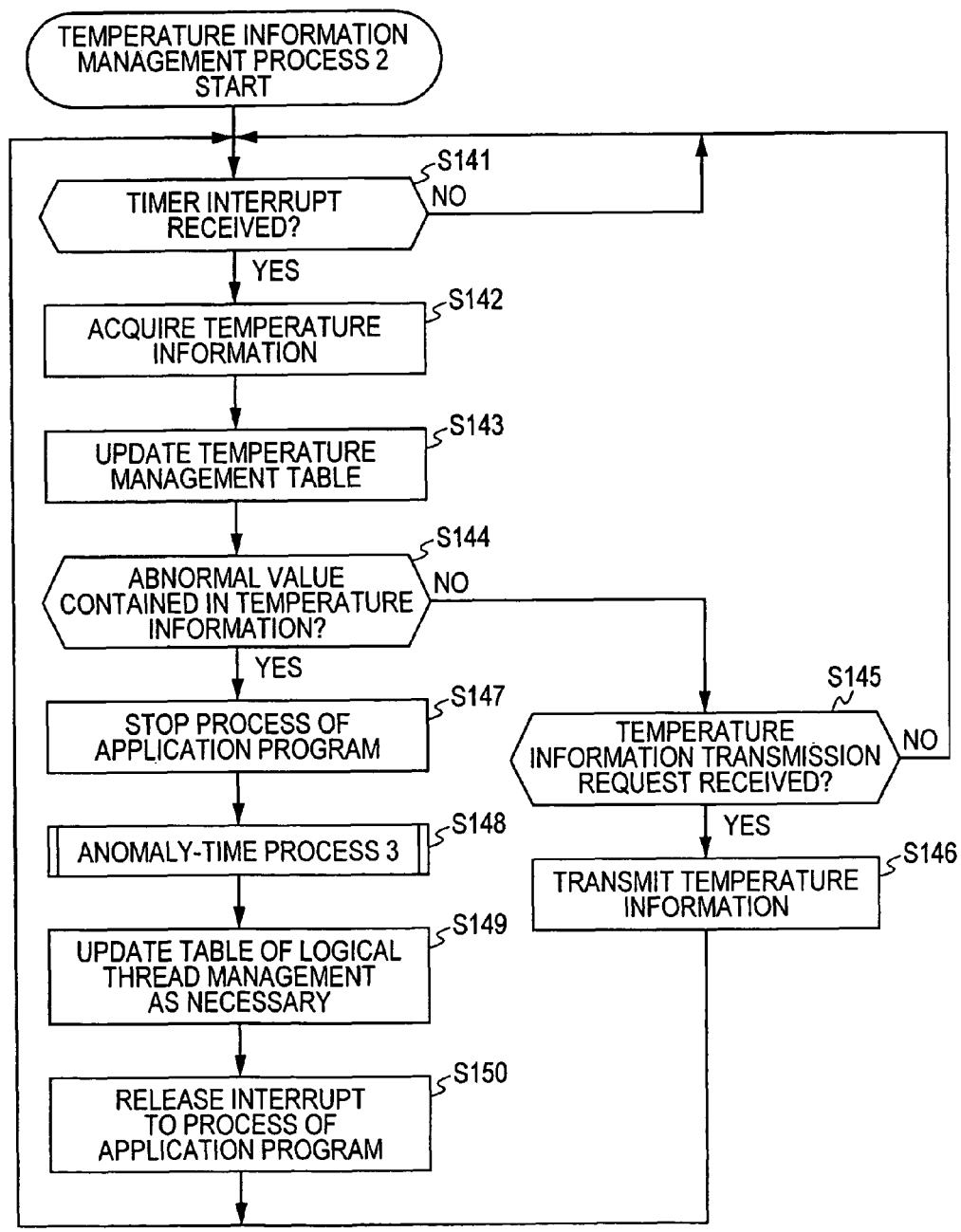
FIG. 27 is a flowchart illustrating a temperature information management process 2.
Figure 28:
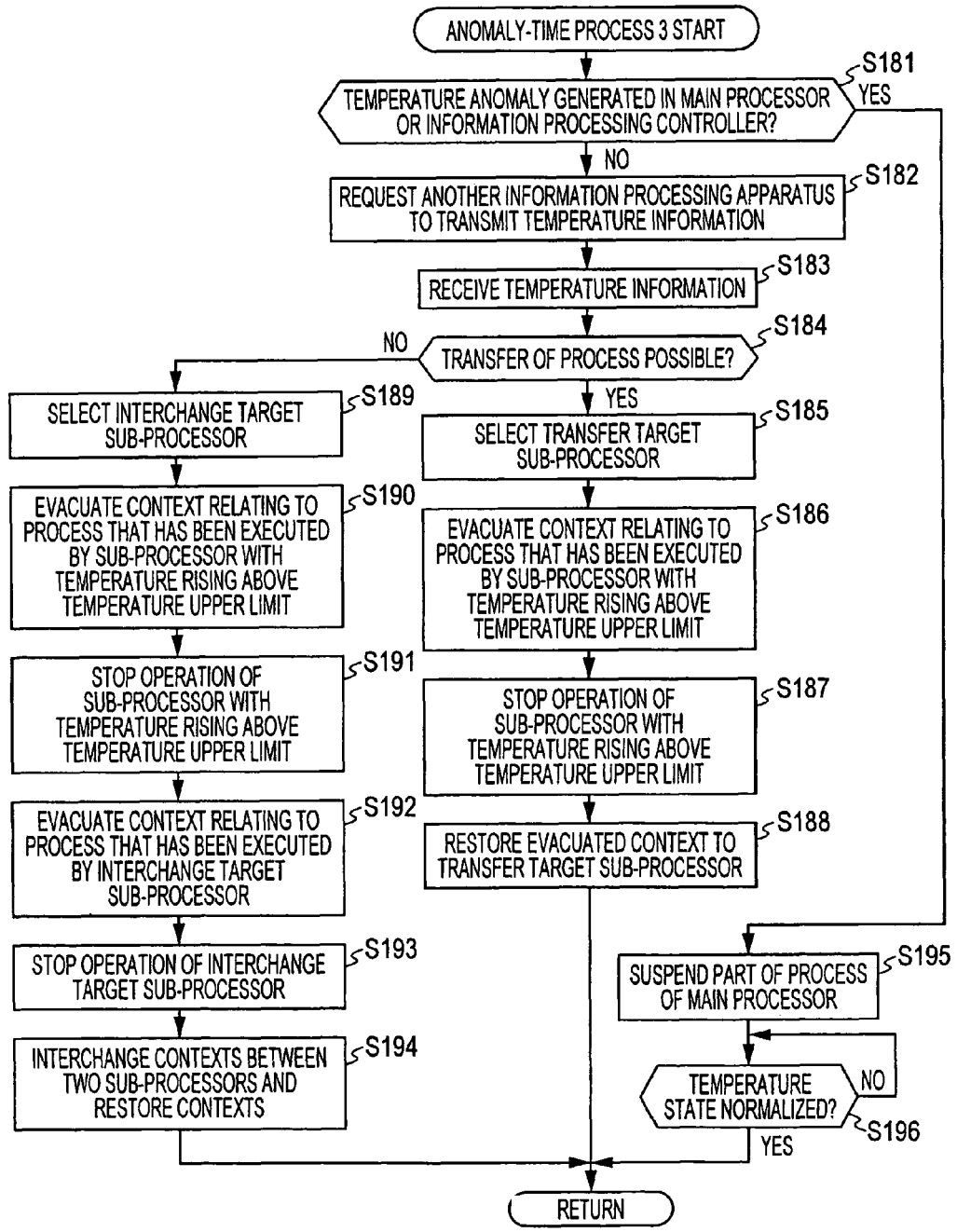
FIG. 28 is a flowchart illustrating an anomaly-time process 3.
Figure 32:
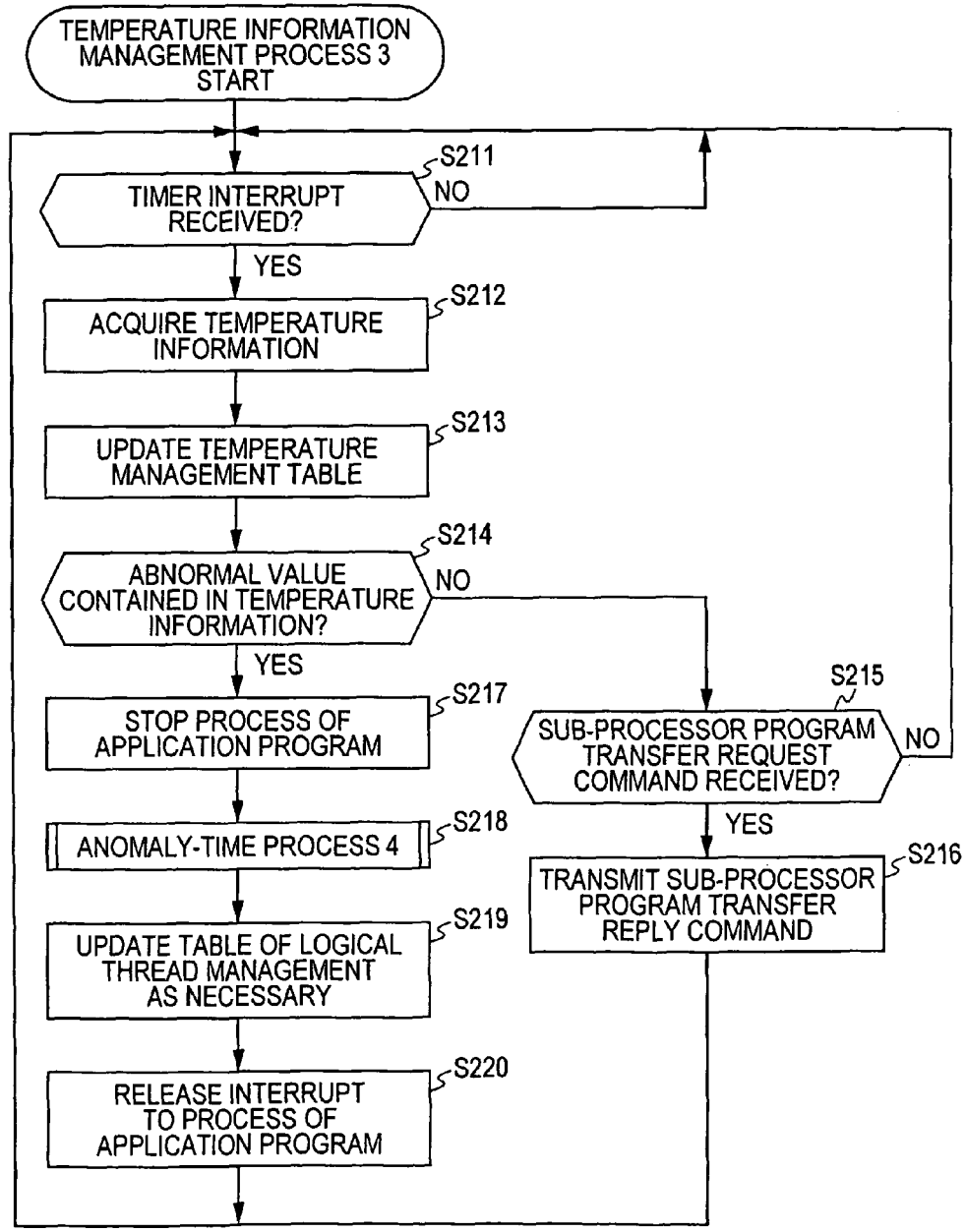
FIG. 32 is a flowchart illustrating a temperature information management process 3.
Figure 33:
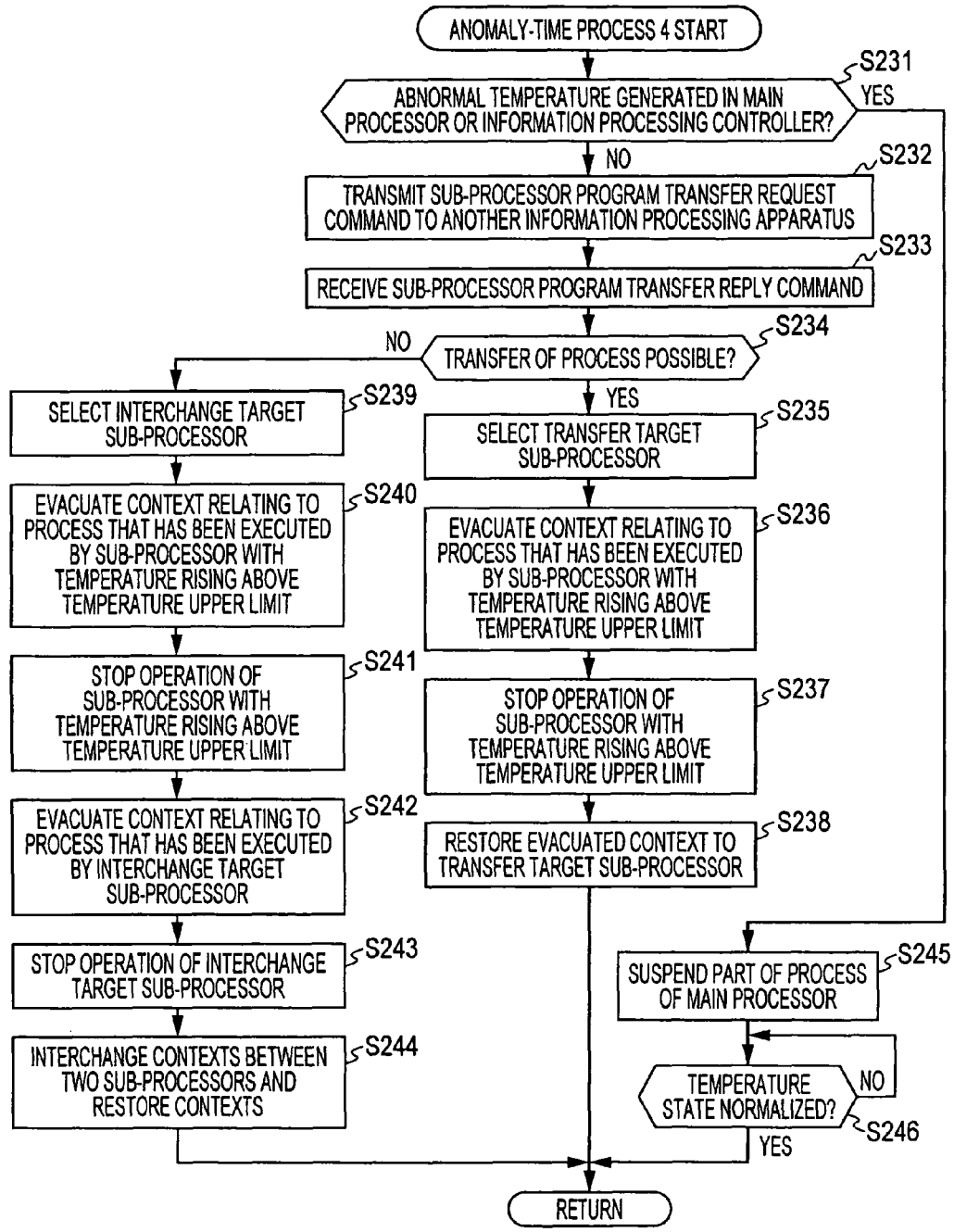
FIG. 33 is a flowchart illustrating a temperature information management process 4.
Figure 57:
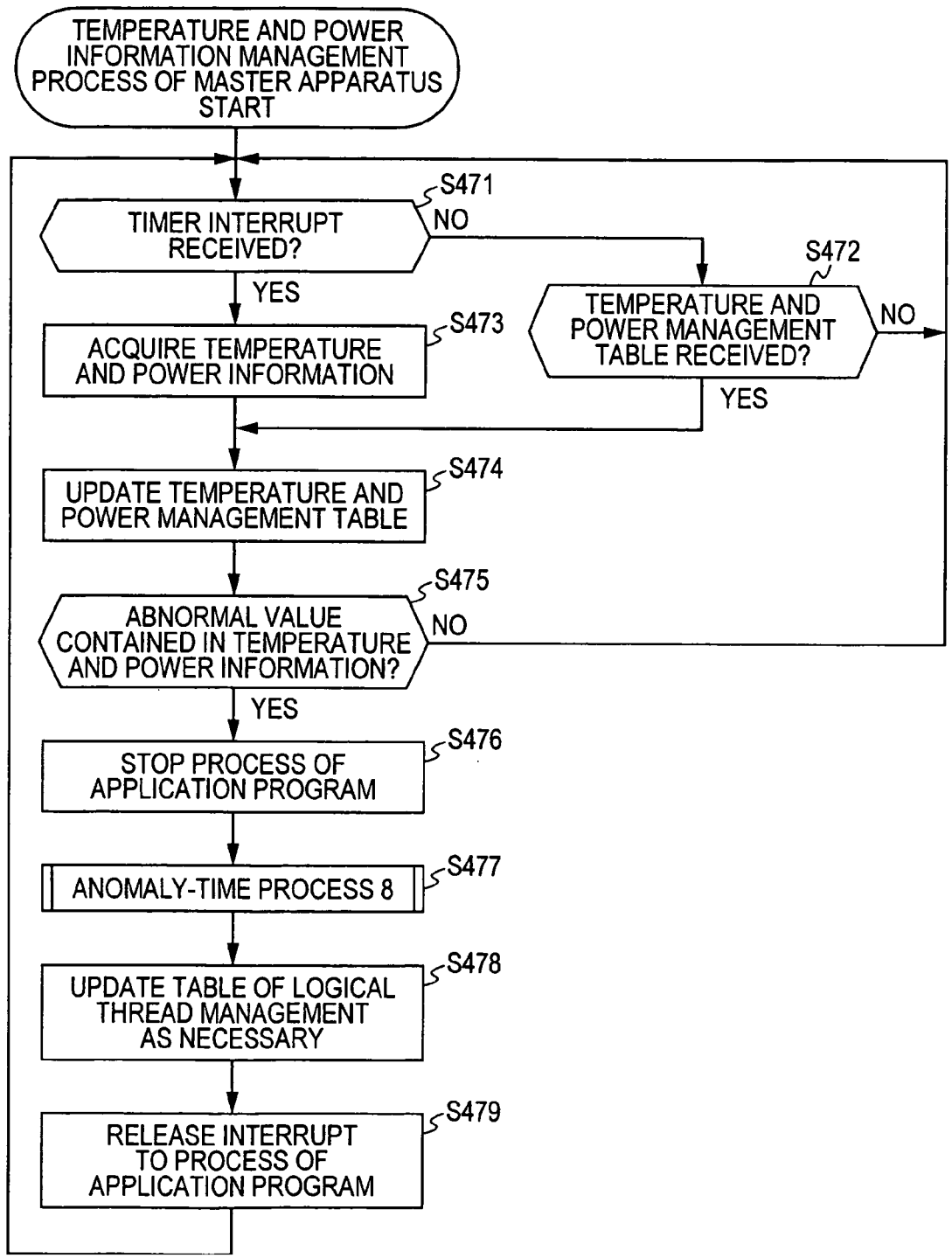
FIG. 57 is a flowchart illustrating a temperature and power information management process of the master apparatus.
Figure 58:
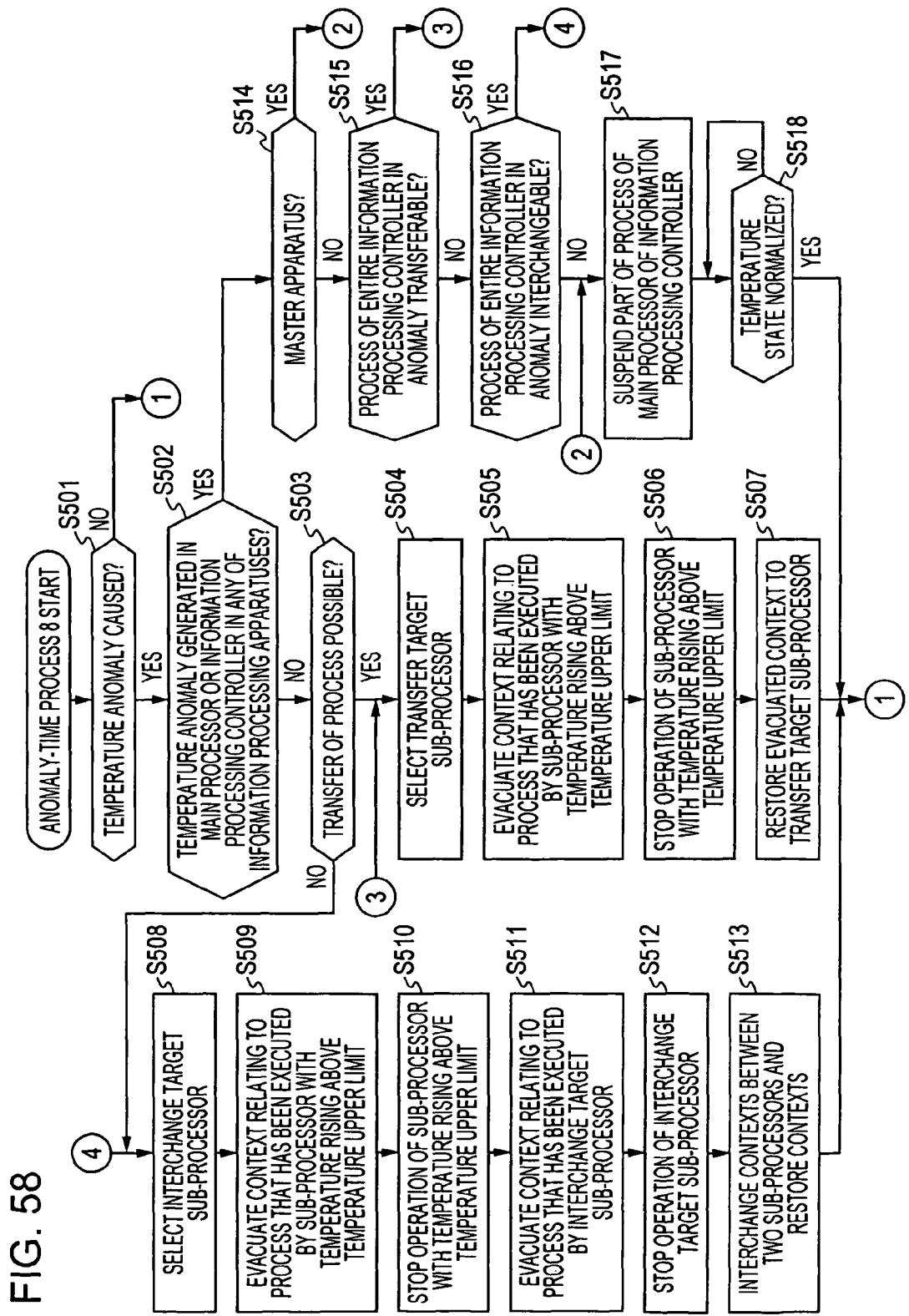
FIG. 58 is a flowchart illustrating an anomaly-time process 8.

In accordance with one embodiment of the present invention, an information processing method of an information processing apparatus including the first information processor (for example, the main processor main processor 42) and the plurality of second information processors (for example, the sub-processors 43), includes steps of requesting the start of distributed processing for providing a function corresponding to a process unit, the first information processing means, when executing an application program, forming a plurality of processes to be respectively assigned to the plurality of second information processing means, into the process unit for providing the function, (for example, one of step S1 of FIG. 14 and step S451 of FIG. 56), acquiring temperature information of temperature generated in the vicinity of the second information processor (for example, one of step S22 of FIG. 15, step S73 of FIG. 22, step S122 of FIG. 24, step S142 of FIG. 27, step S212 of FIG. 32, step S473 of FIG. 57, and step S562 of FIG. 60), detecting a temperature anomaly in the temperature information acquired in the temperature information acquisition step (for example, one of step S24 of FIG. 15, step S75 of FIG. 22, step S144 of FIG. 27, step S214 of FIG. 32, and step S475 of FIG. 57), determining one of the second information processor, the vicinity temperature of which is detected to be in temperature anomaly in the anomaly detecting step (for example, step S41 of FIG. 16, step S91 of FIG. 23, step S181 of FIG. 28, step S231 of FIG. 33, and step S502 of FIG. 58), and controlling the distributed processing to update the assignment of the process executed by the second information processor detected to be in temperature anomaly, based on the temperature information acquired in the temperature information acquisition step and the determination result provided in the determination step (for example, steps S42 through S54 of FIG. 16, steps S92 through S107 of FIG. 23, steps S182 through S196 of FIG. 28, steps S232 through S246 of FIG. 33, or steps S503 through S518 of FIG. 58).

A computer program of one embodiment of the present invention also includes the above-referenced steps.

In accordance with yet another embodiment of the present invention, an information processing apparatus includes a first information processor (for example, the main processor 42), a plurality of second information processors (for example, the sub-processors 43), a power measurement unit (for example, a power measurement unit 321) for measuring power consumed by an information processing module (for example, an information processing controller) including the first information processor and the second information processor, and a communication unit (for example, a communication unit 16) for communicating with the other information processing apparatus. The first information processor includes an application program execution control unit (for example, the arithmetic processor 161) for controlling execution of an application program, a distributed processing control unit (for example, one of a logical thread management processor 357, and a logical thread management processor 457) for controlling distributed processing that performs process assignment on the plurality of second information processors in order to provide a function corresponding to a process unit, the application program execution control unit, when executing the application program, forming a plurality of processes to be respectively assigned to the plurality of second information processors, into the process unit for providing the function, a recording unit (for example, one of a power management table 354, a power management table 373, and the temperature and power management table 452) for recording first information relating to power measured by the power measurement unit, and second information relating to the execution of the process of the second information processor, an anomaly detecting unit (for example, one of a power rise detector 355 and an anomaly detector 453) for detecting an anomaly in the power consumption measured by the power measurement unit, and an anomaly-time control unit (for example, one of a power anomaly correction controller 356, a power anomaly correction controller 374, a power anomaly correction controller 392, and a, anomaly correction controller 455) for controlling the distributed processing of the distributed processing control unit in response to the power anomaly detected by the anomaly detecting unit. The anomaly-time control unit controls the distributed processing control unit to update, based on the first information and the second information recorded by the recording unit, the assignment of the process being executed by the plurality of second information processor contained in the information processing module detected to be in power anomaly if the anomaly detecting unit has detected the power anomaly.

Figure 42:
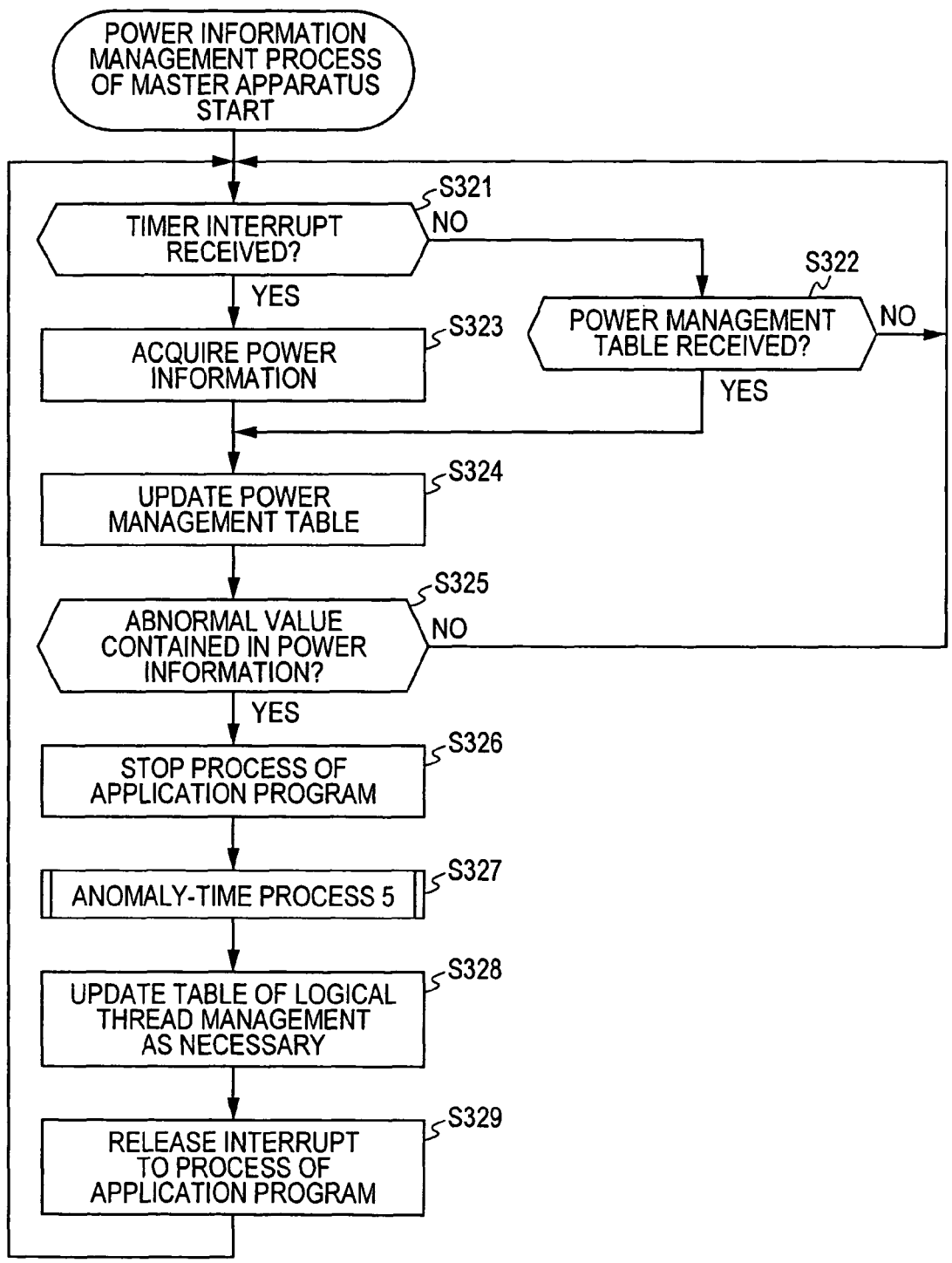
FIG. 42 is a flowchart illustrating a power information management process of a master apparatus.
Figure 43:
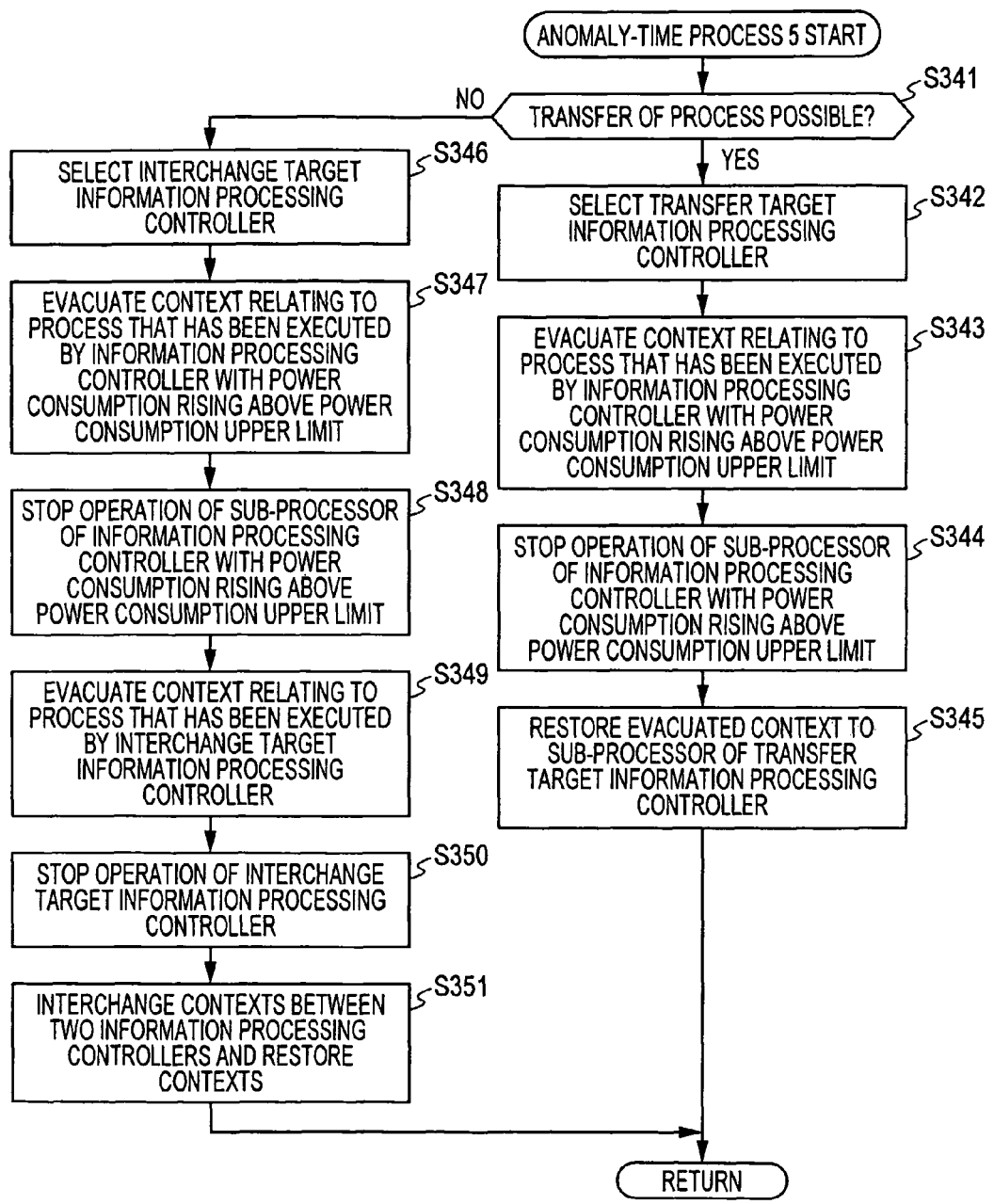
FIG. 43 is a flowchart illustrating an anomaly-time process 5.
Figure 46:
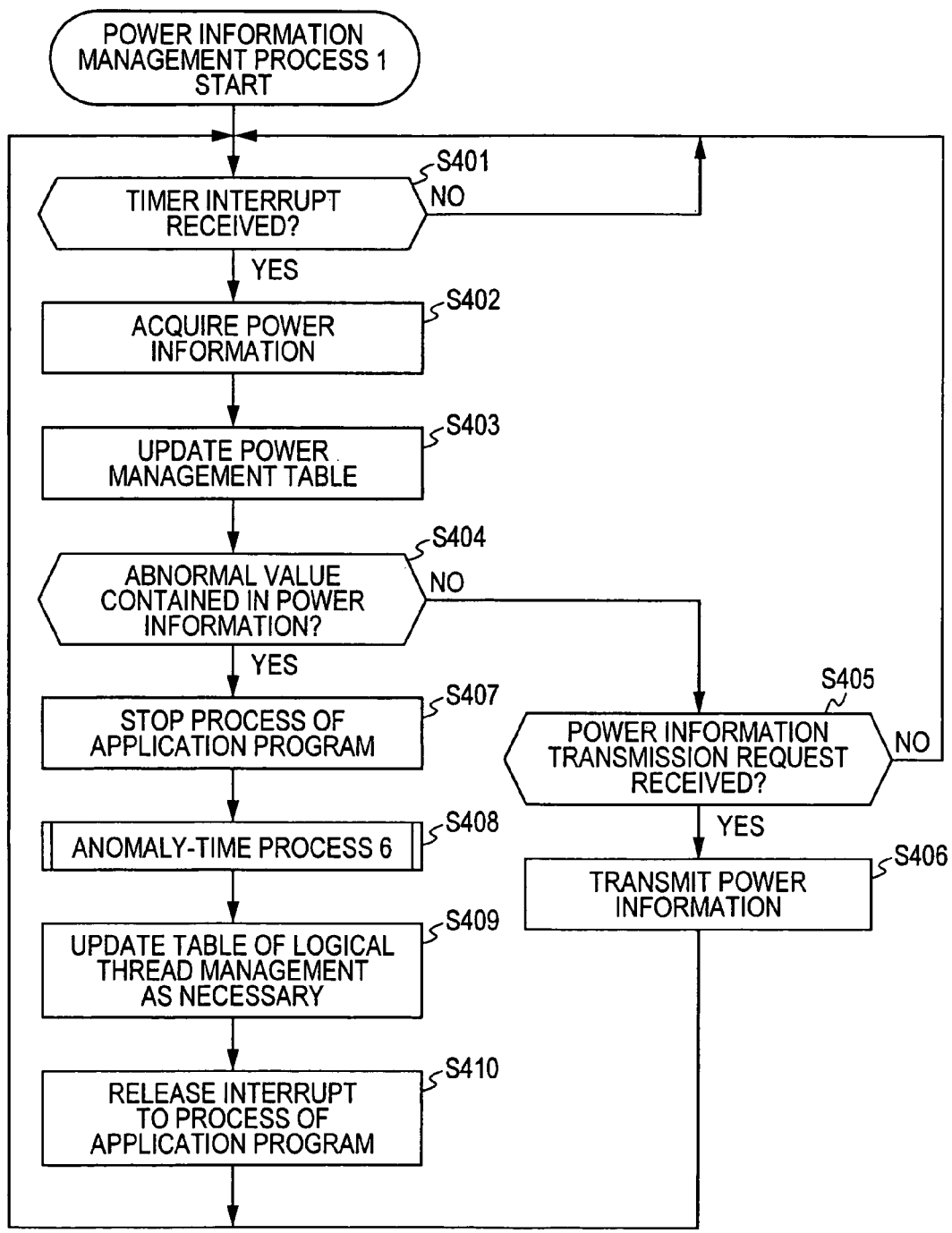
FIG. 46 is a flowchart illustrating a power information management process 1.
Figure 47:
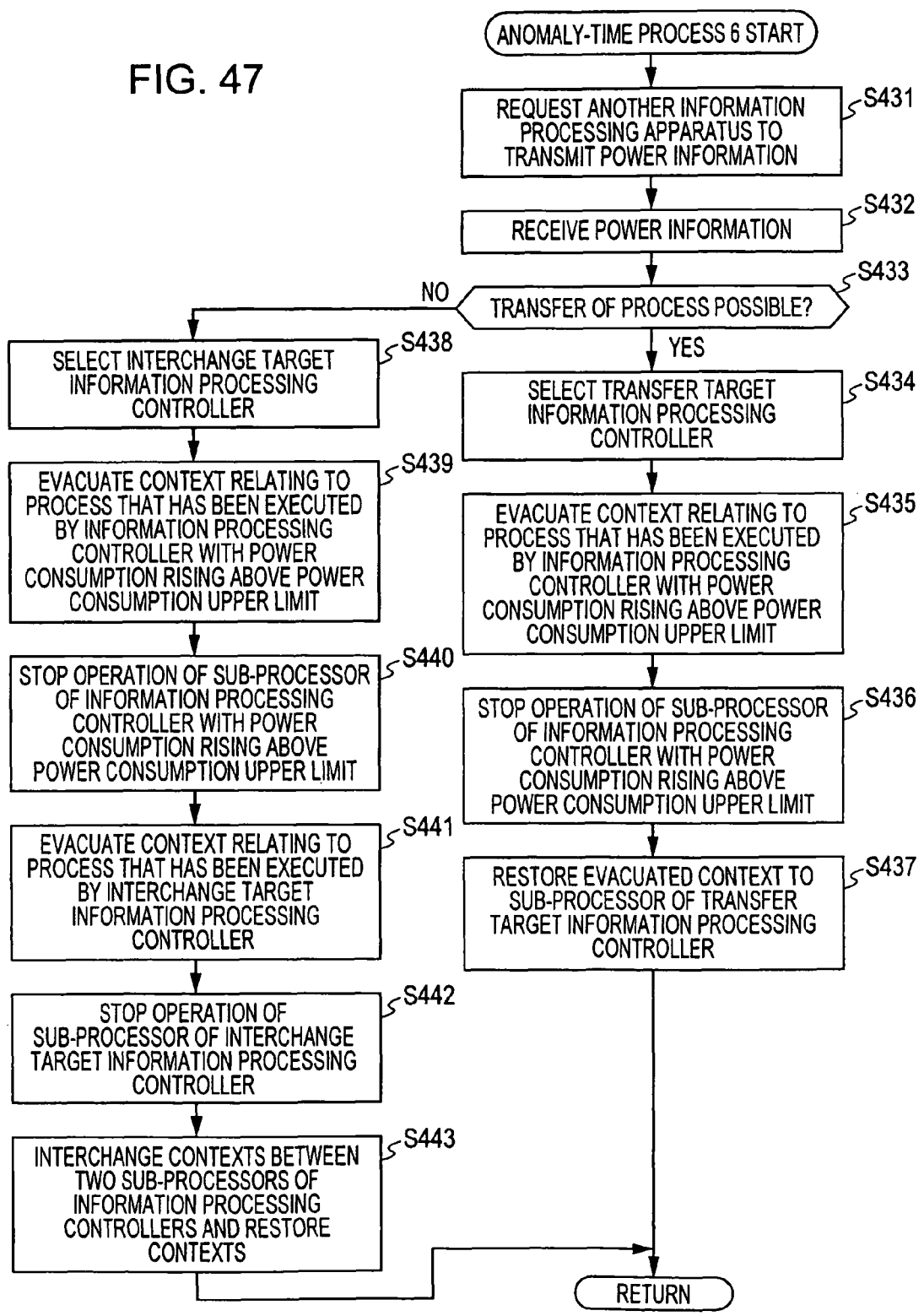
FIG. 47 is a flowchart illustrating an anomaly-time process 6.
Figure 49:
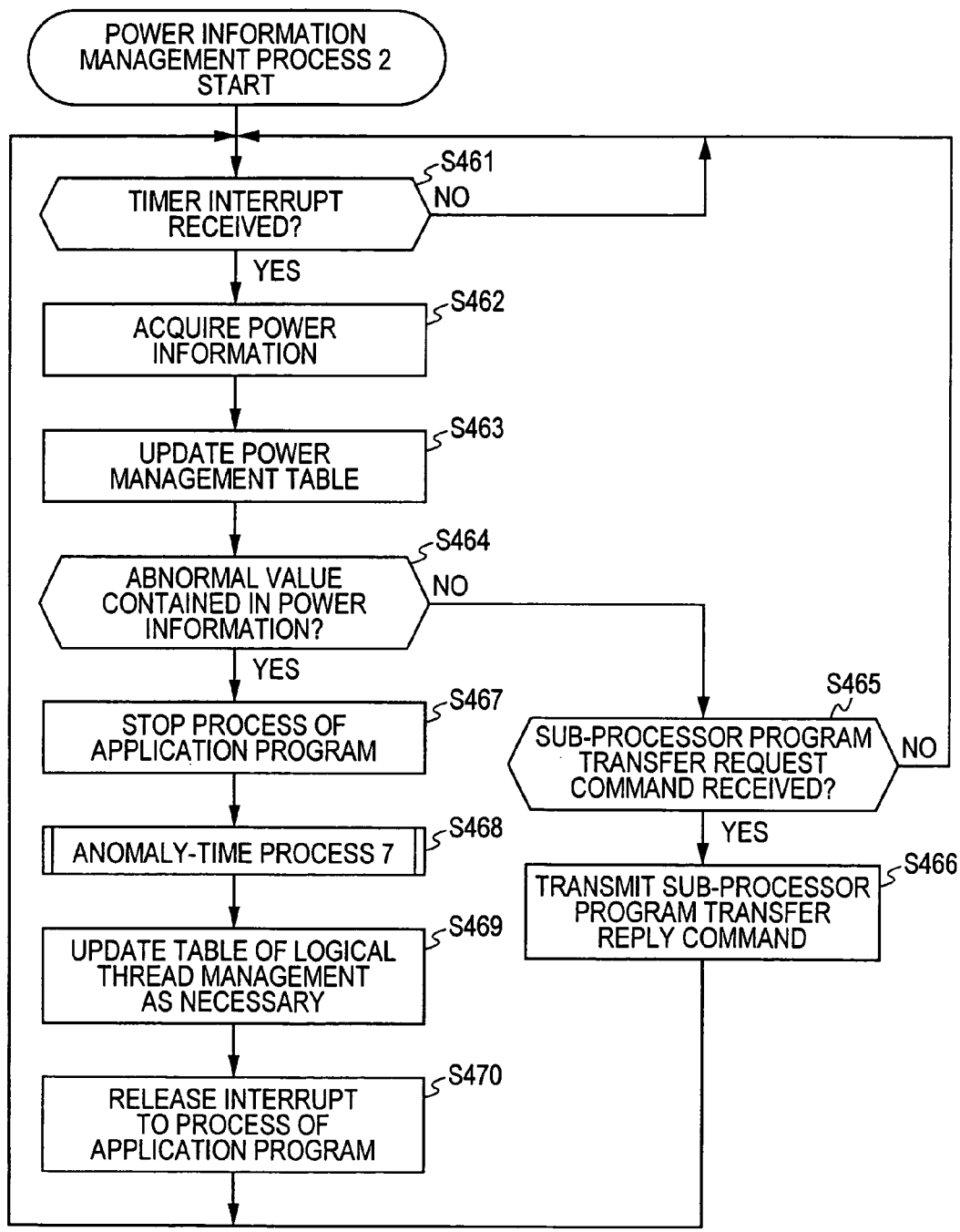
FIG. 49 is a flowchart illustrating a power information management process 2.
Figure 50:
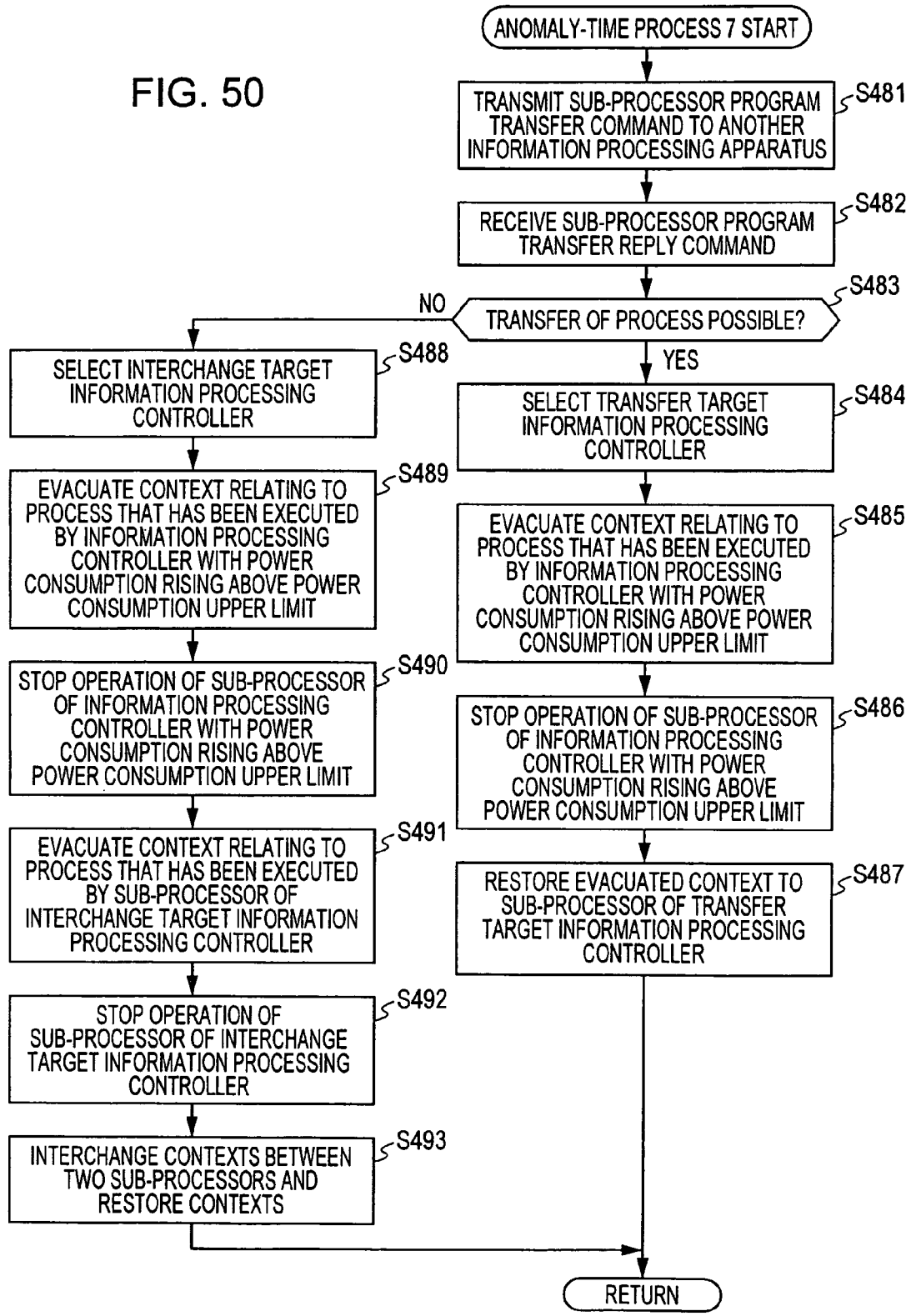
FIG. 50 is a flowchart illustrating an anomaly-time process 7.
Figure 59:
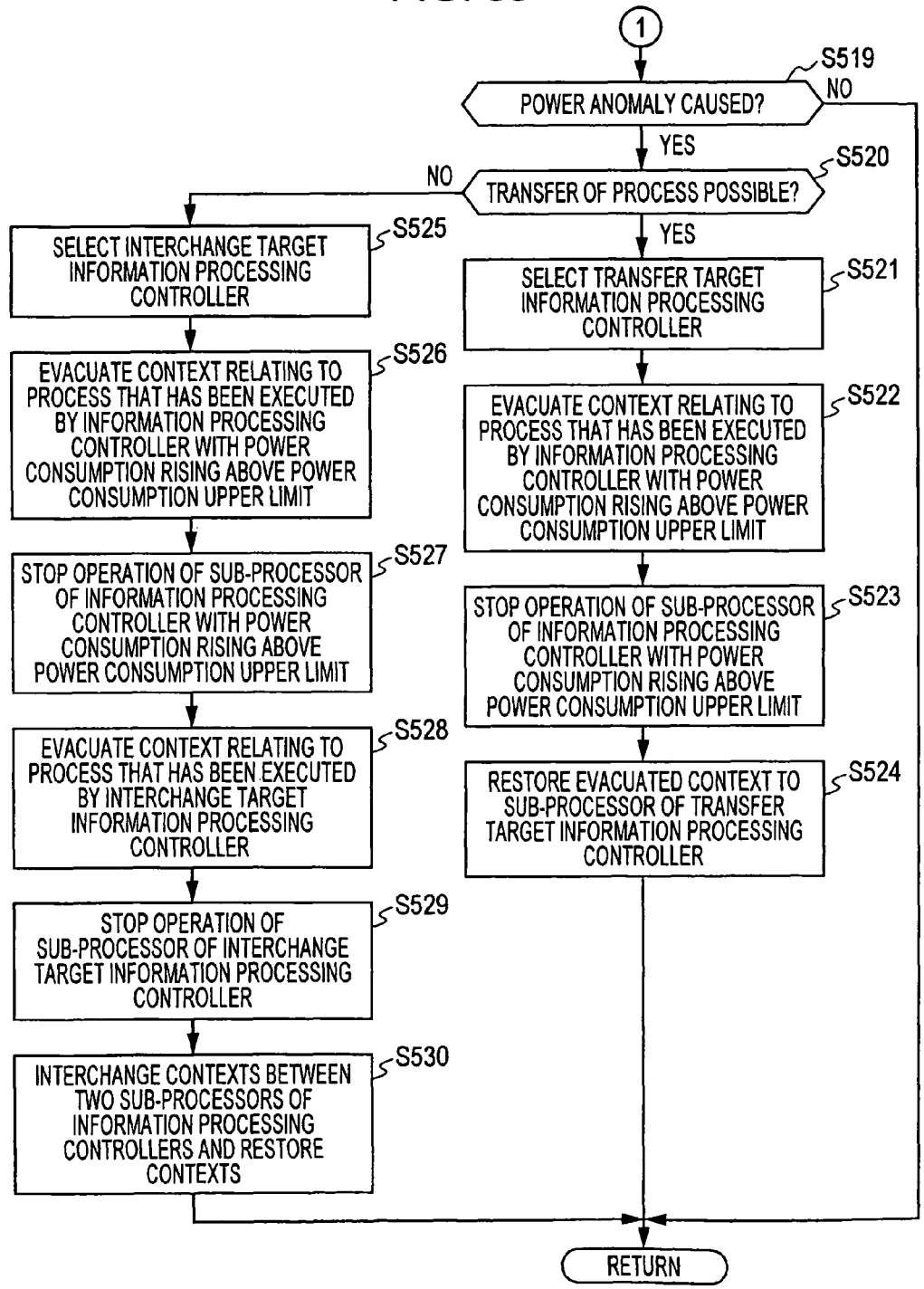
FIG. 59 is a flowchart illustrating the anomaly-time process 8.

In accordance with another embodiment of the present invention, an information processing method of an information processing apparatus including a first information processor (for example, the main processor 42), a plurality of second information processors (for example, the sub-processors 43), and a communication unit for communicating with another information processing apparatus, includes steps of requesting the start of distributed processing for providing a function corresponding to a process unit, the first information processing means, when executing an application program, forming a plurality of processes to be respectively assigned to the plurality of second information processing means, into the process unit for providing the function, (for example, one of step S301 of FIG. 41, and step S451 of FIG. 56), acquiring information relating to power consumed by an information processing module (for example, an information processing controller) including the first information processor and the second information processor (for example, one of step S323 of FIG. 42, step S328 of FIG. 44, step S402 of FIG. 46, step S462 of FIG. 49, step S473 of FIG. 57, and step S562 of FIG. 60), detecting an anomaly in the information relating to the power consumption acquired in the power information acquisition step (for example, one of step S325 of FIG. 42, step S404 of FIG. 46, step S464 of FIG. 49, and step S475 of FIG. 57), and controlling the distributed processing to update the assignment of the process being executed by the second information processor in the information processing module detected to be in power anomaly, based on the power information acquired in the power information acquisition step (corresponding to process to be discussed with reference to FIGS. 43, 47, and 50, or steps S520 through S530 of FIG. 59).

A computer program of one embodiment of the present invention also includes the above-referenced steps.

The embodiments of the present invention are described below with reference to the drawings.

FIG. 1 illustrates a communication system in accordance with one embodiment of the present invention. In this communication system, information processing apparatuses 1-1 through 1-n are interconnected to each other via a network 2, such as a home network, a local area network (LAN), a wide area network (WAN), or the Internet.

In response to an execution of distributed processing by a plurality of information processing apparatuses, the information processing apparatus 1-1 generates a software cell containing data and a program, required to execute the requested process, and transmits the generated software cell to one of the information processing apparatuses 1-2 through 1-n via the network 2.

Upon receiving the software cell transmitted from the information processing apparatus 1-1, each of the information processing apparatuses 1-2 through 1-n executes the requested process. After executing the requested process, each of the information processing apparatuses 1-2 through 1-n transmits data resulting from the requested process to the information processing apparatus 1-1. If it is not necessary to discriminate one from another among the information processing apparatuses 1-1 through 1-n, one is simply referred to as an information processing apparatus 1.

Upon receiving the data transmitted from one of the information processing apparatuses 1-2 through 1-n, the information processing apparatus 1-1 executes a predetermined process in response to the received data, or records the received data.

The information processing apparatus 1-1 includes at least one information processing controller 11, a main memory 12, a recorder 13-1, a recorder 13-2, a bus 14, an operation input unit 15, a communication unit 16, a display 17, and a drive 18.

The information processing controller 11 executes a variety of programs stored in the main memory 12, thereby generally controlling the information processing apparatus 1-1. The information processing controller 11 generates a software cell, and supplies the communication unit 16 with the generated software cell via the bus 14. The information processing controller 11 feeds the data supplied from the communication unit 16 to one of the recorder 13-1 and the recorder 13-2. In response to a user command input via the operation input unit 15, the information processing controller 11 acquires specified data from one of the main memory 12, the recorder 13-1 and the recorder 13-2, and supplies the acquired data to the communication unit 16 via the bus 14.

The information processing controller 11 is assigned an information processing apparatus identification (ID) that uniquely identifies the information processing apparatus 1-1 over the entire network 2.

The information processing controller 11 includes a bus 41, a main processor 42, and sub-processors 43-1 through 43-m, a direct memory access controller (DMAC) 44, a key management table recorder 45, and a disk controller (DC) 46.

The main processor 42, the sub-processor 43-1 through the sub-processor 43-m, the DMAC 44, the key management table recorder 45, and the DC 46 are interconnected to each other via the bus 41. The main processor 42 is assigned a main processor ID that uniquely identifies the main processor 42. Similarly, the sub-processors 43-1 through 43-m are assigned respective sub-processor IDs that uniquely identify the sub-processors 43-1 through 43-m.

In order to cause the information processing apparatuses 1-2 through 1-n connected via the network 2 to perform distributed processing, the main processor 42 generates the software cell and supplies the generated software cell to the communication unit 16 via the bus 41 and the bus 14. The main processor 42 can be designed to execute programs other than a managing program. In this case, the main processor 42 functions as a sub-processor.

The main processor 42 causes each of the sub-processors 43-1 through 43-m to execute a program independent of the other sub-processors, thereby providing a single result from a logical single function (logical thread). More specifically, the main processor 42 manages the schedule of the execution of the program by the sub-processors 43-1 through 43-m and generally manages the information processing controller 11 (information processing apparatus 1-1).

The main processor 42 temporarily stores, in a local storage 51-1, thereof the data and the programs loaded from the main memory 12. The main processor 42 reads the data and the programs from the local storage 51-1, and executes a variety of processes based on the read data and programs.

Under the control of the main processor 42, the sub-processors 43-1 through 43-m execute programs and process data in parallel and independent of each other. The program to be executed by the main processor 42 can be executed in cooperation with the program executed by the sub-processors 43-1 through 43-m.

The sub-processors 43-1 through 43-m are provided with local storages 51-2 through 51-(m+1), respectively. The sub-processors 43-1 through 43-m temporarily store data and programs in the local storages 51-2 through 51-(m+1), respectively, as necessary. The sub-processors 43-1 through 43-m read data and programs from the local storages 51-2 through 51-(m+1), respectively, and perform a variety of programs based on the read data and programs.

If it is not necessary to discriminate one from another from among the sub-processors 43-1 through 43-m, each sub-processor is simply referred to as a sub-processor 43. If is not necessary to discriminate one from another from among the local storages 51-2 through 51-(m+1), each local storage is simply referred to as a local storage 51.

Using a main processor key, a sub-processor key, and an access key, recorded on the key management table recorder 45, the DMAC 44 manages accessing of the main processor 42 and the sub-processor 43 to the programs and data, stored in the main memory 12.

The key management table recorder 45 records the main processor key, the sub-processor key, and the access key. The main processor key, the sub-processor key, and the access key will be discussed in detail later.

The DC 46 manages accessing of the main processor 42 and the sub-processor 43 to each of the recorder 13-1 and the recorder 13-2.

In the above discussion, the information processing apparatus 1-1 includes a single information processing controller 11. Alternatively, the information processing controller 11 can include a plurality of information processing controllers 11.

The main memory 12 includes a random-access memory (RAM), for example. The main memory 12 temporarily stores data and a variety programs executed by the main processor 42 and the sub-processor 43.

Each of the recorder 13-1 and the recorder 13-2 includes a hard disk, for example. Each of the recorder 13-1 and the recorder 13-2 stores data and a variety of programs executed by the main processor 42 and the sub-processor 43. Each of the recorder 13-1 and the recorder 13-2 stores data supplied from the information processing controller 11. If it is not necessary to discriminate the recorder 13-1 from the recorder 13-2, each recorder is simply referred to as a recorder 13.

Connected to the information processing controller 11 via the bus 14 are the operation input unit 15, the communication unit 16, the display 17, and the drive 18. The operation input unit 15 includes keys, buttons, a touchpad, and a mouse. In response to a user operation input, the operation input unit 15 supplies information responsive to the operation input to the information processing controller 11 via the bus 14.

The communication unit 16 transmits the software cell, supplied from the information processing controller 11, to the information processing apparatuses 1-2 through 1-n via the network 2. The communication unit 16 supplies, data transmitted from the information processing apparatuses 1-2 through 1-n, to the information processing controller 11 via the bus 14.

The display 17 includes a cathode-ray tube (CRT) or a liquid-crystal display (LCD). The display 17 displays information (including data generated in the execution of an application program and notification to a user required to execute the application program) generated in the process of the information processing controller 11 and supplied via the bus 14.

If one of a magnetic disk 61, an optical disk 62, a magneto-optic disk 63, and a semiconductor memory 64 is loaded onto the information processing apparatus, the drive 18 drives the loaded medium to read programs and data recorded thereon. The programs and data are transferred to the information processing controller 11 via the bus 14 as necessary, and are recorded onto the recorder 13 by the information processing controller 11.

The information processing apparatuses 1-2 through 1-n have a structure similar to that of the information processing apparatus 1-1, and are not discussed further herein. Functions may added to or removed from the information processing apparatuses 1-2 through 1-n, and the information processing apparatuses 1-2 through 1-n can have a structure adapted to the function addition or function removal.

Figure 2:
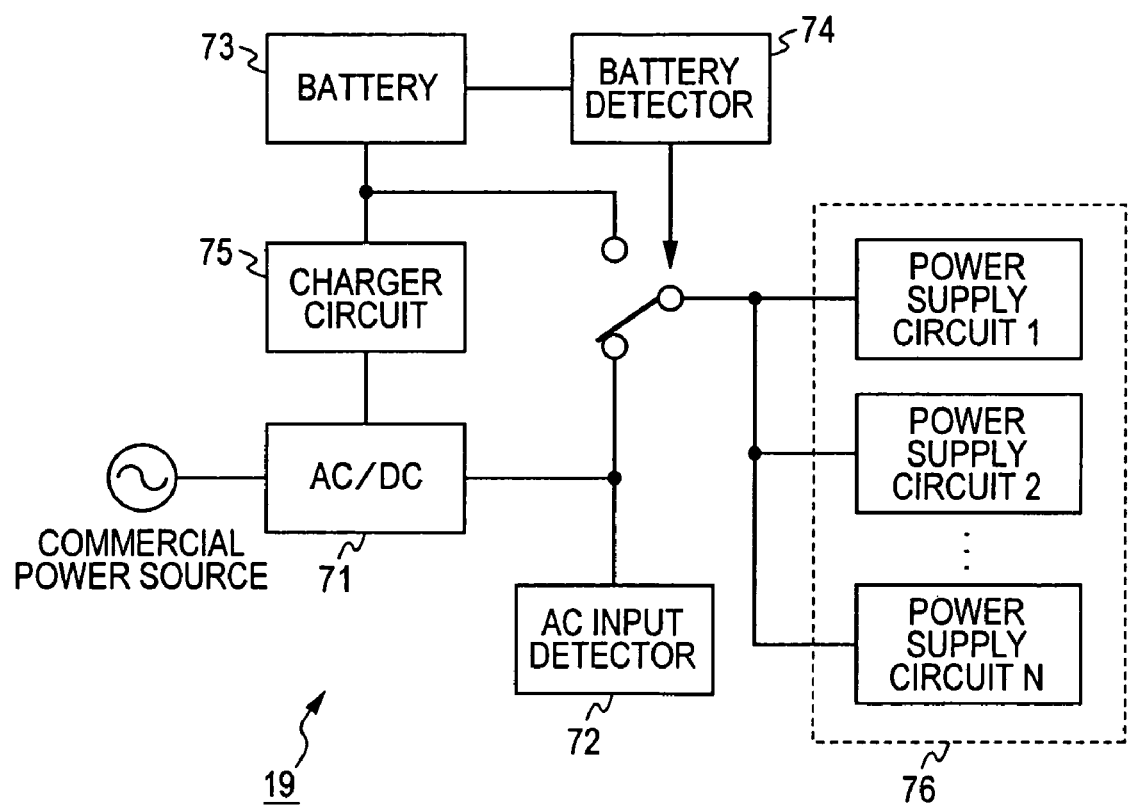
FIG. 2 illustrates the structure of a power supply of an information processing apparatus.

The information processing apparatus 1 includes a power supply 19 to power the entire circuitry thereof. FIG. 2 illustrates the structure of the power supply 19.

The power supply 19 includes a AC-DC converter 71 converting an AC current from a commercial power source to a DC current, an AC input detector 72 detecting the supply of AC power to a power supply circuit 76, a rechargeable battery 73, mounted at a predetermined location and charged to predetermined power for supplying power to the information processing apparatus 1, a battery detector 74 detecting the supply of power from the rechargeable battery 73, a charger circuit 75 charging the battery 73 with DC power from the AC-DC converter 71, and the power supply circuit 76 supplying power to each block of the information processing apparatus 1. In addition to the AC power and the rechargeable battery, a dry battery may be used as a power source or the power supply circuit 76. The power supply 19 of the information processing apparatus 1 works with at least one of the power sources. Elements in the information processing apparatus 1 can operate from different operating voltages. The power supply circuit 76 can output a plurality of voltages. Alternatively, a plurality of power supply circuits 76 can be arranged for different voltages with one circuit on a per voltage basis.

The access process of the sub-processor 43 to the main memory 12 is described below with reference to FIGS. 3 through 5.

Figure 3:
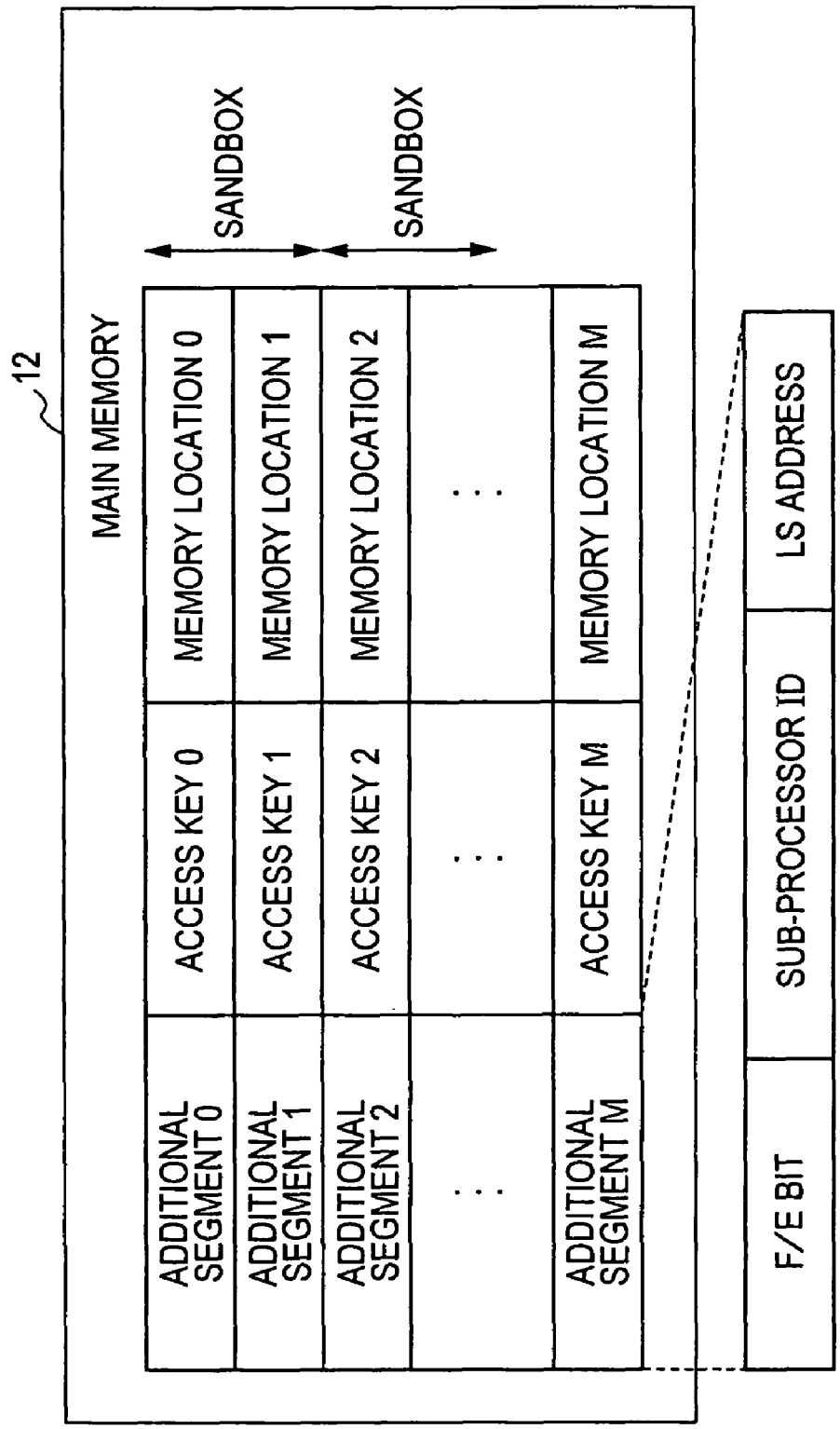
FIG. 3 illustrates a main memory of the information processing apparatus.

As shown in FIG. 3, the main memory 12 contains memory locations specifying a plurality of addresses. Each memory location is assigned an additional segment storing information relating to the state of data. The additional segment stores an F/E bit, a sub-processor ID and a local storage (LS) address. Each memory location is assigned an access key to be discussed later.

An F/E bit of "0" indicates that data is under process by the sub-processor 43 or data is invalid and not updated in its empty state. The F/E bit of "0" thus indicates that the data cannot be read from that memory location. Furthermore, the F/E bit of "0" indicates that data can be written on that memory location. If data is written onto that memory location, the F/E bit is set to "1".

The F/E bit of "1" indicates that the data of that memory location is not yet read by the sub-processor 43 and is unprocessed and updated data. The data of the memory location with the F/E bit of "1" is readable. If the data is read by the sub-processor 43, the F/E bit is set to "0". The F/E bit of "1" indicates that the corresponding memory location receives no data for data writing.

Read reserve can set in the memory location with the F/E bit of "0" (read disabled/write enabled state). To reserve a read operation in the memory location with the F/E bit of "0", the sub-processor 43 writes a sub-processor ID and a LS address of the sub-processor 43 as read reserve information onto the additional segment of the memory location for read reserve. When the sub-processor 43 writes data on the read-reserved memory location with the F/E bit shifted to "1" (read enabled/write disabled), the data can be read to the local storage 51 identified by the sub-processor ID and the LS address written on the additional segment as the read reserve information.

When a plurality of sub-processors 43 process data at multiple stages, the read and write of the data at each memory location are controlled as described above. The sub-processor 43 performing a back stage process can read front-stage processed data immediately after the sub-processor 43 performing a front stage process writes processed data onto a predetermined address in the main memory 12.

As shown in FIG. 4, the local storage 51 in the sub-processor 43 is composed of memory locations, each specifying a plurality of addresses. Each memory location is assigned an additional segment. The additional segment includes a busy bit.

To read the data stored on the main memory 12 into the memory location of the local storage 51 of the sub-processor 43, a corresponding busy bit is set to "1" for reservation. No further data cannot be stored onto the memory location with the busy bit at "1". When the data is read into the memory location of the local storage 51, the busy bit is set to "0" to allow other data to be stored.

As shown in FIG. 3, the main memory 12 connected to the information processing controller 11 includes a plurality of sandboxes. The sandbox is used to fix an area in the main memory 12. Each sub-processor 43 is assigned a sandbox. The sub-processor 43 can exclusively use that assigned sandbox. More specifically, the sub-processor 43 can use the assigned sandbox, but cannot access data beyond the area of the assigned sandbox.

The main memory 12 includes a plurality of memory locations, and each sandbox is a set of memory locations.

A key management table of FIG. 5 is used to exclusively control the main memory 12. The key management table is recorded on the key management table recorder 45 and associated with the DMAC 44. Each entry in the key management table includes a sub-processor ID, a sub-processor key, and a key mask.

To access the main memory 12, the sub-processor 43 outputs a read command or a write command to the DMAC 44. The command contains a sub-processor ID identifying the sub-processor 43 and an address of the main memory 12 as an access target.

To execute the command from the sub-processor 43, the DMAC 44 checks the sub-processor key of the sub-processor 43 as an access requesting source by referencing the key management table. The DMAC 44 compares the checked sub-processor key of the access requesting source with an access key assigned to the memory location of the main memory 12 as the access target. Only if the two keys match, the DMAC 44 executes the command supplied from the sub-processor 43.

When any bit is shifted to "1" in the key mask recorded in the key management table of FIG. 5, the bit corresponding to the sub-processor key associated with the key mask is set to "0" or "1".

For example, the sub-processor key is now "1010". Accessing to only a sandbox having an access key of "1010" is possible with this sub-processor key. If a key mask associated with the sub-processor key is set to "0001", a key mask bit set to "1" is masked from a match determination between the sub-processor key and the access key (no match determination is performed on a key mask bit set to "1"). With the sub-processor key "1010", sandboxes having access keys of "1010" and "1011" are accessible.

The exclusiveness of the sandbox of the main memory 12 is thus assured. If a plurality of sub-processors 43 need to process data at multiple stages, only both the sub-processor 43 performing the front stage process and the sub-processor 43 performing the back stage process can access predetermined addresses of the main memory 12 to protect data.

The key mask value can be modified as discussed below. In the information processing apparatus 1-1, all key mask values are "0". A program loaded to the main processor 42 is now executed in cooperation with a program loaded to the sub-processor 43. Resulting processed data output from the sub-processor 43-1 is stored in the main memory 12. To output the resulting processed data stored in the main memory 12 to the sub-processor 43-2, the area of the main memory 12 storing the resulting processed data output from the sub-processor 43-1 needs to be accessible by each of the sub-processor 43-1 and the sub-processor 43-2. In such a case, the main processor 42 modifies the key mask values to set up an area in the main memory 12 accessible by the plurality of sub-processors 43. The multi-stage process is thus performed by the sub-processors 43.

More specifically, the sub-processor 43-1 performs a predetermined process on data transmitted from the information processing apparatus 1-2 through the information processing apparatus 1-n, and stores the processed data in a first area in the main memory 12. The sub-processor 43-2 reads the data from the first area of the main memory 12, performs a predetermined process on the read data, and stores the processed data onto a second area different from the first area in the main memory 12.

With a sub-processor key of the sub-processor 43-1 set to "0100", an access key of the first area set to "0100", a sub-processor key of the sub-processor 43-2 set to "0101", and an access key of the second area of the main memory 12 set to "0101", the sub-processor 43-2 is unable to access the first area of the main memory 12. By modifying the key mask to "0001", the sub-processor 43-2 can access the first area of the main memory 12.

Figure 6:
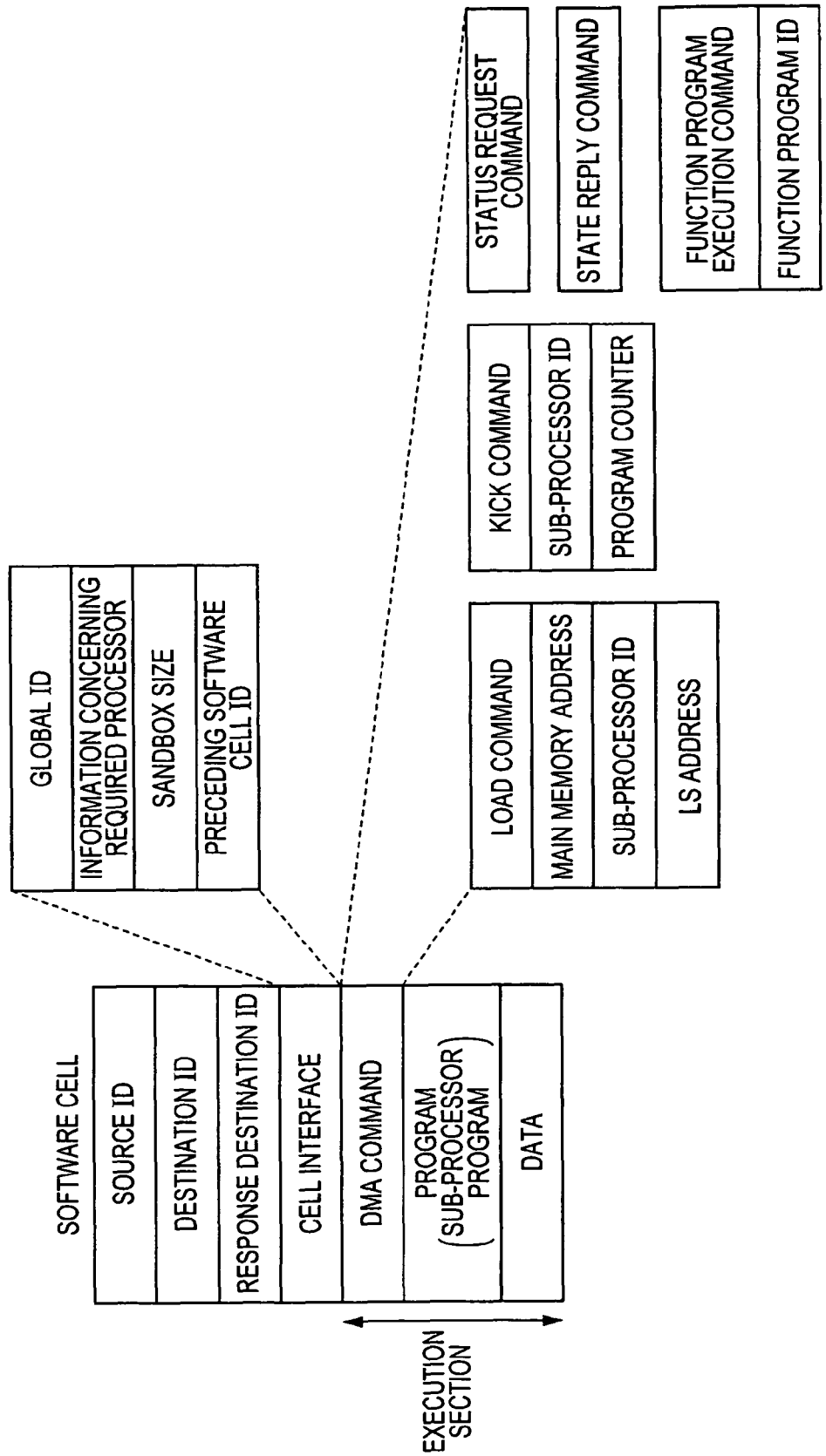
FIG. 6 illustrates the structure of a software cell of the information processing apparatus.
Figure 7:
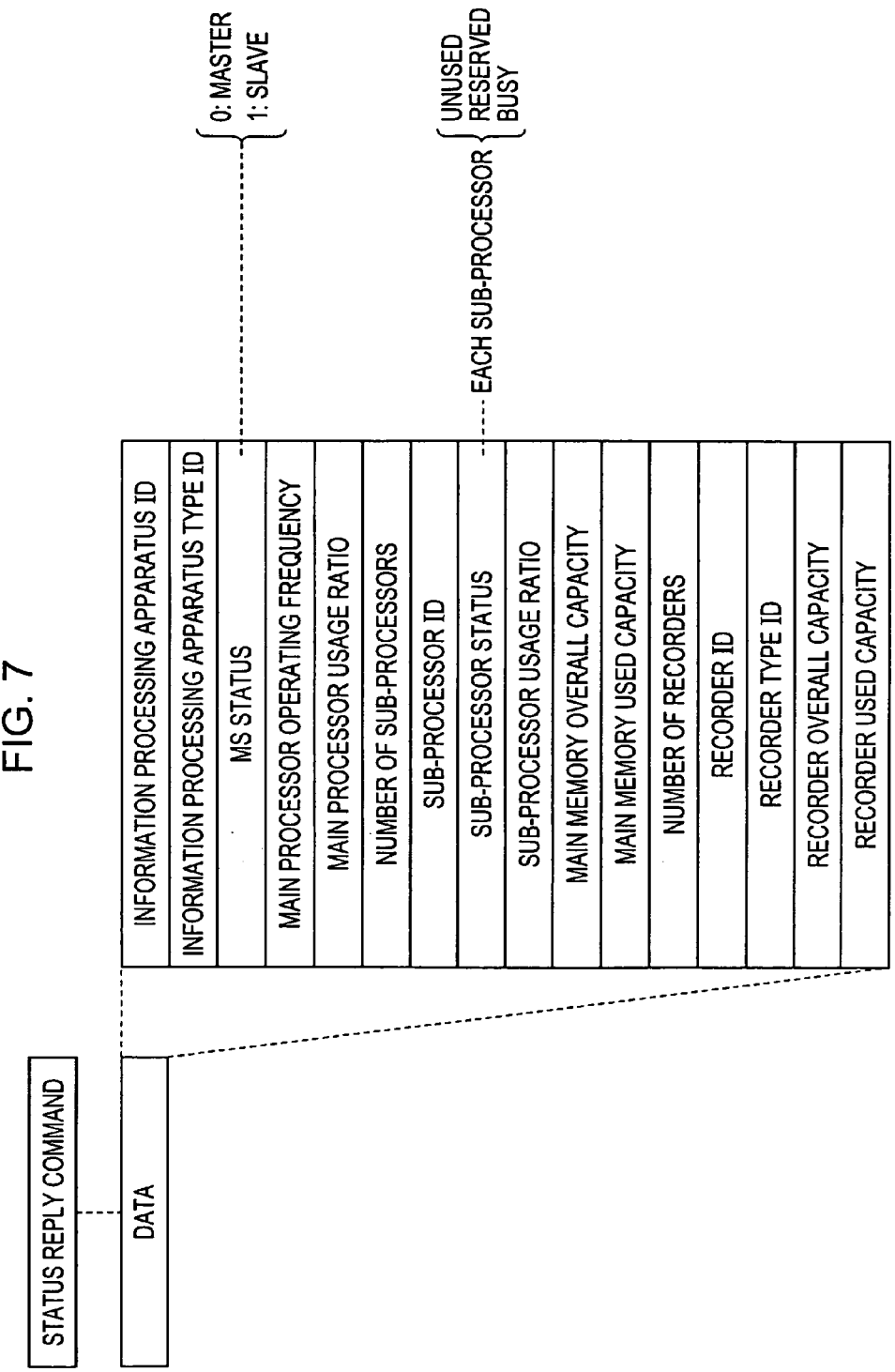
FIG. 7 illustrates the structure of an data area of the software cell with a direct memory access command being a status reply command.

FIGS. 6 and 7 illustrate one operation of the system in which the information processing apparatus 1-1 generates a software cell, and distributes a process among the information processing apparatus 1-2 through the information processing apparatus 1-n for execution.

The main processor 42 in the information processing apparatus 1-1 generates a software cell containing commands, programs, and data required to perform the process, and transmits the generated software cell to the information processing apparatus 1-2 through the information processing apparatus 1-n via the network 2.

FIG. 6 illustrates the structure of the software cell.

The software cell is composed of a source ID, a destination ID, a response destination ID, a cell interface, a DMA (direct memory access) command, a program, and data.

The source ID includes a network address of the information processing apparatus 1-1 as a source of the software cell, an information processing apparatus ID of the information processing controller 11 in the information processing apparatus 1-1, and identifiers of the main processor 42 and the sub-processor 43 contained in the information processing controller 11 in the information processing apparatus 1-1 (a main processor ID and a sub-processor ID).

The destination IDs include network addresses of the information processing apparatus 1-2 through the information processing apparatus 1-n as destinations of the software cell, information processing apparatus IDs of the information processing apparatus 1-2 through the information processing apparatus 1-n, and main processor IDs and sub-processor IDs of the information processing controllers 11 of the information processing apparatus 1-2 through the information processing apparatus 1-n.

The response destination IDs include a network address of the information processing apparatus 1-1 as a response destination of the execution results of the software cell, the information processing apparatus ID of the information processing controller 11 of the information processing apparatus 1-1, and the identifiers of the main processor 42 and the sub-processor 43 of the information processing controller 11 in the information processing apparatus 1-1.

The cell interface includes information required to use the software cell, and is composed of a global ID, information of a required sub-processor, a sandbox size, and a preceding software cell ID.

The global ID uniquely identifies the software cell over the entire network 2, and is generated based on the source ID, and date and time of generation or transmission of the software cell.

The information of the required sub-processor shows the number of sub-processors required to execute the software cell. The sandbox size shows the memory capacities of the main memory and the local storage of each sub-processor required to execute the software cell.

The preceding software cell ID is an identifier of a preceding software cell within software cells forming one group requesting a sequential execution of streaming data.

The execution section of the software cell is composed of DMA commands, programs, and data. The DMA commands include a series of DMA commands required to initiate the program. The programs include a sub-processor program to be executed by the sub-processor. The data here is to be processed by the programs including the sub-processor program.

The DMA commands include a load command, a kick command, a function program execution command, a status request command, and a status reply command.

The load command is used to load information stored in the main memory 12 to the local storage of the sub-processor. The load command further includes a main memory address, a sub-processor ID and an LS address. The main memory address identifies a predetermined area in the main memory as a load source of the information. The sub-processor ID and the LS address are respectively the identifier of the sub-processor as the load destination of the information and the address of the local storage of the sub-processor.

The kick command is used to start the execution of the program. The kick command further includes a sub-processor ID and a program counter. The sub-processor ID identifies the sub-processor to be kicked, and the program counter provides an address to a program execution program counter.

The function program execution command is used for a given apparatus (such as the information processing apparatus 1-1) to request another apparatus (such as one of the information processing apparatus 1-2 through the information processing apparatus 1-n) to execute a function program. Upon receiving the function program execution command, an information processing controller of the apparatus (such as one of the information processing apparatus 1-2 through the information processing apparatus 1-n) identifies, in response to a function program ID, the function program to be initiated.

The status request command is used to transmit, to the information processing apparatus 1-1 as the response destination, device information relating to current operational status of the information processing apparatus 1-2 through the information processing apparatus 1-n, as the destination IDs.

The status reply command is used for the information processing apparatus 1-2 through the information processing apparatus 1-n having received the status request command to return the device information to the information processing apparatus 1-1 pointed by the response destination ID contained in the status request command. The status reply command is also used to store the device information onto data area of the execution section.

FIG. 7 illustrates the structure of the data area of the software cell with a DMA command being a status reply command.

The information processing apparatus ID is an identifier identifying the information processing apparatus 1 including the information processing controller 11. The information processing apparatus IDs thus identify the information processing apparatus 1-2 through the information processing apparatus 1-n transmitting the status reply command. The information processing apparatus 1-2 through the information processing apparatus 1-n are now powered on. The main processors 42 contained in the information processing controllers 11 of the information processing apparatus 1-2 through the information processing apparatus 1-n generate the information processing apparatus IDs, based on the date and time of power on, the network addresses of the information processing apparatus 1-2 through the information processing apparatus 1-n, and the number of sub-processors 43 contained in the information processing controllers 11 of the information processing apparatus 1-2 through the information processing apparatus 1-n.

The information processing apparatus IDs contain values indicative of features of the information processing apparatus 1-2 through the information processing apparatus 1-n. The values indicative of the features of the information processing apparatus 1-2 through the information processing apparatus 1-n are information representing the type of the apparatuses. For example, the information represents that each of the information processing apparatus 1-2 through the information processing apparatus 1-n is one of a hard disk recorder, a personal digital assistants (Pads), a portable compact disk (CD) player. The information processing apparatus ID can represent functions of the information processing apparatus 1-2 through the information processing apparatus 1-n, such as audio-visual recording, audio-visual playback. The values indicative of the features of the information processing apparatus 1-2 through the information processing apparatus 1-n are determined beforehand. Upon receiving the status reply command, the information processing apparatus 1-1 learns the features and the functions of the information processing apparatus 1-2 through the information processing apparatus 1-n by reading the information processing apparatus IDs.

A master/slave (MS) status indicates which mode each of the information processing apparatus 1-2 through the information processing apparatus 1-n operates at. If the MS status is at "0", the apparatus operates as a master apparatus. If the MS status is at "1", the apparatus operates as a slave apparatus.

A main processor operating frequency is an operating frequency of the main processor 42 in the information processing controller 11. A main processor usage ratio is a usage ratio of the main processor 42 taking into consideration all programs currently running on the main processor 42. More specifically, the main processor usage ratio is a ratio of the overall available performance of the main processor 42 to performance currently in use, and is calculated in million instruction per second (MIPS) or in a processor use time per unit time.

The number of sub-processors represents the number of sub-processors 43 contained in the information processing controller 11. The sub-processor ID is an identifier identifying the sub-processor 43 in the information processing controller 11.

The sub-processor status indicates the status of each sub-processor 43, and can be one of "unused", "reserved", and "busy". The status "unused" indicates that the sub-processor 43 is neither currently used nor reserved. The status "reserved" indicates that the main processor 42 is not currently used but reserved. The status "busy" indicates that the sub-processor 43 is currently used.

A sub-processor usage ratio indicates the usage ratio of the sub-processor 43 that currently executes the program or that is reserved for the program. If a sub-processor status is "busy", the sub-processor usage status indicates a current usage ratio. If the sub-processor status is "reserved", the sub-processor usage status indicates an estimated usage ratio at which the sub-processor 43 is expected to run.

The sub-processor ID, the sub-processor status, and the sub-processor usage ratio are set in a combination for each sub-processor 43. The number of combinations corresponds to the number of sub-processors 43 in a single information processing controller 11.

Main memory overall capacity is an overall memory capacity of the main memory 12 in the information processing controller 11, and main memory used capacity is a currently used memory capacity of the main memory 12 in the information processing controller 11.

The number of recorders indicates the number of recorders 13 connected to the information processing controller 11. A recorder. ID uniquely identifies each recorder 13 connected to the information processing controller 11. A recorder type ID indicates the type of the recorder 13 (for example, a hard disk, a CD-RW (compact disk rewritable), a CD+RW (compact disk plus rewritable), a DVD-RW (digital versatile disk rewritable), a DVD+RW (digital versatile disk plus rewritable), a memory disk, SRAM (static random-access memory), or ROM (read-only memory)).

A recorder overall capacity indicates an overall storage capacity of the recorder 13 identified by the recorder ID, and a recorder used capacity indicates a currently used capacity of the recorder 13.

The recorder ID, the recorder type ID, the recorder overall capacity, and the recorder used capacity are set in a combination for each recorder 13. The number of combinations equals to the number of recorders 13 connected to the information processing controller 11. If a plurality of recorders 13 are connected to a single information processing controller 11, the recorders 13 are assigned different recorder IDs, and the recorder type IDs, the recorder overall capacities and the recorder used capacities are managed on a per recorder basis.

The information processing apparatus 1-1 generates the software cell to cause the information processing apparatus 1-2 through the information processing apparatus 1-n to perform distributed processing. The generated software cell is then transmitted to the information processing apparatus 1-2 through the information processing apparatus 1-n.

Each piece of data is transmitted in a software cell to the information processing apparatus 1-2 through the information processing apparatus 1-n in the same manner as the software cell. The discussion of the transmission of the data is thus omitted herein.

The main processor 42 contained in the information processing controller 11 in one of the information processing apparatus 1-2 through the information processing apparatus 1-n generates the software cell having the structure discussed above, and transmits the generated software cell to the information processing controller 11 in the information processing apparatus 1-1 via the network 2. An information processing apparatus 1 as a source, another information processing apparatus 1 as a destination, a third information processing apparatus 1 as a response destination, and an information processing controllers 11 of respective information processing apparatuses 1 are identified by the above-referenced source ID, destination ID, and response destination ID.

The main processor 42 contained in the information processing controller 11 in the information processing apparatus 1 having received the software cell stores the software cell in the main memory 12 thereof. The main processor 42 as the destination reads the software cell and processes DMA commands contained in the software cell.

More specifically, the main processor 42 as the destination executes the load command. The main processor 42 loads information from an address in the main memory 12 pointed by the load command onto a predetermined area of the local storage 51 of the sub-processor 43 identified by the sub-processor ID and the LS address contained in the load command. The information to be loaded herein includes the sub-processor program contained the received software cell, data required to execute the program, and other specified data.

The main processor 42 outputs the kick command together with the program counter contained in the kick command to the sub-processor 43 identified by the sub-processor ID contained in the kick command.

The specified sub-processor 43 executes the sub-processor program in accordance with the kick command and the program counter. After storing the execution results in the main memory 12, the sub-processor 43 notifies the main processor 42 of the completion of the execution of the program.

A processor that performs the software cell in the information processing controller 11 in the information processing apparatus 1 as the destination is not limited to the sub-processor 43. The main processor 42 can be specified as a processor to perform the function program contained in the software cell.

In such a case, the information processing apparatus 1 as the source transmits, to the information processing apparatus 1 as the destination, a software cell instead of the sub-processor program. The software cell contains a main memory program and data to be processed by the main memory program and with a DMA command as a load command. The information processing apparatus 1 as the destination stores the main memory program and the data to be processed by the main memory program. The information processing apparatus 1 as the source transmits, to the information processing apparatus 1 as the destination, identifiers including the main processor ID, the main memory address, the function program ID identifying the main memory program of the information processing controller 11 in the information processing apparatus 1 as the destination, and the software cell with the DMA command being the kick command or the function program command. The main processor 42 thus executes the main memory program.

In the network system of the embodiment of the present invention, the information processing apparatus 1 as the source of the software cell transmits, to the information processing apparatus 1 as the destination, the sub-processor program or the main memory program in the software cell. With the sub-processor program loaded onto the sub-processor 43 in the information processing controller 11 in the information processing apparatus 1 as the destination, the information processing apparatus 1 as the destination executes one of the sub-processor program and the main memory program.

If the software cell contains the sub-processor program, the information processing controller 11 in the information processing apparatus 1 as the destination of the software cell loads the sub-processor program onto the specified sub-processor 43. The specified sub-processor 43 thus performs one of the sub-processor program and the main memory program in the software cell.

Without a user intervention to operate the information processing apparatus 1 as the destination of the software cell, one of the sub-processor program and the main memory program is reassigned to the information processing apparatus 1 as the destination from the information processing apparatus 1 as the source. The information processing controller 11 in the information processing apparatus 1 as the destination executes one of the sub-processor program and the main memory program in the software cell. Data transfer is performed in a DMA method between the sub-processors 43. Using the above-referenced sandbox, a single information processing controller 11 processes data fast and at a high security level even when the data needs to be processed at multiple stages.

Figure 8:
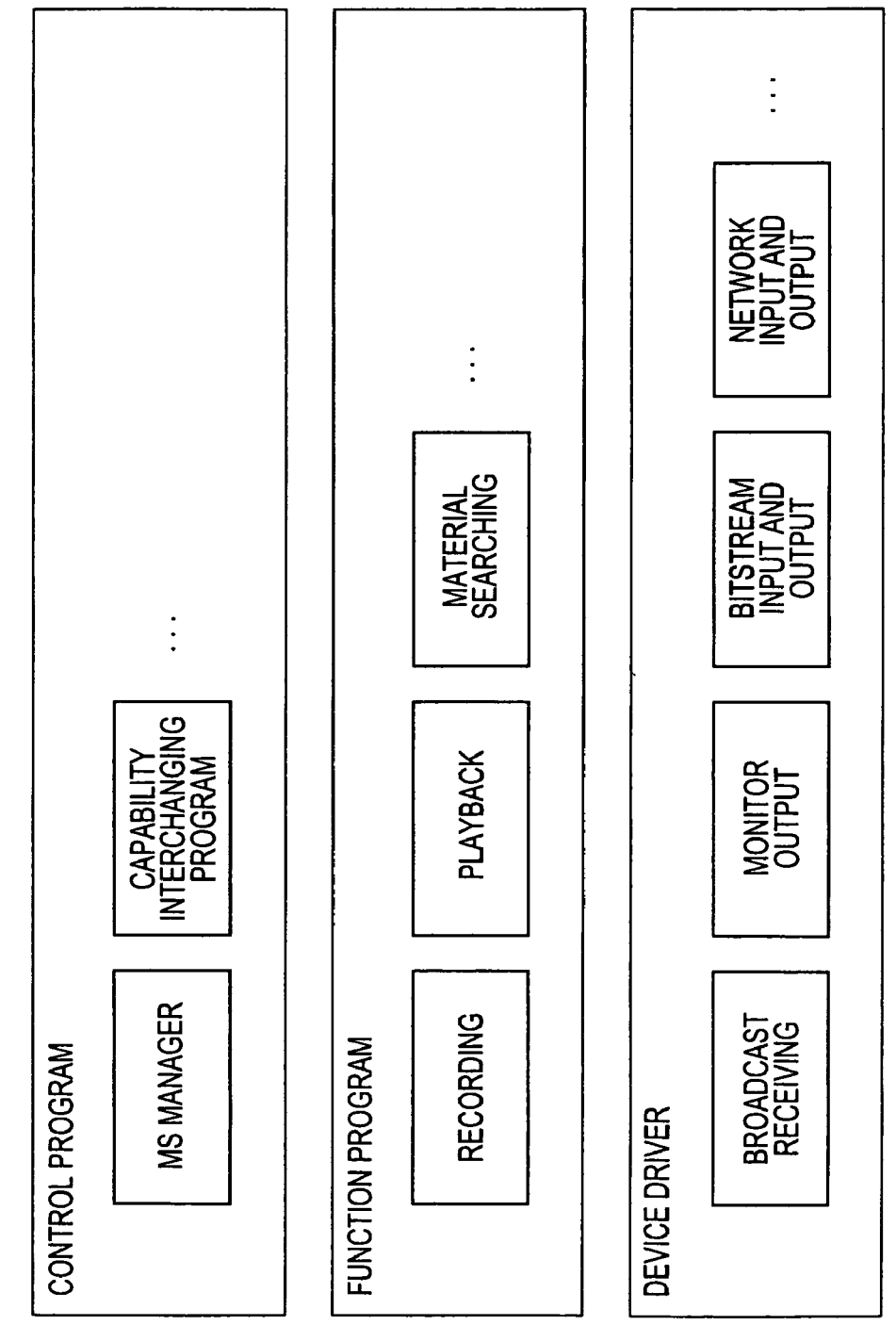
FIG. 8 illustrates the structure of a software program stored in the main memory in an information processing controller of FIG. 1.

FIG. 8 illustrates the structure of a software program stored in the main memory 12 in each information processing controller 11. Before power on of the information processing apparatus 1, the software program is pre-stored in the recorder 13 connected to the information processing controller 11.

The programs are categorized into control programs, function programs, and device drivers by function or feature.

The control program is installed on the information processing controllers 11, and is executed by the main processor 42 in the information processing controller 11. If distributed processing is performed by a plurality of information processing apparatuses 1, the control program includes the MS (master/slave) manger and a capability interchanging program.

The function program, executed by the main processor 42, is a so-called application program. Each information processing controller 11 has its own function program for recording, playback, material searching, for example, in accordance with the function of the information processing apparatus 1.

The device driver is used to perform an input and output function (transmission and reception function) of data to the information processing controller 11 or the information processing apparatus 1. For example, depending on the function of the information processing apparatus 1, the information processing controller 11 is provided with a interfaces for broadcast receiving, monitor outputting, bitstream inputting and outputting, and network inputting and outputting.

Loading of each program to the main memory 12 is described below with reference to FIG. 8.

The information processing apparatus 1 physically connected to the network 2 via an interconnect cable (not shown) is switched on. The information processing apparatus 1 is thus electrically and functionally connected to the network 2. The main processor 42 in the information processing controller 11 of the information processing apparatus 1 loads, to the main memory 12, programs categorized in the control program and programs categorized in the device driver.

More specifically, the main processor 42 reads the program to be loaded from the recorder 13 by causing the DC 46 to execute a read command. The main processor 42 writes the program onto the main memory 12 by causing the DMAC 44 to execute a write command. As a result, the main processor 42 loads, to the main memory 12, the programs categorized in the control program and the program categorized in the device driver.

As for the programs categorized in the function program, only required ones can be loaded to the main memory 12 under the control of the main processor 42 when necessary. Alternatively, as the other category programs, the function programs can be loaded to the main memory 12 at the power on.

The function programs are assigned respective identifiers uniquely identifying themselves as function program IDs. The function program ID is determined at the production phase of the function program based on the date and time of production and the information processing apparatus ID.

It is not necessary to store the programs categorized in the function program in the recorders 13 of all information processing apparatuses 1 connected to the network 2. If the recorder 13 of one of the information processing apparatuses 1 stores the function program, the function program can be exchanged between the information processing apparatuses 1 in the manner discussed above as necessary. A plurality of information processing apparatuses 1 connected to the network 2 can function as a virtual single information processing apparatus to execute the function program.

The MS manager and the capability interchanging program are discussed below.

Upon detecting that the information processing apparatus 1 is connected to the network 2, the MS manager checks the presence of another information processing apparatus 1 connected to the network 2. Each of the word "connected" and the word "presence" means that the information processing apparatus 1 is not only physically connected to the network 2 but also electrically and functionally connected to the network 2.

More specifically, to verify the presence of another information processing apparatus 1 connected to the network 2, the MS manager generates a software cell with the DMA command being a status request command, both a source ID and a response destination ID pointing to own apparatus and no particular destination ID set, transmits the generated software cell, and sets a timer for network connection verification. Time-out time for the timer is 10 minutes, for example.

The main processor 42 in the information processing apparatus 1 reserves an area for device information (information relating to operational status) on the main memory 12, and records, in a device information table, the information processing apparatus ID, the information processing apparatus type ID, the sub-processor ID, the recorder ID, the number of recorders, and the recorder overall capacity.

If another information processing apparatus 1 is connected to the network 2, the DMA command from the other connected information processing apparatus 1 is a status reply command, and the software cell containing, as data, the device information recorded on the main memory 12 in the other information processing apparatus 1 is returned. The MS manager monitors the reception of the software cell of the status reply command until time is up in the timer. If the status reply command indicating the MS status=0 (master apparatus) is received, the MS manager sets the MS status in the device information table of own apparatus to "1". In this way, the MS manager recognizes own apparatus as a slave apparatus. If no status reply command has been received at all until time is up, or if a status reply command indicating the MS status=0 (master apparatus) is not received at all until time is up, the MS manager sets the MS status in the device information table of own apparatus to "0". The MS manager recognizes own apparatus as a mater apparatus.

Regardless of whether own apparatus is a mater or a slave apparatus, the MS manager references status information and monitors the states of the other apparatuses by regularly transmitting the status request command to the network 2. If any change takes place in the connection state of the network 2, the MS manager notifies a capability interchanging program, to be discussed later, of the change.

If own apparatus is a master apparatus, the capability interchanging program acquires the device information of all other information processing apparatuses 1, namely, the slave apparatuses, connected to the network 2.

The apparatus generates the software cell with the DMA command being the status request command and transmits the software cell to the network 2 to acquire the device information of the slave apparatuses. The apparatus then receives the software cell with the SMA command being the status reply command and including the device information of the slave apparatuses as data.

As the device information table of own apparatus as master apparatus, the capability interchanging program reserves an area in the main memory 12 of own apparatus to store the device information of all slave apparatuses connected to the network 2, and then records the device information as the device information table of the slave apparatuses.

More specifically, the device information of all information processing apparatuses 1 connected to the network 2 is stored in the main memory 12 of the master apparatus as the device information table.

If own apparatus is a slave apparatus, the capability interchanging program acquires the device information of all other information processing apparatuses connected to the network 2, and stores the information processing apparatus ID and the MS status contained in the device information onto the main memory 12. The device information of own apparatus is recorded onto the main memory 12 of the slave apparatus as the device information table while the information processing apparatus IDs and the MS statuses of the other information processing apparatuses 1 (master and slave apparatuses) connected to the network 2 are also recorded.

Regardless of whether own apparatus is a mater apparatus or a slave apparatus, the capability interchanging program acquires, from the MS manager, information relating to a change in the connection status of the network 2, for example, when a new information processing apparatus 1 is connected to the network 2 or when an information processing apparatus 1 is disconnected from the network 2. The capability interchanging program then updates the information recorded on the main memory 12.

The MS manager and the capability interchanging program can be executed by any of the main processor 42 and the sub-processors 43. The MS manager and the capability interchanging program are preferably resident programs that are continuously operative while the main power of the information processing apparatus 1 remains turned on.

The master apparatus in the distributed processing needs to monitor user operation and the operation status of the slave apparatus. If the user operates one of the information processing apparatuses 1 connected to the network 2, the master apparatus directly learns operation information if the operated one is a master. If the user operates a slave apparatus, the operation information is transferred to a master apparatus. Regardless of whether the operated apparatus is a mater apparatus or a slave apparatus, the master apparatus remains kept informed of the operation information. The operation information is transmitted in the software cell with the DMA command being an operation information transmission command.

The main processor 42 contained in the information processing controller 11 of the master apparatus selects, in response to the operation information, a function program to be performed. As previously discussed, the main processor 42 contained in the information processing controller 11 of the master apparatus loads the function program onto the main memory 12 from the recorder 13 of own apparatus or another information processing apparatus (namely, a slave apparatus).

The function program defines required specifications, different from execution unit to execution unit, including the information processing apparatus type ID, the throughputs of the main processor and the sub-processor, the main memory usage ratio, conditions of an external recorder. The main processor 42 contained in the information processing controller 11 of the master apparatus reads required specifications for each function program and references the device information table pre-recorded on the main memory 12 by the capability interchanging program. The main processor 42 thus reads the device information of each information processing apparatus 1 connected to the network 2.

The main processor 42 contained in the information processing controller 11 of the master apparatus compares the device information of each information processing apparatus 1 connected to the network 2 with the required specifications of the function program. For example, if the function program requires a video recording function, only the information processing apparatus 1 having the recording function is identified and extracted based on the information processing apparatus type ID. A slave apparatus satisfying the throughputs of the main processor and the sub-processor required to execute the function program, the main memory used capacity, and the conditions of the external recorder is identified as an execution request apparatus candidate. If a plurality of execution request apparatus candidates are identified, one of the candidates is selected.

The main processor 42 contained in the information processing controller 11 of the master apparatus updates the device information table recorded on the main memory 12 of own apparatus regarding the execution request apparatus candidate identified as a slave apparatus. The main processor 42 further generates the software cell with the DMA commands being the load command and the kick command, sets information of the sub-processor required for the function program and the sandbox size, and transmits the software cell to the slave apparatus identified as the execution request apparatus candidate.

The slave apparatus requested to execute the function program executes the function program, and updates the device information table recorded thereon. The main processor 42 contained in the information processing controller 11 of the slave apparatus loads the function program on the main memory 12 from the recorder 13 of own apparatus or from another information processing apparatus 1.

As the main memory program, if necessary, the sub-processor program is transmitted in the software cell to the other information processing apparatus 1 to be loaded onto the sub-processor 43 of the other information processing apparatus 1. The other information processing apparatus 1 thus executes the sub-processor program.

Subsequent to the completion of the function program, the main processor 42 in the information processing controller 11 of the slave apparatus having executed the function program transmits an end notification to the main processor 42 of the information processing controller 11 of the master apparatus while updating the device information table recorded on own apparatus. Upon receiving the end notification of the execution of the function program, the main processor 42-1 in the information processing controller 11 of the master apparatus updates a portion of the device information table recorded on own apparatus, corresponding to the slave apparatus having executed the function program.

The master apparatus always needs to monitor the user operation and the operation status of a slave apparatus. If an information processing apparatus 1 disconnected from the network 2 is a master apparatus in a single virtual information processing apparatus executing the function program, an information processing apparatus 1 having a minimum value of information processing apparatus ID, from among information processing apparatuses 1 not disconnected from the network 2, is set as a master apparatus.

The information processing controller 11 of one embodiment of the present invention can be implemented as a one-chip integrated circuit containing a plurality of sub-processors. Such a one-chip information processing controller 11 inevitably results in high heat density in comparison with non-one-chip processors performing the same process. A temperature detector using a temperature sensor can be arranged at each of the main processor 42 and the sub-processor 43. Using the temperature detector, the main processor 42 and the sub-processor 43 are controlled to operate within a normal operating temperature range. With this arrangement, device degradation is controlled, and highly reliable information processing controller 11 and information processing apparatus 1 are provided. In the information processing controller 11 in accordance with one embodiment of the present invention, a process is transferred or interchanged between sub-processors of at least one information processing apparatus 1 in response to a temperature rise. Device failure and a drop in processing speed due to heat are thus prevented.

The information processing controller 11 of the information processing apparatus 1 in accordance with a first embodiment of the present invention is described below with reference to FIGS. 9-17. The information processing controller 11 performs distributed processing even under temperature rise conditions.

Figure 9:
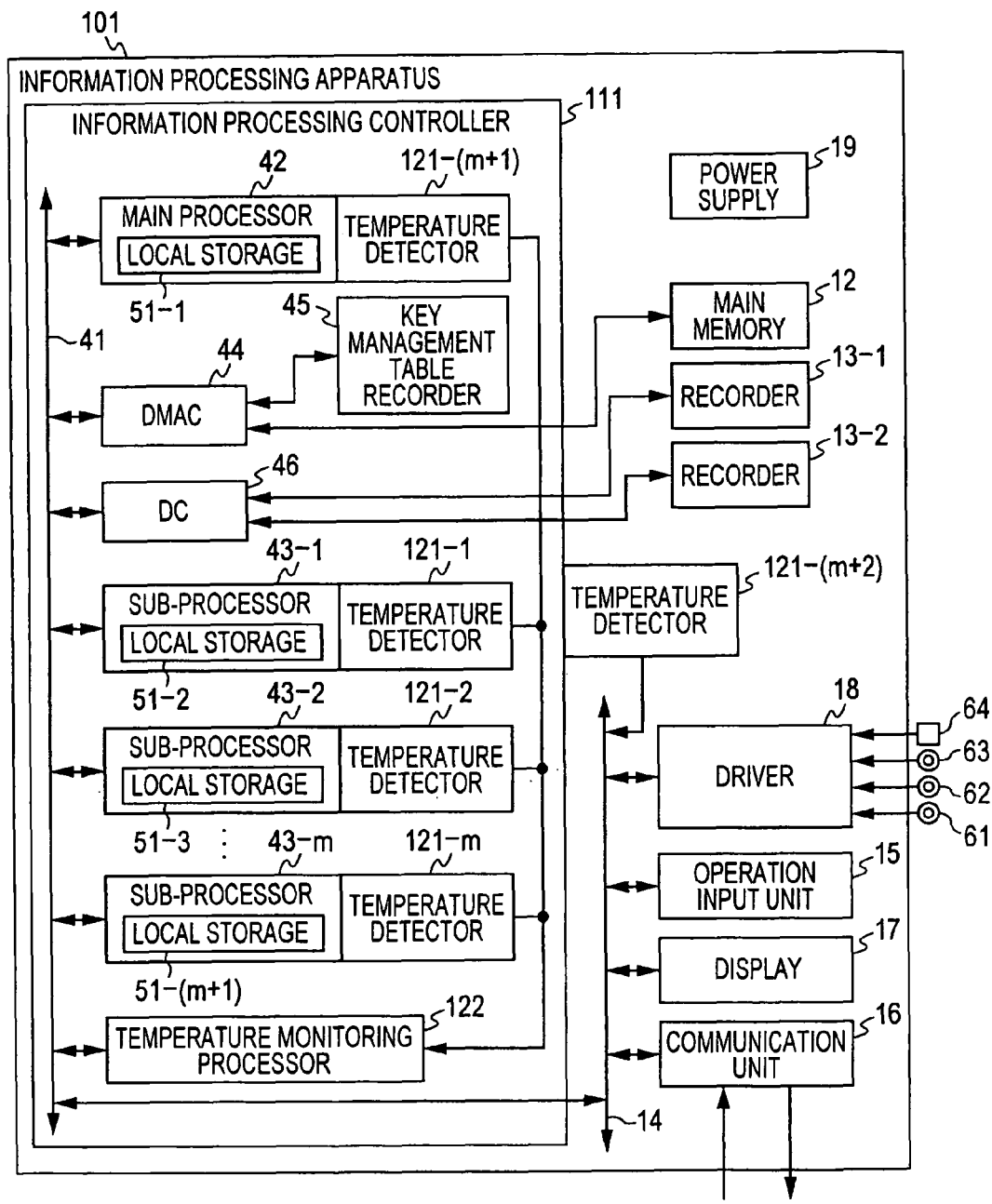
FIG. 9 illustrates the structure of an information processing apparatus in accordance with one embodiment of the present invention.

FIG. 9 is a block diagram of an information processing apparatus 101 in which temperature detectors are arranged at the main processor 42 and the sub-processor 43.

As shown in FIG. 9, elements described with reference to FIG. 1 are designated with the same reference numerals and the discussion thereof is omitted as appropriate. The information processing apparatus 101 of FIG. 9 includes an information processing controller 111 instead of the information processing controller 11. A temperature detector 121-(m+2) (m is a number equal to the number of sub-processors 43 arranged in the information processing controller 111) is mounted to detect temperature of the one-chip information processing controller 111. The rest of the information processing apparatus 101 is identical in structure to the information processing apparatus 1 of FIG. 1.

The information processing controller 111 includes a temperature detector 121-1 through a temperature detector 121-m measuring temperatures of a sub-processor 43-1 through a sub-processor 43-m, and a temperature detector 121-(m+1) measuring temperature of the main processor 42, and a temperature monitoring processor 122 monitoring temperature measurements provided by the temperature detector 121-1 through the temperature detector 121-(m+2) and outputting the monitored temperature measurements to the main processor 42 via the bus 41. The rest of the information processing controller 111 is identical in structure to the information processing controller 11 discussed with reference to FIG. 1.

The information processing apparatus 101 is not connected to the network 2 in accordance with the first embodiment, and operates on a standalone basis. In other words, the distributed processing is performed among the sub-processor 43-1 through the sub-processor 43-m in the information processing controller 111 in the information processing apparatus 101 of the first embodiment of the present invention.

The chip structure of the information processing controller 11 is described below with reference to FIG. 10. The DMAC 44, the key management table recorder 45, the DC 46, and the temperature monitoring processor 122 are not shown in FIG. 10.

Mounted on the chip of the information processing controller 111 are eight processors of the sub-processor 43-1 through the sub-processor 43-8 in a 4 by 2 layout (with the four processors on one side and the remaining four processors on the other side of the bus 41), and the local storage 51-2 through the local storage 51-9 respectively corresponding to the sub-processor 43-1 through the sub-processor 43-8. The main processor 42 is arranged close to the sub-processors 43 to transfer data at a high speed therebetween. Connected on one side of the bus 41 as shown in FIG. 10 are the sub-processor 43-1 through the sub-processor 43-4 in the order of small to large number with the sub-processor 43-1 closest to the main processor 42 and the sub-processor 43-4 farthest from the main processor 42. Connected on the other side of the bus 41 as shown in FIG. 10 are the sub-processor 43-5 through the sub-processor 43-8 in the order from small to large number with the sub-processor 43-5 closest to the main processor 42 and the sub-processor 43-8 farthest from the main processor 42. A heat sink 141 is attached to the chip of the information processing controller 111.

The temperature detector 121-1 through the temperature detector 121-8 are arranged close to the sub-processor 43-1 through the sub-processor 43-8, respectively. The temperature detector 121-9 is arranged in the vicinity of the main processor 42, and the temperature detector 121-10 is arranged in the vicinity of the heat sink 141.

Figure 11:
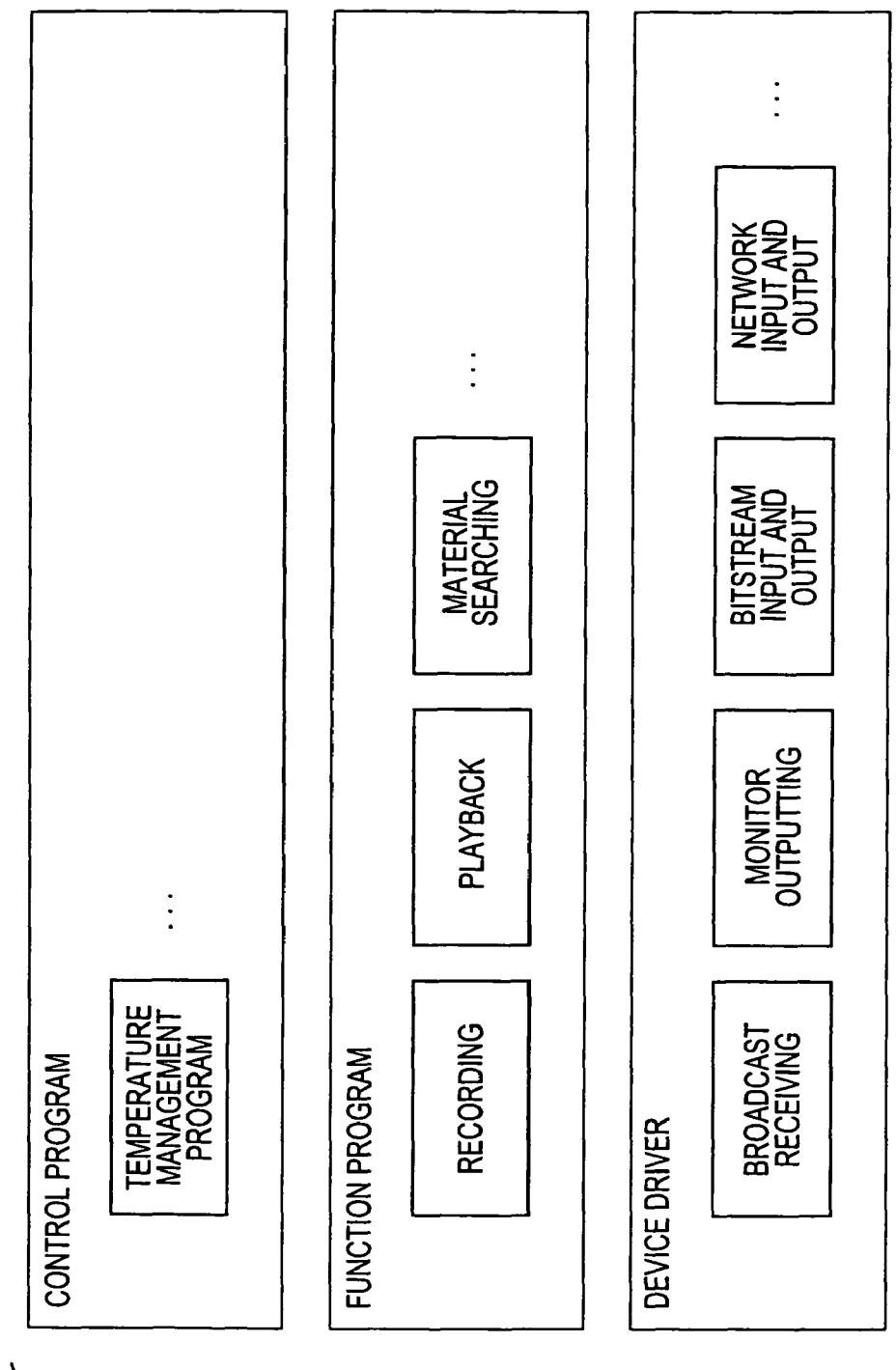
FIG. 11 illustrates the structure of a software program stored in the information processing controller of FIG. 9.

FIG. 11 illustrates the structure of a software program executed by the information processing controller 111 of the first embodiment of the present invention. The information processing controller 11 performs a control process in response to a temperature rise. The software program is pre-stored in the recorder 13 connected to the information processing controller 111 prior to the power on of the information processing apparatus 101.

As shown in FIG. 11, elements identical to those described with reference to FIG. 8 are designated with the reference numerals and the discussion thereof are omitted as appropriate. A temperature management program is added to and the MS manager and the capability interchanging program are removed from the control programs in the software structure stored in the main memory 12 in the information processing controller 111 of the first embodiment. The rest of the software structure of FIG. 11 is identical to the software structure of FIG. 8. The temperature management program is preferably a resident program that is continuously operative while the main power of the information processing apparatus 101 remains turned on.

The temperature detector 121-1 through the temperature detector 121-10 in the information processing apparatus 101 measure temperatures of the sub-processors. The temperature monitoring processor 122 monitors the information of measured temperatures. The temperature management program gathers and manages the monitored temperature information. Based on the temperature information, the temperature management program controls the process performed by the main processor 42, and the transfer or the interchange of the process performed by the sub-processor 43-1 through the sub-processor 43-8 performed as necessary.

Figure 12:
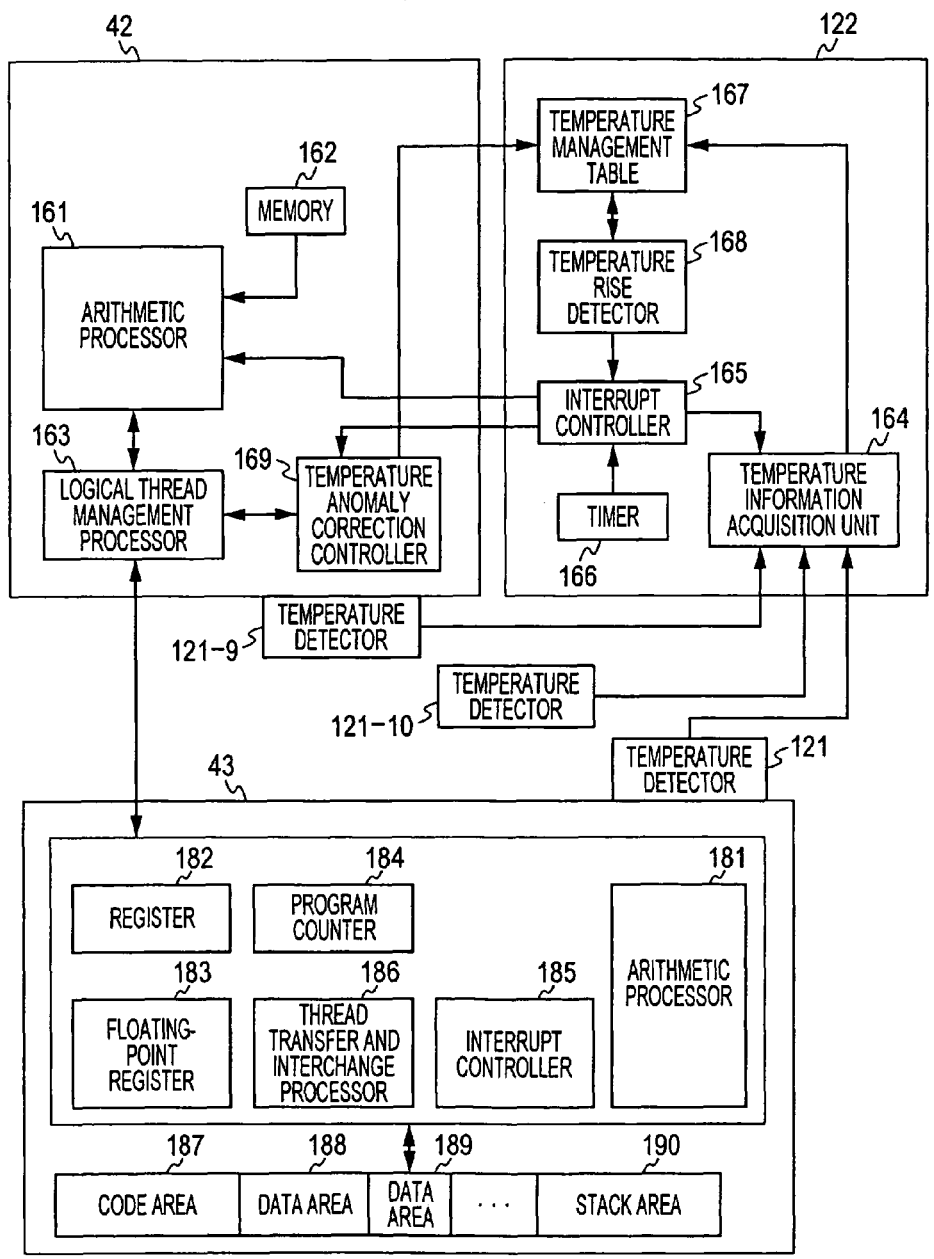
FIG. 12 is a functional block diagram illustrating the function executed by the information processing controller of FIG. 9.

FIG. 12 is a functional block diagram of the software program of the function performed by the information processing apparatus 101. The software program has been discussed with reference to FIG. 11.

The functions of an arithmetic processor 161, a memory 162, a logical thread management processor 163, and a temperature anomaly correction controller 169 shown in FIG. 12 are basically carried out by the main processor 42 in the information processing apparatus 101. The functions of a temperature information acquisition unit 164, an interrupt controller 165, a timer 166, a temperature management table 167, and a temperature rise detector 168 shown in FIG. 12 are basically carried out by the temperature monitoring processor 122 in the information processing apparatus 101.

The functions of an arithmetic processor 181, a register 182, a floating-point register 183, a program counter 184, an interrupt controller 185, and a thread transfer and interchange processor 186 shown in FIG. 12 are basically carried out by the sub-processor 43 in the information processing apparatus 101. A code area 187, a data area 188, and a stack area 190 correspond to at least a portion of the storage area of the local storage 51. FIG. 12 illustrates a single combination of sub-processor 43 and temperature detector 121. All sub-processors 43 and temperature detectors 121 in the information processing controller 111 are likewise connected.

The arithmetic processor 161 executes an arithmetic process for a predetermined application program. The memory 162 corresponds to at least one portion of the storage area of the local storage 51-1, and stores a program performed by the arithmetic processor 161 and data required to execute the program. To cause at least one of the sub-processors 43 to perform distributed processing, the arithmetic processor 161 supplies setting information of a logical thread to the logical thread management processor 163, thereby requesting the logical thread management processor 163 to generate the logical thread. The logical thread is defined as a process unit that provides a single function as a result of uniting a plurality of programs respectively assigned to a plurality of sub-processors 43. The plurality of programs may belong to the same application program or different application programs. In other words, the plurality of programs respectively assigned to the plurality of sub-processors 43 as necessary are those recorded on a predetermined storage area of the main memory 12. In response to a request of the application program executed by the arithmetic processor 161, the programs are loaded to the local storage 51 of the sub-processor 43 from the main memory 12 for execution.

The logical thread management processor 163 generates or deletes the logical thread corresponding to the application program executed by the arithmetic processor 161, while monitoring the status of the generated logical thread and controlling the operation of the generated logical thread. The logical thread management processor 163 generates a table listing entire management information of the information processing apparatus 101, and a table listing information required to execute the logical thread on a per logical thread execution basis. The logical thread management processor 163 controls the execution of the logical thread by referencing and updating the tables as necessary.

At the control timing of the process of the interrupt controller 165, the temperature information acquisition unit 164 acquires the temperature information supplied from the temperature detector 121, and updates a temperature management table 167. The interrupt controller 165 references the timer 166, and interrupts the temperature information acquisition unit 164. In response to information supplied from the temperature rise detector 168, the interrupt controller 165 interrupts the arithmetic processor 161 and the temperature anomaly correction controller 169.

The temperature management table 167 lists information for use in temperature management performed by the information processing controller 111. As shown in FIG. 13, the temperature management table 167 lists a controller ID identifying the information processing controller 111, information relating to the operation status of the sub-processor 43-1 through the sub-processor 43-8, updated temperature measurement results of the heat sink 141, the main processor 42, and the sub-processor 43-1 through the sub-processor 43-8 (in other words, temperature measurement results provided by the temperature detector 121-1 through the temperature detector 121-10), temperature upper limit values of the heat sink 141, the main processor 42, and the sub-processor 43-1 through the sub-processor 43-8 (if the temperature detector 121-1 through the temperature detector 121-10 detect temperatures above the temperature upper limits, a temperature anomaly is triggered), and layout information of the sub-processors in the chip.

The temperature upper limit of FIG. 13 is a specification value at the design stage of the information processing controller 111 and the information processing apparatus 101, and is an upper temperature limit of a required temperature range within which the normal operation of the information processing controller 111 and the information processing apparatus 101 is guaranteed. The temperature upper limit may be a preferred temperature upper limit below which a normal and efficient operation of the information processing controller 111 and the information processing apparatus 101 is performed. The information of the operation status of the sub-processor 43-1 through the sub-processor 43-8 indicates a run status or a stop status as to whether the apparatus is active or not. The sub-processor layout information indicates the layout of the sub-processor 43-1 through the sub-processor 43-8 set beforehand in the design stage of the information processing controller 111 and the information processing apparatus 101. As shown in FIG. 10, the processor layout information includes information of the arrangement of the sub-processor 43-1 through the sub-processor 43-8 in a configuration of two rows by four columns, and information correspondence between the layout and the sub-processor ID.

The temperature rise detector 168 references the temperature management table 167 to determine whether the temperature detection result of any of the temperature detector 121-1 through the temperature detector 121-10 rises above the temperature upper limit. If the temperature upper limit is exceeded by any of the temperature detection results, the temperature rise detector 168 notifies the interrupt controller 165 of an abnormal temperature rise, thereby causing the interrupt controller 165 to interrupt the arithmetic processor 161 and the temperature anomaly correction controller 169.

In response to an interrupt from the interrupt controller 165, the temperature anomaly correction controller 169 references the temperature management table 167. The temperature anomaly correction controller 169 determines which of the information processing controller 111, the main processor 42, and the sub-processors 43 corresponds to the temperature detector 121 that has detected the abnormal temperature rise. By controlling the logical thread management processor 163, the temperature anomaly correction controller 169 stops the process currently in progress, as required, or transfers or interchanges the thread currently in progress with one of normal sub-processors 43.

Under the control of the logical thread management processor 163, the arithmetic processor 181 executes a program (thread) assigned by the main processor 42. The register 182 and the floating-point register 183 are used by the arithmetic processor 181 that executes the program. The program counter 184 indicates an address storing a command currently executed by the arithmetic processor 181.

Under the control of the logical thread management processor 163, the interrupt controller 185 stops the process of the arithmetic processor 181 if an interrupt is triggered, and causes the arithmetic processor 181 to resume the process if the interrupt is released. Under the control of the logical thread management processor 163, the program currently executed by own sub-processor is transferred to another sub-processor 43, or is interchanged with another program executed by another sub-processor 43. In this case, the thread transfer and interchange processor 186 evacuates a content of the currently executed program (values of the register 182, the floating-point register 183, and the program counter 184) to the stack area 190. The thread transfer and interchange processor 186 transfers the content of the stack area 190 and the data area 189 to the local storage 51 of the sub-processor 43 selected as a transfer target or an interchange target.

The code area 187 stores a code common to the sub-processors 43. The data area 188 stores fixed data. The data area 189 stores data different from sub-processor to sub-processor. The stack area 190 receives the evacuated context of the currently executed program when the program currently executed by own sub-processor is transferred to another sub-processor 43, or is interchanged with another program executed by another sub-processor 43.

The process of the information processing controller 111 having the function discussed with reference to the functional block diagram of FIG. 12 is specifically described below.

If an application program for processing three-dimensional graphics, a process of a single screen is partitioned by pixels, and the partitioned processes are calculated in parallel by a plurality of sub-processors based on the same program and the same model data. More specifically, when the arithmetic processor 161 executes an application program for processing three-dimensional graphics, processes partitioned by pixel are assigned to and calculated in parallel by a plurality of sub-processors 43.

To request the logical thread management processor 163 to generate a logical thread, the arithmetic processor 161 determines beforehand the number of the sub-processors 43 to be used for the logical thread, and supplies the logical thread management processor 163 with setting information of the logical thread. Herein, two sub-processors 43 are used. The logical thread management processor 163 loads the commonly used program and model data required for the process to the code area 187 and the data area 188 (local storage 51) of the sub-processor 43 to which the distributed processing is assigned.

Optionally, the commonly used program and model data required for the process may be supplied beforehand to the local storage 51 of the sub-processor 43 to which no distributed processing is yet assigned. As will be discussed later, in the event of temperature rise, the loading of the program and model data becomes unnecessary when the process of the logical thread is newly assigned (for process transfer or process interchange) to the sub-processor 43 that has not been assigned the distributed processing.

For example, if the sub-processors 43 assigned the distributed processing are the sub-processor 43-1 and the sub-processor 43-2, the arithmetic processor 181 of the sub-processor 43-1 calculates a luminance value at a position having coordinates (2x, y) on a screen while the arithmetic processor 181 of the sub-processor 43-2 calculates a luminance value at a position having coordinates (2x+1, y).

With the information processing apparatus 101 operating, the interrupt controller 165 continuously references the temperature management table 167. At regular intervals, the interrupt controller 165 interrupts the temperature information acquisition unit 164, thereby causing the temperature information acquisition unit 164 to acquire the temperature information of the temperature detector 121-1 through the temperature detector 121-10. The interrupt controller 165 thus updates the value of the temperature detection results in the temperature management table 167.

The sub-processor 43-1 and the sub-processor 43-2 successively process the threads assigned in response to the request of the application program processed by the arithmetic processor 161. With the calculation process in progress, the sub-processor 43-1 and the sub-processor 43-2 generates heat as transistors contained therewithin perform a high-speed switching operation. Heat generated by the main processor 42 and the sub-processors 43 performing the distributed processing assigned thereto affect not only the switching operation of the transistors arranged therewithin but also adjacent processors. If processors working at a high-speed switching rate are present within a close range, the temperatures of these processors substantially rise.

The temperature rise detector 168 references the temperature management table 167. Upon detecting that any of temperature detection results of the temperature detector 121-1 through the temperature detector 121-10 is above a predetermined temperature upper limit, the temperature rise detector 168 notifies the interrupt controller 165 of an abnormal temperature rise. In response to the notification from the temperature rise detector 168, the interrupt controller 165 interrupts the arithmetic processor 161 and the temperature anomaly correction controller 169.

When interrupted by the interrupt controller 165, the arithmetic processor 161 suspends the current process of the application program. When interrupted by the interrupt controller 165, the temperature anomaly correction controller 169 references the temperature management table 167 to determine which of the information processing controller 111, the main processor 42, and the sub-processors 43 corresponds to the temperature detector 121 that has detected the abnormal temperature rise. By controlling the logical thread management processor 163, the temperature anomaly correction controller 169, as appropriate, stops the process, or transfers or interchanges the currently processed thread between the sub-processor 43 detected to be in abnormal temperature rise and a normal sub-processor 43.

More specifically, the temperature anomaly correction controller 169 references the temperature management table 167. Upon determining that the sub-processor 43-1 corresponds to the temperature detector 121 having detected the abnormal temperature rise, for example, the temperature anomaly correction controller 169 references the temperature management table 167 to determine whether a sub-processor 43 can be selected as a transfer target to which the process of the thread being executed by the sub-processor 43-1 is transferred.

Selected as a transfer target is one sub-processor 43 resulting in the lowest temperature measurement from among those that have remained inoperative and are not closely located to the currently operating sub-processor 43. If a plurality of sub-processors 43 satisfy the criteria, a sub-processor 43 having the smallest sub-processor ID number is selected as a transfer target. If sub-processors 43 that have remained inoperative and are located far from the currently operating sub-processor 43 are not available, one resulting in the lowest temperature measurement is selected from among the currently inoperative sub-processors 43. If a plurality of sub-processors 43 satisfy the criteria, a sub-processor 43 having the smallest sub-processor ID number is selected as a transfer target.

If no currently inoperative sub-processors 43 are available, the process is interchanged rather than being transferred. A sub-processor 43 resulting in the lowest temperature measurement is selected as an interchange target. If a plurality of sub-processors 43 satisfy the criteria, a sub-processor 43 having the smallest sub-processor ID number is selected as an interchange target.

If the commonly used program and model data required to execute the process are supplied beforehand to the local storages 51 of one sub-processors 43 having no distributed processing assignment, that sub-processors 43 may be selected with priority.

The temperature anomaly correction controller 169 references the temperature management table 167. If the temperature anomaly correction controller 169 determines that the temperature detector 121 having detected the abnormal temperature rise corresponds to the sub-processor 43-1 from among the currently operating sub-processor 43-1 and sub-processor 43-2, the temperature anomaly correction controller 169 references the temperature management table 167. The temperature anomaly correction controller 169 then selects the sub-processor 43-4 as satisfying the above-referenced criteria from among the currently inoperative sub-processors 43-3 through 43-8.

The temperature anomaly correction controller 169 notifies the logical thread management processor 163 that the sub-processor 43-4 has been selected as the transfer target of the process of the sub-processor 43-1. The logical thread management processor 163 stops the process, and evacuates the context of the process performed by the sub-processor 43-1. The logical thread management processor 163 controls the sub-processor 43-1 to load the evacuated context to the sub-processor 43-4 while modifying the operation status of the sub-processor 43-1 in the temperature management table 167 to "stop".

The interrupt controller 185 in the sub-processor 43-1 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43-4 as the transfer target pre-stores the commonly used program and model data, the thread transfer and interchange processor 186 transfers the content of the stack area 190 and the data area 189 to an information storage area (not shown) managed by the logical thread management processor 163 (a portion of the storage area of the local storage 51 of the main processor 42). If the sub-processor 43-4 does not pre-store commonly used program and model data, the thread transfer and interchange processor 186 transfers the data of the code area 187 through the stack area 190 to the information storage area (not shown) managed by the logical thread management processor 163 (the portion of the storage area of the local storage 51 of the main processor 42).

The logical thread management processor 163 supplies, to the sub-processor 43-4 as the transfer target, the evacuated data to store the evacuated data on areas corresponding to the code area 187 through the stack area 190. The evacuated data is the content of the stack area 190 and the data area 189 if the sub-processor 43-4 as the transfer target pre-stores the commonly used program and model data, and is the data of the code area 187 through the stack area 190 if the sub-processor 43-4 as the transfer target does not pre-store commonly used program and model data.

The interrupt controller 165 releases the interrupt to the arithmetic processor 161. The arithmetic processor 161 requests again the logical thread management processor 163 to execute the logical thread. The logical thread management processor 163 starts the distributed processing on the sub-processor 43-2 and the sub-processor 43-4.

The temperature anomaly correction controller 169 references the temperature management table 167. If the temperature anomaly correction controller 169 determines that the temperature detector 121 having detected the abnormal temperature rise corresponds to one of the information processing controller 111 and the main processor 42, the temperature anomaly correction controller 169 controls the logical thread management processor 163 to temporarily suspend the application program executed by the arithmetic processor 161. The logical thread management processor 163 causes the main processor 42 to temporarily stop the process to lower the amount of generated heat, except a required portion of the program executed by a resident program. The temperature anomaly correction controller 169 references the temperature management table 167 and waits on standby until the abnormal temperature rise is no longer detected. When a normal temperature state is restored, or the temperature value drops below a predetermined threshold, the process of the main processor 42, namely, the process of the application program executed by the arithmetic processor 161 resumes.

As previously discussed, the functions of the arithmetic processor 161, the memory 162, the logical thread management processor 163, and the temperature anomaly correction controller 169 shown in FIG. 12 are basically carried out by the main processor 42 in the information processing apparatus 101. The functions of the temperature information acquisition unit 164, the interrupt controller 165, the timer 166, the temperature management table 167, and the temperature rise detector 168 shown in FIG. 12 are basically carried out by the temperature monitoring processor 122 in the information processing apparatus 101. Hardware performing the above function may be different from the above-referenced structure. For example, part of the function of the main processor 42 may be carried out by the temperature monitoring processor 122, part of the function of the temperature monitoring processor 122 may be performed by the main processor 42, or these functions may be performed by different hardware. Even in such a case, the present invention is perfectly applicable.

Figure 14:
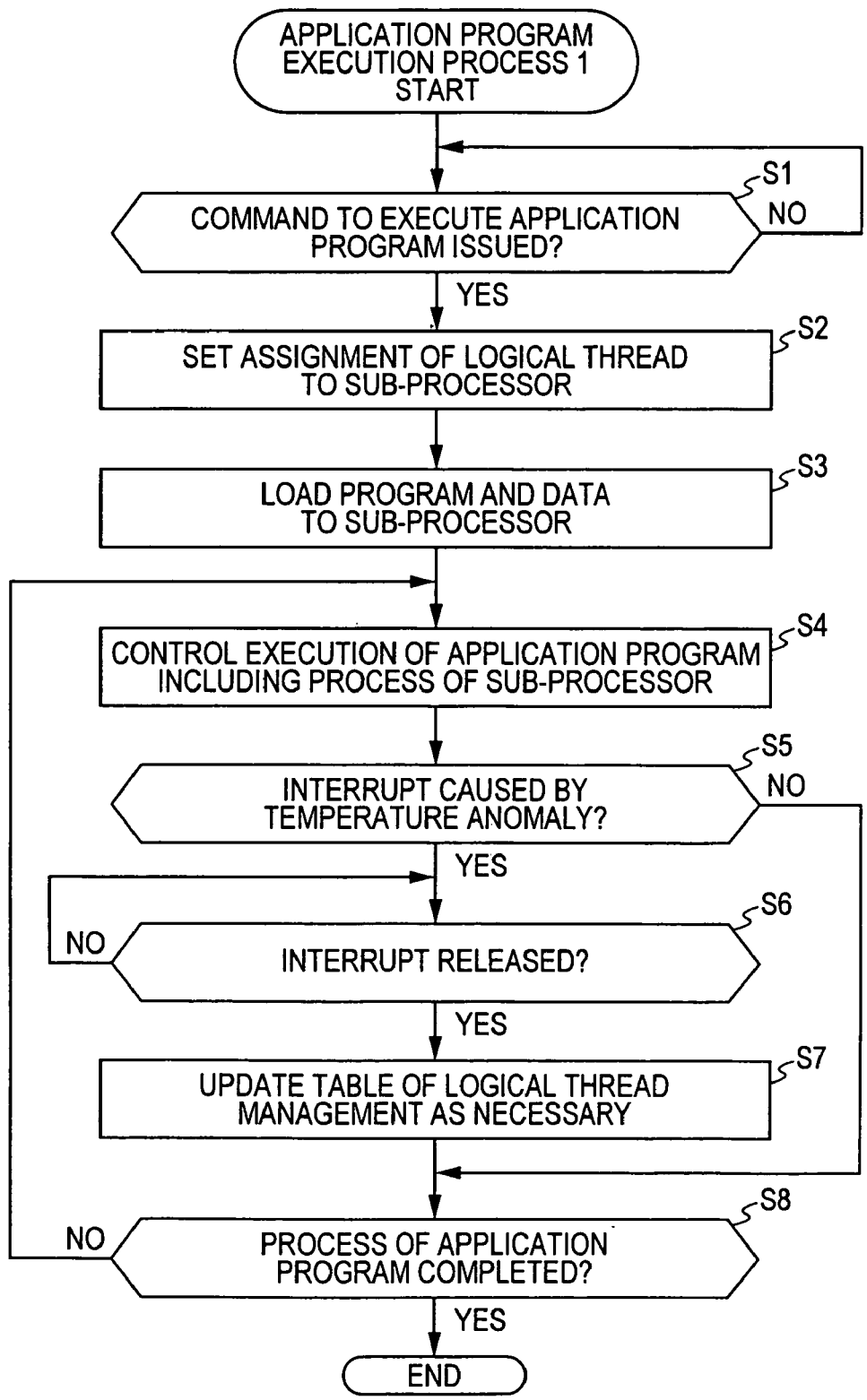
FIG. 14 is a flowchart illustrating an application program execution process 1 of the information processing apparatus.

A application program execution process 1 executed by the information processing apparatus 101 of the first embodiment of FIG. 9 is described below with reference to a flowchart of FIG. 14. The temperature management program is a resident program that is continuously operative while the main power of the information processing apparatus 101 remains turned on.

In step S1, the arithmetic processor 161 determines whether a user has input a command to execute the application program. More specifically, in step S1, the main processor 42 determines, in response to a signal supplied from the operation input unit 15 via the bus 14 and the bus 41, whether the command to execute the application program has been issued. If it is determined in step S1 that the command to execute the application program has not been issued, the process of S1 is repeated until it is determined that the command to execute the application program has been issued.

If it is determined in step S1 that the command to execute the application program has been issued, the arithmetic processor 161 sets the assignment of the logical thread to the sub-processors and supplies the setting information of the logical thread to the logical thread management processor 163 in step S2.

In step S3, the logical thread management processor 163 loads a program and data for executing the assigned process to the code area 187 and the data area 188 of the local storage 51 in the sub-processor 43 to which the logical thread is assigned.

In step S4, the arithmetic processor 161 and the logical thread management processor 163 control the execution of the application program including the process of the sub-processor 43. The arithmetic processor 181 in the sub-processor 43 performs the assigned process.

The temperature management program is a resident program that is continuously operative while the main power of the information processing apparatus 101 remains turned on, and the process is performed throughout a period while steps S1 through S4 are executed. The temperature information management process 1 of the temperature management program will be described later with reference to a flowchart of FIG. 15.

In step S5, the arithmetic processor 161 determines whether an interrupt responsive to the occurrence of a temperature anomaly is issued from the interrupt controller 165. If it is determined in step S5 that an interrupt responsive to the occurrence of a temperature anomaly is not issued, processing proceeds to step S8.

If it is determined in step S5 that an interrupt responsive to the occurrence of a temperature anomaly is issued, the current process is suspended. In step S6, the arithmetic processor 161 determines whether the interrupt is released. If it is determined in step S6 that the interrupt is not yet released, the process at step S6 is repeated until it is determined that the interrupt has been released.

If it is determined in step S6 that the interrupt has been released, the arithmetic processor 161 supplies the logical thread management processor 163 with the setting information of the logical thread as necessary in step S7. The logical thread management processor 163 thus updates the table relating to the logical thread management.

If it is determined in step S5 that the interrupt responsive to the occurrence of a temperature anomaly has not been issued, the arithmetic processor 161 determines in step S8 subsequent to the end of step S7 whether the process of the application program has been completed. If it is determined in step S8 that the process of the application program has not been completed, processing returns to step S4 to repeat step S4 and subsequent steps. If it is determined in step S8 that the process of the application program has been completed, the process ends.

In this way, the selected sub-processor 43 performs the distributed processing corresponding to the application program performed by the main processor 42.

The temperature information management process 1 executed by the information processing apparatus 101 of FIG. 9 (more specifically, executed by the temperature management program of FIG. 11) is described below with reference to a flowchart of FIG. 15.

In step S21, the temperature information acquisition unit 164 determines whether a timer interrupt is received from the interrupt controller 165. If it is determined in step S21 that a timer interrupt has not been received, the process in step S21 is repeated until it is determined that a timer interrupt has been received.

If it is determined in step S21 that a timer interrupt has been received, the temperature information acquisition unit 164 acquires temperature information from each of the temperature detectors 121 in step S22.

In step S23, the temperature information acquisition unit 164 updates the temperature management table 167 based on the temperature information acquired in step S22.

In step S24, the temperature rise detector 168 references the temperature management table 167 to determine whether an abnormal value is contained in the temperature information, in other words, whether any of the temperature detection results detected by the temperature detectors 121 is above the predetermined temperature upper limit. If it is determined in step S24 that no abnormal value is contained in the temperature information, processing returns to step S21 to repeat step S21 and subsequent steps.

If it is determined in step S24 that an abnormal value is contained in the temperature information, the temperature rise detector 168 notifies the interrupt controller 165 of the detection of the abnormal temperature rise, thereby causing the interrupt controller 165 to interrupt the arithmetic processor 161 and the temperature anomaly correction controller 169 in step S25. The interrupt controller 165 interrupts the arithmetic processor 161 and the temperature anomaly correction controller 169, thereby stopping the process of the application program controlled by the arithmetic processor 161 and causing the temperature anomaly correction controller 169 to start an anomaly-time process 1.

In step S26, the anomaly-time process 1 to be discussed later with reference to FIG. 16 is performed.

In step S27, the temperature anomaly correction controller 169 controls the logical thread management processor 163 in response to the anomaly-time process 1, thereby causing the logical thread management processor 163 to update a table of logical thread management as necessary.

In step S28, the interrupt controller 165 releases the interrupt to the process of the application program controlled by the arithmetic processor 161. Processing returns to step S21 to repeat step S21 and subsequent steps.

The temperature information detected by the temperature detectors 121 is thus acquired, and whether to perform an interrupt process at the occurrence of temperature anomaly is determined based on the temperature management table 167 that is updated in response to the detected temperature information.

The anomaly-time process 1 executed in step S26 of FIG. 15 is described below with reference to a flowchart of FIG. 16.

In step S41, the temperature anomaly correction controller 169 references the temperature management table 167, and determines which of the main processor 42 and the information processing controller 111 suffers from the temperature anomaly, in other words, which of the temperature detector 121-9 and the temperature detector 121-10 has detected temperatures above the predetermined temperature upper limit. If it is determined in step S41 that one of the main processor 42 and the information processing controller 11 causes the temperature anomaly, processing proceeds to step S53 as described below.

If it is determined in step S41 that neither the main processor 42 nor the information processing controller 111 causes the temperature anomaly, in other words, that any of the sub-processors 43 has caused the temperature anomaly, the temperature anomaly correction controller 169 references the temperature management table 167. The temperature anomaly correction controller 169 thus determines whether the process of the sub-processor 43 detected to be in temperature anomaly is transferable, in other words, whether any of sub-processors 43 other than the sub-processor 43 detected to be in temperature anomaly is not currently operating. If it is determined in step S42 that the process of the sub-processor 43 detected to be in temperature anomaly is not transferable, processing proceeds to step S47.

If it is determined in step S42 that the process of the sub-processor 43 detected to be in temperature anomaly is transferable, the temperature anomaly correction controller 169 selects a sub-processor 43 as a transfer target of the process, and notifies the logical thread management processor 163 of the selection results in step S43. More specifically, the temperature anomaly correction controller 169 selects, as a transfer target with priority, one sub-processor 43 resulting in the lowest temperature measurement from among those that have remained inoperative and are not closely located to the currently operating sub-processor 43. If a plurality of sub-processors 43 satisfy the criteria, the temperature anomaly correction controller 169 selects a sub-processor 43 having the smallest sub-processor ID number as a transfer target. If sub-processors 43 that have remained inoperative and are located far from the currently operating sub-processor 43 are not available, one resulting in the lowest temperature measurement is selected from among the currently inoperative sub-processors 43. If a plurality of sub-processors 43 satisfy the criteria, a sub-processor 43 having the smallest sub-processor ID number is selected as a transfer target. The temperature anomaly correction controller 169 then notifies the logical thread management processor 163 of the selection results.

Figure 17A:
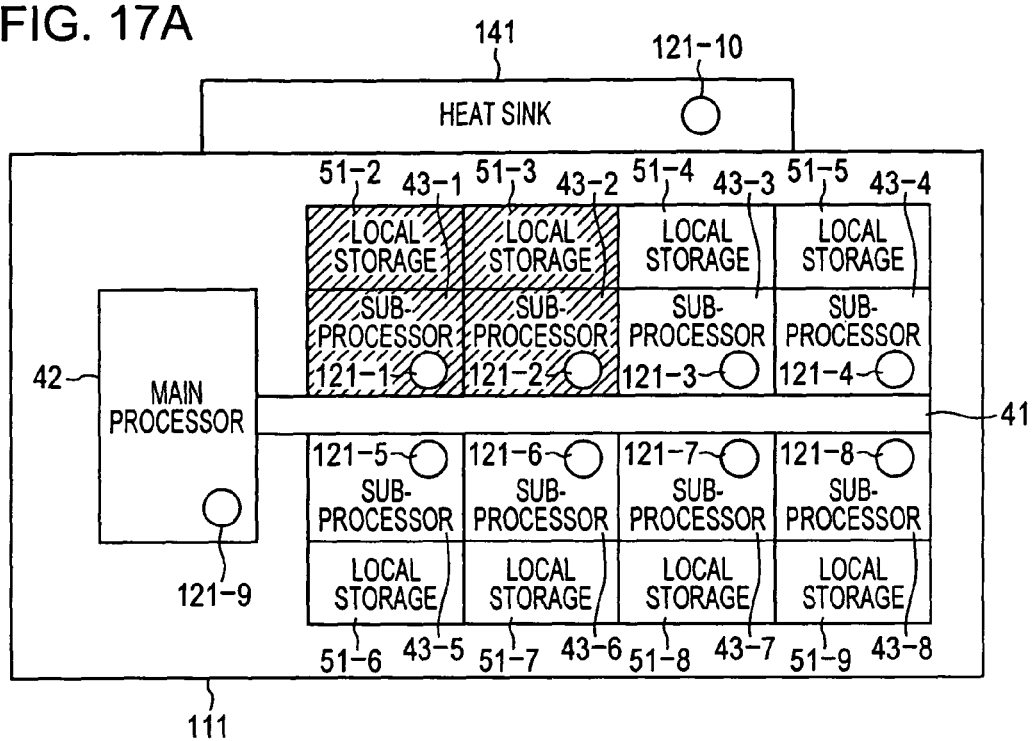
FIG. 17 illustrates the transfer of a process of the information processing apparatus.
Figure 17B:
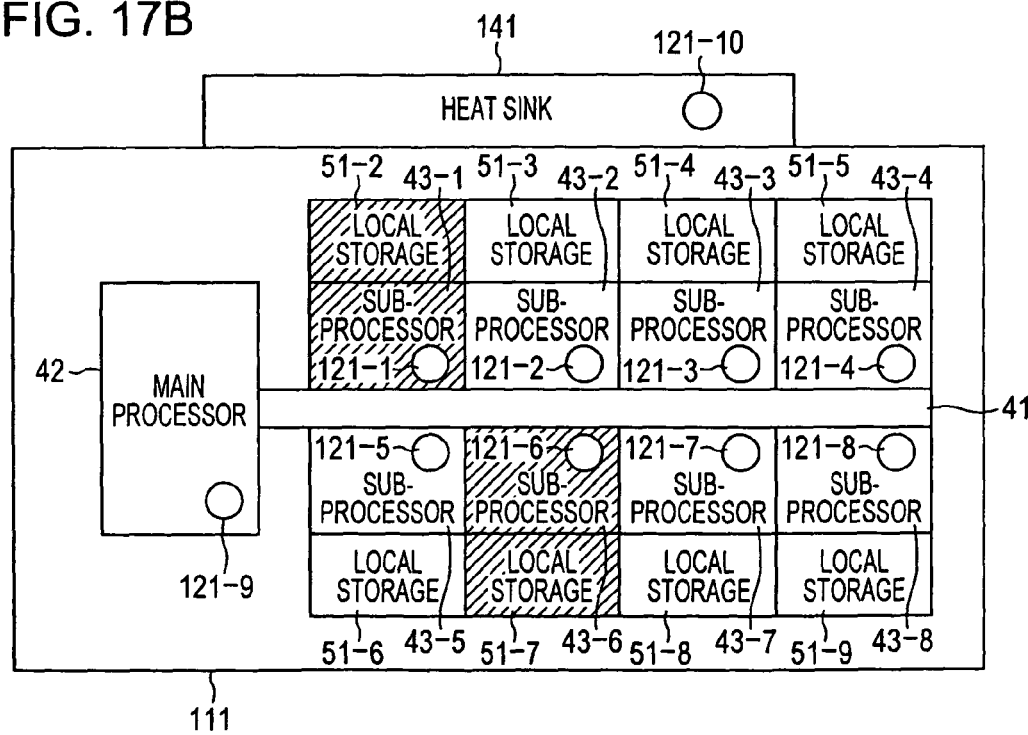

As shown in FIG. 17A, the currently operating sub-processors are the sub-processor 43-1 and the sub-processor 43-2, and the temperature detector 121 detecting the abnormal temperature rise corresponds to the sub-processor 43-1. In this case, the temperature anomaly correction controller 169 references the temperature management table 167, and determines that the sub-processor 43-4 from among the sub-processor 43-3 through the sub-processor 43-8 satisfy the above-referenced criteria, and selects the sub-processor 43-4 as a transfer target.

In step S44, the logical thread management processor 163 evacuates the context of the process being executed by the sub-processor 43 detected to be above the temperature upper limit. The interrupt controller 185 of the sub-processor 43 detected to be above the temperature upper limit suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 163 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 163 (the portion of the storage area of the local storage 51 of the main processor 42).

In step S45, the logical thread management processor 163 stops the operation of the sub-processor 43 detected to be above the temperature upper limit.

In step S46, the logical thread management processor 163 restores the context evacuated in step S44 to the sub-processor 43 selected as the transfer target. The sub-processor 43 selected as the transfer target stores the supplied context onto the areas of the code area 187 through the stack area 190. The process then returns to step S26 and then proceed to step S27 of FIG. 15.

If it is determined in step S42 that the process of the sub-processor 43 detected to be in temperature anomaly is not transferable, the temperature anomaly correction controller 169 selects a sub-processor 43 as an interchange target and notifies the logical thread management processor 163 of the selection result in step S47. More specifically, the temperature anomaly correction controller 169 is designed to select a sub-processor 43 resulting in the lowest temperature measurement as an interchange target with priority. If a plurality of sub-processors 43 satisfying the above criteria are available, a sub-processor 43 having the smallest sub-processor ID number is selected.

In step S48, the logical thread management processor 163 evacuates the context of the process being executed by the sub-processor 43 detected to be above the temperature upper limit. The interrupt controller 185 of the sub-processor 43 detected to be above the temperature upper limit suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 163 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 163 (the portion of the storage area of the local storage 51 of the main processor 42).

In step S49, the logical thread management processor 163 stops the operation of the sub-processor 43 detected to be above the temperature upper limit.

In step S50, the logical thread management processor 163 evacuates the context of the process being executed by the sub-processor 43 selected as the interchange target. The interrupt controller 185 of the sub-processor 43 selected as the interchange target suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 as the interchange target pre-stores the commonly used program and model data, the thread transfer and interchange processor 186 transfers the content of the stack area 190 and the data area 189 to an information storage area managed by the logical thread management processor 163 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 163 (the portion of the storage area of the local storage 51 of the main processor 42).

In step S51, the logical thread management processor 163 stops the operation of the sub-processor 43 selected as the interchange target of the process.

In step S52, the logical thread management processor 163 interchanges contexts between the two context-evacuated sub-processors 43 to restore the context there. More specifically, the logical thread management processor 163 restores the context, evacuated in step S48, to the sub-processor 43 selected as the interchange target of the process while restoring the context, evacuated in step S50, to the sub-processor 43 detected to be above the temperature upper limit. Each sub-processor 43 stores the supplied contexts on corresponding areas of the floating-point register 183 through the stack area 190. The process then returns to step S26 and then proceeds to step S27 of FIG. 15.

If it is determined in step S41 that one of the main processor 42 and the information processing controller 111 suffers from the temperature anomaly, the temperature anomaly correction controller 169 controls the logical thread management processor 163, thereby suspending the process of the application program executed by the arithmetic processor 161 in step S53. The process of the main processor 42 is thus temporarily suspended except a required portion of the process executed by the resident program.

In step S54, the temperature anomaly correction controller 169 references the temperature management table to determine whether the normal temperature state is restored. If it is determined in step S54 that the normal temperature state is not yet restored, the process in step is repeated until it is determined that the normal temperature state is restored. If it is determined in step that the normal temperature state is restored, processing returns to step S26 and then proceeds to step S27 of FIG. 15.

In this way, whether to suspend the process, whether to transfer part of the distributed processing, or whether to interchange part of the distributed processing is determined depending on the location of the temperature anomaly, the operation of the chip, and the temperature measurement values of the processors. One of the transfer target and the interchange target is also determined.

The information processing apparatus 101, including the temperature detectors 121 arranged on the main processor 42, and the sub-processors 43, is operated on a standalone fashion without being connected to a network. The information processing apparatus 101 monitors the temperature anomaly. If any temperature anomaly is detected, whether to suspend the process, whether to transfer part of the distributed processing, or whether to interchange part of the distributed processing is determined depending on the location of the temperature anomaly, the operation of the chip, and the temperature measurement values of the processors. The transfer target or the interchange target of the process is also determined, and the process is transferred or interchanged. The device failure due to runaway or malfunction caused by heat and drop in the processing speed are prevented while the suspension of the process in the middle thereof is minimized.

The information processing apparatus 101 operates in a standalone fashion with no connection established to the network 2 in the process discussed with reference to FIGS. 9 through 7. The present invention is applicable to the case in which a plurality of information processing apparatuses 101 are connected to the network 2 as shown in FIG. 18.

An information processing controller 111 in the information processing apparatus 101 in accordance with a second embodiment of the present invention is described below with reference to FIGS. 18-33. The information processing controller 111 performs distributed processing in temperature rise.

FIG. 18 illustrates a network system that performs distributed processing among a plurality of information processing apparatuses 101 in response to temperature rise. An information processing apparatus 101-1 through an information processing apparatus 101-n are basically identical in hardware structure to the information processing apparatus 101 previously discussed with reference to FIG. 9. The information processing controller 111 in each of the information processing apparatus 101-1 through the information processing apparatus 101-n is basically identical in hardware structure to the one-chip processor previously discussed with reference to FIG. 10.

Figure 10:
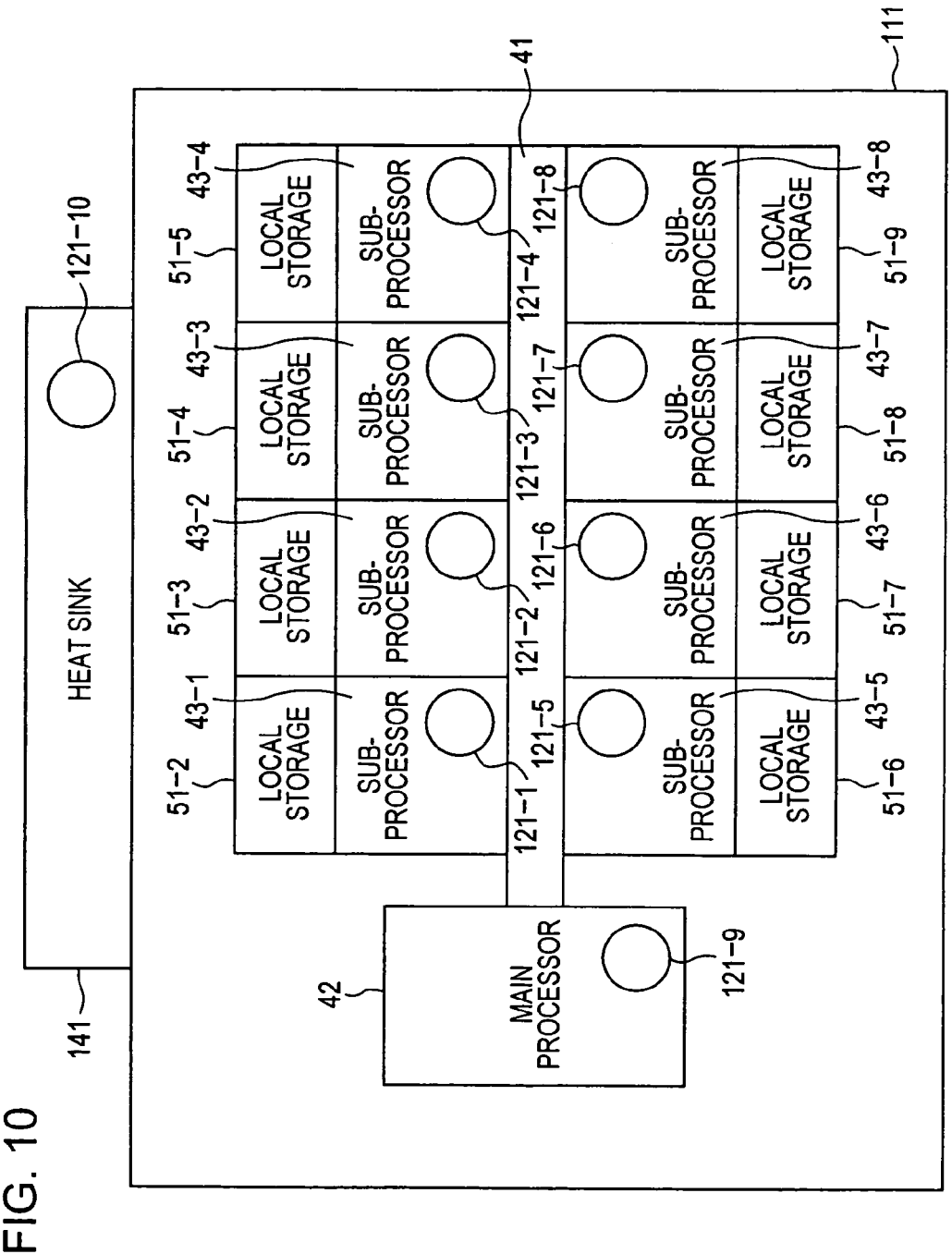
FIG. 10 illustrates the structure of a chip in the information processing controller of FIG. 9.

As shown in FIG. 19, the information processing controller 111 having the same structure as the one-chip processor discussed with reference to FIG. 10 is connected to the network 2 via the bus 14 and the communication unit 16. As previously discussed, one of the information processing apparatus 101-1 through the information processing apparatus 101-n is recognized as a master apparatus, and the other apparatuses are recognized as slave apparatuses.

Figure 20:
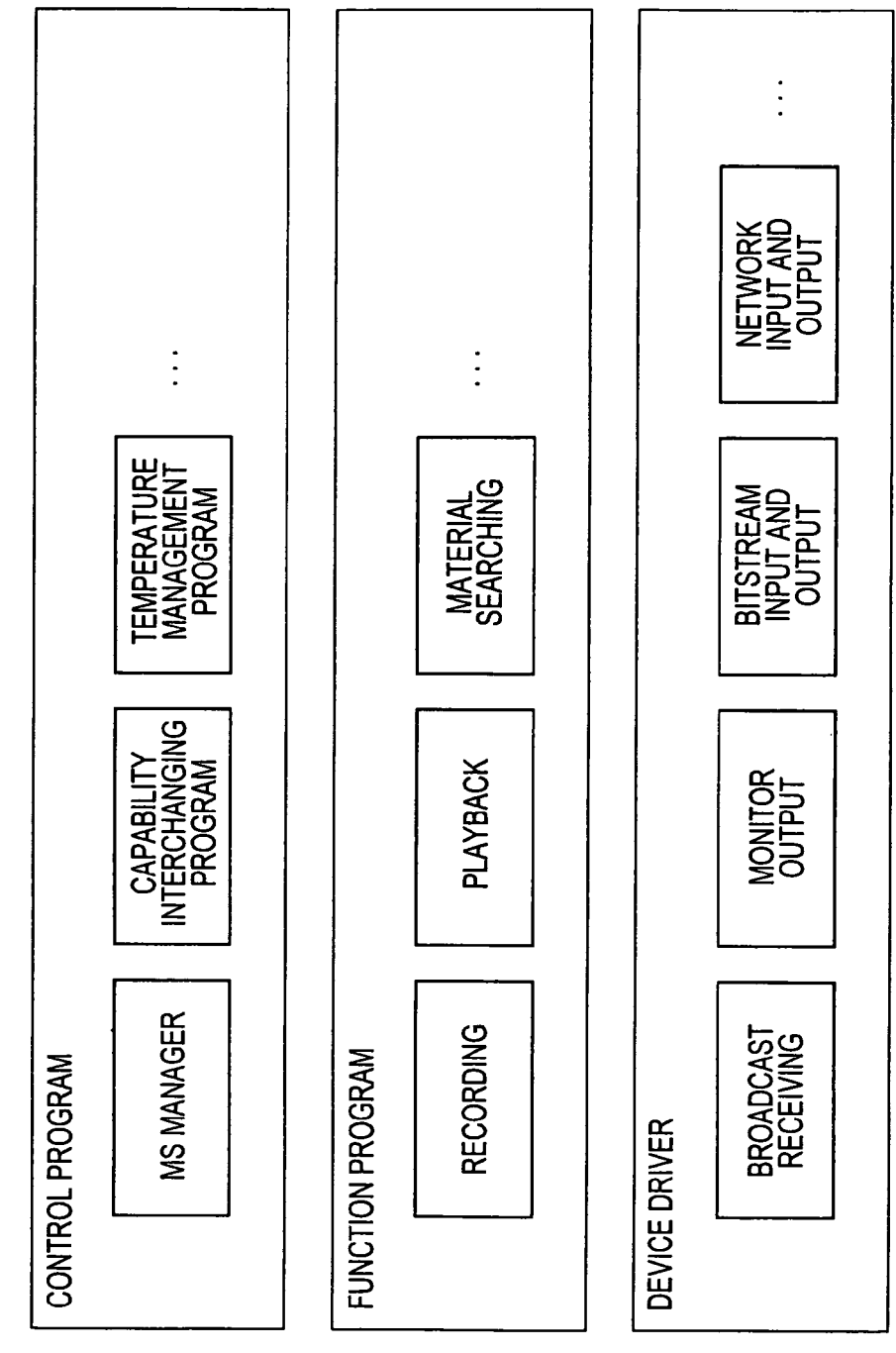
FIG. 20 illustrates the structure of a software program stored in the main memory in the information processing controller of FIG. 18.

FIG. 20 illustrates the structure of a software program executed by the information processing controller 111 of the second embodiment. The software program is pre-recorded on the recorder 13 connected to the information processing controller 111 prior to the switching of the information processing apparatus 101.

Elements identical to those described with reference to FIG. 8 are designated with the same reference numerals and the discussion thereof is omitted herein. The structure of the software program stored in the main memory 12 of the information processing controller 111 of the second embodiment remains unchanged from the software structure discussed with reference to FIG. 8 except that a temperature management program is newly added to the control programs. The temperature management program is preferably a resident program that is continuously operative as long as the main power of the information processing apparatus 101 remains turned on.

The temperature management program of FIG. 20 performs the same process as described in the first embodiment of FIG. 11. The temperature detector 121-1 through the temperature detector 121-10 detect temperatures of the information processing apparatuses 101. The temperature monitoring processor 122 monitors the temperatures. The temperature management program gathers and manages information of the temperatures. Based on the temperature information, the temperature management program controls the process executed by the main processor 42 and the transfer or interchange of the process executed by the sub-processor 43-1 through the sub-processor 43-8 as necessary. The temperature management program exchanges the temperature information with the other information processing apparatuses 101 connected to the network 2, and then controls the process executed by the main processor 42 and the transfer or interchange of the process executed by the sub-processor 43-1 through the sub-processor 43-8 as necessary.

The control of exchanging the temperature information with the other information processing apparatuses 101 via the network 2, and the control of the transfer or interchange of the process with the other information processing apparatuses 101 via the network 2 are divided into the following three patterns.

In a first pattern, the information processing apparatus 101-1, if identified as a master apparatus, manages own temperature management table but also temperature management tables of the information processing apparatus 101-2 through the information processing apparatus 101-n as slave apparatuses. More specifically, each of the information processing apparatus 101-2 through the information processing apparatus 101-n, as the slave apparatuses, regularly transmits an updated temperature management table thereof to the information processing apparatus 101-1. The information processing apparatus 101-1 as the master apparatus monitors the temperature information of all information processing apparatuses 101-1 through 101-n, and if an abnormal temperature rise is detected in any of the information processing apparatuses 102-1 through 102-n, the information processing apparatus 101-1 selects an appropriate sub-processor 43 as a transfer target or an interchange target of the process from all sub-processors 43 contained in the information processing controllers 111 of the information processing apparatuses 101 connected to the network 2. The information processing apparatus 101-1 performs control process to transfer the process of the sub-processor 43 detected to be in anomaly to the selected sub-processor 43 or to interchange the processes between the two sub-processors 43.

In a second pattern, the information processing apparatus 101 monitors the temperature management table of its own, and if an abnormal temperature rise is detected in the temperature management table, the information processing apparatus 101 transmits, to all other information processing apparatuses 101, a command requesting all other information processing apparatuses 101 to transmit the temperature information. More specifically, upon receiving a command requesting the transmission of the temperature information, an information processing apparatus 101 not detecting any temperature rise generates a command to transmit the temperature information based on own temperature management table, and transmits a command to reply the generated temperature information to the information processing apparatus 101 as a source of the temperature information request command. Upon receiving the temperature information rely command, the information processing apparatus 101 selects an appropriate sub-processor 43 as a transfer target or an interchange target of the process from all sub-processors 43 contained in the information processing controllers 111 of the information processing apparatuses 101 connected to the network 2. The information processing apparatus 101 performs control process to transfer the process of the sub-processor 43 detected to be in anomaly to the selected sub-processor 43 or to interchange the processes between the two sub-processors 43.

In a third pattern, each information processing apparatus 101 monitors own temperature management table, and if an abnormal temperature rise is detected in the temperature management table, the information processing apparatus 101 transmits, to all other information processing apparatuses 101, a command requesting all other information processing apparatuses 101 to transfer sub-processor programs. More specifically, upon receiving a command requesting the transfer of the sub-processor program from the other information processing apparatus 101, an information processing apparatus 101 not detecting any temperature rise generates, based on own temperature management table, a reply command indicating whether own apparatus can be a transfer target of the sub-processor program. The information processing apparatus 101 then transmits the reply command to the information processing apparatus 101 as the source of the command requesting the transfer of the sub-processor program. Upon receiving the temperature information rely command, the information processing apparatus 101 selects an appropriate sub-processor 43 as a transfer target or an interchange target of the process from all sub-processors 43 contained in the information processing controllers 111 of the information processing apparatuses 101 connected to the network 2. The information processing apparatus 101 performs control process to transfer the process of the sub-processor 43 detected to be in anomaly to the selected sub-processor 43 or to interchange the processes between the two sub-processors 43.

Figure 21:
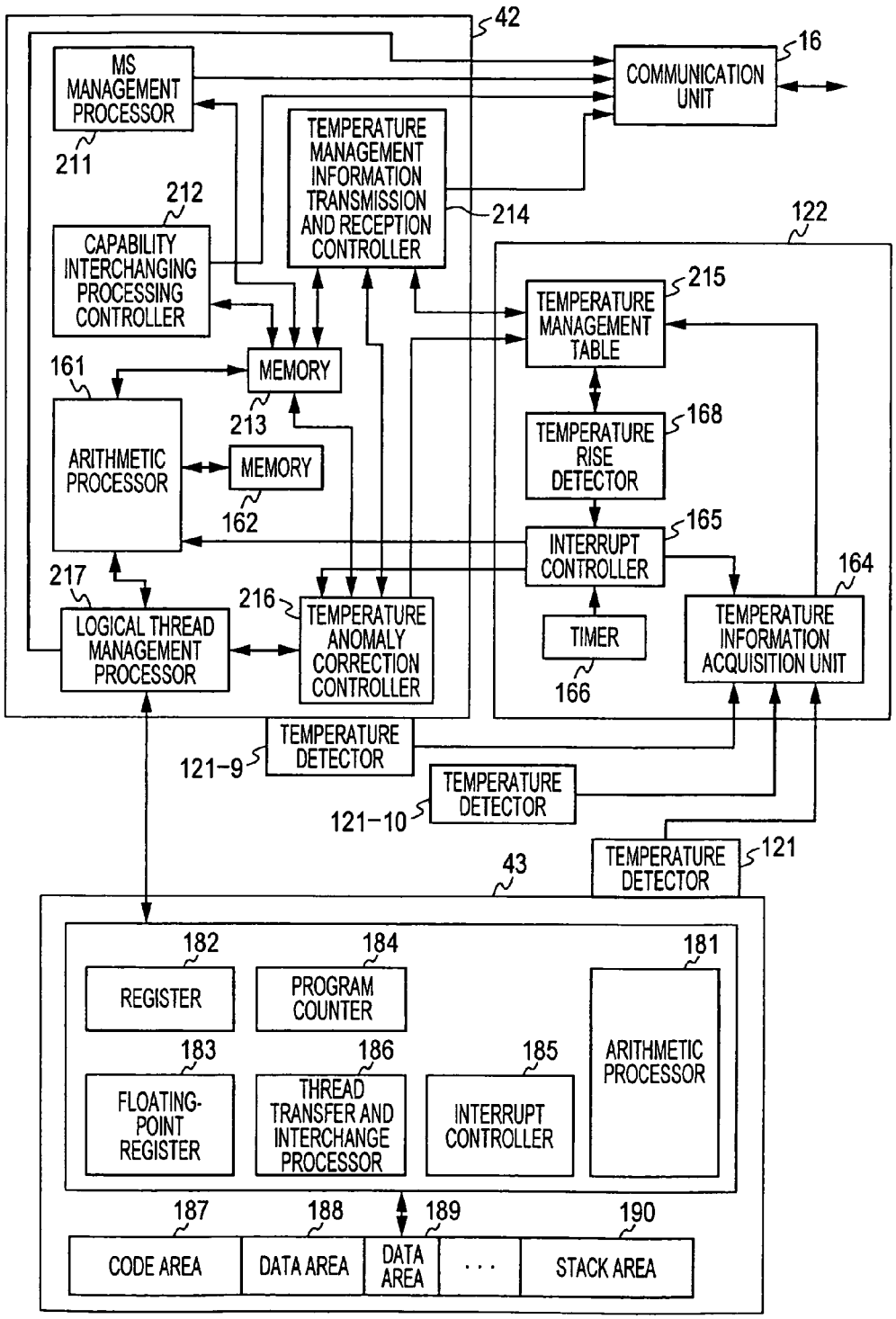
FIG. 21 is a functional block diagram illustrating the function the information processing controller of FIG. 18 executed in a first pattern.

FIG. 21 is a functional block diagram of the information processing controller 111 that performs the control process in the first pattern in accordance with the second embodiment of the present invention. Elements identical to those described with reference to FIG. 12 are designated with the same reference numerals, and the discussion thereof is omitted as appropriate. In the first pattern of the information processing controller 111 of the second embodiment as shown in FIG. 12, the main processor 42 additionally includes an MS management processor 211, a capability interchanging processing controller 212, a memory 213, and a temperature management information transmission and reception controller 214. The main processor 42 further includes a temperature anomaly correction controller 216 in place of the temperature anomaly correction controller 169, and a logical thread management processor 217 in place of the logical thread management processor 163. The rest of the main processor 42 remains unchanged from the main processor 42 of FIG. 12. The temperature monitoring processor 122 includes a temperature management table 215 in place of the temperature management table 167, and the rest of the temperature monitoring processor 122 remains unchanged from the temperature monitoring processor 122 of FIG. 12.

Hardware performing the above function may be different from the above-referenced structure. For example, part of the function of the main processor 42 may be carried out by the temperature monitoring processor 122, part of the function of the temperature monitoring processor 122 may be performed by the main processor 42, or these functions may be performed by different hardware. Even in such a case, the present invention is perfectly applicable.

Upon detecting that own apparatus is connected to the network 2, the MS management processor 211 generates a software cell with a DMA command being a status requesting command, both a source ID and a response destination being own apparatus, and a destination ID unfixed, and transmits the generated software cell to the network 2 via the communication unit 16. The MS management processor 211 then receives a software cell with a DMA command being a status reply command and including, as data, device information stored in the main memory 12 in the other information processing apparatus 101. The MS management processor 211 thus recognizes whether own apparatus, from among the information processing apparatuses 101 connected to the network 2, is a mater apparatus or a slave apparatus. If own apparatus 101 is a master apparatus, the capability interchanging processing controller 212 acquires the device information of all information processing apparatuses 101, as slave apparatuses, connected to the network 2, and store the device information on the memory 213. If own apparatus 101 is a slave apparatus, the capability interchanging processing controller 212 acquires the information processing apparatus ID and the MS manager contained in the device information of all other information processing apparatuses 101, and stores the information processing apparatus ID and the MS manager onto the memory 213.

The memory 213, corresponding to part of the storage area of the main memory 12, stores at least a portion of the device information of the information processing apparatus 101 connected to the network 2. Under the control of the temperature anomaly correction controller 216, the temperature management information transmission and reception controller 214 controls the transmission of the temperature management table or a variety of commands (software cell) generated for temperature management to the other information processing apparatuses 101 connected to the network 2 via the communication unit 16. The temperature management information transmission and reception controller 214 controls the reception of the temperature management table of the other information processing apparatuses 101 or a variety of commands (software cell) generated for temperature management from the other information processing apparatuses 101 connected to the network 2 via the communication unit 16. The temperature management table or the variety of commands (software cell) generated for temperature management are collectively referred to as temperature management information if there is no need for discriminating information relating to temperature management of a plurality of information processing apparatuses 101 connected to the network 2 from information relating to the control of distributed processing executed based on the temperature management.

If own apparatus 101 is a master apparatus, the temperature management tables 215 include not only own temperature management table updated based on the information acquired by the temperature information acquisition unit 164 but also temperature management tables transmitted from the other information processing apparatuses 101 and received in the process of the temperature management information transmission and reception controller 214. If own apparatus 101 is a slave apparatus, the temperature management table 215 includes own temperature management table updated based on the information acquired by the temperature information acquisition unit 164.

If own apparatus 101 is a master apparatus, the temperature anomaly correction controller 216 references the temperature management table 215 in response to an interrupt from the interrupt controller 165. The logical thread management processor 217 thus detects which of the information processing apparatuses 101 connected to the network 2 corresponds to a temperature detector 121 having detected an abnormal temperature rise, and which of the main processor 42, and the sub-processors 43 corresponds to the temperature detector 121 having detected the abnormal temperature. Based on the detection results, the temperature anomaly correction controller 216 controls the logical thread management processor 217, thereby stopping the process, or transferring the process to or interchanging the process with one of the sub-processors 43.

The logical thread management processor 217 generates or deletes the logical thread corresponding to the application program executed by the arithmetic processor 161. If own apparatus 101 is a master apparatus, the logical thread management processor 217 monitors the status of the generated logical thread and controls the operation of the generated logical thread corresponding to the distributed processing performed by one of the information processing apparatuses 101 connected to the network 2. If own apparatus 101 is a master apparatus, the logical thread management processor 217 generates a table listing management information of all information processing apparatuses 101 connected to the network 2, and a table listing information required to execute the logical thread on a per logical thread execution basis. The logical thread management processor 217 controls the execution of the logical thread by referencing and updating the tables as necessary.

If own apparatus is a master apparatus, the logical thread management processor 217 generates a software cell for controlling the process of the software cell executed by another information processing apparatus 101, and transmits the generated software cell via the communication unit 16. Furthermore, if own apparatus is a slave apparatus, the logical thread management processor 217 receives, via the communication unit 16, a software cell transmitted from a master information processing apparatus 101. The logical thread management processor 217 causes the sub-processor 43 to perform the distributed processing responsive to the software cell, generates a software cell corresponding to a reply or a response, and transmits the generated software cell via the communication unit 16. Regardless whether own apparatus 101 is a master apparatus or a slave apparatus, the logical thread management processor 217 acquires, via the communication unit 16, information relating to a thread already executed by another information processing apparatus 101.

Figure 24:
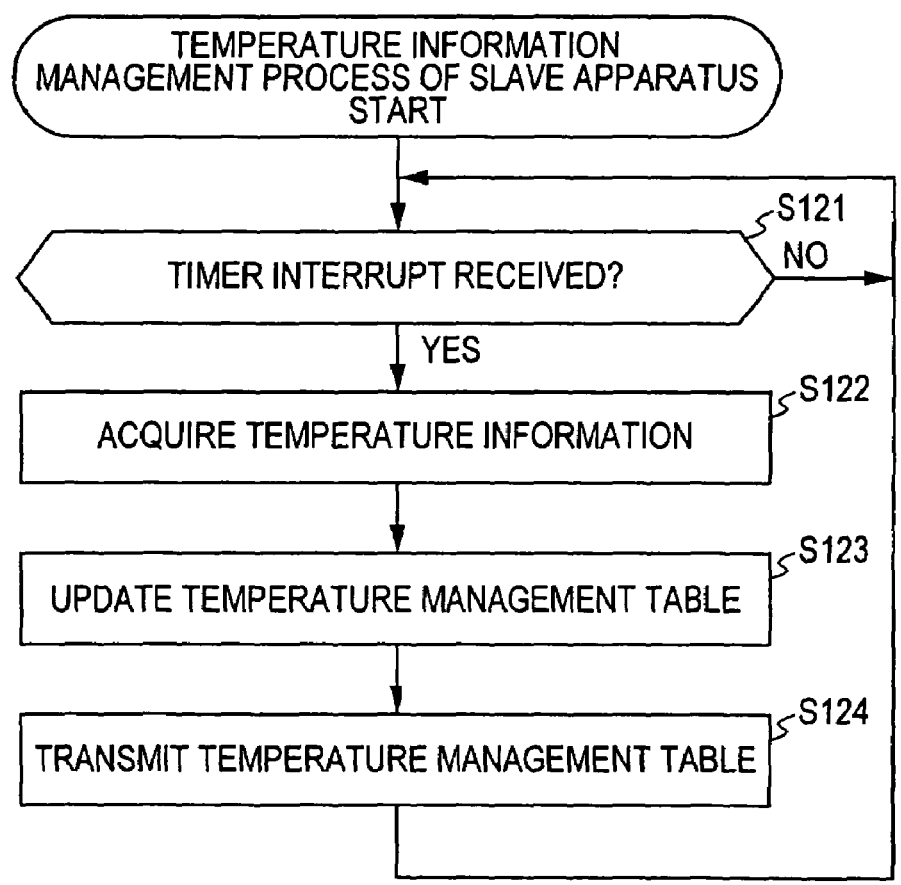
FIG. 24 is a flowchart illustrating a temperature information management process of a slave apparatus.

The operation of the first pattern of the second embodiment is described below with reference to flowcharts of FIGS. 22-24. In accordance with the second embodiment of the present invention, the application program execution process is identical to the process of the first embodiment discussed with reference to FIG. 14, and is not further described herein.

A temperature information management process of the master apparatus is described below with reference to the flowchart of FIG. 22.

In step S71, the temperature information acquisition unit 164 determines whether a timer interrupt has been issued from the interrupt controller 165.

If it is determined in step S71 that no timer interrupt has been issued, the temperature management information transmission and reception controller 214 determines in step S72 whether a temperature management table has been received from any of the information processing apparatuses 101 connected to the network 2. If it is determined in step S72 that no temperature management table has been received, processing returns to step S71 to repeat step S71 and subsequent steps. If it is determined in step S72 that a temperature management table has been received, processing proceeds to step S74.

If it is determined in step S71 that a timer interrupt has been received, the temperature information acquisition unit 164 acquires temperature detection results from each temperature detector 121 in step S73.

If it is determined in step S72 that a temperature management table has been received, or subsequent to step S73, the temperature information acquisition unit 164 updates, in step S74, the temperature management table 215 based on the temperature management table of the other information processing apparatus 101 received in step S72, or own temperature management table acquired in step S73.

In step S75, the temperature rise detector 168 references the temperature management table 215 to determine whether a temperature anomaly is contained in the temperature information, in other words, whether any of the temperature detection results of all temperature detectors 121 arranged in the information processing apparatuses 101 connected to the network 2 is above the predetermined temperature upper limit. If it is determined in step S75 that no abnormal temperature value is contained in the temperature information, processing returns to step S71 to repeat step S71 and subsequent steps.

If it is determined in step S75 that an abnormal temperature value is contained in the temperature information, the temperature rise detector 168 notifies the interrupt controller 165 of the detection of an abnormal temperature rise, thereby causing the interrupt controller 165 to interrupt the arithmetic processor 161 and the temperature anomaly correction controller 216 in step S76. The interrupt controller 165 interrupts the arithmetic processor 161 and the temperature anomaly correction controller 216, thereby causing the arithmetic processor 161 to stop the process of the application program and the temperature anomaly correction controller 216 to start an anomaly-time process 2.

The anomaly-time process 2 to be discussed later with reference to FIG. 23 is performed in step S77.

In step S78, the temperature anomaly correction controller 216 controls the logical thread management processor 217 in accordance with the anomaly-time process 2 executed in step S77, thereby causing the temperature anomaly correction controller 216 to update a table for thread management as necessary.

In step S79, the interrupt controller 165 releases the interrupt to the process of the application program controlled by the arithmetic processor 161, and processing returns to step S71 to repeat step S71 and subsequent steps.

The master information processing apparatus 101 acquires the temperature management table updated based on the temperature information detected by each temperature detector 121 arranged in each of the information processing apparatuses 101 connected to the network 2, and manages the table as the temperature management table 215. Whether to perform an anomaly-time interrupt process is thus determined based on the temperature management table 215 stored in the master information processing apparatus 101.

The anomaly-time process 2 executed in step S77 of FIG. 22 is described below with reference to a flowchart of FIG. 23.

In step S91, the temperature anomaly correction controller 216 references the temperature management table 215 to determine which of the main processor 42 and the information processing controller 111 in any of the information processing apparatuses 101 connected to the network 2 suffers from a temperature anomaly. If it is determined in step S91 that one of the main processor 42 and the information processing controller 111 in any of the information processing apparatuses 101 connected to the network 2 suffers a temperature anomaly, processing proceeds to step S103.

If it is determined in step S91 that none of the main processor 42 and the information processing controller 111 suffers from the temperature anomaly, in other words that any of the sub-processors 43 in any of the information processing apparatuses 101 connected to the network 2 suffers from the temperature anomaly, the temperature anomaly correction controller 216 references the temperature management table 215 in step S92. The temperature anomaly correction controller 216 determines in step S92 whether the process of the sub-processor 43 detected to be in temperature anomaly is transferable, in other words, whether any of the sub-processors 43 other than the sub-processor 43 detected to be in temperature anomaly is inoperative. If it is determined in step S92 that the process of the sub-processor 43 detected to be in temperature anomaly is not transferable, processing proceeds to step S97.

If it is determined in step S92 that the process of the sub-processor 43 detected to be in temperature anomaly is transferable, the temperature anomaly correction controller 216 references the temperature management table 215 in step S93. In step S93, the temperature anomaly correction controller 216 thus selects a sub-processor 43 as a transfer target of the process from among the sub-processors 43 of the information processing controllers 111 of the information processing apparatuses 101 connected to the network 2, and notifies the logical thread management processor 217 of the selection results. More specifically, the temperature anomaly correction controller 216 selects, as a transfer target with priority, one sub-processor 43 resulting in the lowest temperature measurement from among those that have remained inoperative and are not closely located to the currently operating sub-processor 43, from among the sub-processors 43 of the information processing controllers 111 of the information processing apparatuses 101 connected to the network 2. If a plurality of sub-processors 43 satisfy the criteria, the temperature anomaly correction controller 216 selects a sub-processor 43 having the smallest sub-processor ID number as a transfer target. If sub-processors 43 that have remained inoperative and are located far from the currently operating sub-processor 43 are not available, the temperature anomaly correction controller 216 selects one resulting in the lowest temperature measurement from among the currently inoperative sub-processors 43 out of the sub-processors 43 of the information processing controllers 111 of the information processing apparatuses 101 connected to the network 2. If a plurality of sub-processors 43 satisfy the criteria, the temperature anomaly correction controller 216 selects a sub-processor 43 having the smallest sub-processor ID number as a transfer target, and notifies the logical thread management processor 217 of the selection results.

In step S94, the logical thread management processor 217 evacuates the context of the process being executed by the sub-processor 43 detected to be above the temperature upper limit.

If the sub-processor 43 detected to be above the temperature upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42).

If the sub-processor 43 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42) in the information processing apparatus 101 via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42) in the information processing apparatus 101 via the bus 41, the bus 14, the communication unit 16 and the network 2.

In step S95, the logical thread management processor 217 stops the operation of the sub-processor 43 detected to be above the temperature upper limit.

In step S96, the logical thread management processor 217 restores the context, evacuated in step S94, to the sub-processor 43 selected as a transfer target sub-processor. More specifically, if the transfer target sub-processor 43 is the one in the master apparatus, the logical thread management processor 217 supplies the context stored in an information storage area managed by itself to the transfer target sub-processor 43 via the bus 41. If the transfer target sub-processor 43 is the one in the slave apparatus, the logical thread management processor 217 supplies the context stored in the information storage area managed itself to the transfer target sub-processor 43 contained in the information processing apparatus 101 functioning as a slave apparatus, via the bus 41, the bus 14, the communication unit 16 and the network 2. The sub-processor 43 selected as the transfer target sub-processor stores the supplied context in corresponding areas of the code area 187 through the stack area 190. Processing returns to step S77 and then proceeds to step S78 as shown in FIG. 22.

If it is determined in step S92 that the process of the sub-processor 43 detected to be in temperature anomaly is not transferable, the temperature anomaly correction controller 216 references the temperature management table 215 in step S97. In step S97, the temperature anomaly correction controller 216 selects a sub-processor 43 as an interchange target from among the sub-processors 43 of the information processing controllers 111 of the information processing apparatuses 101 connected to the network 2, and notifies the logical thread management processor 217 of the selection results. More specifically, the temperature anomaly correction controller 216 selects, as a transfer target sub-processor 43 with priority, one resulting in the lowest temperature measurement from among the sub-processors 43 of the information processing controllers 111 of the information processing apparatuses 101 connected to the network 2. If a plurality of sub-processors 43 satisfy the criteria, the temperature anomaly correction controller 216 selects a sub-processor 43 having the smallest sub-processor ID as a transfer target.

In step S98, the logical thread management processor 217 evacuates the context of the process being executed by the sub-processor 43 detected to be above the temperature upper limit.

If the sub-processor 43 detected to be above the temperature upper limit is a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42).

If the sub-processor 43 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the interchange target pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42) in the information processing apparatus 101 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42) in the information processing apparatus 101 functioning as the master apparatus via the bus 41, the bus 14, the communication unit 16 and the network 2.

In step S99, the logical thread management processor 217 stops the operation of the sub-processor 43 detected to be above the temperature upper limit.

In step S100, the logical thread management processor 217 evacuates the context of the process being executed by the sub-processor 43 selected as the interchange target.

If the sub-processor 43 selected as the interchange target is in a master apparatus, the interrupt controller 185 suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 as the transfer source pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42).

If the sub-processor 43 selected as the interchange target of the process is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the transfer source pre-stores the commonly used program and model data, the thread transfer and interchange processor 186 transfers the content of the stack area 190 and the data area 189 to an information storage area managed by the logical thread management processor 217 (a portion of the storage area of the local storage 51 of the main processor 42) in the information processing apparatus 101 operating as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 217 (the portion of the storage area of the local storage 51 of the main processor 42) in the information processing apparatus 101 operating as the master apparatus via the bus 41, the bus 14, the communication unit 16 and the network 2.

In step S101, the logical thread management processor 217 stops the operation of the sub-processor 43 selected as the interchange target.

In step S102, the logical thread management processor 163 interchanges contexts between the two context-evacuated sub-processors 43 to restore the context there. More specifically, the logical thread management processor 163 restores the context, evacuated in step S98, to the sub-processor 43 selected as the interchange target of the process while restoring the context, evacuated in step S100, to the sub-processor 43 detected to be above the temperature upper limit. If the sub-processor 43 detected to be above the temperature upper limit or the interchange target sub-processor 43 is the one in the master apparatus, the logical thread management processor 217 supplies the corresponding context stored in the information storage area managed by itself to the interchange target sub-processor 43 via the bus 41. If the sub-processor 43 detected to be above the temperature upper limit or the interchange target sub-processor 43 is the one in the slave apparatus, the logical thread management processor 217 supplies the corresponding context stored in the information storage area managed by itself to the interchange target sub-processor 43 contained in the information processing apparatus 101 operating as the slave apparatus via the bus 41, the bus 14, the communication unit 16 and the network 2. Each sub-processor 43 stores the supplied context in areas of the code area 187 through the stack area 190. Processing returns to step S77 and then proceeds to step S78 of FIG. 22.

If it is determined in step S91 that one of the main processor 42 and the information processing controller 111 suffers from the temperature anomaly, the temperature anomaly correction controller 216 determines in step S103 whether one of the main processor 42 and the information processing controller 111, suffering from the temperature anomaly, is contained in the information processing apparatus 101 as the master apparatus. If it is determined in step S103 that one of the main processor 42 and the information processing controller 111 suffering from the temperature anomaly is contained in the information processing apparatus 101 as the master apparatus, processing proceeds to step S106.

If it is determined in step S103 that one of the main processor 42 and the information processing controller 111, suffering from the temperature anomaly, is not contained in the information processing apparatus 101 as the master apparatus, in other words, one of the main processor 42 and the information processing controller 111, suffering from the temperature anomaly, is contained in the information processing apparatus 101 as the salve apparatus, the temperature anomaly correction controller 216 references the temperature management table 215 in step S104. In step S104, the temperature anomaly correction controller 216 thus determines whether the process of one of the main processor 42 and the information processing controller 111 in the information processing apparatus 101 is transferable. If it is determined in step S104 that the process of one of the main processor 42 and the information processing controller 111 in the information processing apparatus 101 is transferable, processing proceeds to step S93.

If it is determined in step S104 that the process of one of the main processor 42 and the information processing controller 111 in the information processing apparatus 101 is not transferable, the temperature anomaly correction controller 216 references the temperature management table 215 in step S105. In step S105, the temperature anomaly correction controller 216 determines the process of one of the main processor 42 and the information processing controller 111 in the information processing apparatus 101 is interchangeable. If it is determined in step S105 that the process of one of the main processor 42 and the information processing controller 111 in the information processing apparatus 101 is interchangeable, processing proceeds to step S97.

If it is determined in step S103 that the one of the main processor 42 and the information processing controller 111, detected to be in temperature anomaly, is contained in the information processing apparatus 101 as the master apparatus, or if it is determined in step S105 that the process of one of the main processor 42 and the information processing controller 111 in the information processing apparatus 101 is not interchangeable, the temperature anomaly correction controller 216 controls the logical thread management processor 217 to temporarily stop the application program executed by the arithmetic processor 161. The process of the main processor 42, except part thereof executed by the resident program, is temporarily suspended.

In step S107, the temperature anomaly correction controller 216 references the temperature management table 215 to determine whether a normal temperature state is restored. If it is determined in step S107 that normal temperature state is not yet restored, the process in step S107 is repeated until it is determined that the normal temperature state is restored. If it is determined in step S107 that the normal temperature state is restored, processing returns to step S77 and then proceeds to step S78 as shown in FIG. 22.

In this way, whether to suspend the process, whether to transfer part of the distributed processing, or whether to interchange part of the distributed processing is determined depending on the location of the temperature anomaly, the operation of the chip, and the temperature measurement values of the processors. One of the transfer target and the interchange target is also determined.

A temperature information management process of the slave apparatus executed in parallel with the temperature information management process of the master apparatus discussed with reference to FIG. 22 is described below with reference to a flowchart of FIG. 24.

In step S121, the temperature information acquisition unit 164 in the information processing apparatus 101 functioning as a slave apparatus determines whether a timer interrupt has been input. If it is determined in step S121 that no timer interrupt has been input, the process in step S121 is repeated until it is determined that a timer interrupt has been input.

If it is determined in step S121 that a timer interrupt has been input, the temperature information acquisition unit 164 acquires the temperature information from each of the temperature detectors 121 in step S122.

In step S123, the temperature information acquisition unit 164 updates the temperature management table 215 based on the temperature information acquired in step S122.

In step S124, the temperature management information transmission and reception controller 214 transmits the temperature management table 215, updated in step S123, to the information processing apparatus 101 functioning as the master apparatus via the communication unit 16 and the network 2. Processing returns to step S121 to repeat step S121 and subsequent steps.

The temperature management table of the slave apparatus is transmitted to the master apparatus. The transmitted temperature management table of the slave apparatus is managed by the master apparatus.

In accordance with the second embodiment of the present invention, the plurality of information processing apparatuses 101 connected to the network 2, each having the information processing controller 111 with the temperature detectors 121 arranged at the main processor 42 and the sub-processors 43 respectively, perform the process as discussed with reference to FIGS. 21-24. With the first pattern control of the temperature information and the transfer or interchange of the process, device failure or lowered processing speed due to heat is prevented while the suspension of the process in the middle thereof is minimized.

Figure 25:
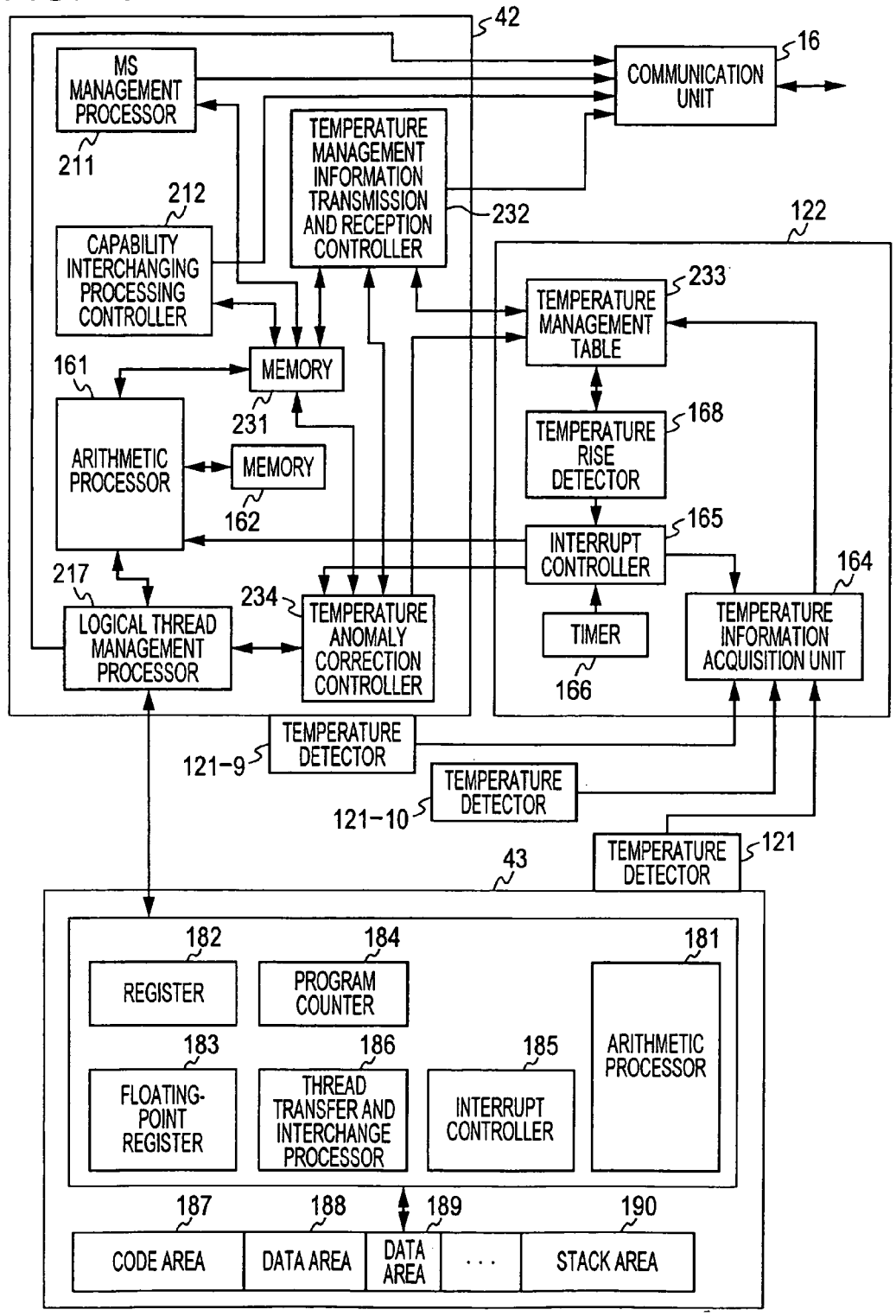
FIG. 25 is a functional block diagram illustrating the function performed by the information processing controller of FIG. 18 in a second pattern.

FIG. 25 is a functional block diagram illustrating the information processing controller 111 that performs control in the second pattern in accordance with the second embodiment of the present invention. Elements identical to those discussed with reference to FIG. 21 are designated with the same reference numerals, and the discussion thereof is omitted as appropriate. In the information processing controller 111 of FIG. 25 performing the second pattern control in accordance with the second embodiment of the present invention, a memory 231, a temperature management information transmission and reception controller 232, and a temperature anomaly correction controller 234 are used in place of the memory 213, the temperature management information transmission and reception controller 214, and the temperature anomaly correction controller 216, respectively. The rest of the main processor 42 is identical to the main processor 42 of FIG. 21. The temperature monitoring processor 122 uses a temperature management table 233 in place of the temperature management table 215. The rest of the temperature monitoring processor 122 is identical to the temperature monitoring processor 122 of FIG. 21.

Hardware performing the above function may be different from the above-referenced structure of FIG. 25. For example, part of the function of the main processor 42 may be carried out by the temperature monitoring processor 122, part of the function of the temperature monitoring processor 122 may be performed by the main processor 42, or these functions may be performed by different hardware. Even in such a case, the present invention is perfectly applicable.

The memory 231 corresponds to at least part of the storage area of the main memory 12, stores at least part of the device information of the information processing apparatus 101 connected to the network 2 while storing temporarily the temperature management table of another information processing apparatus 101, received by the temperature management information transmission and reception controller 232. Under the control of the temperature anomaly correction controller 234, the temperature management information transmission and reception controller 232 controls transmitting, via the 16, the temperature management information or a variety of commands (software cell) generated for temperature management to the other information processing apparatus 101 connected to the network 2. The temperature management information transmission and reception controller 232 also controls receiving, via the communication unit 16, the temperature management information or a variety of commands (software cell) for temperature management from the other information processing apparatus 101 connected to the network 2.

If the temperature rise detector 168 detects the occurrence of a temperature anomaly, and the interrupt controller 165 performs an interrupt process, the temperature anomaly correction controller 234 generates a command requesting all other information processing apparatuses 101 connected to the network 2 to transmit the temperature management information, based on the information acquired by own temperature information acquisition unit 164. The temperature anomaly correction controller 234 also controls the temperature management information transmission and reception controller 232 to transmit the generated command to all other information processing apparatuses 101. When the temperature management information transmission and reception controller 232 receives, from the other information processing apparatus 101 connected to the network 2, a command requesting the transmission of the temperature management information, the temperature anomaly correction controller 234 generates a temperature information reply command of FIG. 26 based on the temperature management table stored in the temperature management table 233. The temperature anomaly correction controller 234 controls the temperature management information transmission and reception controller 232 to transmit the generated temperature information reply command.

The temperature information reply command contains, from the temperature management table information stored in the temperature management table 233, updated temperature detection results of the heat sink 141, the main processor 42, and the sub-processor 43-1 through the sub-processor 43-8 (namely, updated temperature measurement results of the temperature detector 121-1 through the temperature detector. 121-10), the set temperature upper limits of the heat sink 141, the main processor 42, and the sub-processor 43-1 through the sub-processor 43-8 (in other words, a temperature anomaly is triggered if any of the temperature detector 121-1 through the temperature detector 121-10 detects a temperature above the set temperature upper limit), information of the operation states of the sub-processor 43-1 through the main processor 42-8, and layout information of the sub-processors in the chip.

Regardless of whether own apparatus is a master apparatus or a slave apparatus, the temperature management table 233 stores own temperature management table updated based on the information acquired from own temperature information acquisition unit 164.

The second pattern operation of the second embodiment is described below with reference to flowcharts of FIGS. 27 and 28. In accordance with the second embodiment, the application program execution process is basically identical to the application program execution process of the first embodiment discussed with reference to FIG. 14, and the discussion thereof is omitted herein.

A temperature information management process 2 is described below with reference to a flowchart of FIG. 27.

In steps S141 through S144, a process basically similar to that discussed with reference to steps S21 through S24 of FIG. 15 is performed. More specifically, if it is determined that a timer interrupt has been received, the temperature information acquisition unit 164 acquires temperature information from each of the temperature detectors 121, and updates the temperature management table 233. The temperature rise detector 168 references the temperature management table 233 to determine whether an abnormal value is contained in the temperature information.

If it is determined in step S144 that no abnormal value is contained in the temperature information, the temperature anomaly correction controller 234 determines in step S145 whether the temperature management information transmission and reception controller 232 has received, from another information processing apparatus 101 connected to the network 2, a command requesting the transmission of the temperature management information. If it is determined in step S145 that the temperature management information transmission and reception controller 232 has not received, from the other information processing apparatus 101 connected to the network 2, a command requesting the transmission of the temperature management information, processing returns to step S141 to repeat step S141 and subsequent steps.

Figure 26:
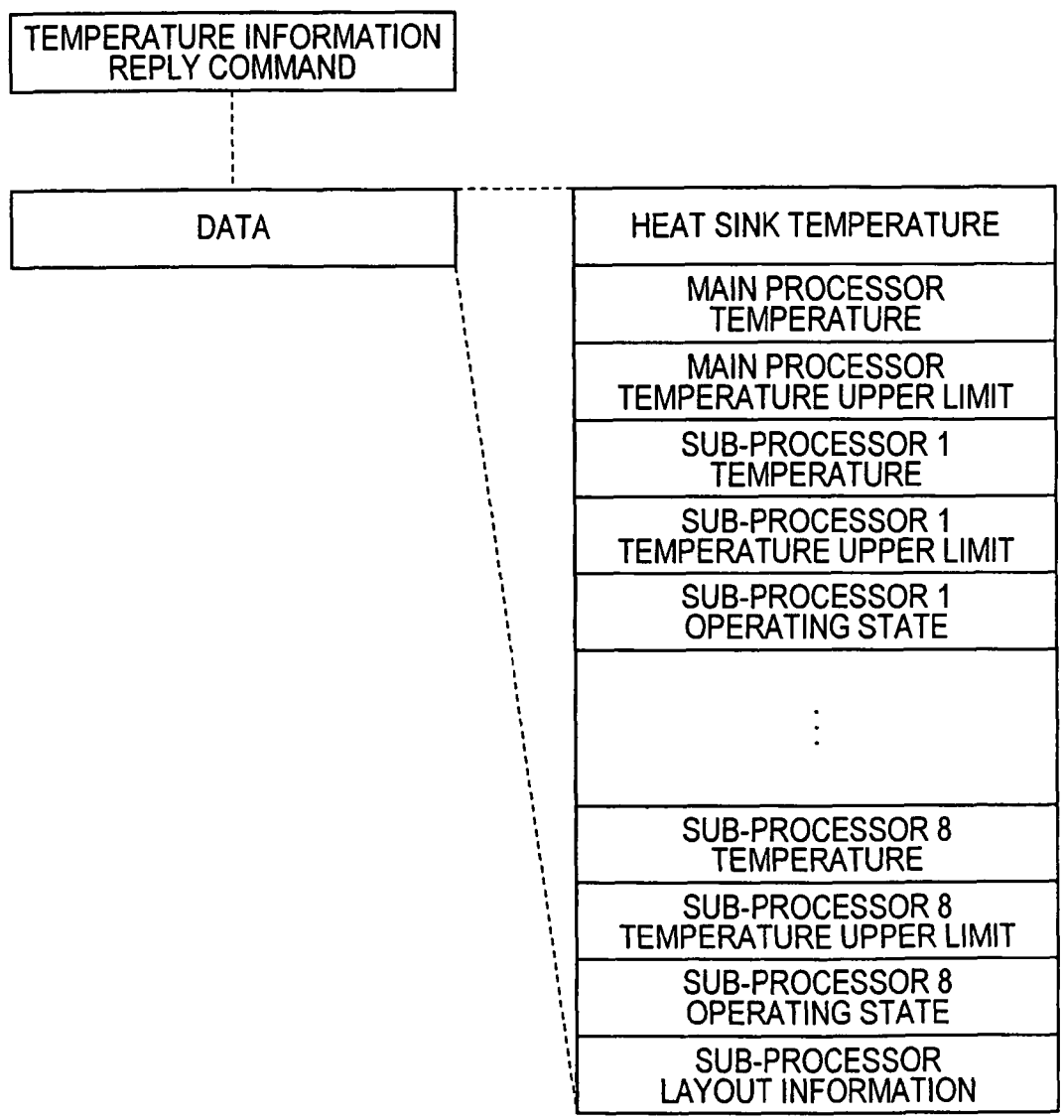
FIG. 26 illustrates a temperature information reply command.

If it is determined in step S145 that a command requesting the transmission of the temperature management information has been received from the other information processing apparatus 101, the temperature anomaly correction controller 234 generates the temperature information reply command of FIG. 26 based on the temperature management table stored in the temperature management table 233 in step S146. The temperature anomaly correction controller 234 controls the temperature management information transmission and reception controller 232 to transmit the generated temperature information reply command. Processing returns to step S141 to repeat step S141 and subsequent steps.

If it is determined in step S144 that an abnormal value is contained in the temperature information, the temperature rise detector 168 notifies the interrupt controller 165 of the detection of the abnormal temperature rise, thereby causing the interrupt controller 165 to interrupt the arithmetic processor 161 and the temperature anomaly correction controller 234 in step S147. The interrupt controller 165 interrupts the arithmetic processor 161 and the temperature anomaly correction controller 234, thereby stopping the process of the application program controlled by the arithmetic processor 161 and causing the temperature anomaly correction controller 234 to start an anomaly-time process 3.

The anomaly-time process 3 to be discussed later with reference to FIG. 28 is executed in step S148.

In step S149, the temperature anomaly correction controller 234 controls the logical thread management processor 217 based on the anomaly-time process 3 executed in step S148, thereby updating the table of the logical thread management as necessary.

In step S150, the interrupt controller 165 releases the interrupt to the process of the application program controlled by the arithmetic processor 161, and processing returns to step S141 to repeat step S141 and subsequent steps.

Regardless of whether each information processing apparatus 101 connected to the network 2 is a master apparatus or a slave apparatus, a temperature anomaly of own apparatus is detected based on the temperature management table updated based on the temperature information detected by the temperature detectors 121 of own apparatus. In the event of the anomaly, the interrupt process is performed and the anomaly-time process 3 to be discussed later is performed. If the request to transmit the temperature information is received from the other information processing apparatus 101 connected to the network 2, the temperature information reply command of FIG. 26 is generated, and then transmitted to the requesting information processing apparatus 101.

The anomaly-time process 3 executed in step S148 of FIG. 27 is described below with reference to a flowchart of FIG. 28.

In step S181, the temperature anomaly correction controller 234 references the temperature management table 233, and determines which of the main processor 42 and the information processing controller 111 suffers from the temperature anomaly, in other words, which of the temperature detector 121-9 and the temperature detector 121-10 has detected temperatures above the predetermined temperature upper limit. If it is determined in step S181 that one of the main processor 42 and the information processing controller 11 causes the temperature anomaly, processing proceeds to step S195 as described below.

If it is determined in step S181 that neither the main processor 42 nor the information processing controller 111 causes the temperature anomaly, in other words, that any of the sub-processors 43 has caused the temperature anomaly, the temperature anomaly correction controller 234 generates a command requesting all other information processing apparatuses 101 connected to the network 2 to transmit the temperature management information in step S182. The temperature anomaly correction controller 234 controls the temperature management information transmission and reception controller 232 to transmit the generated command. The temperature management information transmission and reception controller 232 transmits, via the communication unit 16 and the network 2, the command requesting the transmission of the temperature management information to all information processing apparatuses 101 connected to the network 2.

In step S183, the temperature management information transmission and reception controller 232 receives the temperature information reply command of FIG. 26 and supplies the received temperature information reply command to the temperature anomaly correction controller 234.

In step S184, the temperature anomaly correction controller 234 determines, based on the temperature information reply command transmitted from all other information processing apparatuses 101 connected to the network 2, whether the process of the sub-processor 43 detected to be in temperature anomaly is transferable.

If it is determined in step S184 that the process is transferable, a process basically identical to that performed in steps S93 through S96 of FIG. 23 is performed in steps S185 through S188. More specifically, the temperature management table 233 is referenced, a transfer target sub-processor 43 is selected from among the sub-processors 43 of the information processing controller 111 in the information processing apparatus 101 connected to the network 2, the context of the process being executed by the sub-processor 43 detected to be above the temperature upper limit is evacuated, the operation of the sub-processor 43 detected to be above the temperature upper limit is stopped, and the evacuated context is restored back to the transfer target sub-processor.

Subsequent to step S188, processing returns to step S148 and proceeds to step S149 of FIG. 27.

If it is determined in step S184 that the process is not transferable, a process basically identical to that performed in steps S97 through S102 of FIG. 23 is performed in steps S189 through S194. More specifically, the temperature management table 233 is referenced, an interchange target sub-processor 43 is selected from among the sub-processors 43 of the information processing controller 111 in the information processing apparatus 101 connected to the network 2, the context of the process being executed by the sub-processor 43 detected to be above the temperature upper limit is evacuated, and the operation of the sub-processor 43 detected to be above the temperature upper limit is stopped.

The context of the process being executed by the sub-processor 43 selected as the interchange target of the process is evacuated, the operation of the sub-processor 43 selected as the interchange target of the process is stopped, and the contexts of the two sub-processors are interchanged for restoration.

Subsequent to step S194, processing returns to step S148 and then proceeds to step S149.

If it is determined in step S181 that one of the main processor 42 and the information processing controller 11 suffers from the temperature anomaly, a process basically identical to that performed in steps S53 and S54 of FIG. 16 is performed in steps S195 and S196. More specifically, the logical thread management processor 217 is controlled so that the application program being executed by the arithmetic processor 161 is temporarily stopped. The process of the main processor 42, except part of thereof under the control of the resident program, is temporarily stopped. The temperature management table 233 is referenced to determine whether normal temperature state is restored. If it is determined that the normal temperature state has not been restored, the process in step S196 is repeated until it is determined that the normal temperature state is restored.

If it is determined in step S196 that the normal temperature state has been restored, processing returns to step S148 and then proceeds to step S149.

In this way, if a temperature anomaly occurs, another information processing apparatus is requested to transmit the temperature information. Whether to suspend the process, whether to transfer part of the distributed processing, or whether to interchange part of the distributed processing is determined depending on the location of the temperature anomaly, the operation of the information processing controller 111 connected to the network 2, and the temperature measurement values of the processors. One of the transfer target and the interchange target is also determined.

In accordance with the second embodiment of the present invention, the plurality of information processing apparatuses 101 connected to the network 2, each having the information processing controller 111 with the temperature detectors 121 arranged at the main processor 42 and the sub-processors 43 respectively, perform the process as discussed with reference to FIGS. 25-28. With the second pattern control of the temperature information and the transfer or interchange of the process, device failure or lowered processing speed due to heat is prevented while the suspension of the process in the middle thereof is minimized.

Figure 29:
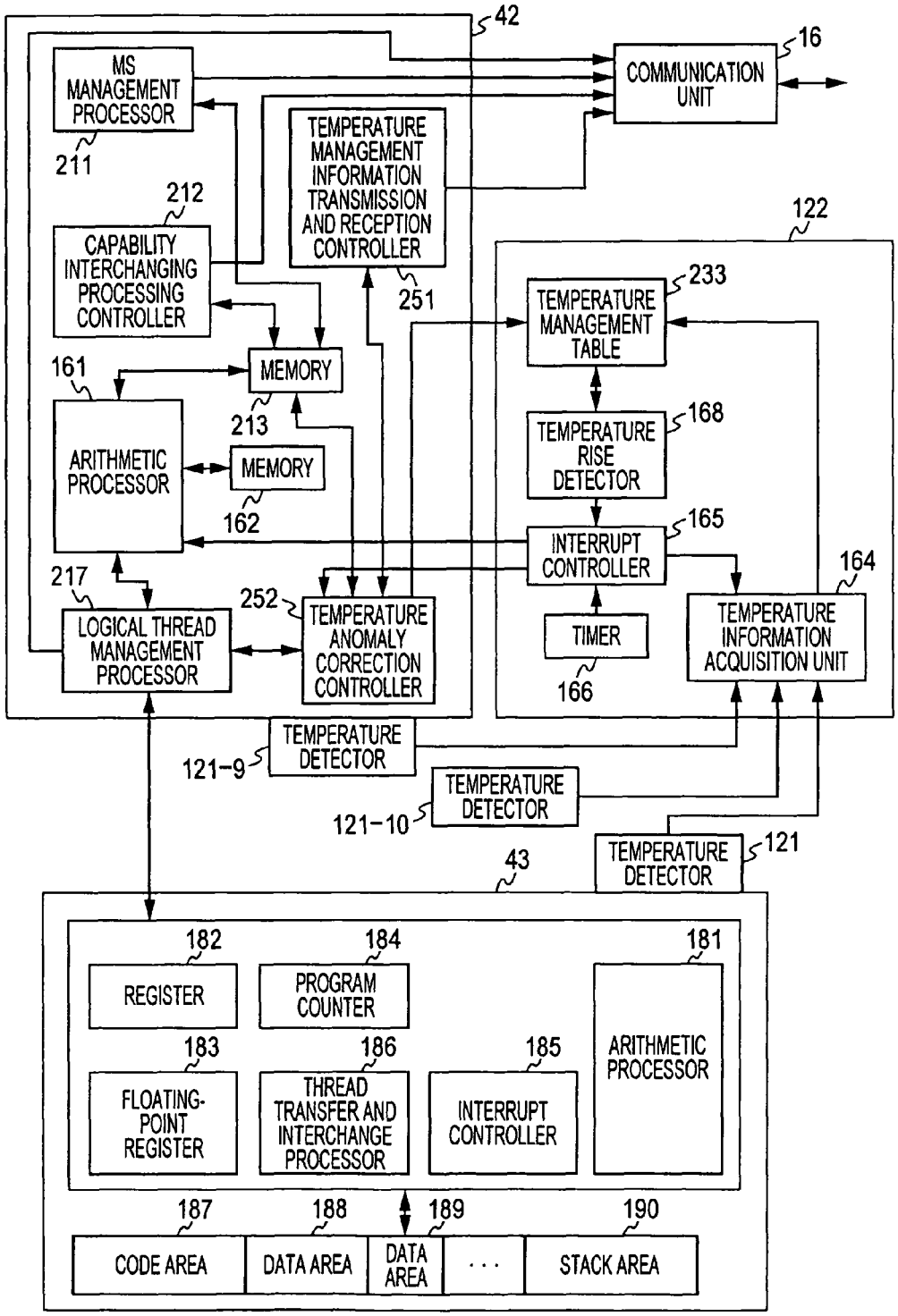
FIG. 29 is a functional block diagram illustrating the function performed by the information processing controller of FIG. 18 in a third pattern.

FIG. 29 is a functional block diagram illustrating the information processing controller 111 that performs control in the third pattern in accordance with the second embodiment of the present invention. Elements identical to those discussed with reference to FIG. 21 are designated with the same reference numerals, and the discussion thereof is omitted as appropriate. In the information processing controller 111 of FIG. 29 performing the third pattern control in accordance with the second embodiment of the present invention, a temperature management information transmission and reception controller 251 and a temperature anomaly correction controller 252 are used in place of the temperature management information transmission and reception controller 214, and the temperature anomaly correction controller 216, respectively. The rest of the main processor 42 is identical to the main processor 42 of FIG. 21. The temperature monitoring processor 122 uses a temperature management table 233 in place of the temperature management table 215. The rest of the temperature monitoring processor 122 is identical to the temperature monitoring processor 122 of FIG. 21.

Hardware performing the above function may be different from the above-referenced structure of FIG. 29. For example, part of the function of the main processor 42 may be carried out by the temperature monitoring processor 122, part of the function of the temperature monitoring processor 122 may be performed by the main processor 42, or these functions may be performed by different hardware. Even in such a case, the present invention is perfectly applicable.

Under the control of the temperature anomaly correction controller 252, the temperature management information transmission and reception controller 251 controls transmitting, via the 16, the temperature management information or a variety of commands (software cell) generated for temperature management to the other information processing apparatus 101 connected to the network 2. The temperature management information transmission and reception controller 251 also controls receiving, via the communication unit 16, the temperature management information or a variety of commands (software cell) for temperature management from the other information processing apparatus 101 connected to the network 2.

Figure 30:
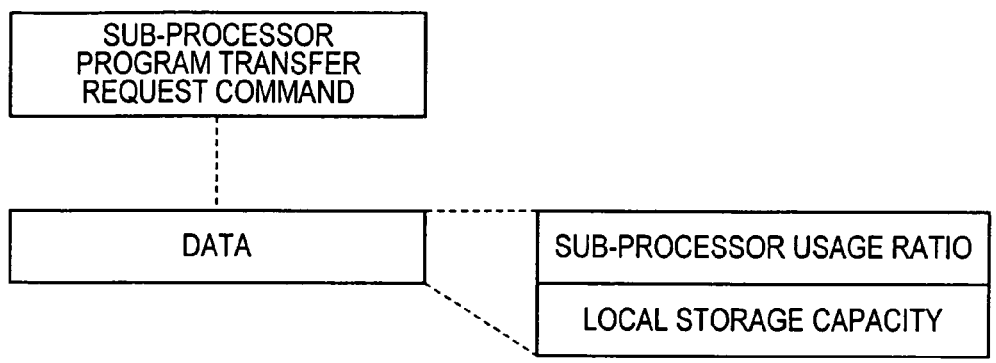
FIG. 30 illustrates a sub-processor program transfer request command.

If the temperature rise detector 168 detects the occurrence of a temperature anomaly, and the interrupt controller 165 performs an interrupt process, the temperature anomaly correction controller 252 generates a sub-processor program transfer command of FIG. 30 to request all other information processing apparatuses 101 connected to the network 2 to transfer or interchange the process of a current logical thread, based on the information acquired by the temperature information acquisition unit 164 of own apparatus. The temperature anomaly correction controller 252 also controls the temperature management information transmission and reception controller 251 to transmit the generated command. When the temperature management information transmission and reception controller 251 receives, from the other information processing apparatus 101 connected to the network 2, the sub-processor program transfer request command of FIG. 30, the temperature anomaly correction controller 251 generates a sub-processor program transfer reply command of FIG. 31 based on a temperature management table stored in the temperature management table 233. The temperature anomaly correction controller 252 controls the temperature management information transmission and reception controller 251 to transmit the generated sub-processor program transfer reply command.

The sub-processor program transfer request command contains information of a sub-processor usage ratio of the process (thread) being executed by the sub-processor detected to be in temperature anomaly, and a local storage capacity of the sub-processor detected to be in temperature anomaly.

The sub-processor program transfer reply command contains information relating to whether to accept the transfer request of the sub-processor program (transfer OK, interchange OK, or transfer/interchange unpermissible), and a sub-processor ID if the corresponding sub-processor accepts the sub-processor program transfer request. The temperature anomaly correction controller 252 determines whether to accept the sub-processor program transfer request, whether to accept the sub-processor program interchange request, or whether to reject the two requests, based on the sub-processor usage ratio of the sub-processor detected to be in temperature anomaly and performing the process (thread) thereof, and information of the local storage capacity, described in the sub-processor program transfer request command, and the temperature management table stored in the temperature management table 233.

Regardless of whether own apparatus is a master apparatus or a slave apparatus, as previously discussed with reference to FIG. 25, the temperature management table 233 holds own temperature management table updated based on the information acquired by the temperature information acquisition unit 164.

The operation of the third pattern of the second embodiment is described below with reference to flowcharts of FIGS. 32 and 33. The application program execution process of the second embodiment is basically identical to the application program execution process of the first embodiment discussed with reference to FIG. 14, and the discussion thereof is omitted herein.

A temperature information management process 3 is described below with reference to the flowchart of FIG. 32.

A process substantially identical to that performed in steps S21 through S24 of FIG. 15 is performed in steps S211 through S214. More specifically, if it is determined that a timer interrupt has been received, the temperature information acquisition unit 164 acquires temperature information from each of the temperature detectors 121, and updates the temperature management table 233. The temperature rise detector 168 references the temperature management table 233 to determine whether an abnormal value is contained in the temperature information.

If it is determined in step S214 that no abnormal value is contained in the temperature information, the temperature anomaly correction controller 252 determines in step S215 whether the temperature management information transmission and reception controller 251 has received, from another information processing apparatus 101 connected to the network 2, a sub-processor program transfer request command of FIG. 30. If it is determined in step S215 that the temperature management information transmission and reception controller 232 has not received, from the other information processing apparatus 101, the sub-processor program transfer request command, processing returns to step S211 to repeat step S211 and subsequent steps.

If it is determined in step S215 that the sub-processor program transfer request has been received from the other information processing apparatus 101, the temperature anomaly correction controller 252 determines whether to accept the sub-processor program transfer request. This determination is performed based on information described in the sub-processor program transfer request command, including the sub-processor usage ratio of the sub-processor, detected to be in temperature anomaly, performing the process (thread), information of the local storage capacity, and information regarding the operation states of the sub-processor 43-1 through the sub-processor 43-8 of own apparatus, updated temperature measurement results of the heat sink 141, the main processor 42 and the sub-processor 43-1 through the sub-processor 43-8, and the sub-processor layout information stored in the temperature management table 233. The temperature anomaly correction controller 252 generates the temperature information reply command of FIG. 31, and controls the temperature management information transmission and reception controller 251 to transmit the generated temperature information reply command. Processing returns to step S211 to repeat step S211 and subsequent steps.

If it is determined in step S214 that an abnormal value is contained in the temperature information, the temperature rise detector 168 notifies the interrupt controller 165 of the detection of the abnormal temperature rise, thereby causing the interrupt controller 165 to interrupt the arithmetic processor 161 and the temperature anomaly correction controller 252 in step S217. The interrupt controller 165 interrupts the arithmetic processor 161 and the temperature anomaly correction controller 252, thereby stopping the process of the application program controlled by the arithmetic processor 161 and causing the temperature anomaly correction controller 252 to start an anomaly-time process 4.

The anomaly-time process 4 to be discussed later with reference to FIG. 33 is executed in step S218.

In step S219, the temperature anomaly correction controller 252 controls the logical thread management processor 217 based on the anomaly-time process 4 executed in step S218, thereby updating the table of the logical thread management as necessary.

In step S220, the interrupt controller 165 releases the interrupt to the process of the application program controlled by the arithmetic processor 161, and processing returns to step S211 to repeat step S211 and subsequent steps.

Figure 31:
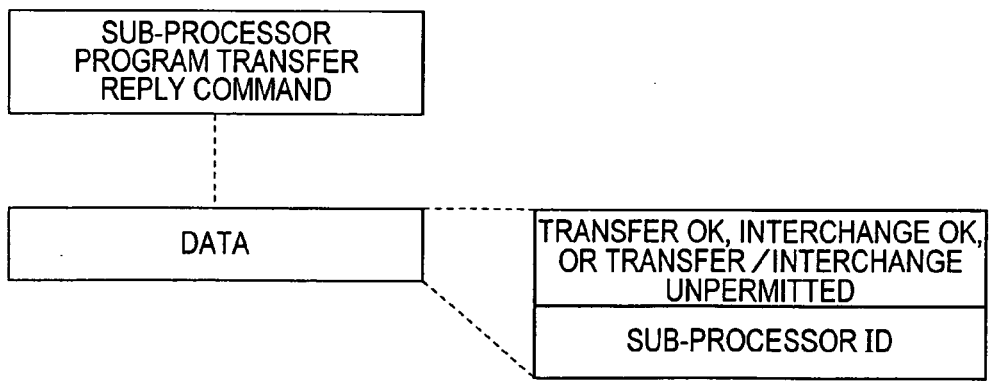
FIG. 31 illustrates a sub-processor program transfer reply command.

Regardless of whether each information processing apparatus 101 connected to the network 2 is a master apparatus or a slave apparatus, a temperature anomaly of own apparatus is detected based on the temperature management table updated based on the temperature information detected by the temperature detectors 121 of own apparatus. In the event of the anomaly, the interrupt process is performed and the anomaly-time process 4 to be discussed later is performed. If the sub-processor program transfer request command of FIG. 30 is received from the other information processing apparatus 101 connected to the network 2, a temperature information reply command of FIG. 31 is generated, and then transmitted to the requesting information processing apparatus 101.

The anomaly-time process 4 executed in step S218 of FIG. 32 is described below with reference to a flowchart of FIG. 33.

In step S231, the temperature anomaly correction controller 252 references the temperature management table 233, and determines which of the main processor 42 and the information processing controller 111 suffers from the temperature anomaly, in other words, which of the temperature detector 121-9 and the temperature detector 121-10 has detected temperatures above the predetermined temperature upper limit. If it is determined in step S231 that one of the main processor 42 and the information processing controller 11 causes the temperature anomaly, processing proceeds to step S245 as described below.

If it is determined in step S231 that neither the main processor 42 nor the information processing controller 111 causes the temperature anomaly, in other words, that one of the sub-processors 43 has caused the temperature anomaly, the temperature anomaly correction controller 252 generates the sub-processor program transfer request command of FIG.

30 in step S232. The temperature anomaly correction controller 252 causes the temperature management information transmission and reception controller 251 to transmit the generated command to all other information processing apparatuses 101 connected to the network 2. The temperature management information transmission and reception controller 251 transmits, via the communication unit 16 and the network 2, the sub-processor program transfer request command to all information processing apparatuses 101 connected to the network 2.

In step S233, the temperature management information transmission and reception controller 262 receives the sub-processor program transfer request command of FIG. 30 and supplies the received sub-processor program transfer request command to the temperature anomaly correction controller 252.

In step S234, the temperature anomaly correction controller 251 determines, based on the sub-processor program transfer request command received in step S233, whether the process of the sub-processor 43 detected to be in temperature anomaly is transferable.

If it is determined in step S234 that the process is transferable, a process basically identical to that performed in steps S93 through S96 of FIG. 23 is performed in steps S235 through S238. More specifically, the temperature management table 233 is referenced, one transfer target sub-processor 43 is selected as a transfer target from among the sub-processors 43 of the information processing controller 111 in the information processing apparatus 101 connected to the network 2, the context of the process being executed by the sub-processor 43 detected to be above the temperature upper limit is evacuated, the operation of the sub-processor 43 detected to be above the temperature upper limit is stopped, and the evacuated context is restored back to the transfer target sub-processor 43.

Subsequent to step S238, processing returns to step S218 and proceeds to step S219 of FIG. 32.

If it is determined in step S234 that the process is not transferable, a process basically identical to that performed in steps S97 through S102 of FIG. 23 is performed in steps S239 through S244. More specifically, the temperature management table 233 is referenced, one sub-processor 43 is selected as an interchange target from among the sub-processors 43 of the information processing controller 111 in the information processing apparatus 101 connected to the network 2, the context of the process being executed by the sub-processor 43 detected to be above the temperature upper limit is evacuated, and the operation of the sub-processor 43 detected to be above the temperature upper limit is stopped.

The context of the process being executed by the sub-processor 43 selected as the interchange target of the process is evacuated, the operation of the sub-processor 43 selected as the interchange target of the process is stopped, and the contexts of the two sub-processors are interchanged for restoration.

Subsequent to step S244, processing returns to step S218 and proceeds to step S219 of FIG. 32.

If it is determined in step S231 that one of the main processor 42 and the information processing controller 11 suffers from the temperature anomaly, a process basically identical to that performed in steps S53 and S54 of FIG. 16 is performed in steps S245 and S246. More specifically, the logical thread management processor 217 is controlled so that the application program being executed by the arithmetic processor 161 is temporarily stopped. The process of the main processor 42, except part of thereof under the control of the resident program, is temporarily stopped. The temperature management table 233 is referenced to determine whether normal temperature state is restored. If it is determined that the normal temperature state has not been restored, the process in step S246 is repeated until it is determined that the normal temperature state is restored.

If it is determined in step S246 that the normal temperature state has been restored, processing returns to step S218 and then proceeds to step S219 of FIG. 32.

In this way, if a temperature anomaly occurs, the sub-processor program transfer request command is transmitted, and the reply command is received. Whether to suspend the process, whether to transfer part of the distributed processing, or whether to interchange part of the distributed processing is determined depending on the location of the temperature anomaly, the operation of the information processing controller 111 connected to the network 2, and the temperature measurement values of the processors. One of the transfer target and the interchange target is also determined.

In accordance with the second embodiment of the present invention, the plurality of information processing apparatuses 101 connected to the network 2, each having the information processing controller 111 with the temperature detectors 121 arranged at the main processor 42 and the sub-processors 43 respectively, perform the process as discussed with reference to FIGS. 29-33. With the third pattern control of the temperature information and the transfer or interchange of the process, device failure or lowered processing speed due to heat is prevented while the suspension of the process in the middle thereof is minimized.

Figure 34:
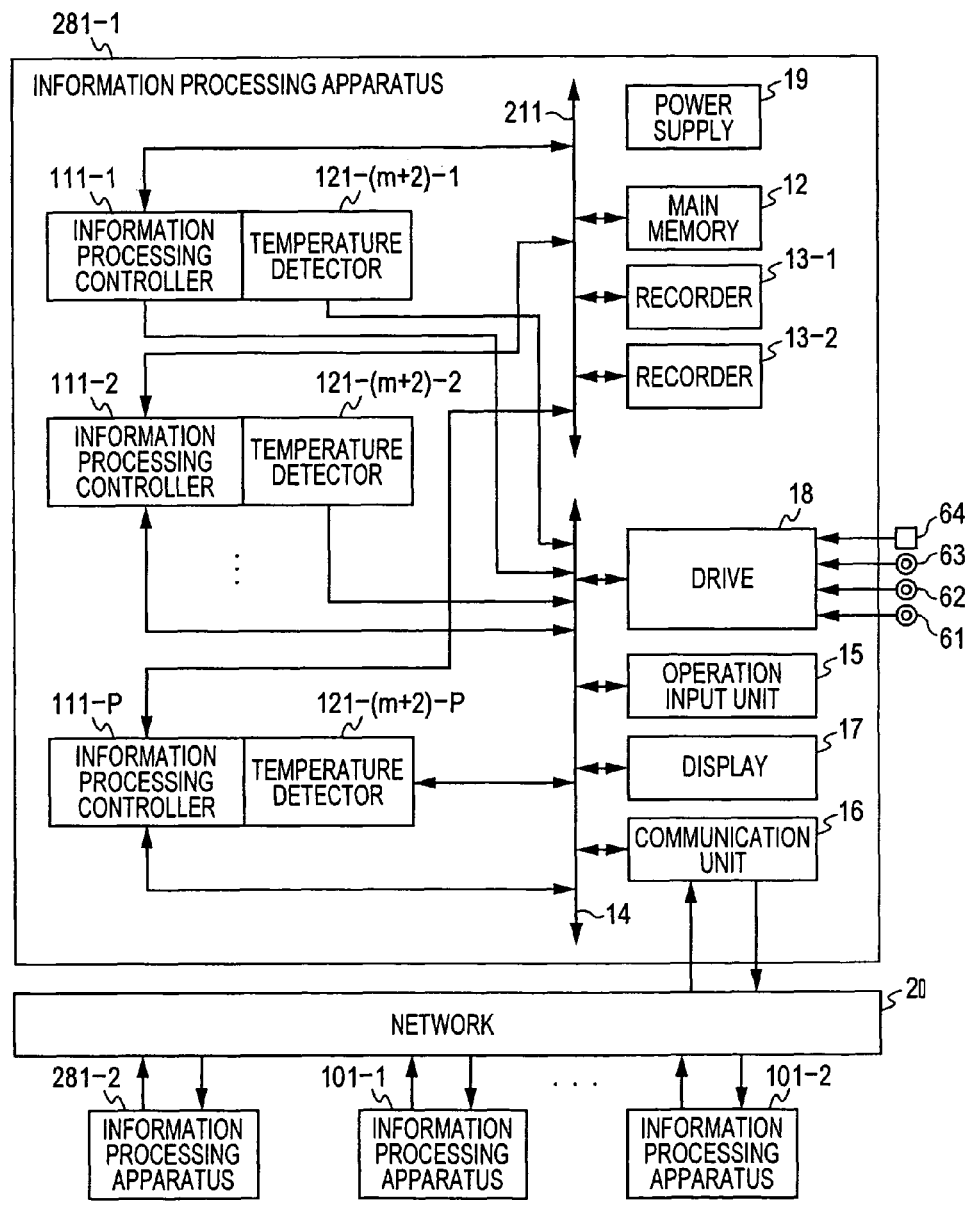
FIG. 34 illustrates the structure of an information processing apparatus including a plurality of information processing controllers in accordance with one embodiment of the present invention.

An information processing apparatus 281-1 can include a plurality of information processing controllers 111-1 through 111-p (p is a positive integer) as shown in FIG. 34. In such a case, as well, the information processing apparatus 281-1 transmits and receives, via the bus 14, a variety of information units, as in the second embodiment where the variety of information units is transmitted and received by the plurality of information processing controllers 111 via the communication unit 16 and the network 2. The present invention is also applicable to such an arrangement.

One of the information processing controllers 111-1 through 111-p in the information processing apparatus 281-1 functions as a master controller in the information processing apparatus 281-1, and the other information processing controllers 111 function as slave controllers. Each of the first through third patterns of the second embodiment is equally applied. A temperature anomaly is detected in any of the information processing controllers 111-1 through 111-p. In this way, whether to suspend the process, whether to transfer part of the distributed processing, or whether to interchange part of the distributed processing is determined depending on the operation of the information processing controllers 111 connected to the bus 14 and the temperature measurement results of the processors. One of the transfer target and the interchange target is thus determined.

Information processing apparatuses 281-1 and 281-2, each having the same structure as the information processing apparatus 281 can be connected to the network 2. The plurality of information processing apparatuses 101 (such as the information processing apparatuses 101-1 and 101-2 as shown in FIG. 34) can also be connected to the network 2. A temperature anomaly may be detected in any of the information processing controllers 111-1 through 111-p in the information processing apparatus 281-1, but neither transfer target nor interchange target may be found in each of the information processing controllers 111 connected to the bus 14. In such a case, one of the first through third patterns of the second embodiment is used. One of a transfer target and an interchange target may be selected from the sub-processors 43 contained in each of the information processing apparatus 281-2 and the plurality of information processing apparatuses 101.

The information processing controller of embodiments of the present invention may include a temperature detector to control the apparatus to function within a normal operating temperature range. Furthermore, the information processing apparatus may monitor power input to the information processing controller and prevent excessive power from being consumed by any single information processing controller to preclude device degradation. In response to an increase in power consumption, the information processing controller of embodiments of the present invention permits the process to be transferred to or interchanged between sub-processors in at least one information processing apparatus. Device failure and lowered processing speed are thus avoided.

An information processing controller of an information processing apparatus of a third embodiment of the present invention is described below with reference to FIGS. 35 through 52. The information processing controller of the third embodiment performs distributed processing in response to an increase in power consumption of processors.

Figure 35:
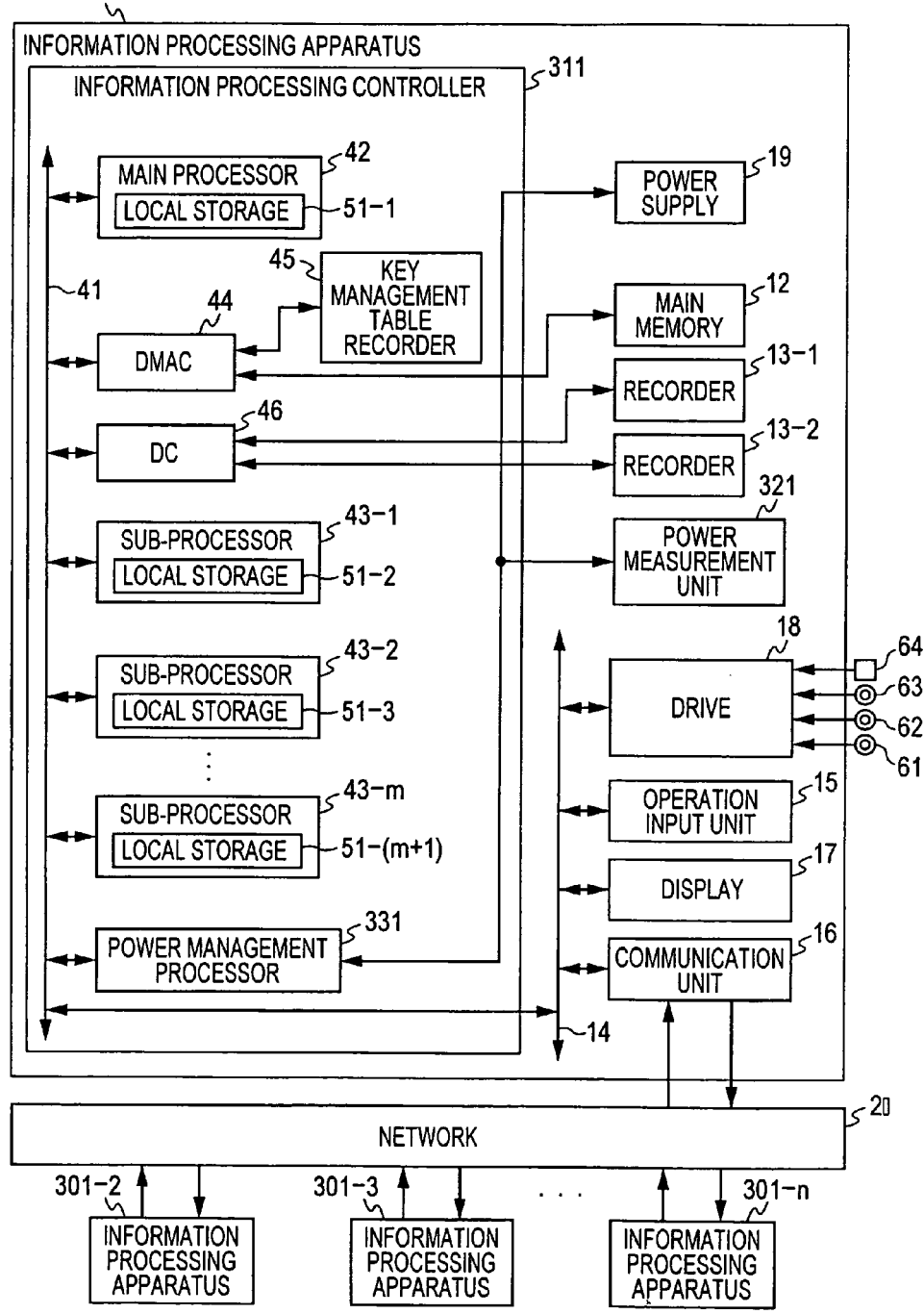
FIG. 35 illustrates the structure of an information processing controller in accordance with one embodiment of the present invention.

FIG. 35 is a block diagram of an information processing apparatus 301-1. The information processing apparatus 301-1 includes a power measurement unit 321 measuring power consumed by an information processing controller 311, and, in an information processing controller 311, a power management processor 331 monitoring the state of a power supply 19 and acquiring the measurement results of the power measurement unit 321.

As shown in FIG. 35, elements identical to those described with reference to FIG. 1 are designated with the same reference numerals, and the discussion thereof is omitted herein as appropriate. The information processing apparatus 301-1 of FIG. 35 includes, in place of the information processing controller 11, the information processing controller 311 including the power management processor 331 that monitors the state of the power supply 19 and acquires the measurement results of the power measurement unit 321. The power measurement unit 321 is newly arranged to measure power consumed by the one-chip information processing controller 311. The rest of the information processing apparatus 301-1 is substantially identical to the information processing apparatus 1 of FIG. 1.

The information processing apparatuses 301-2 through 301-n connected to the network 2 are similar to the information processing apparatus 301-1 in structure, and the discussion of the structure thereof is thus omitted herein. If it is not necessary to discriminate one from another among the information processing apparatuses 301-1 through 301-n, each information processing apparatus is simply referred to as an information processing apparatus 301.

Figure 36:
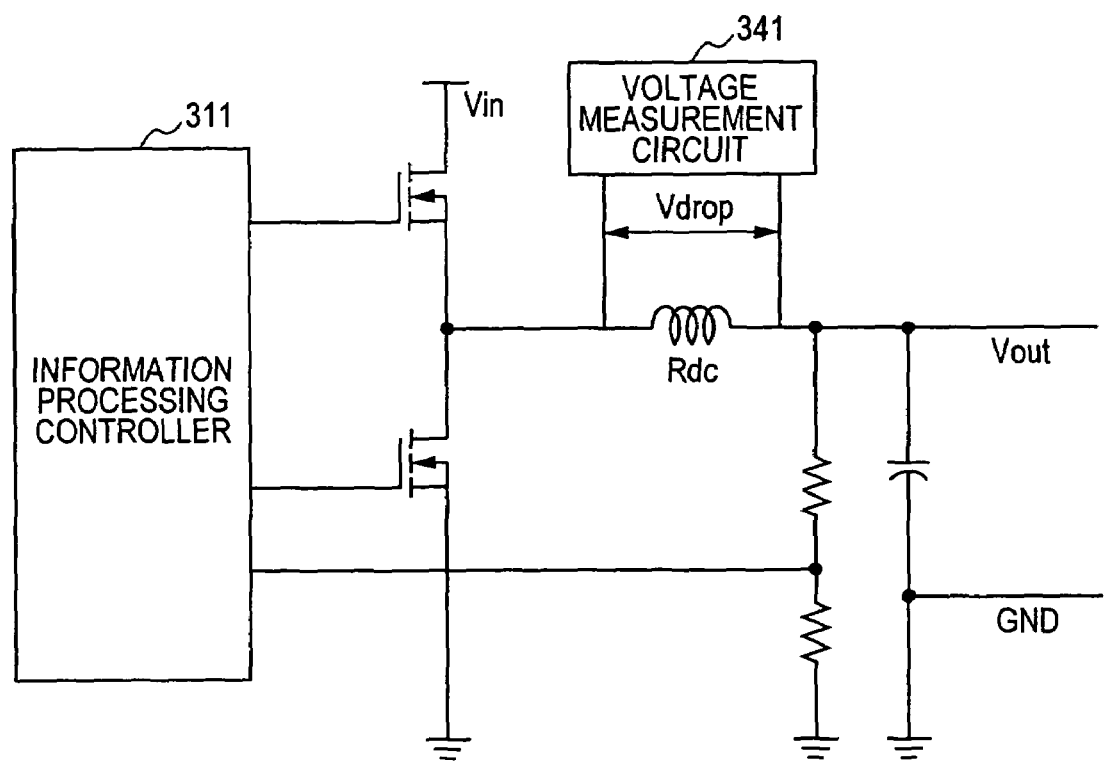
FIG. 36 illustrates a power measurement method of a power measurement unit.

As shown in FIG. 36, the synchronous-rectifier type power measurement unit 321 is discussed. A direct-current resistance Rdc of an output inductor is a finite value determined at design stage. A voltage measurement circuit 341 measures a voltage difference Vdrop across the output inductor, and a current value Iout supplied to the information processing controller 311 is calculated from the measured voltage difference Vdrop. The current value Iout is a current consumed by the information processing controller 311 as a load to the power supply 19. The direct-current resistance Rdc is sufficiently small with reference to a load impedance viewed from the output terminal of the power supply circuit. The consumed power is calculated by multiplying load impedance by squared current consumption. With the voltage measurement circuit 341 monitoring the voltage difference Vdrop across the output inductor, the power consumption of the information processing controller 311 is indirectly monitored.

Figure 37:
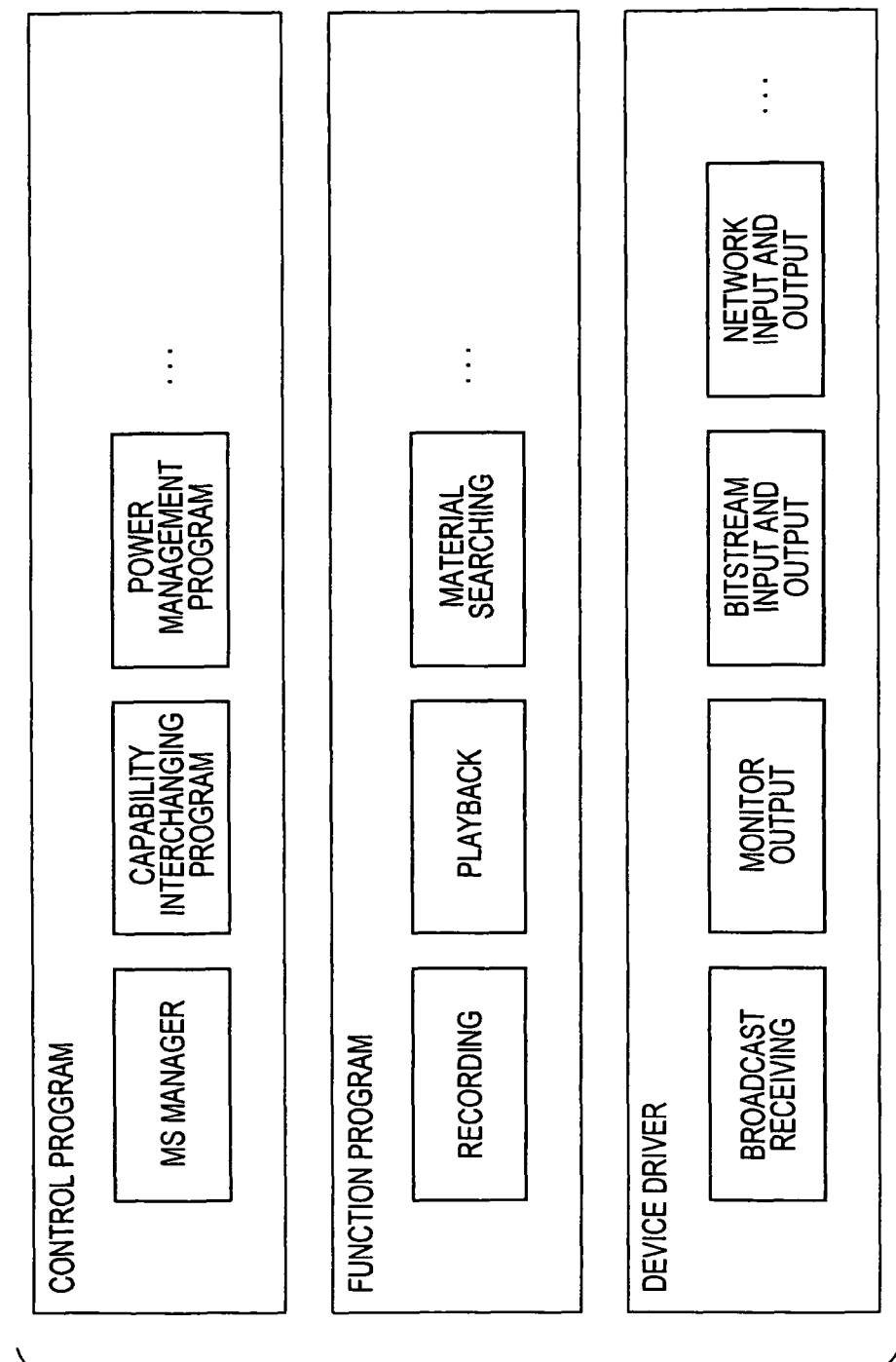
FIG. 37 illustrate the structure of a software program stored in a main memory of the information processing controller of FIG. 35.

FIG. 37 illustrates the structure of a software program executed by the information processing controller 311 in accordance with the third embodiment of the present invention. The information processing controller 311 controls distributed processing assignment in response to power consumption. The software program is pre-recorded on the recorder 13 connected to the information processing controller 311 prior to the power on of the information processing apparatus 301-1.

As shown in FIG. 37, elements identical to those described with reference to FIG. 8 are designated with the same reference numerals, and the discussion thereof is omitted herein. The structure of the software program stored in the main memory 12 of the information processing controller 311 in accordance with the third embodiment of the present invention is substantially identical to the software structure discussed with reference to FIG. 8 except that a power management program is contained as a control program. The power management program is preferably a resident program that is continuously operative while the main power of the information processing apparatus 301 remains turned on.

Under the control of the power management program, the power management processor 331 gathers information about power consumption measured by the power measurement unit 321 in the information processing apparatus 301. Based on the power information, the information processing controller 311 controls the process executed by the main processor 42, and as necessary, the transfer or interchange of the process executed by the sub-processors 43-1 through 43-8. The information processing controller 311 exchanges power information with other information processing apparatuses 301 via the network 2, and then controls the process executed by the main processor 42, and as necessary, the transfer or interchange of the process being executed by the sub-processors 43-1 through 43-8.

The control of the power information of the information processing apparatuses 301 connected to the network 2 and the transfer or interchange of the process is performed in the following three patterns.

In a first pattern, the information processing apparatus 301-1, if identified as a master apparatus, manages own power management table but also power management tables of the information processing apparatus 301-2 through the information processing apparatus 301-n. More specifically, each of the information processing apparatus 301-2 through the information processing apparatus 301-n, as slave apparatuses, regularly transmits an updated power management table thereof to the information processing apparatus 301-1. The information processing apparatus 301-1 as the master apparatus monitors the power information of all information processing apparatuses 301-1 through 301-n, and if an abnormal power consumption is detected in any of the information processing apparatuses 301-1 through 301-n, the information processing apparatus 301-1 selects an appropriate information processing controller 311 as a transfer target or an interchange target of the process from all information processing controllers 311 of the information processing apparatuses 101 connected to the network 2. The information processing apparatus 301-1 transfers the process of the sub-processor 43 detected to be power anomaly to the sub-processor 43 in the selected information processing controller 311 or interchanges the processes between the two sub-processors 43.

In a second pattern, the information processing apparatus 301 monitors own temperature management table, and if an abnormal power consumption is detected in the power management table, the information processing apparatus 301 transmits, to all other information processing apparatuses 301, a command requesting all other information processing apparatuses 301 to transmit the power information. More specifically, upon receiving a command requesting the transmission of the power information, an information processing apparatus 301 not detecting any abnormal power consumption generates a power information reply command of FIG. 39, and transmits the command to reply the generated power information to the information processing apparatus 301 as a source of the power information request command.

The power information reply command contains information relating to a power consumption upper limit of AC power, a power consumption upper limit of rechargeable battery power, and a power consumption upper limit of dry battery power, power connection information representing which of AC power, rechargeable battery power, and dry battery power is connected, and power consumption in a current process. The power consumption upper limit is determined at design stage of the information processing apparatus and is an upper limit below which the information processing apparatus 301 normally operates from the AC power. The power consumption upper limit may be a preferable power consumption upper limit below which the information processing apparatus 301 operates normally and efficiently. The same is true of the power consumption upper limits of the rechargeable battery power and the dry battery power. The power connection information may be set at the design stage of the information processing apparatus 301. If the information processing apparatus 301 works with a plurality of power sources, the power connection information may be modified. The current power consumption is the one measured by the power measurement unit 321, and varies depending on the operation state of the information processing apparatus 301.

Upon receiving the temperature information rely command, the information processing apparatus 301 selects an appropriate information processing controller 311 as a transfer target or an interchange target of the process from all information processing controllers 311 of the information processing apparatuses 301 connected to the network 2. The information processing apparatus 301 performs control process to transfer the process of the sub-processor 43 detected to be in anomaly to the sub-processor 43 in the selected information processing controller 311 or to interchange the processes between the two sub-processors 43.

In a third pattern, each information processing apparatus 301 monitors own power management table, and if an abnormal power consumption is detected in the power management table, the information processing apparatus 301 transmits, to all other information processing apparatuses 301, a command requesting all other information processing apparatuses 301 to transfer sub-processor programs. More specifically, upon receiving a command requesting the transfer of the sub-processor program from the other information processing apparatus 301, an information processing apparatus 301 not detecting any abnormal power consumption generates, based on own power management table, a reply command indicating whether own apparatus can be a transfer target of the sub-processor program. The information processing apparatus 301 then transmits the reply command to the information processing apparatus 301 as the source of the command requesting the transfer of the sub-processor program. Upon receiving the power information rely command, the information processing apparatus 301 selects an information processing controller 311 as a transfer target or an interchange target of the process from all information processing controllers 311 of the information processing apparatuses 301 connected to the network 2. The information processing apparatus 301 performs control process to transfer the process of the sub-processor 43 detected to be in anomaly to the sub-processor 43 in the selected information processing controller 311 or to interchange the processes between the two sub-processors 43.

Figure 38:
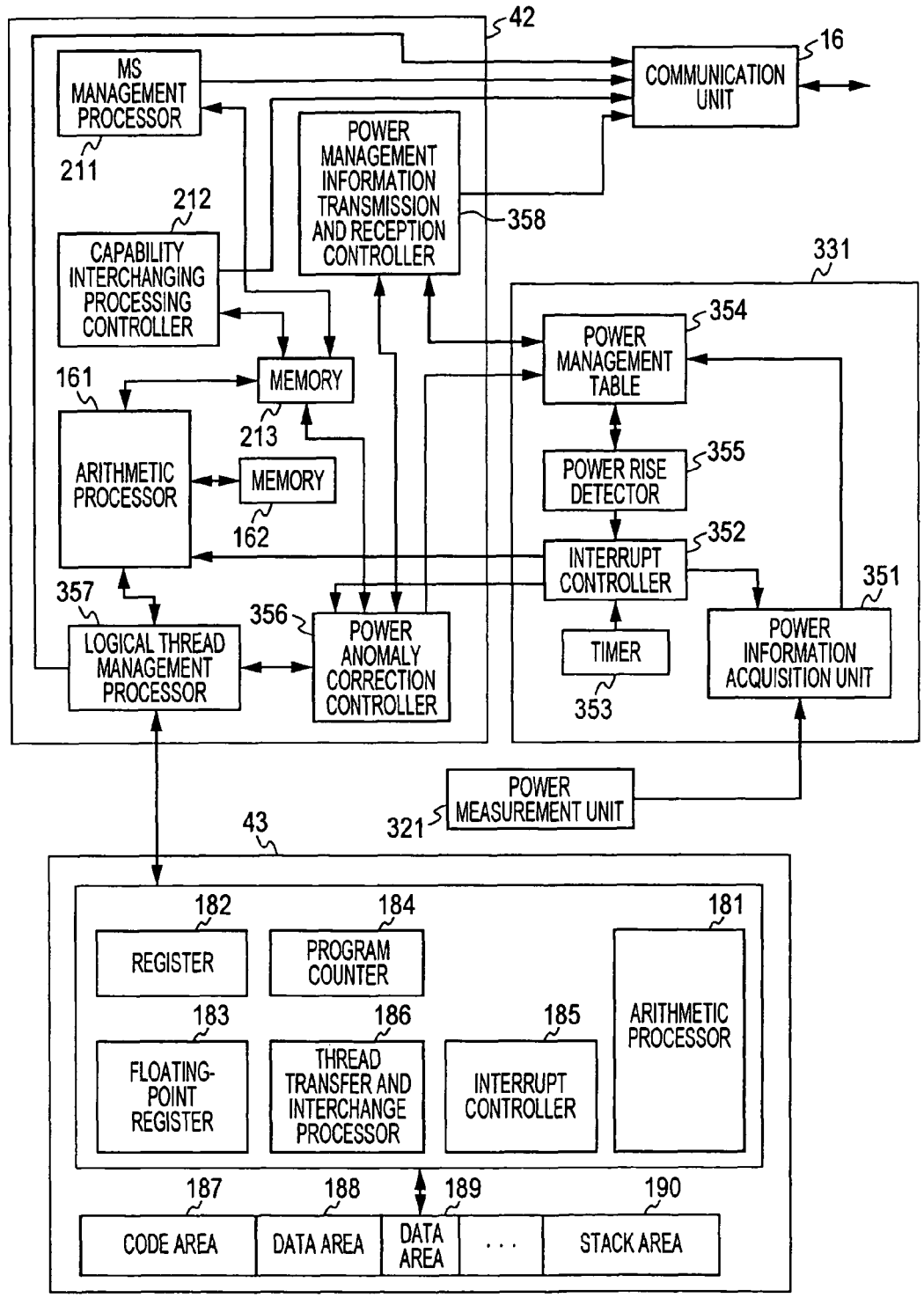
FIG. 38 is a functional block diagram illustrating the function performed by the information processing controller of FIG. 35 in the first pattern.

FIG. 38 is a functional block diagram of the information processing controller 311 that performs the control process in the first pattern in accordance with the third embodiment of the present invention. Elements identical to those described with reference to FIG. 21 are designated with the same reference numerals, and the discussion thereof is omitted as appropriate. In the first pattern of the information processing controller 311 of the third embodiment as shown in FIG. 38, the main processor 42 includes a power anomaly correction controller 356, a logical thread management processor 357, and a power management information transmission and reception controller 358 in place of the temperature anomaly correction controller 216, the logical thread management processor 217, and the temperature management information transmission and reception controller 214. The rest of the main processor 42 is identical to the main processor 42 of FIG. 21. The third embodiment of the present invention employs a power management processor 331 in place of the temperature monitoring processor 122 of FIG. 21. The power management processor 331 includes a power information acquisition unit 351, an interrupt controller 352, a timer 353, a power management table 354, and a power rise detector 355.

The power information acquisition unit 351 acquires power information from a power measurement unit 321 at timing controlled by the interrupt controller 352, thereby updating the power management table 354. The interrupt controller 352 references the timer 353 and timer-interrupts the power information acquisition unit 351. In response to information supplied from the power rise detector 355, the interrupt controller 352 interrupts the arithmetic processor 161 and the power anomaly correction controller 356.

Under the control of the power anomaly correction controller 356, the power management information transmission and reception controller 358 controls transmitting, via the communication unit 16, the power management table or a variety of commands (software cell) generated for power management to the other information processing apparatuses 301 connected to the network 2. The power management information transmission and reception controller 358 controls receiving, via the communication unit 16, the temperature management table of the other information processing apparatuses 101 or a variety of commands (software cell) generated for temperature management from the other information processing apparatuses 301 connected to the network 2. The temperature management table or the variety of commands (software cell) generated for power management are collectively referred to as power management information if there is no need for discriminating information relating to temperature management of a plurality of information processing apparatuses 301 connected to the network 2 and information relating to the control of distributed processing executed based on the temperature management.

Figure 40:
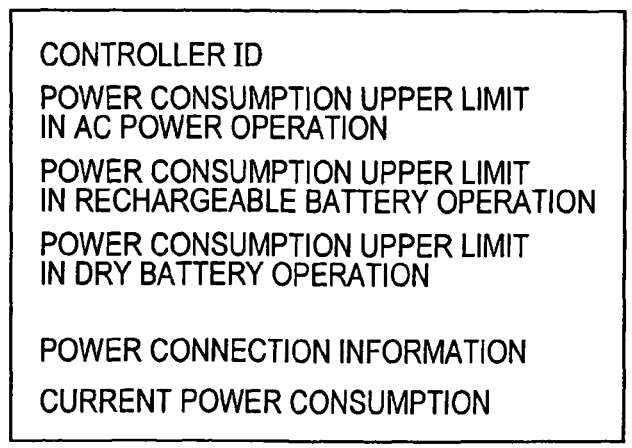
FIG. 40 illustrates power management information.

The power management table 354 holds information for managing power consumption of the information processing controller 311. If own apparatus is a slave apparatus, the power management table 354 holds own power information, and if own apparatus is a mater apparatus, the power management table 354 holds power information of all information processing apparatuses 301 connected to the network 2. As shown in FIG. 40, the power information contains a controller ID identifying each information processing controller 311, the power consumption upper limit of the AC power, the power consumption upper limit of the rechargeable battery 73, the power consumption upper limit of the dry battery, the power connection information indicating which of the AC power, the rechargeable battery power, and the dry battery power is connected, and the power consumed in the current process. The power consumption upper limit is determined at design stage of the information processing apparatus and is an upper limit below which the information processing apparatus 301 normally operates from the AC power. The power consumption upper limit may be a preferable power consumption upper limit below which the information processing apparatus 301 operates normally and efficiently. The same is true of the power consumption upper limits of the rechargeable battery power 73 and the dry battery power. The power connection information may be set at the design stage of the information processing apparatus 301. If the information processing apparatus 301 works with a plurality of power sources, the power connection information may be modified. The current power consumption is the one measured by the power measurement unit 321, and varies depending on the operation state of the information processing apparatus 301.

If own apparatus is a master apparatus, the power rise detector 355 references the power management table 354. If a power consumption value above the predetermined upper limit is found in power detection results of all information processing apparatuses 301 connected to the network 2, the power rise detector 355 notifies the interrupt controller 352 of the detection of the power consumption anomaly, thereby causing the interrupt controller 352 to interrupt the arithmetic processor 161 and the power anomaly correction controller 356.

If own apparatus is a master apparatus, the power anomaly correction controller 356 references the power management table 354 in response to an interrupt from the interrupt controller 352. The power anomaly correction controller 356 thus detects which of the information processing apparatuses 301 connected to the network 2 is in power consumption anomaly. Based on the detection results, the power anomaly correction controller 356 controls the logical thread management processor 357, thereby stopping the process or transferring the process of the sub-processor 43 in the information processing apparatus 301 detected in power anomaly to another sub-processor 43 or interchanging the processes between the two sub-processor 43.

The logical thread management processor 357 generates or deletes a logical thread of an application program performed by the arithmetic processor 161. If own apparatus is a master apparatus, the logical thread management processor 357 monitors the state of the logical thread in distributed processing performed by one of the information processing apparatuses 301 connected to the network 2 and controls the distributed processing. If own apparatus is the master apparatus, the logical thread management processor 357 generates a table listing management information of all information processing apparatuses 301 connected to the network 2 and a table listing information required to execute the logical thread on a per executed logical thread basis. The logical thread management processor 357 thus controls the execution of the logical thread by referencing and updating the information of the tables.

If own apparatus is a master apparatus, the logical thread management processor 357 generates a software cell controlling the process of the thread to be executed by another information processing apparatus 301 as necessary, and transmits the generated software cell via the communication unit 16. If own apparatus is a slave apparatus, the logical thread management processor 357 receives, via the communication unit 16, a software cell transmitted from a master information processing apparatus 301. The logical thread management processor 357 causes the sub-processor 43 to perform the distributed processing responsive to the software cell, generates a software cell corresponding to a reply or a response, and transmits the generated software cell via the communication unit 16. Regardless whether own apparatus 301 is a master apparatus or a slave apparatus, the logical thread management processor 357 acquires, via the communication unit 16, information relating to a thread already executed by the other information processing apparatus 301.

Hardware performing the above function may be different from the above-referenced structure of FIG. 38. For example, part of the function of the main processor 42 may be carried out by the power management processor 331, part of the function of the power management processor 331 may be performed by the main processor 42, or these functions may be performed by different hardware. Even in such a case, the present invention is perfectly applicable.

The first pattern operation of the third embodiment of the present invention is described below with reference to flowcharts of FIGS. 41 through 44.

An application program execution process 2 to be executed by the information processing apparatus 301 of the third embodiment of FIG. 38 is described below with reference to a flowchart of FIG. 41. The power management program is a resident program that is continuously operative while the main power of the information processing apparatus 301 remains turned on.

In step S301, the arithmetic processor 161 determines whether a user has input a command to execute an application program. More specifically, in step S301, the main processor 42 determines, in response to a signal supplied from the operation input unit 15 via the bus 14 and the bus 41, whether the command to execute the application program has been issued. If it is determined in step S301 that the command to execute the application program has not been issued, the process of S301 is repeated until it is determined that the command to execute the application program has been issued.

If it is determined in step S301 that the command to execute the application program has been issued, the arithmetic processor 161 sets the assignment of the logical thread to the sub-processors and supplies the setting information of the logical thread to the logical thread management processor 357 in step S302.

In step S303, the logical thread management processor 357 loads a program and data for executing the assigned process to the code area 187 and the data area 188 of the local storage 51 in the sub-processor 43 to which the logical thread is assigned.

In step S304, the arithmetic processor 161 and the logical thread management processor 357 control the execution of the application program including the process of the sub-processor 43. The arithmetic processor 181 in the sub-processor 43 performs the assigned process.

The power management program is a resident program that is continuously operative while the main power of the information processing apparatus 301 remains turned on, and the process is performed throughout a period while steps S301 through S304 are executed. The power information management process of the master apparatus will be described later with reference to a flowchart of FIG. 42, and the power information management process of the slave apparatus will be described later with reference to a flowchart of FIG. 44.

In step S305, the arithmetic processor 161 determines whether an interrupt responsive to the occurrence of a power anomaly is issued from the interrupt controller 352. If it is determined in step S305 that an interrupt responsive to the occurrence of a power anomaly is not issued, processing proceeds to step S308.

If it is determined in step S305 that an interrupt responsive to the occurrence of a power anomaly is issued, the current process is suspended. In step S306, the arithmetic processor 161 determines whether the interrupt is released. If it is determined in step S306 that the interrupt is not yet released, the process at step S306 is repeated until it is determined that the interrupt has been released.

If it is determined in step S306 that the interrupt has been released, the arithmetic processor 161 supplies the logical thread management processor 357 with the setting information of the logical thread as necessary. The logical thread management processor 357 thus updates the table relating to the logical thread management.

If it is determined in step S305 that the interrupt responsive to the occurrence of a power consumption anomaly has not been issued, the arithmetic processor 161 determines in step S308 subsequent to the end of step S307 whether the process of the application program has been completed. If it is determined in step S308 that the process of the application program has not been completed, processing returns to step S304 to repeat step S304 and subsequent steps. If it is determined in step S308 that the process of the application program has been completed, processing ends.

The selected sub-processor 43 performs the distributed processing corresponding to the application program performed by the main processor 42.

A power information management process of the master apparatus is described below with reference to the flowchart of FIG. 42.

In step S321, the power information acquisition unit 351 determines whether a timer interrupt has been issued from the interrupt controller 352.

If it is determined in step S321 that no timer interrupt has been issued, the power management information transmission and reception controller 358 determines in step S322 whether a power management table has been received from any of the information processing apparatuses 301 connected to the network 2. If it is determined in step S322 that no power management table has been received, processing returns to step S321 to repeat step S321 and subsequent steps. If it is determined in step S322 that a power management table has been received, processing proceeds to step S324.

If it is determined in step S321 that a timer interrupt has been received, the power information acquisition unit 351 acquires power measurement results from each power measurement unit 321 in step S323.

If it is determined in step S322 that a power management table has been received, or subsequent to step S323, the power information acquisition unit 351 updates, in step S324, the power management table 354 based on the power management table of the other information processing apparatus 301 received in step S322, or own power information acquired in step S323.

In step S325, the power rise detector 355 references the power management table 354 to determine whether a power anomaly is contained in the power information, in other words, whether any of the power detection results of all power measurement units 321 arranged in the information processing apparatuses 101 connected to the network 2 is above the predetermined power consumption upper limit. If it is determined in step S325 that no abnormal power value is contained in the power information, processing returns to step S321 to repeat step S321 and subsequent steps.

If it is determined in step S325 that an abnormal power value is contained in the power information, the power rise detector 355 notifies the interrupt controller 352 of the detection of an abnormal power consumption, thereby causing the interrupt controller 352 to interrupt the arithmetic processor 161 and the power anomaly correction controller 356 in step S326. The interrupt controller 352 interrupts the temperature anomaly correction controller 216 and the arithmetic processor 161, thereby causing the arithmetic processor 161 to stop the process of the application program and the power anomaly correction controller 356 to start an anomaly-time process 5.

The anomaly-time process 5 to be discussed later with reference to FIG. 43 is performed in step S327.

In step S328, the power anomaly correction controller 356 controls the logical thread management processor 357 in accordance with the anomaly-time process 5 executed in step S327, thereby causing the logical thread management processor 357 to update a table for thread management as necessary.

In step S329, the interrupt controller 352 releases the interrupt to the process of the application program controlled by the arithmetic processor 161, and processing returns to step S321 to repeat step S321 and subsequent steps.

The master information processing apparatus 301 acquires the power management table updated based on the power information obtained by each power measurement unit 321 arranged in each of all information processing apparatuses 301 connected to the network 2, and manages the table as the power management table 354. Whether to perform an anomaly-time interrupt process is thus determined based on the power management table 354 stored in the master information processing apparatus 301.

The anomaly-time process 5 executed in step S327 of FIG. 42 is described below with reference to a flowchart of FIG. 43.

In step S341, the logical thread management processor 357 references the power management table 354 to determine whether the process of all sub-processors 43 contained in the information processing controller 311 detected to be power anomaly is transferable. If it is determined in step S341 that the process of all sub-processors 43 contained in the information processing controller 311 detected to be power anomaly is not transferable, processing proceeds to step S346.

If it is determined in step S341 that the process of all sub-processors 43 contained in the information processing controller 311 detected to be power anomaly is transferable, the power anomaly correction controller 356 references the power management table 354 in step S342. In step S342, the power anomaly correction controller 356 selects an information processing controller 311 as a transfer target from among the information processing controllers 311 of the information processing apparatuses 301 connected to the network 2, and notifies the logical thread management processor 357 of the selection results. More specifically, by referencing the power management table 354, the power anomaly correction controller 356 selects, an information processing controller 311 able to execute the process of the sub-processor 43 in operation and consuming the lowest power from among the information processing controllers 311 in the information processing apparatuses 301 connected to the network 2. If a plurality of information processing controllers 311 satisfying the criteria are available, the power anomaly correction controller 356 may select one having the lowest processor ID number. Alternatively, in the selection, the power anomaly correction controller 356 may place a higher priority on an information processing controller 311 in the other information processing apparatus 301 operating from the AC power than on an information processing controller 311 in the other information processing apparatus 301 operating from the rechargeable battery or the dry battery.

The logical thread management processor 357 in the main processor 42 in the information processing controller 311 selected as a transfer target determines which sub-processors 43 to assign the distributed processing to.

In step S343, the logical thread management processor 357 evacuates the context of the process of the information processing controller 311 consuming power above the power consumption upper limit.

If the information processing controller 311 operating at power above the power consumption upper limit is in a master apparatus, the interrupt controller 185 receives an interrupt command instructing the evacuation of the context of the current process, and stops the process of the arithmetic processor 181. The thread transfer and interchange processor 186 evacuates the context of the currently running program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42).

If the information processing controller 311 detected to be operating at power above the power consumption upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 as the transfer target pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42) in the information processing apparatus 101 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42) in the information processing apparatus 101 functioning as the master apparatus via the bus 41, the bus 14, the communication unit 16 and the network 2.

In step S344, the logical thread management processor 357 stops the operation of the sub-processor 43 of the information processing controller 311 detected to be operating at power above the power consumption upper limit.

In step S345, the logical thread management processor 357 restores the context, evacuated in step S343, to the sub-processor 43 selected as a transfer target sub-processor. More specifically, if the transfer target sub-processor 43 is the one in the master apparatus, the logical thread management processor 357 supplies the context stored in an information storage area managed by itself to the transfer target sub-processor 43 via the bus 41. If the transfer target sub-processor 43 is the one in the slave apparatus, the logical thread management processor 357 supplies the context stored in the information storage area managed itself to the transfer target sub-processor 43 contained in the information processing apparatus 301 functioning as the slave apparatus, via the bus 41, the bus 14, the communication unit 16 and the network 2. The sub-processor 43 selected as the transfer target sub-processor stores the supplied context in areas corresponding to the code area 187 through the stack area 19 0. Processing returns to step S327 and then proceeds to step S238 as shown in FIG. 42.

If it is determined in step S341 that the process of all sub-processors 43 contained in the information processing controller 311 detected to be in power consumption anomaly is not transferable, the power anomaly correction controller 356 references the power management table 354 in step S346. In step S346, the power anomaly correction controller 356 selects a sub-processor 43 in the information processing controller 311 as an interchange target from among the sub-processors 43 of the information processing controllers 311 of the information processing apparatuses 301 connected to the network 2, and notifies the logical thread management processor 357 of the selection results. More specifically, the power anomaly correction controller 356 selects, as an interchange target information processing controller 311 with priority, one operating at the lowest power consumption from among the information processing controllers 311 of the information processing apparatuses 301 connected to the network 2. Alternatively, in the selection, the power anomaly correction controller 356 may place a higher priority on an information processing controller 311 in the other information processing apparatus 301 operating from the AC power than an information processing controller 311 in the other information processing apparatus 301 operating from the rechargeable battery or the dry battery. If a plurality of information processing controller 311 satisfy the criteria, the power anomaly correction controller 356 selects an information processing controller 311 having the smallest processor ID number as an interchange target.

If any of the local storages 51 of the sub-processor 43 having no distributed processing assignment is supplied beforehand with the commonly used programs and model data required for the process, the information processing controller 311 with the local storage 51 of the sub-processor 43 having with the commonly used program and model data stored therewithin may be selected with priority.

The logical thread management processor 357 in the main processor 42 in the information processing controller 311 selected as the interchange target determines which sub-processors 43 to assign the distributed processing to.

In step S347, the logical thread management processor 357 evacuates the context of the process being executed by the sub-processor 43 in the information processing apparatus 301 detected to be operating at power above the power consumption upper limit.

If the information processing controller 311 detected to consume power above the power consumption upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange target pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42).

If the information processing controller 311 detected to consume power above the power consumption upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange target pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42) in the information processing apparatus 101 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42) in the information processing apparatus 301 functioning as the master apparatus via the bus 41, the bus 14, the communication unit 16 and the network 2.

In step S348, the logical thread management processor 357 stops the operation of the sub-processor 43 of the information processing controller 311 detected to be in power consumption anomaly.

In step S349, the logical thread management processor 357 evacuates the context of the process being executed by the sub-processor 43 in the information processing controller 311 selected as the interchange target.

If the information processing controller 311 selected as the interchange target is in a master apparatus, the interrupt controller 185 suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 in an interchange source pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42).

If the information processing controller 311 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange source pre-stores the commonly used program and model data, the thread transfer and interchange processor 186 transfers the content of the stack area 190 and the data area 189 to an information storage area managed by the logical thread management processor 357 (a portion of the storage area of the local storage 51 of the main processor 42) in the information processing apparatus 301 operating as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 357 (the portion of the storage area of the local storage 51 of the main processor 42) in the information processing apparatus 301 operating as the master apparatus via the bus 41, the bus 14, the communication unit 16 and the network 2.

In step S350, the logical thread management processor 357 stops the operation of the sub-processor 43 in the information processing controller 311 selected as an interchange target.

In step S351, the logical thread management processor 357 interchanges contexts between the context-evacuated sub-processors 43 of the information processing controllers 311 to restore the contexts there. More specifically, the logical thread management processor 357 restores the context, evacuated in step S347, to the sub-processor 43 of the information processing controller 311 selected as the interchange target of the process while restoring the context, evacuated in step S349, to the sub-processor 43 of the information processing controller 311 detected to consume power above the power consumption upper limit. If the information processing controller 311 detected to consume power above the power consumption upper limit or the interchange target information processing controller 311 is the one in the master apparatus, the logical thread management processor 357 supplies the corresponding context stored in the information storage area managed by itself to the interchange target sub-processor 43 in the interchange target via the bus 41. If the information processing controller 311 detected to consume power above the power consumption upper limit or the interchange target information processing controller 311 is the one in the slave apparatus, the logical thread management processor 357 supplies the corresponding context stored in the information storage area managed by itself to the sub-processor 43 in the information processing controller 311 as the interchange target contained in the information processing apparatus 301 operating as the slave apparatus via the bus 41, the bus 14, the communication unit 16 and the network 2. Each sub-processor 43 in the two information processing controllers 311 stores the supplied context in corresponding areas of the code area 187 through the stack area 190. Processing returns to step S327 and then proceeds to step S328 of FIG. 42.

In this way, whether to suspend the process, whether to transfer part of the distributed processing, or whether to interchange part of the distributed processing is determined depending on the location of the power consumption anomaly, the operation of the information processing controller 311 in the information processing apparatus 301 connected to the network 2, and the power measurement values of the processors. One of the transfer target and the interchange target is also determined.

Figure 44:
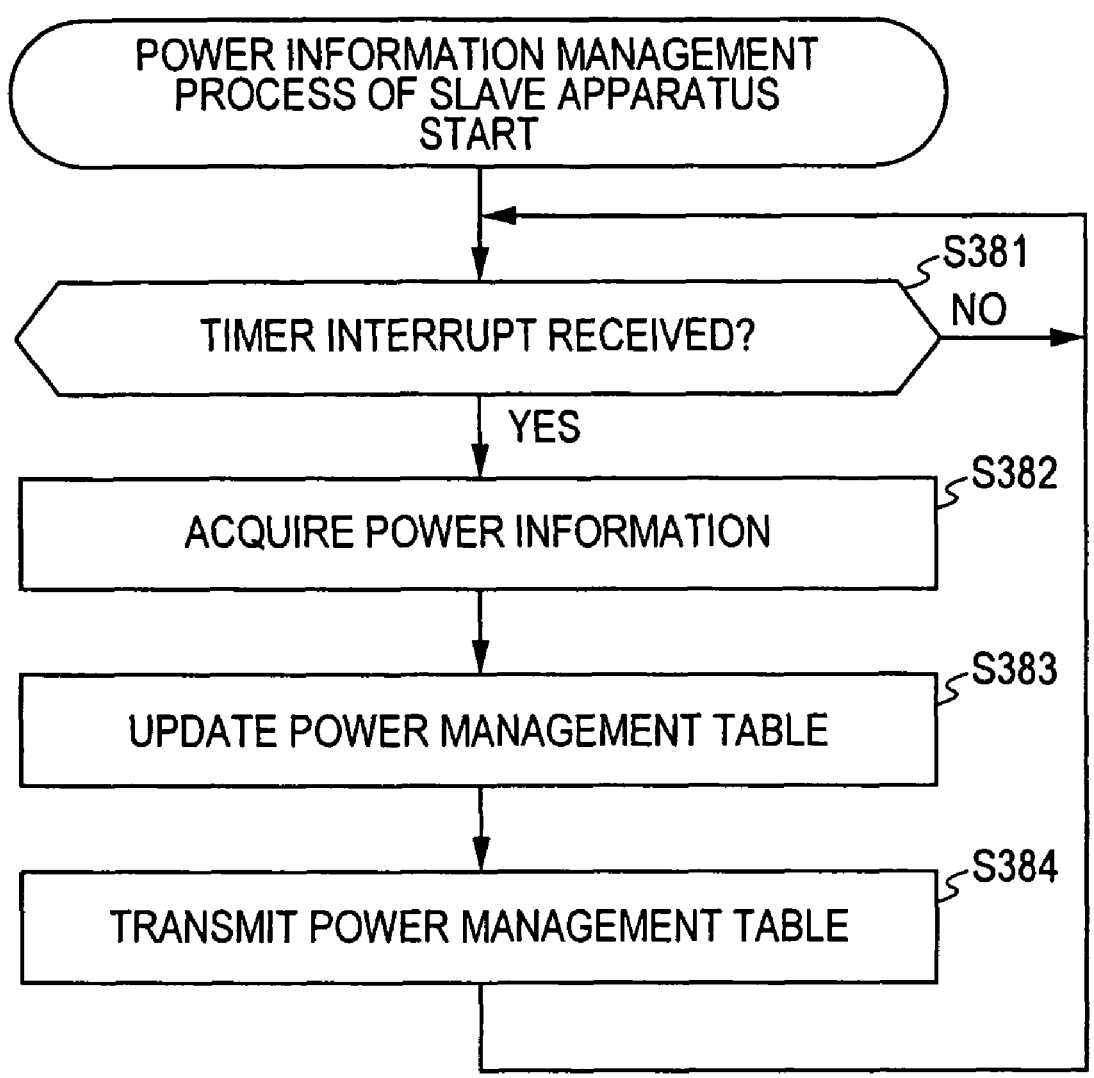
FIG. 44 is a flowchart illustrating a power information management process of a slave apparatus.

A power information management process of the slave apparatus executed in parallel with the power information management process of the master apparatus discussed with reference to FIG. 42 is described below with reference to a flowchart of FIG. 44.

In step S381, the power information acquisition unit 351 in the information processing apparatus 301 functioning as a slave apparatus determines whether a timer interrupt has been input from the interrupt controller 352. If it is determined in step S381 that no timer interrupt has been input, the process in step S381 is repeated until it is determined that a timer interrupt has been input.

If it is determined in step S381 that a timer interrupt has been input, the power information acquisition unit 351 acquires the power information from each of the power measurement units 321 in step S382.

In step S383, the power information acquisition unit 351 updates the power management table 354 based on the power information acquired in step S382.

In step S384, the power management information transmission and reception controller 358 transmits the power management table 354, updated in step S383, to the information processing apparatus 301 functioning as the master apparatus via the communication unit 16 and the network 2. Processing returns to step S381 to repeat step S381 and subsequent steps.

The power management table of the slave apparatus is transmitted to the master apparatus. The transmitted power management table of the slave apparatus is managed by the master apparatus.

In accordance with the third embodiment of the present invention, the plurality of information processing apparatuses 301 connected to the network 2, each having the power measurement unit 321 arranged to measure power consumption of the information processing controller 311, perform the process as discussed with reference to FIGS. 41-44. With the first pattern control of the temperature information and the transfer or interchange of the process, device failure or lowered processing speed due to heat is prevented while the suspension of the process in the middle thereof is minimized.

Figure 45:
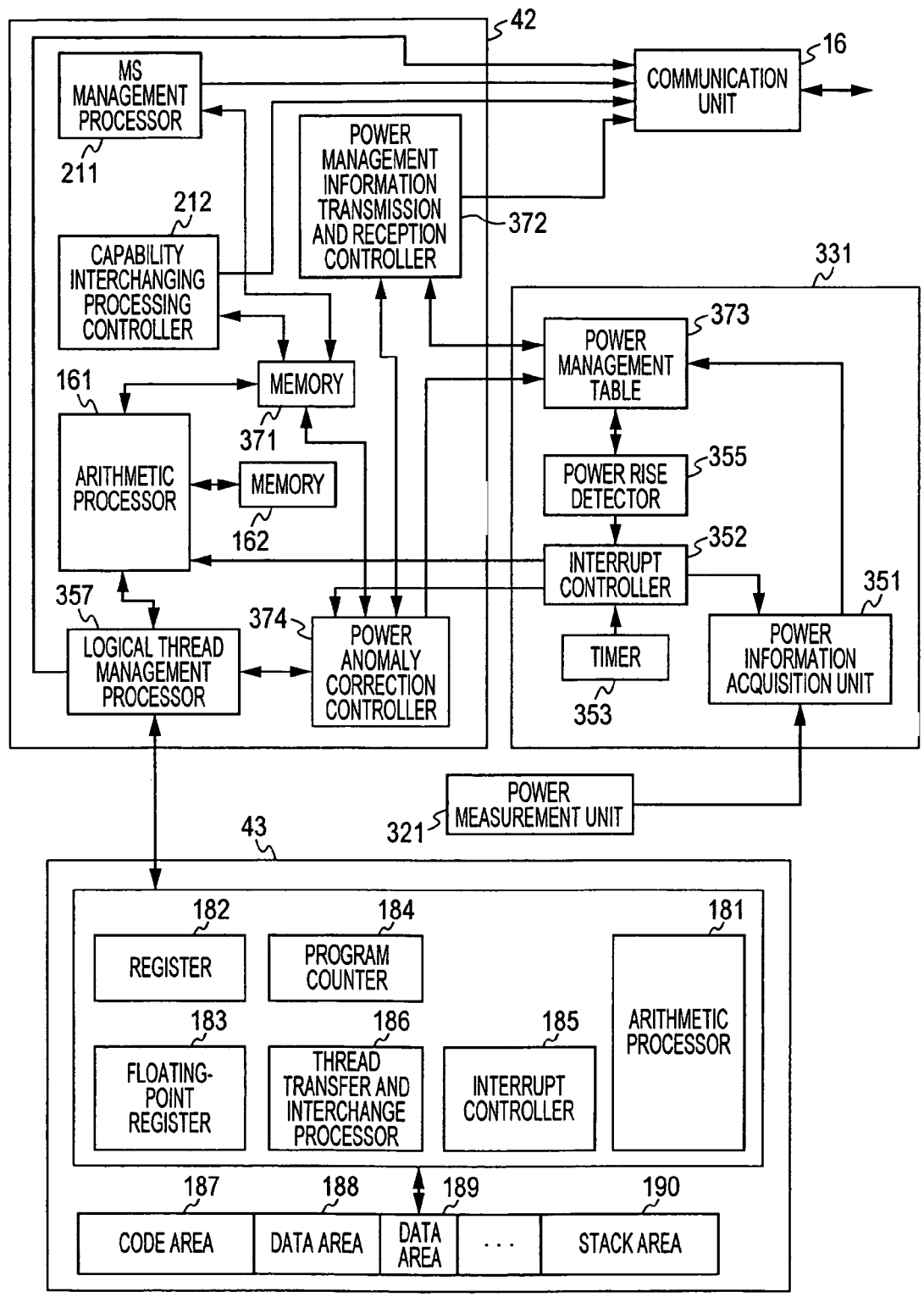
FIG. 45 is a functional block diagram illustrating the function performed by the information processing controller of FIG. 35 in the second pattern.

FIG. 45 is a functional block diagram illustrating the information processing controller 311 that performs control in the second pattern in accordance with the third embodiment of the present invention. Elements identical to those discussed with reference to FIG. 38 are designated with the same reference numerals, and the discussion thereof is omitted as appropriate. In the information processing controller 311 of FIG. 45 performing the second pattern control in accordance with the third embodiment of the present invention, a memory 371, a power management information transmission and reception controller 372, and a power anomaly correction controller 374 are used in place of the memory 213, the power management information transmission and reception controller 358, and the power anomaly correction controller 356, respectively. The rest of the main processor 42 is identical to the main processor 42 of FIG. 38. The power management processor 331 uses a power management table 373 in place of the power management table 354. The rest of the power management processor 331 is identical to the power management processor 331 of FIG. 38.

Figure 41:
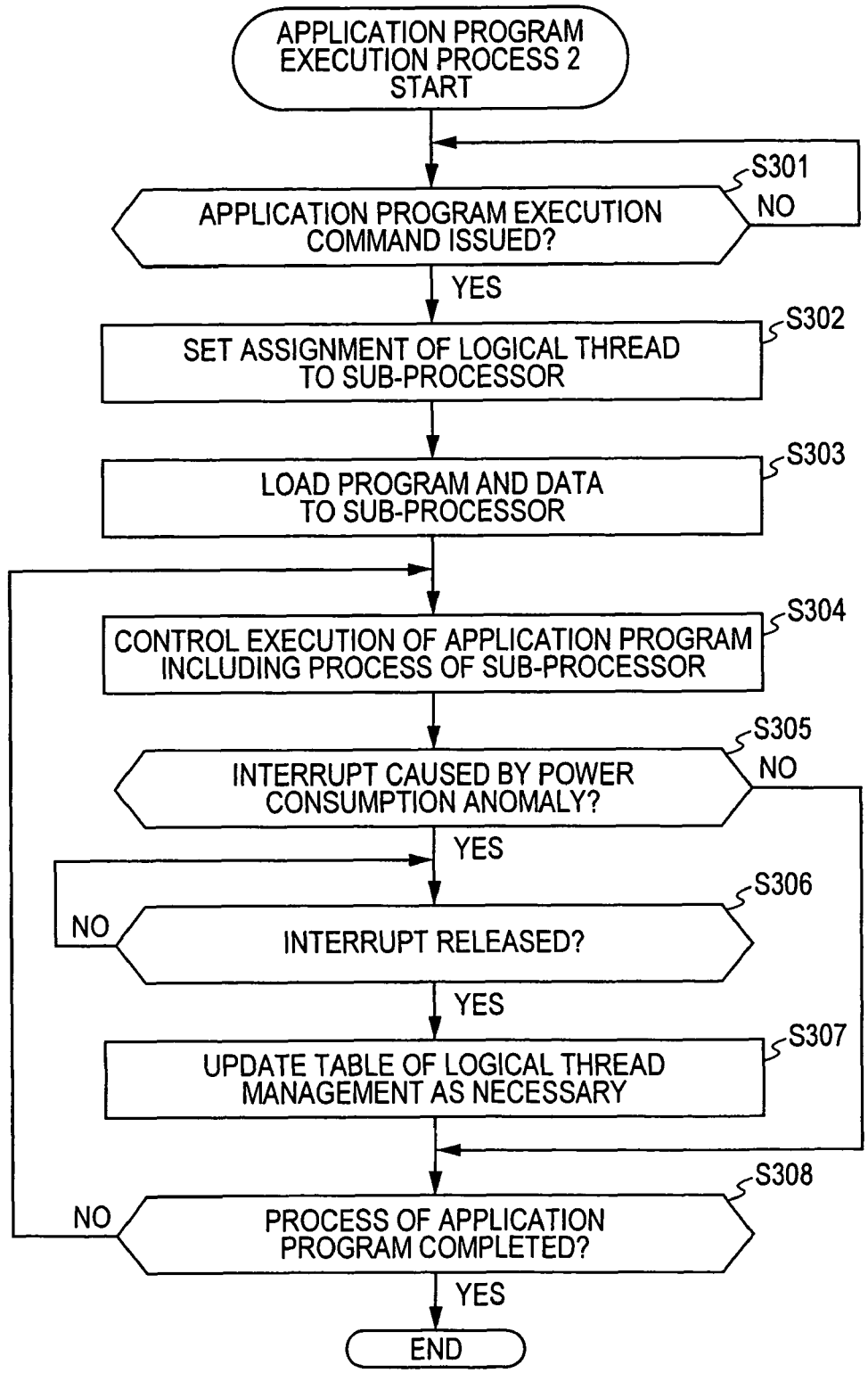
FIG. 41 is a flowchart illustrating an application program execution process 2.

Hardware performing the above function may be different from the above-referenced structure of FIG. 41. For example, part of the function of the main processor 42 may be carried out by the power management processor 331, part of the function of the power management processor 331 may be performed by the main processor 42, or these functions may be performed by different hardware. Even in such a case, the present invention is perfectly applicable.

The memory 371 corresponds to at least part of the storage area of the main memory 12, stores at least part of the device information of the information processing apparatus 301 connected to the network 2 while storing temporarily the power management table of another information processing apparatus 301 received by the power management information transmission and reception controller 372. Under the control of the power anomaly correction controller 374, the power management information transmission and reception controller 372 controls transmitting, via the 16, the power management information or a variety of commands (software cell) generated for power management to the other information processing apparatus 301 connected to the network 2. The power management information transmission and reception controller 372 also controls receiving, via the communication unit 16, the power management information or a variety of commands (software cell) for power management from the other information processing apparatus 301 connected to the network 2.

If the power rise detector 355 detects the occurrence of a power anomaly in the information acquired by own power information acquisition unit 351, followed by an interrupt process of the interrupt controller 352, the power anomaly correction controller 374 generates a command requesting all other information processing apparatuses 301 connected to the network 2 to transmit the power management information. The power anomaly correction controller 374 controls the power management information transmission and reception controller 372 to transmit the generated command. If the power management information transmission and reception controller 372 receives, from another information processing apparatus 301 connected to the network 2, a command requesting the transmission of the power management information, the power anomaly correction controller 374 generates a power information reply command of FIG. 39 based on the information held in the power management table 373, and controls the power management information transmission and reception controller 372 to transmit the generated power information reply command.

Regardless of whether own apparatus is a master apparatus or a slave apparatus, the power management table 373 stores own temperature management table information updated based on the information acquired from own power information acquisition unit 351.

The second pattern operation of the third embodiment is described below with reference to flowcharts of FIGS. 46 and 47. In accordance with the third embodiment, the application program execution process in the second pattern is basically identical to the application program execution process in the first pattern discussed with reference to FIG. 41, and the discussion thereof is omitted herein.

A power information management process 2 is described below with reference to a flowchart of FIG. 46.

In step S401, the interrupt controller 352 determines whether a timer interrupt has been input from the interrupt controller 352. If it is determined in step S401 that a timer interrupt has not been received, the step in step S401 is repeated until it is determined that a timer interrupt has been input.

If it is determined in step S401 that a timer interrupt has been input, a process substantially identical to that performed in steps S323 through S325 of FIG. 42 is performed in steps S402 through S404. More specifically, if it is determined that a timer interrupt has been input, the power information acquisition unit 351 acquires power information from each of the power measurement unit 321, and updates the power management table 373. The power rise detector 355 references the power management table 373 to determine whether an abnormal value is contained in the power information.

If it is determined in step S404 that no abnormal value is contained in the power information, the power anomaly correction controller 374 determines in step S405 whether the power management information transmission and reception controller 372 has received, from another information processing apparatus 301 connected to the network 2, a command requesting the transmission of the power management information. If it is determined in step S405 that the power management information transmission and reception controller 372 has not received, from the other information processing apparatus 301 connected to the network 2, a command requesting the transmission of the power management information, processing returns to step S401 to repeat step S401 and subsequent steps.

Figure 39:
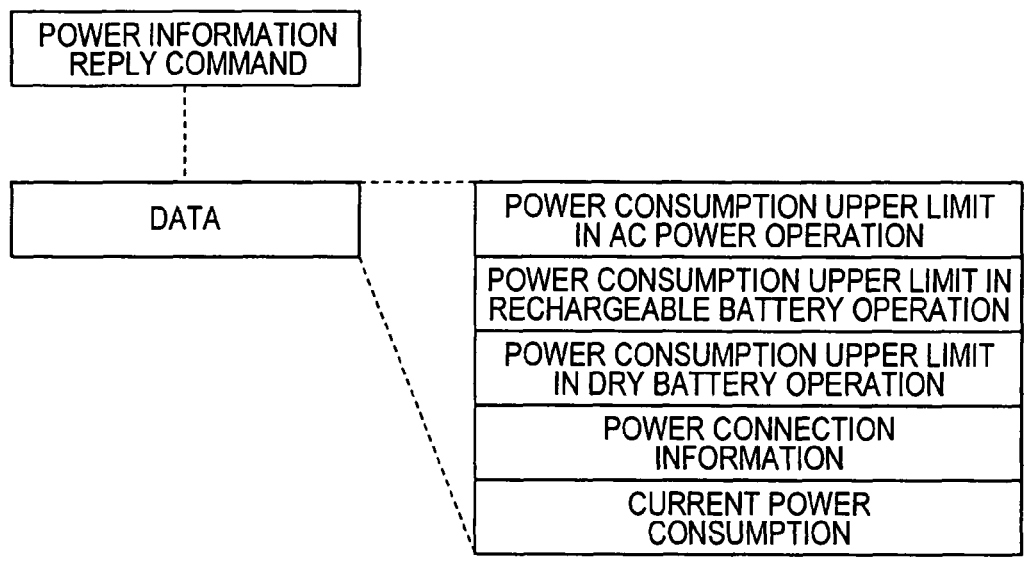
FIG. 39 illustrates a power information reply command.

If it is determined in step S405 that a command requesting the transmission of the power management information has been received from the other information processing apparatus 301, the power anomaly correction controller 374 generates the power information reply command of FIG. 39 based on the power management table information stored in the power management table 373 in step S406. The power anomaly correction controller 374 controls the power management information transmission and reception controller 372 to transmit the generated power information reply command. Processing returns to step S401 to repeat step S401 and subsequent steps.

If it is determined in step S404 that an abnormal value is contained in the power information, the power rise detector 355 notifies the interrupt controller 352 of the detection of the abnormal power consumption rise, thereby causing the interrupt controller 352 to interrupt the arithmetic processor 161 and the power anomaly correction controller 374 in step S407. The interrupt controller 352 interrupts the arithmetic processor 161 and the power anomaly correction controller 374, thereby stopping the process of the application program controlled by the arithmetic processor 161 and causing the power anomaly correction controller 374 to start an anomaly-time process 6.

The anomaly-time process 6 to be discussed later with reference to FIG. 47 is executed in step S408.

In step S409, the power anomaly correction controller 374 controls the logical thread management processor 357 based on the anomaly-time process 6 executed in step S408, thereby updating the table of the logical thread management as necessary.

In step S410, the interrupt controller 352 releases the interrupt to the process of the application program controlled by the arithmetic processor 161, and processing returns to step S401 to repeat step S401 and subsequent steps.

Regardless of whether each information processing apparatus 301 connected to the network 2 is a master apparatus or a slave apparatus, a power consumption anomaly of own apparatus is detected based on the power management table updated based on the power information detected by own power measurement unit 321. In the event of the anomaly, the interrupt process is performed and the anomaly-time process 6 to be discussed later is performed. If the request to transmit the power information is received from the other information processing apparatus 301 connected to the network 2, the power information reply command of FIG. 39 is generated, and then transmitted to the requesting information processing apparatus 301.

The anomaly-time process 6 executed in step S408 of FIG. 46 is described below with reference to a flowchart of FIG. 47.

In step S431, the power anomaly correction controller 374 generates a command requesting all other information processing apparatuses 301 connected to the network 2 to transmit the power management information, and controls the power management information transmission and reception controller 372 to transmit the generated command. The power management information transmission and reception controller 372 transmits the command requesting the transmission of the power management information to all other information processing apparatuses 301 connected to the network 2 via the communication unit 16 and the network 2.

In step S432, the power management information transmission and reception controller 372 receives the power information reply command of FIG. 39 and supplies the power anomaly correction controller 374 with the received command.

In step S433, the power anomaly correction controller 374 determines, based on the power information reply commands transmitted from all other information processing apparatuses 301 connected to the network 2, whether the process of the information processing apparatus 301 detected to be in power consumption anomaly is transferable.

If it is determined in step S433 that the process is transferable, a process basically identical to that performed in steps S342 through S345 of FIG. 43 is performed in steps S434 through S437. More specifically, the power management table 373 is referenced, an information processing controller 311 is selected as a transfer target from among the information processing controllers 311 in the information processing apparatuses 301 connected to the network 2, the context of the process being executed by the sub-processor 43 of the information processing controller 311 detected to consume power above the power consumption upper limit is evacuated, the operation of the sub-processor 43 of the information processing controller 311 detected to consume power above the power consumption upper limit is stopped, and the evacuated context is restored back to the sub-processor 43 of the information processing controller 311 as the transfer target.

Subsequent to step S437, processing returns to step S408 and proceeds to step S409 of FIG. 46.

If it is determined in step S433 that the process is not transferable, a process basically identical to that performed in steps S346 through S351 of FIG. 43 is performed in steps S438 through S443. More specifically, the power management table 373 is referenced, an information processing controller 311 is selected as an interchange target from among the information processing controllers 311 in the information processing apparatuses 301 connected to the network 2, the context of the process being executed by the information processing controller 311 detected to consume power above the power consumption upper limit is evacuated, and the operation of the sub-processor 43 of the information processing controller 311 detected to consume power above the power consumption upper limit is stopped.

The context of the process being executed by the sub-processor 43 of the information processing controller 311 selected as the interchange target of the process is evacuated, the operation of the sub-processor 43 of the information processing controller 311 selected as the interchange target of the process is stopped, and the contexts of the sub-processors 43 of the two information processing controllers 311 are interchanged for restoration.

Subsequent to step S443, processing returns to step S408 and proceeds to step S409 of FIG. 46.

If a power anomaly occurs in one information processing controller 311, information relating to the operation of the information processing controllers 311 connected to the network 2 and the power consumption of the processors in the information processing controllers 311 is acquired. Whether to suspend the process, whether to transfer part of the distributed processing, or whether to interchange part of the distributed processing is determined based on the acquired information. One of the transfer target and the interchange target is also determined.

In accordance with the third embodiment of the present invention, the plurality of information processing apparatuses 401 connected to the network 2, each having the information processing controller 311 with the power measurement unit 312, perform the process as discussed with reference to FIGS. 45-47. With the second pattern control of the power information and the transfer or interchange of the process, device failure or lowered processing speed due to heat is prevented.

Figure 48:
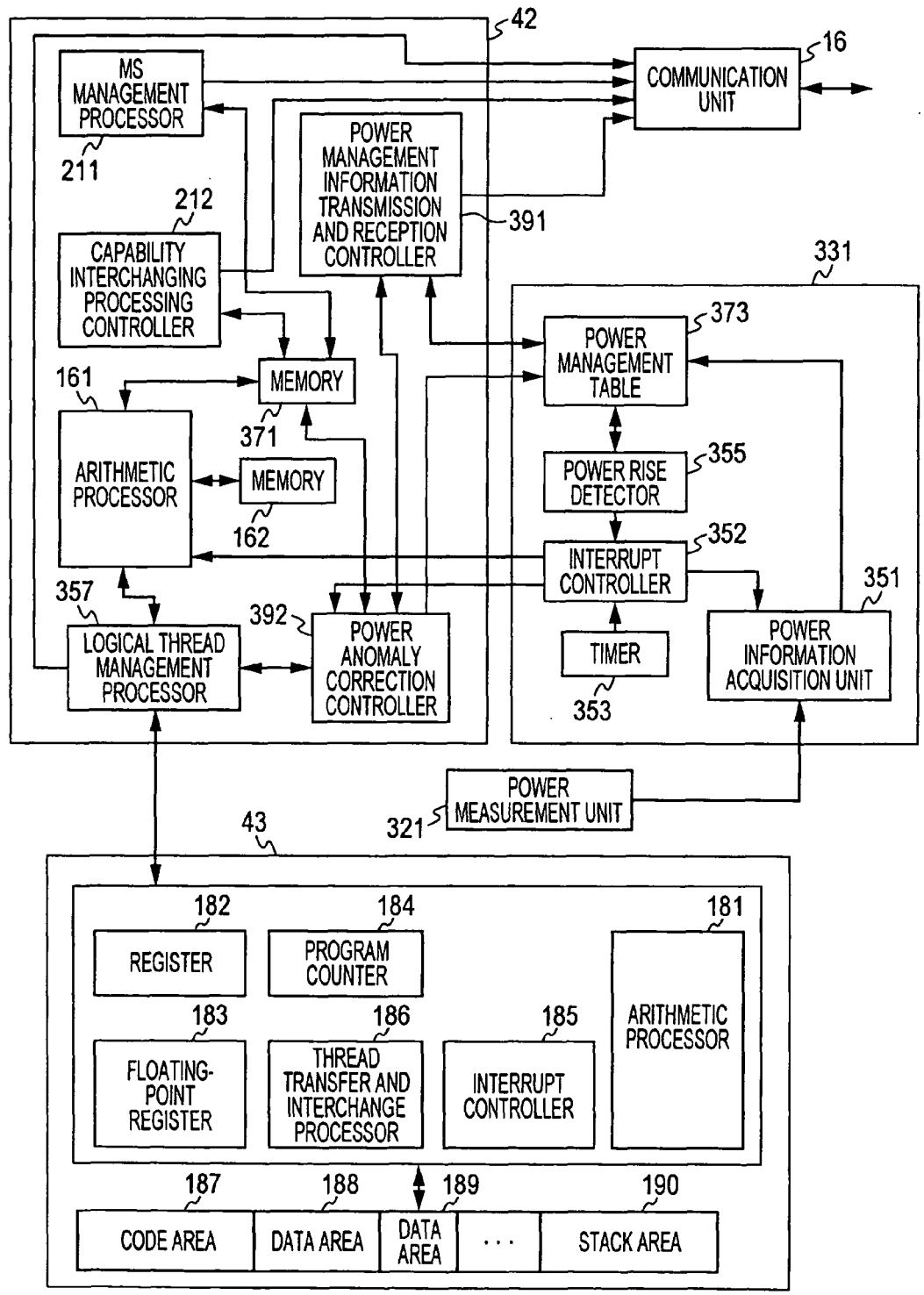
FIG. 48 is a functional block diagram illustrating the function performed by the information processing controller of FIG. 35 in the third pattern.

FIG. 48 is a functional block diagram illustrating the information processing controller 311 that performs control in the third pattern in accordance with the third embodiment of the present invention. Elements identical to those discussed with reference to FIG. 38 are designated with the same reference numerals, and the discussion thereof is omitted as appropriate. In the information processing controller 311 of FIG. 48 performing the third pattern control in accordance with the third embodiment of the present invention, a power management information transmission and reception controller 391 and a power anomaly correction controller 392 are used in place of the power management information transmission and reception controller 358 and the power anomaly correction controller 356, respectively. The rest of the main processor 42 is identical to the main processor 42 of FIG. 38. The power management processor 331 uses the power management table 373, discussed with reference to FIG. 45, in place of the power management table 354. The rest of the power management processor 331 is identical to the power management processor 331 of FIG. 38.

Hardware performing the above function may be different from the above-referenced structure of FIG. 48. For example, part of the function of the main processor 42 may be carried out by the power management processor 331, part of the function of the power management processor 331 may be performed by the main processor 42, or these functions may be performed by different hardware. Even in such a case, the present invention is perfectly applicable.

Under the control of the power anomaly correction controller 392, the power management information transmission and reception controller 391 controls transmitting, via the 16, the power management information or a variety of commands (software cell) generated for power management to the other information processing apparatus 301 connected to the network 2. The power management information transmission and reception controller 391 also controls receiving, via the communication unit 16, the power management information or a variety of commands (software cell) for power management from the other information processing apparatus 301 connected to the network 2.

If the power rise detector 355 detects the occurrence of a power anomaly in the information acquired by own power information acquisition unit 351, the interrupt controller 352 performs an interrupt process. The power anomaly correction controller 392 generates a sub-processor program transfer command requesting all other information processing apparatuses 101 connected to the network 2 to transfer or interchange the process of the current logical thread of own sub-processor 43. The power anomaly correction controller 392 also controls the power management information transmission and reception controller 391 to transmit the generated command. When the power management information transmission and reception controller 391 receives, from the other information processing apparatus 301 connected to the network 2, a sub-processor program transfer request command, the power anomaly correction controller 392 generates a sub-processor program transfer reply command based on power management table information stored in the power management table 373. The power anomaly correction controller 392 controls the power management information transmission and reception controller 391 to transmit the generated sub-processor program transfer reply command.

The sub-processor program transfer request command contains information of a sub-processor usage ratio of the process (thread) being executed by the sub-processor 43 detected to be in power anomaly, and a local storage capacity of the sub-processor 43.

The sub-processor program transfer reply command contains information relating to whether to accept the transfer request of the sub-processor program (transfer OK, interchange OK, or transfer/interchange unpermissible), and a sub-processor ID if the corresponding sub-processor accepts the sub-processor program transfer request. The power anomaly correction controller 392 determines whether to accept the sub-processor program transfer request, whether to accept the sub-processor program interchange request, or whether to reject the two requests, based on in the information contained in the sub-processor transfer request command, namely, the sub-processor usage ratio of the sub-processor, detected to be in power anomaly, performing the process (thread), and the local storage capacity of the sub-processor, and the power management table stored in the power management table 373.

Regardless of whether own apparatus is a master apparatus or a slave apparatus, the power management table 373 holds own power management table information updated based on the information acquired by own power information acquisition unit 351.

The operation of the third pattern of the third embodiment is described below with reference to flowcharts of FIGS. 49 and 50. In accordance with the third embodiment of the present invention, the application program execution process of the third pattern is basically identical to the application program execution process of the first pattern discussed with reference to FIG. 41, and the discussion thereof is omitted herein.

A power information management process 3 is described below with reference to a flowchart of FIG. 49.

A process substantially identical to that performed in steps S401 through S404 of FIG. 46 is performed in steps S461 through S464 of FIG. 46. More specifically, if it is determined that a timer interrupt has been received, the power information acquisition unit 351 acquires power information from each of the power measurement unit 321, and updates the power management table 373. The power rise detector 355 references the power management table 373 to determine whether an abnormal value is contained in the power information.

If it is determined in step S464 that no abnormal value is contained in the power information, the power anomaly correction controller 392 determines in step S465 whether the power management information transmission and reception controller 391 has received, from another information processing apparatus 301 connected to the network 2, a sub-processor program transfer request command. If it is determined in step S465 that the power management information transmission and reception controller 391 has not received, from the other information processing apparatus 301, the sub-processor program transfer request command, processing returns to step S461 to repeat step S461 and subsequent steps.

If it is determined in step S465 that the sub-processor program transfer request has been received from the other information processing apparatus 301, the power anomaly correction controller 392 determines whether to accept the sub-processor program transfer request. This determination is performed based on the sub-processor usage ratio of the sub-processor detected to be in power anomaly and performing the process (thread) thereof, information of the local storage capacity of the sub-processor detected to be power anomaly, described in the sub-processor program transfer request command, and information regarding the operation states of the sub-processor 43-1 through the sub-processor 43-8 of own apparatus stored in the power management table 373. The power anomaly correction controller 392 generates the power information reply command, and controls the power management information transmission and reception controller 391 to transmit the generated power information reply command. Processing returns to step S461 to repeat step S461 and subsequent steps.

If it is determined in step S464 that an abnormal value is contained in the power information, the power rise detector 355 notifies, in step S467, the interrupt controller 352 of the detection of the abnormal power consumption rise, thereby causing the interrupt controller 352 to interrupt the arithmetic processor 161 and the power anomaly correction controller 392. The interrupt controller 352 interrupts the arithmetic processor 161 and the power anomaly correction controller 392, thereby stopping the process of the application program controlled by the arithmetic processor 161 and causing the power anomaly correction controller 392 to start an anomaly-time process 7.

The anomaly-time process 7 to be discussed later with reference to FIG. 50 is executed in step S468.

In step S469, the interrupt controller 352 controls the logical thread management processor 357 based on the anomaly-time process 7 executed in step S368, thereby updating the table of the logical thread management as necessary.

In step S470, the interrupt controller 352 releases the interrupt to the process of the application program controlled by the arithmetic processor 161, and processing returns to step S461 to repeat step S461 and subsequent steps.

Regardless of whether each information processing apparatus 301 connected to the network 2 is a master apparatus or a slave apparatus, a power anomaly of own apparatus is detected based on the power management table updated based on the power information detected by own power measurement unit 321. In the event of the anomaly, the interrupt process is performed and the anomaly-time process 7 to be discussed later is performed. If the sub-processor program transfer request command is received from the other information processing apparatus 301 connected to the network 2, a sub-processor program transfer reply command is generated, and then transmitted to the requesting information processing apparatus 301.

The anomaly-time process 7 executed in step S468 of FIG. 49 is described below with reference to a flowchart of FIG. 50.

In step S481, the power anomaly correction controller 392 references the power management table 373 to generate the sub-processor program transfer request command. The power anomaly correction controller 392 controls the power management information transmission and reception controller 391 to transmit the generated command to all other information processing apparatuses 301 connected to the network 2. The power management information transmission and reception controller 391 transmits, via the communication unit 16 and the network 2, the generated command to all other information processing apparatuses 301 connected to the network 2.

In step S482, the power management information transmission and reception controller 391 receives the sub-processor program transfer reply command and supplies the power anomaly correction controller 392 with the sub-processor program transfer reply command.

In step S483, the power anomaly correction controller 392 determines, based on the sub-processor program transfer reply command received in step S482, whether the process of the sub-processor 43 detected to be in power anomaly is transferable.

If it is determined in step S483 that the process is transferable, a process basically identical to that performed in steps S434 through S437 of FIG. 47 is performed in steps S484 through S487. More specifically, the power management table 373 is referenced, an information processing controller 311 is selected as transfer target from among the information processing controllers 111 in the information processing apparatuses 301 connected to the network 2, the context of the process being executed by the sub-processor 43 of the information processing controller 311 detected to consume power above the power consumption upper limit is evacuated, the operation of the sub-processor 43 of the information processing controller 311 detected to consume power above the power consumption upper limit is stopped, and the evacuated context is restored back to the target sub-processor 43 of the information processing controller 311 as the transfer target.

Subsequent to step S487, processing returns to step S468 and proceeds to step S469 of FIG. 49.

If it is determined in step S483 that the process is not transferable, a process basically identical to that performed in steps S438 through S443 of FIG. 47 is performed in steps S488 through S493. More specifically, the power management table 373 is referenced, a information processing controller 311 is selected as an interchange target from among the information processing controllers 311 in the information processing apparatuses 301 connected to the network 2, the context of the process executed by the information processing controller 311 detected to consume power above the power consumption upper limit is evacuated, and the operation of the sub-processor 43 of the information processing controller 311 detected to consume power above the power consumption upper limit is stopped.

The context of the process being executed by the sub-processor 43 of the information processing controller 311 selected as the interchange target is evacuated, the operation of the sub-processor 43 of the information processing controller 311 selected as the interchange target is stopped, and the contexts of the two sub-processors 43 are interchanged for restoration.

Subsequent to step S493, processing returns to step S468 and proceeds to step S469 of FIG. 49.

In this way, if the information processing controller 311 is detected to be power anomaly, the sub-processor program transfer request command is transmitted, and the reply command is received. Based on the reply command, the transfer target or the interchange target of the process is selected.

In accordance with the third embodiment of the present invention, the plurality of information processing apparatuses 301 connected to the network 2, each having the information processing controller 311 with the power measurement unit 321, perform the process as discussed with reference to FIGS. 48-50. With the third pattern control of the temperature information and the transfer or interchange of the process, device failure or lowered processing speed due to heat is prevented while the suspension of the process in the middle thereof is minimized.

Figure 51:
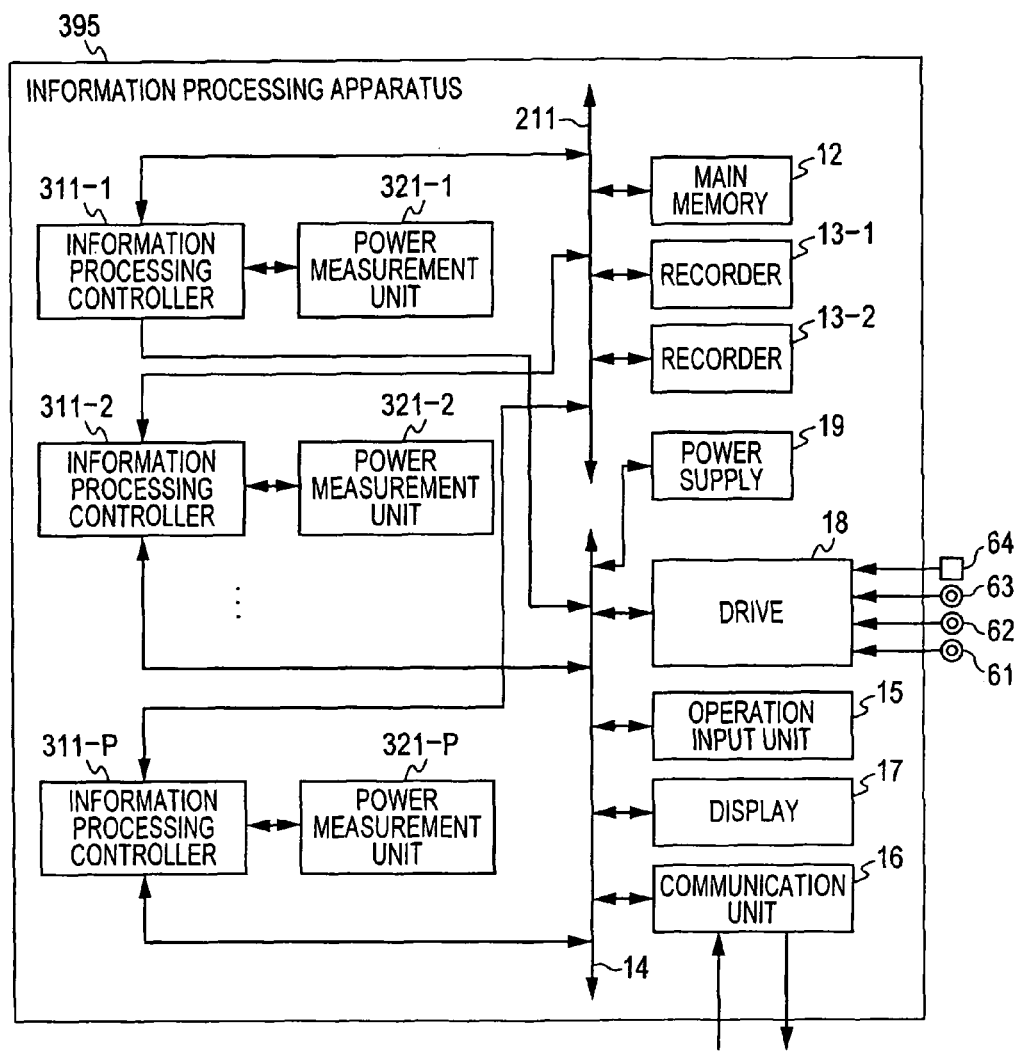
FIG. 51 illustrates the structure of an information processing apparatus including a plurality of information processing controllers in accordance with one embodiment of the present invention.

An information processing apparatus 395, including a plurality of information processing controllers 311-1 through 311-p (p is a positive integer) as shown in FIG. 51, transmits and receive, via the bus 14, a variety of pieces of information, as in the second embodiment where the variety of pieces of information is transmitted and received by the plurality of information processing controllers 111 via the communication unit 16 and the network 2. The present invention is also applicable to such an arrangement.

One of the information processing controllers 311-1 through 311-p in the information processing apparatus 395 functions as a master controller in the information processing apparatus 395, and the other information processing controllers 311 function as slave controllers. Each of the first through third patterns of the third embodiment is equally applicable. A power anomaly is detected in any of the information processing controllers 311-1 through 311-p. In this way, whether to suspend the process, whether to transfer part of the distributed processing, or whether to interchange part of the distributed processing is determined depending on the operation of the information processing controllers 311 connected to the bus 14 and the temperature measurement results of the processors. One of the transfer target and the interchange target is thus selected.

Figure 52:
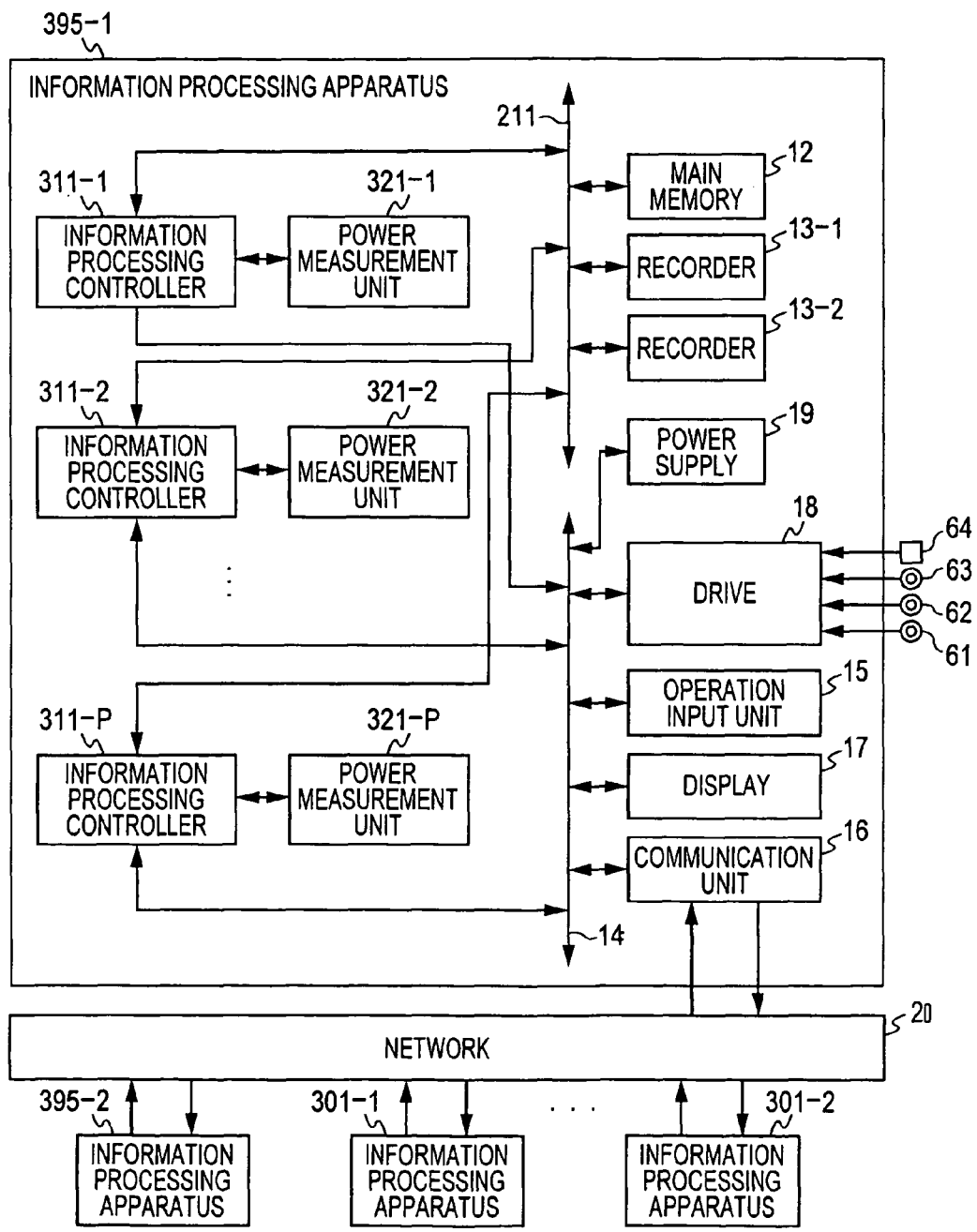
FIG. 52 illustrates an information processing apparatus, connected to a network, including a plurality of information processing controllers in accordance with one embodiment of the present invention.

Information processing apparatuses 395-1 and 395-2, each having the same structure as the information processing apparatus 395 discussed with reference to FIG. 51, can be connected to the network 2 as shown in FIG. 52. The plurality of information processing apparatuses 301 (such as the information processing apparatuses 301-1 and 301-2 as shown in FIG. 52) can also be connected to the network 2. A power anomaly may be detected in any of the information processing controllers 311-1 through 311-p in the information processing apparatus 395-1, and neither transfer target nor interchange target may be found in each of the information processing controllers 311 connected to the bus 14. In such a case, one of the first through third patterns of the third embodiment is used. A transfer target or an interchange target may be selected from the information processing apparatus 395-2 and the information processing controller 311 contained in the plurality of information processing apparatuses 301, each apparatus connected to via the connected to the network 2. If the other conditions are the same, a higher priority may be placed in the selection of the transfer target or the interchange target on the other information processing apparatus 395-2 or the other information processing apparatus 301 operating from the AC power source than those operating from the rechargeable battery power or the dry battery power.

The information processing controller of one embodiment of the present invention can be implemented as a one-chip integrated circuit containing a plurality of sub-processors. A temperature detector using a temperature sensor can be arranged at each of the main processor and the sub-processor. Using the temperature detector, the main processor and the sub-processor are controlled to operate within a normal operating temperature range. Power consumed by the information processing controller is also monitored so that a single information processing controller may not consume an excessive amount of power. With this arrangement, device degradation is controlled, and highly reliable information processing controller and information processing apparatus are provided. In the information processing controller in accordance with one embodiment of the present invention, a process is transferred or interchanged between sub-processors of at least one information processing apparatus in response to a temperature rise or an increase in power consumption. Device failure and lowered processing speed due to heat are thus prevented.

An information processing controller of an information processing apparatus of one embodiment of the present invention is described below with reference to FIGS. 53 through 60. The information processing controller of the embodiment performs distributed processing in response to a temperature rise and an increase in power consumption of processors.

Figure 53:
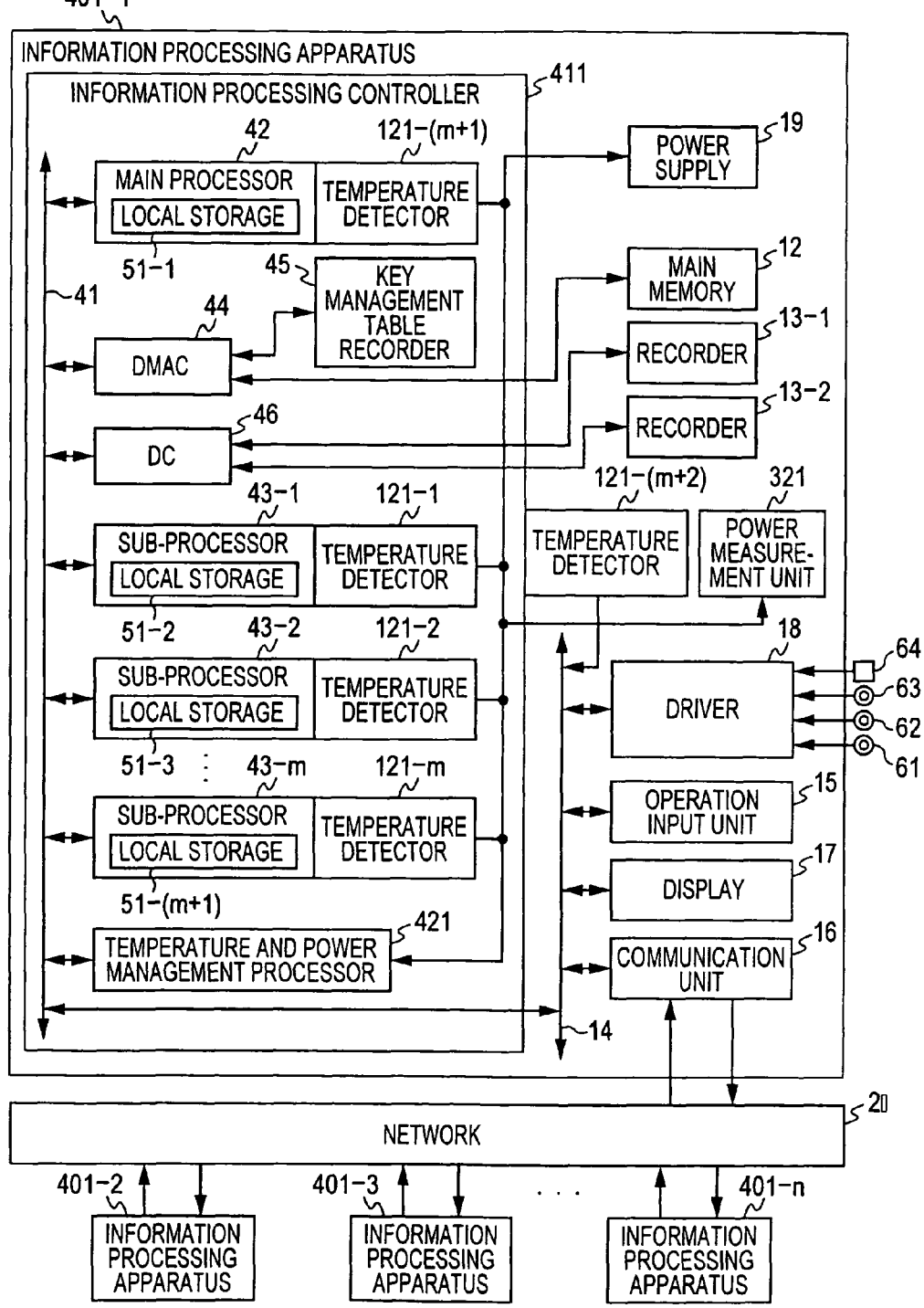
FIG. 53 illustrates the structure of an information processing controller in accordance with one embodiment of the present invention.

FIG. 53 is a block diagram of an information processing apparatus 401-1. The information processing apparatus 401-1 includes temperature detectors 121-1 through 121-m measuring temperature of sub-processors 43-1 through 43-m and a power measurement unit 321 measuring power consumed by the information processing controller 411. The information processing controller 411 monitors the state of a power supply 19. The information processing controller 411 includes a temperature and power management processor 421.

As shown in FIG. 53, elements identical to those described with reference to FIG. 1 are designated with the same reference numerals, and the discussion thereof is omitted herein as appropriate. The information processing apparatus 401-1 of FIG. 53 includes the information processing controller 411 in place of the information processing controller 11 of FIG. 1. The information processing controller 411 includes the temperature detectors 121-1 through 121-m measuring temperatures of the sub-processors 43-1 through 43-m, a temperature detector 121-(m+1) measuring temperature of the main processor 42, and the temperature and power management processor 421 monitoring the sate of the power supply 19 and acquiring measurement results of the power measurement unit 321. The power measurement unit 321 measures power consumed by the one-chip information processing controller 411. The rest of the information processing controller 411 remains unchanged from the information processing apparatus 1 discussed with reference to FIG. 1.

The information processing apparatuses 401-2 through 401-n connected to the network 2 are similar to the information processing apparatus 401-1 in structure, and the discussion of the structure thereof is thus omitted herein. If it is not necessary to discriminate one from another among the information processing apparatuses 401-1 through 401-n, each information processing apparatus is simply referred to as 401.

Figure 54:
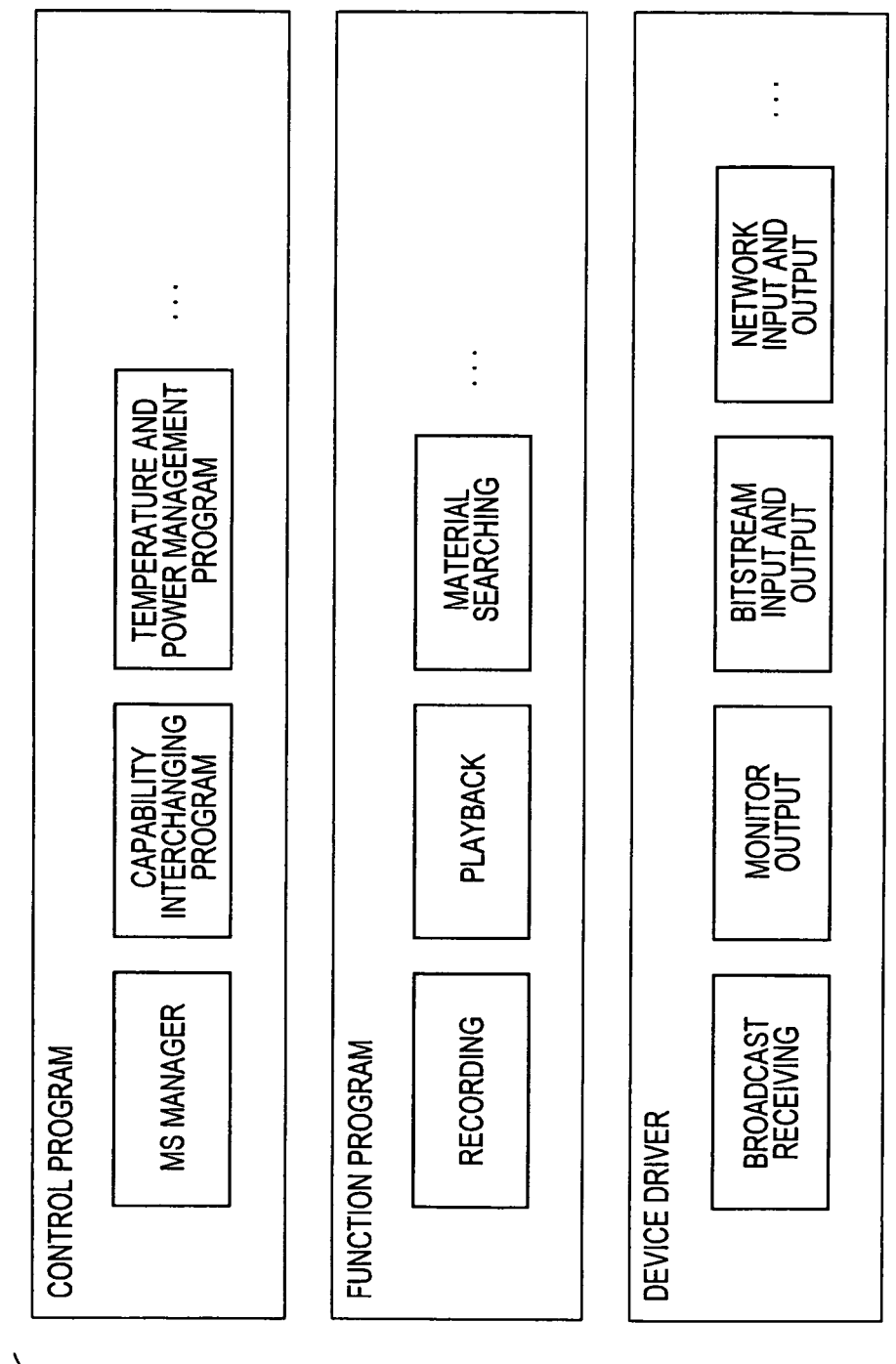
FIG. 54 illustrates the structure of a software program stored in the main memory of the information processing controller of FIG. 53.

FIG. 54 illustrates the structure of a software program executed by the information processing controller 411. The information processing controller 411 controls distributed processing assignment in response to a temperature rise and/or an increase in power consumption. The software program is pre-recorded on the recorder 13 connected to the information processing controller 411 prior to the power on of the information processing apparatus 401.

As shown in FIG. 54, elements identical to those described with reference to FIG. 8 are designated with the same reference numerals, and the discussion thereof is omitted herein. The structure of the software program stored in the main memory 12 of the information processing controller 411 in accordance with the embodiment of the present invention is substantially identical to the software structure discussed with reference to FIG. 8 except that a temperature and power management program is contained as a control program. The temperature and power management program is preferably a resident program that is continuously operative while the main power of the information processing apparatus 401 remains turned on.

Under the control of the temperature and power management program, the information processing controller 411 gathers information relating to temperatures measured by the temperature detectors 121-1 through 121-(m+2), and information relating to power measured by the power measurement unit 321. Based on the temperature information and the power information, the information processing controller 411 controls the process of the main processor 42, and as necessary, the transfer or interchange of the process of the sub-processors 43-1 through 43-m. The information processing controller 411 exchange temperature and power information with other information processing apparatuses 401 via the network 2, and then controls the process executed by the main processor 42, and the transfer or interchange of the process executed by the sub-processors 43-1 through 43-m as necessary.

The control of the temperature information and the power information and the transfer or interchange of the process of the information processing apparatuses 401 connected to the network 2 is performed in the following three patterns.

In a first pattern, the information processing apparatus 401-1, if identified as a master apparatus, manages own temperature and power management table but also temperature and power management tables of the information processing apparatus 401-2 through the information processing apparatus 401-n as slave apparatuses. More specifically, each of the information processing apparatus 401-2 through the information processing apparatus 401-n, as the slave apparatuses, regularly transmits an updated temperature and power management table thereof to the information processing apparatus 401-1. The information processing apparatus 401-1 as the master apparatus monitors the temperature and power information of all information processing apparatuses 401-1 through 401-n, and if an abnormal temperature rise or an abnormal power consumption is detected in any of the information processing apparatuses 401-1 through 401-n, the information processing apparatus 401-1 selects an appropriate sub-processor 43 as a transfer target or an interchange target of the process from among all sub-processors 43 contained in the information processing controllers 411 of the information processing apparatuses 401 connected to the network 2. The information processing apparatus 401-1 performs control process to transfer the process of the sub-processor 43 detected to be in anomaly to the selected sub-processor 43 or to interchange the processes between the two sub-processors 43.

In a second pattern, the information processing apparatus 401 monitors own temperature management table, and if an abnormal power consumption is detected in the power management table, the information processing apparatus 401 transmits, to all other information processing apparatuses 401, a command requesting all other information processing apparatuses 401 to transmit the temperature and power information. More specifically, upon receiving a command requesting the transmission of the temperature and power information, an information processing apparatus 401 detecting neither abnormal temperature rise nor abnormal power consumption generates a power information reply command, and transmits the command to reply the generated temperature and power information to the information processing apparatus 401 as the source of the power information request command.

The temperature and power information reply command contains information relating to the updated temperature detection results of the heat sink 141, the main processor 42, and the sub-processors 43-1 through 43-8 (the updated temperature detection results of the temperature detectors 121-1 through 121-10), the set temperature upper limits of the heat sink 141, the main processor 42, and the sub-processors 43-1 through 43-8 (namely, if temperature detected by each of the temperature detectors 121-1 through 121-10 becomes above the respective temperature upper limit, a temperature anomaly is determined to take place), operation state of the sub-processors 43-1 through 43-8, layout information of the sub-processors in the chip, information relating to the power consumption upper limit of AC power, the power consumption upper limit of rechargeable battery power, and the power consumption upper limit of dry battery power, power connection information representing which of AC power, rechargeable battery power, and dry battery power is connected, and power consumption in a current process.

Upon receiving the temperature and power information rely command, the information processing apparatus 401 selects an appropriate sub-processor 43 as a transfer target or an interchange target of the process from among all sub-processors 43 contained in the information processing controllers 111 of the information processing apparatuses 401 connected to the network 2. The information processing apparatus 401 performs control process to transfer the process of the sub-processor 43 detected to be in anomaly to the selected sub-processor 43 or to interchange the processes between the two sub-processors 43.

In a third pattern, each information processing apparatus 401 monitors own power management table, and if an abnormal temperature rise or abnormal power consumption is detected in the temperature and power management table, the information processing apparatus 401 transmits, to all other information processing apparatuses 401, a command requesting all other information processing apparatuses 401 to transfer sub-processor programs. More specifically, upon receiving a command requesting the transfer of the sub-processor program from the other information processing apparatus 401, an information processing apparatus 401 detecting neither abnormal temperature rise nor abnormal power consumption generates, based on own temperature and power management table, a reply command indicating whether own apparatus can be a transfer target or an interchange target of the sub-processor program. The information processing apparatus 401 then transmits the reply command to the information processing apparatus 401 as the source of the command requesting the transfer of the sub-processor program. Upon receiving the temperature and power information rely command, the information processing apparatus 401 selects an appropriate sub-processor 43 as a transfer target or an interchange target of the process from all sub-processors 43 contained in the information processing controllers 411 of the information processing apparatuses 401 connected to the network 2. The information processing apparatus 401 performs control process to transfer the process of the sub-processor 43 detected to be in anomaly to the selected sub-processor 43 or to interchange the processes between the two sub-processors 43.

Figure 55:
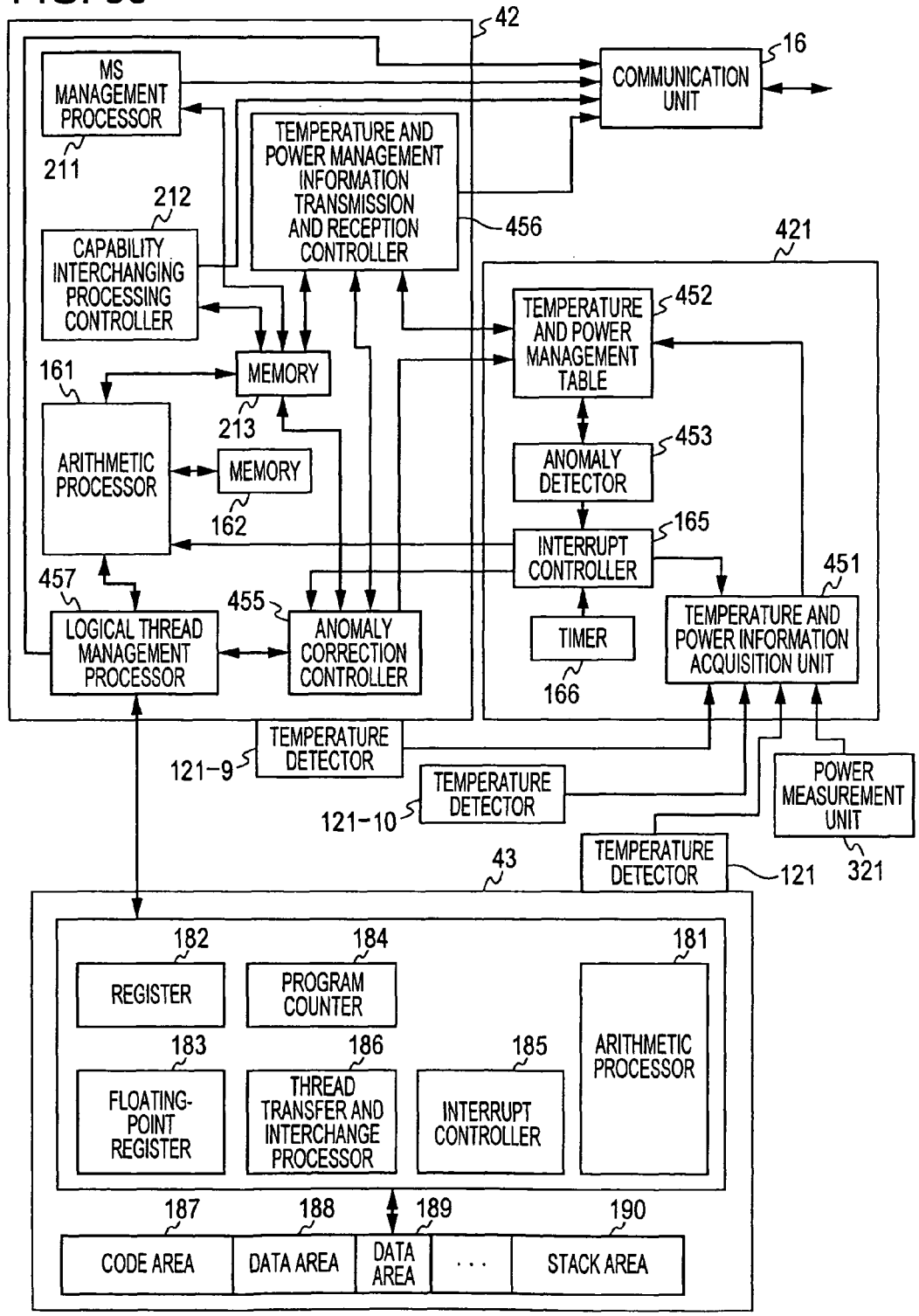
FIG. 55 is a functional block diagram illustrating the function performed by the information processing controller of FIG. 53 in the third pattern.

Particularly, if a temperature rise takes place in the three control patterns, a-sub-processor 43 contained in own appa- FIG. 55 is a functional block diagram of the information processing controller 411 that performs the control process in the first pattern in accordance with one embodiment of the present invention. The information processing controller 411 controls distributed processing in response to a temperature rise or an increase in power consumption. Elements identical to those described with reference to FIG. 21 are designated with the same reference numerals, and the discussion thereof is omitted as appropriate. In the first pattern of the information processing controller 411 as shown in FIG. 55, the main processor 42 includes an anomaly correction controller 455, a logical thread management processor 457, and a temperature and power management information transmission and reception controller 456 in place of the temperature anomaly correction controller 216, the logical thread management processor 217, and the temperature management information transmission and reception controller 214. The rest of the information processing controller 42 remains unchanged from the main processor 42 of FIG. 21. A temperature and power management processor 421, in place of the temperature monitoring processor 122 of FIG. 21, includes a temperature and power information acquisition unit 451, an interrupt controller 165, a timer 166, a temperature and power management table 452, and an anomaly detector 453.

The temperature and power information acquisition unit 451 acquires temperature information and power information from the temperature detector 121 and the power measurement unit 321 at timing controlled by the interrupt controller 165, thereby updating a temperature and power management table 452. The interrupt controller 165 references the timer 166 and timer-interrupts the temperature and power information acquisition unit 451. In response to information supplied from the anomaly detector 453, the interrupt controller 165 interrupts the arithmetic processor 161 and the anomaly correction controller 455.

Under the control of the anomaly correction controller 455, the temperature and power management information transmission and reception controller 456 controls transmitting, via the communication unit 16, the temperature and power management table or a variety of commands (software cell) generated for temperature and power management to the other information processing apparatuses 401 connected to the network 2. The temperature and power management information transmission and reception controller 456 controls receiving, via the communication unit 16, the temperature and power management table of the other information processing apparatuses 401 or a variety of commands (software cell) generated for power and temperature management from the other information processing apparatuses 401 connected to the network 2. The temperature and power management table or the variety of commands (software cell) generated for temperature and power management are collectively referred to as temperature and power management information if there is no need for discriminating information relating to temperature and power management of the plurality of information processing apparatuses 401 connected to the network 2 and information relating to the control of distributed processing executed based on the temperature and power management.

The temperature and power management table 452 holds information of the information processing controller 411 for managing temperature and power consumption. If own apparatus is a slave apparatus, the temperature and power management table 452 holds own temperature an power information, and if own apparatus is a master apparatus, the temperature and power management table 452 holds temperature and power information of all information processing apparatuses 401 connected to the network 2. As previously discussed with reference to FIG. 13, the temperature information contains a controller ID identifying the information processing controller 411, information of the operation state of each of the sub-processors 43-1 through 43-8, information relating to the updated temperature detection results of the heat sink 141, the main processor 42, and the sub-processors 43-1 through 43-8 (the updated temperature detection results of the temperature detectors 121-1 through 121-10), the set temperature upper limits of the heat sink 141, the main processor 42, and the sub-processors 43-1 through 43-8 (namely, if temperature detected by each of the temperature detectors 121-1 through 121-10 becomes above the respective temperature upper limit, a temperature anomaly is determined to take place), and the layout information of the sub-processors in the chip. As previously discussed with reference to FIG. 40, the power information contains the controller IDs of the information processing controllers 411, and information relating to the power consumption upper limit of AC power, the power consumption upper limit of rechargeable battery power, and the power consumption upper limit of dry battery power, power connection information representing which of AC power, rechargeable battery power, and dry battery power is connected, and the power consumption in a current process.

The temperature upper limit is a specification value at the design stage of the information processing controller 411 and the information processing apparatus 401, and is an upper temperature limit of a required temperature range within which the normal operation of the information processing controller 411 and the information processing apparatus 401 is guaranteed. The temperature upper limit may be a preferred temperature upper limit below which a normal and efficient operation of the information processing controller 411 and the information processing apparatus 401 is performed. The information of the operation status of the sub-processor 43-1 through the sub-processor 43-8 indicates a run status or a stop status as to whether the apparatus is active or not. The sub-processor layout information indicates the layout of the sub-processor 43-1 through the sub-processor 43-8 set beforehand in the design stage of the information processing controller 411 and the information processing apparatus 401.

The power consumption upper limit is determined at design stage of the information processing apparatus and is an upper limit below which the information processing apparatus 401 normally operates from the AC power. The AC power consumption upper limit may be a preferable power consumption upper limit below which the information processing apparatus 401 operates normally and efficiently. The same is true of the power consumption upper limits of the rechargeable battery power 73 and the dry battery power. The power connection information may be set at the design stage of the information processing apparatus 401. If the information processing apparatus 401 works with a plurality of power sources, the power connection information may be modified. The current power consumption is the one measured by the power measurement unit 321, and varies depending on the operation state of the information processing apparatus 401.

If own apparatus is a master apparatus, the anomaly detector 453 references the temperature and power management table 452. If a power consumption value above the predetermined upper limit is found in power detection results of all information processing apparatuses 401 connected to the network 2, the anomaly detector 453 notifies the interrupt controller 165 of the detection of the temperature anomaly or power consumption anomaly, thereby causing the interrupt controller 165 to interrupt the arithmetic processor 161 and the anomaly correction controller 455.

If own apparatus is a master apparatus, the anomaly correction controller 455 references the temperature and power management table 452 in response to an interrupt from the interrupt controller 165. The anomaly correction controller 455 thus detects which of the information processing apparatuses 401 connected to the network 2 is in temperature anomaly or power consumption anomaly. Based on the detection results, the anomaly correction controller 455 controls the logical thread management processor 457, thereby stopping the process or transferring the process of the information processing apparatus 401 detected in temperature anomaly or power consumption anomaly to another information processing apparatus 401 or interchanging the processes between the two information processing apparatuses 401.

The logical thread management processor 457 generates or deletes a logical thread of an application program performed by the arithmetic processor 161. If own apparatus is a master apparatus, the logical thread management processor 457 monitors the state of the logical thread in distributed processing performed by one of the information processing apparatuses 401 connected to the network 2 and controls the distributed processing. If own apparatus is a master apparatus, the logical thread management processor 457 generates a table listing management information of all information processing apparatuses 401 connected to the network 2 and a table listing information required to execute the logical thread on a per executed logical thread basis. The logical thread management processor 457 thus controls the execution of the logical thread by referencing and updating the information of the tables.

If own apparatus is a master apparatus, the logical thread management processor 457 generates a software cell controlling the process of the thread executed by another information processing apparatus 401 as necessary, and transmits the generated software cell via the communication unit 16. If own apparatus is a slave apparatus, the logical thread management processor 457 receives, via the communication unit 16, a software cell transmitted from a master information processing apparatus 401. The logical thread management processor 457 causes the sub-processor 43 to perform the distributed processing responsive to the software cell, generates a software cell corresponding to a reply or a response, and transmits the generated software cell via the communication unit 16. Regardless whether own apparatus 401 is a master apparatus or a slave apparatus, the logical thread management processor 457 acquires, via the communication unit 16, information relating to a thread executed by another information processing apparatus 401.

Hardware performing the above function may be different from the above-referenced structure of FIG. 55. For example, part of the function of the main processor 42 may be carried out by the temperature and power management processor 421, part of the function of the temperature and power management processor 421 may be performed by the main processor 42, or these functions may be performed by different hardware. Even in such a case, the present invention is perfectly applicable.

The first pattern operation of the distributed processing is described below with reference to flowcharts of FIGS. 56 through 60.

Figure 56:
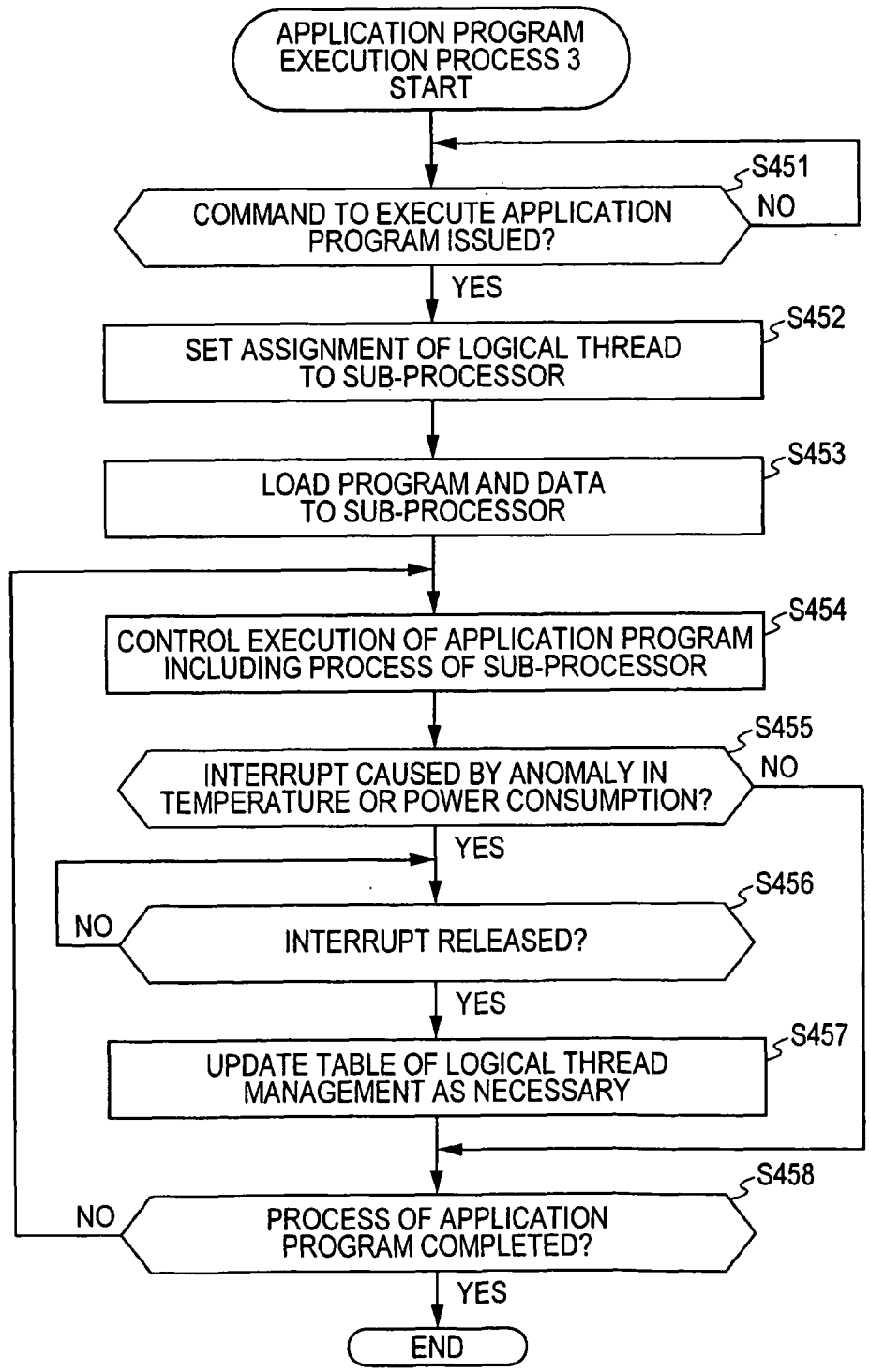
FIG. 56 is a flowchart illustrating an application program execution process 3.

An application program execution process 3 executed by the information processing apparatus 401 of FIG. 55 is described below with reference to the flowchart of FIG. 56. The temperature and power management program is a resident program that is continuously operative while the main power of the information processing apparatus 401 remains turned on.

In step S451, the arithmetic processor 161 determines whether a user has input a command to execute an application program. More specifically, in step S451, the main processor 42 determines, in response to a signal supplied from the operation input unit 15 via the bus 14 and the bus 41, whether the command to execute the application program has been issued. If it is determined in step S451 that the command to execute the application program has not been issued, the process of S451 is repeated until it is determined that the command to execute the application program has been issued.

If it is determined in step S451 that the command to execute the application program has been issued, the arithmetic processor 161 sets the assignment of the logical thread to the sub-processors and supplies the setting information of the logical thread to the logical thread management processor 457 in step S452.

In step S453, the logical thread management processor 457 loads a program and data for executing the assigned process to the code area 187 and the data area 188 of the local storage 51 in the sub-processor 43 to which the logical thread is assigned.

In step S454, the arithmetic processor 161 and the logical thread management processor 457 control the execution of the application program including the process of the sub-processor 43. The arithmetic processor 181 in the sub-processor 43 performs the assigned process.

The temperature and power management program is a resident program that is continuously operative while the main power of the information processing apparatus 401 remains turned on, and the process is performed throughout a period while steps S451 through S454 are executed. The temperature and power information management process of the master apparatus will be described later with reference to the flowchart of FIG. 57, and the temperature and power information management process of the slave apparatus will be described later with reference to the flowchart of FIG. 60.

In step S455, the arithmetic processor 161 determines whether an interrupt responsive to the occurrence of a temperature anomaly or power anomaly is issued from the interrupt controller 165. If it is determined in step S455 that an interrupt responsive to the occurrence of a power anomaly is not issued, processing proceeds to step S458.

If it is determined in step S455 that an interrupt responsive to the occurrence of a temperature anomaly or a power anomaly is issued, the current process is suspended.

In step S456, the arithmetic processor 161 determines whether the interrupt is released. If it is determined in step S456 that the interrupt is not yet released, the process at step S456 is repeated until it is determined that the interrupt has been released.

If it is determined in step S456 that the interrupt has been released, the arithmetic processor 161 supplies the logical thread management processor 457 with the setting information of the logical thread again as necessary. The logical thread management processor 457 thus updates the table relating to the logical thread management.

If it is determined in step S455 that the interrupt responsive to the occurrence of a temperature anomaly or a power consumption anomaly has not been issued, the arithmetic processor 161 determines in step S458 subsequent to the end of step S457 whether the process of the application program has been completed. If it is determined in step S458 that the process of the application program has not been completed, processing returns to step S454 to repeat step S454 and subsequent steps.

If it is determined in step S458 that the process of the application program has been completed, processing ends.

The selected sub-processor 43 performs the distributed processing corresponding to the application program performed by the main processor 42.

A temperature and power information management process of the master apparatus is described below with reference to the flowchart of FIG. 57.

In step S471, the temperature and power information acquisition unit 451 determines whether a timer interrupt has been issued from the interrupt controller 165.

If it is determined in step S471 that no timer interrupt has been issued, the temperature and power management information transmission and reception controller 456 determines in step S472 whether a temperature and power management table has been received from any of the information processing apparatuses 401 connected to the network 2. If it is determined in step S472 that no temperature and power management table has been received, processing returns to step S471 to repeat step S471 and subsequent steps. If it is determined in step S472 that a temperature and power management table has been received, processing proceeds to step S474.

If it is determined in step S471 that a timer interrupt has been received, the temperature and power information acquisition unit 451 acquires power measurement results from each power measurement unit 321 and temperature management results from the temperature detector 121 in step S473.

If it is determined in step S472 that a temperature and power management table has been received, or subsequent to step S473, the temperature and power information acquisition unit 451 updates, in step S474, the temperature and power management table 452 based on the temperature and power management table of the other information processing apparatus 401 received in step S472, or own temperature and power information acquired in step S473.

In step S475, the anomaly detector 453 references the temperature and power management table 452 to determine whether an abnormal value is contained in the temperature and power information, in other words, whether any of the power detection results detected by the power measurement units 321 or temperature detection results detected by the temperature detectors 121 arranged in the information processing apparatuses 401 connected to the network 2 is above the predetermined temperature upper limit or power consumption upper limit. If it is determined in step S475 that no abnormal value is contained in the temperature and power information, processing returns to step S471 to repeat step S471 and subsequent steps.

If it is determined in step S475 that an abnormal value is contained in the temperature and power information, the anomaly detector 453 notifies the interrupt controller 165 of the detection of an abnormal temperature rise or an abnormal power consumption in step S476, thereby causing the interrupt controller 165 to interrupt the arithmetic processor 161 and the anomaly correction controller 455. The interrupt controller 165 interrupts the arithmetic processor 161 and the anomaly correction controller 455, thereby causing the arithmetic processor 161 to stop the process of the application program and the anomaly correction controller 455 to start an anomaly-time process 8.

The anomaly-time process 8 to be discussed later with reference to FIGS. 58 and 59 is performed in step S477.

In step S478, the anomaly correction controller 455 controls the logical thread management processor 457 in accordance with the anomaly-time process 8 executed in step S477, thereby causing the logical thread management processor 557 to update a table for thread management as necessary.

In step S479, the interrupt controller 165 releases the interrupt to the process of the application program controlled by the arithmetic processor 161, and processing returns to step S471 to repeat step S471 and subsequent steps.

The master information processing apparatus 401 acquires the temperature and power management table updated based on the power detection results detected by the power measurement unit 321 and the temperature detection results detected by the temperature detector 121 arranged in each of the information processing apparatuses 401 connected to the network 2, and manages the table as the temperature and power management table 452. Whether to perform an anomaly-time interrupt process is thus determined based on the temperature and power management table 452 stored in the master information processing apparatus 401.

The anomaly-time process 8 executed in step S447 of FIG. 57 is described below with reference to flowcharts of FIGS. 58 and 59.

In step S501, the anomaly correction controller 455 references the temperature and power management table 452 to determine a temperature anomaly takes place. If it is determined in step S501 that no temperature anomaly takes place, processing proceeds to step S519.

If it is determined in step S501 that a temperature anomaly takes place, the anomaly correction controller 455 references the temperature and power management table 452, and determines which of the main processor 42 and the information processing controller 411 suffers from the temperature anomaly in step S502, in other words, which of the temperature detector 121-9 and the temperature detector 121-10 has detected temperatures above the predetermined temperature upper limit. If it is determined in step S502 that one of the main processor 42 and the information processing controller 411 causes the temperature anomaly, processing proceeds to step S514 as described below.

If it is determined in step S502 that neither the main processor 42 nor the information processing controller 411 causes the temperature anomaly, in other words, that any of the sub-processors 43 has caused the temperature anomaly, the anomaly correction controller 455 references the temperature and power management table 452 in step S503. In step S503, the anomaly correction controller 455 thus determines whether the process of the sub-processor 43 detected to be in temperature anomaly is transferable, in other words, whether any of sub-processors 43 other than the sub-processor 43 detected to be in temperature anomaly is not currently operating. If it is determined in step S503 that the process of the sub-processor 43 detected to be in temperature anomaly is not transferable, processing proceeds to step S508.

If it is determined in step S503 that the process of the sub-processor 43 detected to be in temperature anomaly is transferable, the anomaly correction controller 455 selects a sub-processor 43 as a transfer target of the process, and notifies the logical thread management processor 457 of the selection results in step S504. More specifically, the anomaly correction controller 455 selects, as a transfer target with priority, one sub-processor 43 resulting in the lowest temperature measurement from among those that have remained inoperative and are not closely located to the currently operating sub-processor 43, out of the sub-processors 43 in the information processing controllers 411 of the information processing apparatuses 401 connected to the network 2. If a plurality of sub-processors 43 satisfy the criteria, the anomaly correction controller 455 selects a sub-processor 43 having the smallest sub-processor ID number as a transfer target. If sub-processors 43 that have remained inoperative and are located far from the currently operating sub-processor 43 are not available, one resulting in the lowest temperature measurement is selected from among the currently inoperative sub-processors 43. If a plurality of sub-processors 43 satisfy the criteria, a sub-processor 43 having the smallest sub-processor ID number is selected as a transfer target. The anomaly correction controller 455 then notifies the logical thread management processor 457 of the selection results.

In step S505, the logical thread management processor 457 evacuates the context of the process being executed by the sub-processor 43 detected to be above the temperature upper limit. If the sub-processor 43 above the temperature upper limit is in a master apparatus, the interrupt controller 185 of the sub-processor 43 detected to be above the temperature upper limit suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 in the transfer target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 163 (the portion of the storage area of the local storage 51 of the main processor 42).

If the sub-processor 43 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the transfer target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 401 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 101 functioning as the master apparatus via the bus 41, the bus 14, the communication unit 16 and the network 2.

In step S506, the logical thread management processor 457 stops the operation of the sub-processor 43 detected to be above the temperature upper limit.

In step S507, the logical thread management processor 457 restores the context, evacuated in step S505, to the sub-processor 43 selected as the transfer target sub-processor. More specifically, if the transfer target sub-processor 43 is the one in the master apparatus, the logical thread management processor 457 supplies the context stored in an information storage area managed by itself to the transfer target sub-processor 43 via the bus 41. If the transfer target sub-processor 43 is the one in the slave apparatus, the logical thread management processor 457 supplies the context stored in the information storage area managed itself to the transfer target sub-processor 43 contained in the information processing apparatus 401 functioning as the slave apparatus, via the bus 41, the bus 14, the communication unit 16 and the network 2. The sub-processor 43 selected as the transfer target sub-processor stores the supplied context in the code area 187 through the stack area 190 thereof. Processing proceeds to step S519.

If it is determined in step S503 that the process of the sub-processor 43 detected to be in temperature anomaly is not transferable, the anomaly correction controller 455 selects a sub-processor 43 as an interchange target and notifies the logical thread management processor 457 of the selection results in step S508. More specifically, the anomaly correction controller 455 selects, as an interchange target sub-processor 43 with priority, one resulting in the lowest temperature measurement from among the sub-processors 43 of the information processing controllers 411 of the information processing apparatuses 401 connected to the network 2. If a plurality of sub-processors 43 satisfy the criteria, the anomaly correction controller 455 selects a sub-processor 43 having the smallest sub-processor ID number as an interchange target.

In step S509, the logical thread management processor 457 evacuates the context of the process being executed by the sub-processor 43 detected to be above the temperature upper limit. If the sub-processor 43 detected to be above the temperature upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42).

If the sub-processor 43 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 401 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 401 functioning as the master apparatus via the bus 41, the bus 14, the communication unit 16 and the network 2.

In step S510, the logical thread management processor 457 stops the operation of the sub-processor 43 detected to be above the temperature upper limit.

In step S511, the logical thread management processor 457 evacuates the context of the process executed by the sub-processor 43 selected as the interchange target. If the sub-processor 43 selected as the interchange target is in a master apparatus, the interrupt controller 185 suspends the process of the arithmetic processor 181 in response to an interrupt command to evacuate the currently processed context. The thread transfer and interchange processor 186 evacuates the context of the currently executed program (the values of the register 182, the floating-point register 183, and the program counter 184) to the stack area 190. If the sub-processor 43 in an interchange source pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 in the interchange source does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42).

If the sub-processor 43 detected to be above the temperature upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange source pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 101 operating as a master apparatus via the bus 41, the bus 14, the communication unit 16 and the network 2. If the sub-processor 43 in the interchange source does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 401 operating as the master apparatus via the bus 41, the bus 14, the communication unit 16 and the network 2.

In step S512, the logical thread management processor 457 stops the operation of the sub-processor 43 selected as the interchange target.

In step S513, the logical thread management processor 457 interchanges contexts between the two context-evacuated sub-processors 43 to restore the context there. More specifically, the logical thread management processor 457 restores the context, evacuated in step S509, to the sub-processor 43 selected as the interchange target of the process while restoring the context, evacuated in step S511, to the sub-processor 43 detected to be above the temperature upper limit. If the sub-processor 43 detected to be above the temperature upper limit or the interchange target sub-processor 43 is the one in the master apparatus, the logical thread management processor 457 supplies the corresponding context stored in the information storage area managed by itself to the interchange target sub-processor 43 via the bus 41. If the sub-processor 43 detected to be above the temperature upper limit or the interchange target sub-processor 43 is the one in the slave apparatus, the logical thread management processor 457 supplies the corresponding context stored in the information storage area managed by itself to the target sub-processor 43 detected to be above the temperature upper limit or the interchange target sub-processor 43 contained in the information processing apparatus 401 operating as the slave apparatus via the bus 41, the bus 14, the communication unit 16 and the network 2. Each sub-processor 43 stores the supplied context in areas of the code area 187 through the stack area 190 thereof. Processing proceeds to step S519.

If it is determined in step S502 that one of the main processor 42 and the information processing controller 411 suffers from the temperature anomaly, the anomaly correction controller 455 determines in step S514 whether one of the main processor 42 and the information processing controller 411 suffering from the temperature anomaly is contained in the information processing apparatus 401 as the master apparatus. If it is determined in step S514 that one of the main processor 42 and the information processing controller 411 suffering from the temperature anomaly is contained in the information processing apparatus 401 as the master apparatus, processing proceeds to step S517.

If it is determined in step S514 that one of the main processor 42 and the information processing controller 411 suffering from the temperature anomaly is not contained in the information processing apparatus 401 as the master apparatus, in other words, one of the main processor 42 and the information processing controller 411 suffering from the temperature anomaly is contained in the information processing apparatus 401 as the salve apparatus, the anomaly correction controller 455 references the temperature and power management table 452 in step S515. In step S515, the anomaly correction controller 455 thus determines whether the process of the one of the main processor 42 and the information processing controller 411 in the information processing apparatus 401 is transferable. If it is determined in step S515 that the process of the one of the main processor 42 and the information processing controller 411 in the information processing apparatus 401 is transferable, processing proceeds to step S504.

If it is determined in step S515 that the process of the one of the main processor 42 and the information processing controller 411 in the information processing apparatus 401 is not transferable, the anomaly correction controller 455 references the temperature and power management table 452 in step S516. In step S516, the anomaly correction controller 455 determines the process of the one of the main processor 42 and the information processing controller 411 in the information processing apparatus 401 is interchangeable. If it is determined in step S516 that the process of the one of the main processor 42 and the information processing controller 411 in the information processing apparatus 401 is interchangeable, processing proceeds to step S508.

If it is determined in step S514 that the one of the main processor 42 and the information processing controller 411, detected to be in temperature anomaly, is contained in the information processing apparatus 401 as the master apparatus, or if it is determined in step S516 that the process of one of the main processor 42 and the information processing controller 411 in the information processing apparatus 401 is not interchangeable, the anomaly correction controller 455 controls, in step S517, the logical thread management processor 457 to temporarily stop the application program executed by the arithmetic processor 161. The process of the main processor 42, except part thereof executed by the resident program, is temporarily suspended.

In step S518, the anomaly correction controller 455 references the temperature and power management table 452 to determine normal temperature state is restored. If it is determined in step S518 that normal temperature state is not yet restored, the process in step S518 is repeated until the normal temperature state is restored.

If it is determined in step S501 that no temperature anomaly takes place, or subsequent to step S507, or subsequent to step S513, or if it is determined in step S518 that the normal temperature state is restored, the anomaly correction controller 455 determines in step S519 whether a power anomaly takes place. If it is determined in step S519 that no power anomaly takes place, processing returns to step S477 and then proceeds to step S478 as shown in FIG. 57.

If it is determined in step S519 that a power anomaly takes place, the anomaly correction controller 455 references the temperature and power management table 452 in step S520 to determine whether the process of all sub-processors 43 contained the information processing controller 411 detected to be in power consumption anomaly is transferable. If it is determined in step S520 that the process of all sub-processors 43 in the information processing controller 411 detected to be power consumption anomaly is not transferable, processing proceeds to step S525.

If it is determined in step S520 that the process of all sub-processors 43 contained in the information processing controller 411 detected to be in power consumption anomaly is transferable, the anomaly correction controller 455 references the temperature and power management table 452 in step S521. In step S521, the anomaly correction controller 455 thus selects an information processing controller 411 as a transfer target of the process from among the information processing controllers 411 of the information processing apparatuses 101 connected to the network 2, and notifies the logical thread management processor 457 of the selection results. More specifically, the anomaly correction controller 455 references the temperature and power management table 452 and selects, as a transfer target with priority, one information processing controller 411 consuming the lowest power from those that are enabled to perform the process of the currently operating sub-processor 43 and are not closely located to the currently operating information processing controller 411, from among the information processing controllers 411 of the information processing apparatuses 401 connected to the network 2. Alternatively, the anomaly correction controller 455 may select, as a transfer target with higher priority, the information processing controller 411 in the information processing apparatus 401 operating from the AC power source than the information processing controller 411 in the information processing apparatus 401 operating from the rechargeable battery power or the dry battery power. If a plurality of information processing controllers 411 satisfy the criteria, the anomaly correction controller 455 selects an information processing controller 411 having the smallest processor ID number as a transfer target.

In the information processing controller 411 selected as the transfer target, the logical thread management processor 457 in the main processor 42 determines which sub-processors 43 to assign the distributed processing to.

In step S522, the logical thread management processor 457 evacuates the context of the process executed by the information processing controller 411 detected to consume power above the power consumption upper limit.

If the information processing controller 411 detected to consume power above the power consumption upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the transfer target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42).

If the information processing controller 411 detected to consume power above the power consumption upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the transfer target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 401 functioning as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 401 operating as the master apparatus via the bus 41, the bus 14, the communication unit 16 and the network 2.

In step S523, the logical thread management processor 457 stops the operation of the sub-processor 43 in the information processing controller 411 detected to consume power above the power consumption upper limit.

In step S524, the logical thread management processor 457 restores the context, evacuated in step S522, to the sub-processor 43 in the information processing controller 411 selected as the transfer target. More specifically, if the transfer target sub-processor 43 is the one in the master apparatus, the logical thread management processor 457 supplies the context stored in an information storage area managed by itself to the transfer target sub-processor 43 via the bus 41. If the transfer target sub-processor 43 is the one in the slave apparatus, the logical thread management processor 457 supplies the context stored in the information storage area managed itself to the transfer target sub-processor 43 contained in the information processing apparatus 401 functioning as a slave apparatus, via the bus 41, the bus 14, the communication unit 16 and the network 2. In the sub-processor 43 selected as the transfer target, the supplied context is stored in areas corresponding to the code area 187 through the stack area 190, and processing returns to step S477 and then proceeds to step S478 of FIG. 57.

If it is determined in step S520 that the process of all sub-processors 43 contained in the information processing controller 411 detected to be in power consumption anomaly is not transferable, the anomaly correction controller 455 references the temperature and power management table 452 in step S525. In step S525, the anomaly correction controller 455 thus selects a sub-processor 43 as an interchange target of the process from among the sub-processors 43 of the information processing controllers 411 of the information processing apparatuses 101 connected to the network 2, and notifies the logical thread management processor 457 of the selection results. More specifically, the anomaly correction controller 455 selects, as an interchange target with priority, one information processing controller 411 consuming the lowest power from among the information processing controllers 411 of the information processing apparatuses 401 connected to the network 2. Alternatively, the anomaly correction controller 455 may select, as an interchange target with higher priority, the information processing controller 411 in the information processing apparatus 401 operating from the AC power source than the information processing controller 411 in the information processing apparatus 401 operating from the rechargeable battery power or the dry battery power. If a plurality of information processing controllers 411 satisfy the criteria, the anomaly correction controller 455 selects an information processing controller 411 having the smallest processor ID number as an interchange target.

If the commonly used program and model data required to execute the process are supplied beforehand to the local storages 51 of one sub-processors 43 having no distributed processing assignment, the information processing controller 411 having that sub-processor 43 with that local storage 51 may be selected with priority.

In the information processing controller 411 selected as the interchange target, the logical thread management processor 457 in the main processor 42 determines which of the sub-processors 43 is assigned the distributed processing.

In step S526, the logical thread management processor 457 evacuates the context of the process being executed by the sub-processor 43 of the information processing controller 411 detected to consume power above the power consumption upper limit.

If the information processing controller 411 detected to consume power above the power consumption upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange target pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42).

If the information processing controller 411 detected to consume power above the power consumption upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange process pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 401 operating as a master apparatus via the bus 41, the bus 14, the communication unit 16 and the network 2. If the sub-processor 43 does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 401 operating as the master apparatus via the bus 41, the bus 14, the communication unit 16 and the network 2.

In step S527, the logical thread management processor 457 stops the operation of the sub-processor 43 in the information processing controller 411 detected to consume power above the power consumption upper limit.

In step S528, the logical thread management processor 457 restores the context of the process being executed by the sub-processor 43 of the information processing controller 411 selected as the interchange target.

If the information processing controller 411 detected to consume power above the power consumption upper limit is in a master apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in an interchange source pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42). If the sub-processor 43 in the interchange source does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42).

If the information processing controller 411 detected to consume power above the power consumption upper limit is in a slave apparatus, the interrupt controller 185 stops the process of the arithmetic processor 181 in response to an interrupt command instructing the evacuation of the context of the current process. The thread transfer and interchange processor 186 evacuates the context of the currently running program (the values of the register 182, the floating-point register 183, and the program counter 184) to the stack area 190. If the sub-processor 43 in the interchange source pre-stores the commonly used program and model data, the thread transfer and interchange processor 186 transfers the content of the stack area 190 and the data area 189 to an information storage area managed by the logical thread management processor 457 (a portion of the storage area of the local storage 51 of the main processor 42) in the information processing apparatus 401 via the bus 41, the bus 14, the communication unit 16 and the network 2. If the sub-processor 43 in the interchange source does not pre-store commonly used program and model data, the thread transfer and interchange processor 186 transfers the data of the code area 187 through the stack area 190 to the information storage area managed by the logical thread management processor 457 (the portion of the storage area of the local storage 51 of the main processor 42) in the information processing apparatus 401 via the bus 41, the bus 14, the communication unit 16 and the network 2.

In step S529, the logical thread management processor 457 stops the operation of the sub-processor 43 in the information processing controller 411 selected as the interchange target.

In step S530, for context restoration, the logical thread management processor 457 interchanges the contexts of the sub-processors 43 in the two information processing controllers 411 that have undergone context evacuation. More specifically, the logical thread management processor 457 restores the context, evacuated in step S526, to the sub-processor 43 in the information processing controller 411 selected as the interchange target while restoring the context, evacuated in step S528, to the sub-processor 43 in the information processing controller 411 that has consumed power above the power consumption upper limit. In other words, if the information processing controller 411 detected to consume power above the power consumption upper limit or the interchange target information processing controller 411 is the one in the master apparatus, the logical thread management processor 457 supplies the corresponding context stored in the information storage area managed by itself to the interchange target sub-processor 43 via the bus 41. If the information processing controller 411 detected to consume power above the power consumption upper limit or the interchange target information processing controller 411 is the one in the slave apparatus, the logical thread management processor 457 supplies the corresponding context stored in the information storage area managed by itself to the information processing controller 411 detected to consume power above the power consumption upper limit or the interchange target sub-processor 43 contained in the information processing apparatus 401 operating as the slave apparatus via the bus 41, the bus 14, the communication unit 16 and the network 2. The sub-processor 43 in each information processing controller 411 stores the supplied context in areas of the code area 187 through the stack area 190. Processing returns to step S477 and then proceeds to step S478 as shown in FIG. 57.

In this way, whether to transfer part of the distributed processing, or whether to interchange part of the distributed processing is determined depending on the location of the power anomaly, the operation of each information processing controller 411 of the information processing apparatuses 401 connected to the network 2, and the temperature measurement values and the power measurement values of the processors. One of the transfer target and the interchange target is also determined.

Figure 60:
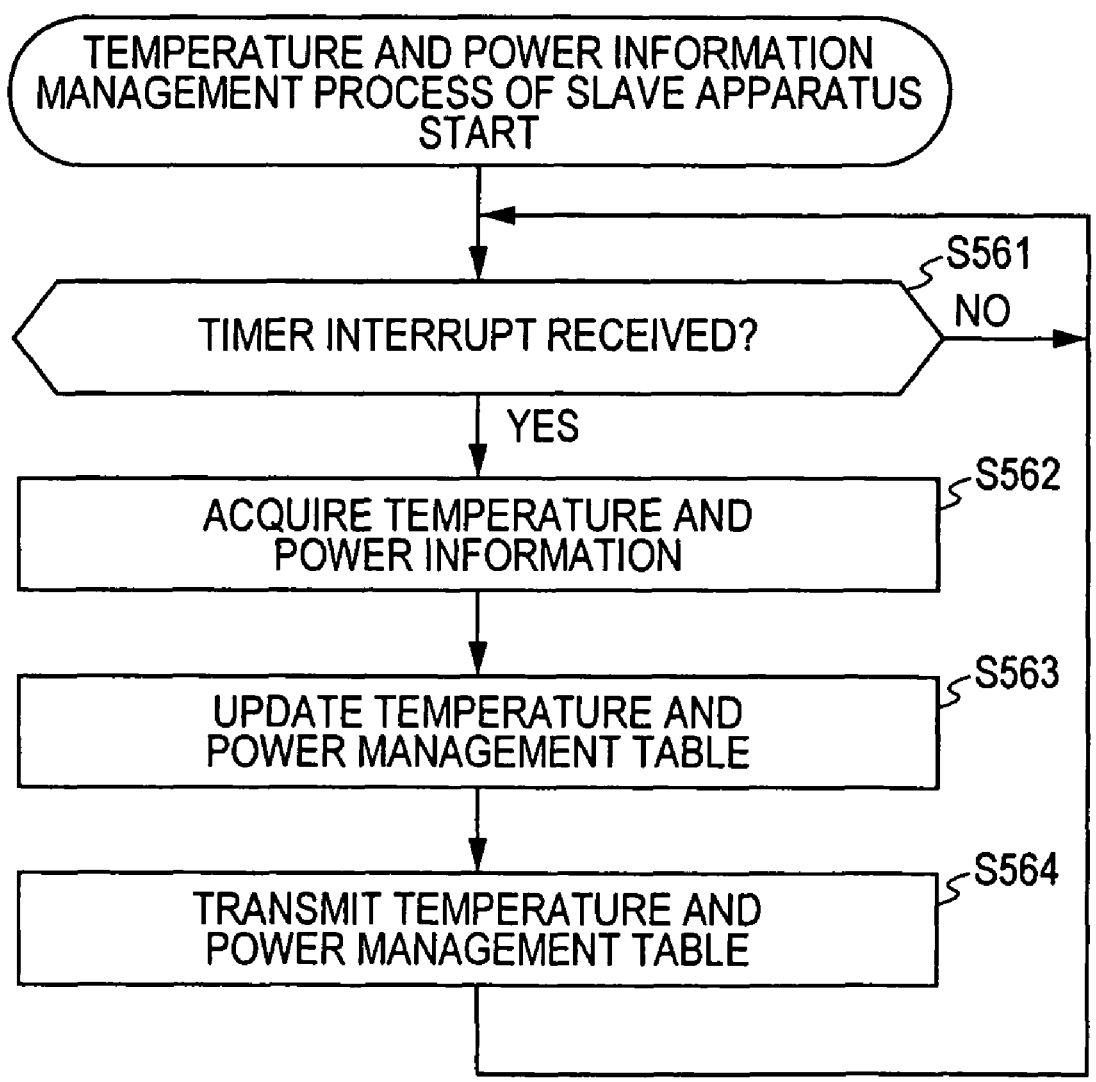
FIG. 60 is a flowchart illustrating a temperature and power information management process of the slave apparatus.

A temperature and power information management process of the slave apparatus executed in parallel with the power information management process of the master apparatus discussed with reference to FIG. 57 is described below with reference to the flowchart of FIG. 60.

In step S561, the temperature and power information acquisition unit 451 in the information processing apparatus 401 functioning as a slave apparatus determines whether a timer interrupt has been input from the interrupt controller 165. If it is determined in step S561 that no timer interrupt has been input, the process in step S561 is repeated until it is determined that a timer interrupt has been input.

If it is determined in step S561 that a timer interrupt has been input, the power temperature and power information acquisition unit 451 acquires the temperature and power information from the temperature detector 121 and the power measurement unit 321, respectively, in step S562.

In step S563, the temperature and power information acquisition unit 451 updates the temperature and power management table 452 based on the temperature information and the power information acquired in step S562.

In step S564, the temperature and power management information transmission and reception controller 456 transmits the power management table 354, updated in step S563, to the information processing apparatus 401 functioning as the master apparatus via the communication unit 16 and the network 2. Processing returns to step S561 to repeat step S561 and subsequent steps.

The temperature and power management table of the slave apparatus is transmitted to the master apparatus in this way. The transmitted temperature and power management table of the slave apparatus is then managed by the master apparatus.

The plurality of information processing apparatuses 401 connected to the network 2, each including the power measurement unit 321 arranged to measure power consumption of the information processing controller 411 and the temperature detector 121 arranged to measure temperatures of the information processing controller 411, perform the process as discussed with reference to FIGS. 56-60. With the first pattern control of the temperature and power information and the transfer or interchange of the process, device failure or lowered processing speed due to heat is prevented while the suspension of the process in the middle thereof is minimized.

The first pattern control of the distributed processing responsive to the temperature information and the power information has been discussed. The distributed processing can be performed in one of the second pattern and the third pattern using the temperature information or the power information. For example, the distributed processing is controlled based on the temperature information and the power information by exchanging the temperature and power information transmission command the temperature and power information reply command or by exchanging the sub-processor program transfer request command and the sub-processor program transfer reply command. Thus, device failure or lowered processing speed due to heat is prevented while the suspension of the process in the middle thereof is minimized.

The present invention is also applicable to the system of FIG. 53 where the plurality of information processing controllers 411 are included, and the system of FIG. 53 where the plurality of information processing controllers 411 is connected to the network 2.

The above-references series of steps can be performed in software. A program forming the software is installed from a recording medium onto a computer incorporated into a hardware structure. The software program may be installed from the recording medium to a general-purpose computer, for example.

As shown in FIG. 1, users may be supplied with the software program in the recording medium separate from a computer. As shown in FIG. 1, the recording media include package media including the magnetic disk 61 (such the Floppy Disk®), the optical disk 62 (such as a compact disk read-only memory (CD-ROM), and a digital versatile disk (DVD)), the magneto-optic disk 63 (such as Mini-Disk (MD®)), and the semiconductor memory 64.

The process steps discussed in this specification are sequentially performed in the time series order as stated. Alternatively, the steps may be performed in parallel or separately.

In this specification, the system refers to a system composed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   first information processing means;
   a plurality of second information processing means; power measurement means for measuring power consumed by an information processing module including the first information processing means and the plurality of second information processing means; and
   communication means for communicating with the other information processing apparatus,
   wherein the first information processing means comprises:
   an application program execution control unit for controlling execution of an application program;
   a distributed processing control unit for controlling distributed processing that performs process assignment on the plurality of second information processing means in order to provide a function corresponding to a process unit, the application program execution control unit, when executing the application program, forming a plurality of processes to be respectively assigned to the plurality of second information processing means, into the process unit for providing the function;
   a recording unit for recording first information relating to power measured by the power measurement means, and second information relating to the execution of the process of the plurality of second information processing means;
   an anomaly detecting unit for detecting an anomaly in the power consumption measured by the power measurement means; and
   an anomaly-time control unit for controlling the distributed processing of the distributed processing control unit in response to the power anomaly detected by the anomaly detecting unit,
   wherein the anomaly-time control unit controls the distributed processing control unit to update, based on the first information and the second information recorded by the recording unit, the assignment of the process being executed by the plurality of second information processing means contained in the information processing module detected to be in power anomaly.

2. The information processing apparatus according to claim 1, forming a network system together with at least another information processing apparatus communicable via the communication means, if own information processing apparatus functions as a master apparatus,
   wherein the communication means receives the first information and the second information of the other information processing apparatus from the other information processing apparatus,
   wherein the recording unit further records the first information and the second information of the other information processing apparatus, received by the communication means,
   wherein the anomaly detecting unit further detects a power anomaly generated in the other information processing apparatus communicable via the communication means, based on the first information of the other information processing apparatus recorded by the recording unit, and
   wherein the anomaly-time control unit controls the distributed processing control unit to update the assignment of the process being executed by the plurality of second information processing means contained in the information processing module detected to be in power anomaly, based on the first information and the second information of own information processing apparatus and the other information processing apparatus, recorded by the recording unit, if the anomaly detecting unit detects the power anomaly; and
   if own information processing apparatus functions as a slave apparatus in the network system, the communication means transmits the first information and the second information, recorded by the recording unit, to a master apparatus in the network system.

3. The information processing apparatus according to claim 1, wherein the anomaly-time control unit generates a first signal requesting the other information processing apparatus communicable via the communication unit to transmit the first information and the second information of the other information processing apparatus if the anomaly detecting unit detects the power anomaly,
   wherein the communication means transmits the first signal to the other information processing apparatus while receiving, from the other information processing apparatus, a second signal corresponding to the first information and the second information, and
   wherein the anomaly-time control unit controls the distributed processing control unit to update the assignment of the process being executed by the plurality of second information processing means contained in the information processing module detected to be in power anomaly, in response to the second signal received by the communication means.

4. The information processing apparatus according to claim 1, wherein the anomaly-time control unit generates a first signal requesting the other information processing apparatus communicable via the communication unit to execute the process being executed by the plurality of second information processing means detected to be in power anomaly if the anomaly detecting unit detects the power anomaly,
   wherein the communication means transmits the first signal to the other information processing apparatus while receiving, from the other information processing apparatus, a second signal in reply to the first signal, and wherein the anomaly-time control unit controls the distributed processing control unit to update the assignment of the process being executed by the plurality of second information processing means contained in the information processing module detected to be in power anomaly, in response to the second signal received by the communication means.

5. The information processing apparatus according to claim 1, wherein the anomaly-time control unit controls the distributed processing control unit to update the process assignment so that one of the other image processing modules detected not to be in power anomaly is selected, and so that the process being executed by the plurality of second information processing means contained in the information processing module detected in power anomaly is performed by the plurality of second information processing means contained in the selected information processing module.

6. The information processing apparatus according to claim 5, wherein the anomaly-time control unit selects, as a process assignment target with high priority, the information processing module consuming power which, as detected by the anomaly detecting unit, is lower than the power consumed by the other information processing means.

7. The information processing apparatus according to claim 5, wherein the anomaly-time control unit selects, as a process assignment target with higher priority, the information processing module operating from an alternating current source than the information processing module operating from a battery power source.

8. The information processing apparatus according to claim 1, wherein the anomaly-time control unit controls the distributed processing control unit to update the process assignment so that one of the second information processing modules detected not to be in power anomaly is selected, and so that the process being executed by the plurality of second information processing means in the information processing module detected to be in power anomaly is interchanged with the process of the plurality of second information processing means in the selected information processing module in execution of the processes.

9. The information processing apparatus according to claim 8, wherein the anomaly-time control unit selects, as a process interchange target with high priority, the information processing module consuming power which, as detected by the anomaly detecting unit, is lower than the power consumed by the other information processing module.

10. The information processing apparatus according to claim 8, wherein the anomaly-time control unit selects, as a process interchange target with higher priority, the information processing module operating from an alternating current source than the information processing module operating from a battery power source.

11. The information processing apparatus according to claim 1, further comprising a plurality of information processing modules.

12. An information processing method of an information processing apparatus including first information processing means, a plurality of second information processing means, and communication means for communicating with another information processing apparatus, the information processing method comprising steps of:
   requesting the start of distributed processing for providing a function corresponding to a process unit, the first information processing means, when executing an application program, forming a plurality of processes to be respectively assigned to the plurality of second information processing means, into the process unit for providing the function;
   acquiring information relating to power consumed by an information processing module including the first information processing means and the plurality of second information processing means;
   detecting an anomaly in the information relating to the power consumption acquired in the power information acquisition step; and
   controlling the distributed processing to update the assignment of the process being executed by the plurality of second information processing means in the information processing module detected to be in power anomaly, based on the power information acquired in the power information acquisition step.

13. A computer program product comprising a non-transitory computer readable medium including program code stored thereon, said program code being executable to perform operations comprising:
   requesting the start of distributed processing for providing a function corresponding to a process unit, a first information processing means, when executing an application program, forming a plurality of processes to be respectively assigned to a plurality of second information processing means, into the process unit for providing the function;
   acquiring information relating to power consumed by an information processing module including the first information processing means and the plurality of second information processing means;
   detecting an anomaly in the information relating to the power consumption acquired in the power information acquisition step; and
   controlling the distributed processing to update the assignment of the process executed by the plurality of second information processing means in the information processing module detected to be in power anomaly, based on the power information acquired in the power information acquisition step.

14. An information processing apparatus, comprising:
   a first information processor;
   a plurality of second information processors;
   a power measurement unit measuring power consumed by an information processing module including the first information processor and the second information processor; and
   a communication unit communicating with the other information processing apparatus,
   wherein the first information processor comprises:
   an application program execution control unit controlling execution of an application program;
   a distributed processing control unit controlling distributed processing that performs process assignment on the plurality of second information processors in order to provide a function corresponding to a process unit, the application program execution control unit, when executing the application program, forming a plurality of processes to be respectively assigned to the plurality of second information processors, into the process unit for providing the function;
   a recording unit recording first information relating to power measured by the power measurement unit, and second information relating to the execution of the process of the plurality of second information processors;

an anomaly detecting unit detecting an anomaly in the power consumption measured by the power measurement unit; and an anomaly-time control unit controlling the distributed processing of the distributed processing control unit in response to the power anomaly detected by the anomaly detecting unit, wherein the anomaly-time control unit controls the distributed processing control unit to update, based on the first information and the second information recorded by the recording unit, the assignment of the process being executed by the plurality of second information processors contained in the information processing module detected to be in power anomaly.

* * * * *